(12) United States Patent
Hayama

(10) Patent No.: US 10,509,404 B2
(45) Date of Patent: Dec. 17, 2019

(54) AUTONOMOUS MOBILE ROBOT AND MOVEMENT CONTROL METHOD

(71) Applicant: Panasonic Intellectual Property Corporation of America, Torrance, CA (US)

(72) Inventor: Satoru Hayama, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 200 days.

(21) Appl. No.: 15/872,953

(22) Filed: Jan. 16, 2018

(65) Prior Publication Data

US 2018/0157260 A1 Jun. 7, 2018

Related U.S. Application Data

(63) Continuation of application No. PCT/JP2016/004172, filed on Sep. 14, 2016.

(30) Foreign Application Priority Data

Sep. 24, 2015 (JP) .................................. 2015-186259
Jul. 25, 2016 (JP) .................................. 2016-145213

(51) Int. Cl.
*B60W 20/16* (2016.01)
*G05D 1/02* (2006.01)
*H04W 84/18* (2009.01)

(52) U.S. Cl.
CPC ............... *G05D 1/02* (2013.01); *H04W 84/18* (2013.01)

(58) Field of Classification Search
CPC combination set(s) only.
See application file for complete search history.

(56) References Cited

U.S. PATENT DOCUMENTS 6,836,701 B2 * 12/2004 McKee ................ G05D 1/0274
 318/568.11
6,941,543 B1 * 9/2005 Brown ................ G05B 19/416
 700/28

(Continued)

FOREIGN PATENT DOCUMENTS

JP 2004-165964 6/2004

OTHER PUBLICATIONS

International Search Report of PCT application No. PCT/JP2016/004172 dated Dec. 6, 2016.

*Primary Examiner* — Redhwan K Mawari
(74) *Attorney, Agent, or Firm* — Greenblum & Bernstein, P.L.C.

(57) ABSTRACT

A controller of a mobile object causes the mobile object to move by a first control amount corresponding to a first velocity absolute value and a first velocity direction. If the controller detects that first information indicating a first velocity of a first communication-partner mobile object is ceased to be received, the controller decides on a second control amount by which the mobile object is to be moved based on the first information that has already been received, the second control amount corresponding to a second velocity absolute value and a second velocity direction. The controller decides on, based on the first control amount and the second control amount, a third control amount corresponding to a third velocity absolute value and a third velocity direction, and causes the mobile object to move by switching from the first control amount to the third control amount.

21 Claims, 82 Drawing Sheets

(56) References Cited

U.S. PATENT DOCUMENTS

| | | | | |
|---|---|---|---|---|
| 7,211,980 B1* | 5/2007 | Bruemmer | ............ | G05D 1/0246 318/567 |
| 2003/0191559 A1* | 10/2003 | Chatsinchai | ............ | G06F 9/451 700/245 |
| 2005/0182518 A1* | 8/2005 | Karlsson | .............. | G05D 1/0246 700/253 |
| 2005/0234592 A1* | 10/2005 | McGee | ................. | G05D 1/027 700/245 |
| 2018/0157260 A1* | 6/2018 | Hayama | ................ | G05D 1/104 |
| 2018/0213597 A1* | 7/2018 | Hayama | ................. | H04W 4/46 |
| 2019/0016384 A1* | 1/2019 | Carlson | ............. | B62D 15/0285 |

* cited by examiner

FIG. 10

| MOBILE OBJECT IDENTIFICATION INFORMATION | POSITION INFORMATION | | | KNOWN GROUP INFORMATION | UNKNOWN GROUP INFORMATION |
|---|---|---|---|---|---|
| | LATITUDE | LONGITUDE | ASL (m) | | |
| MOBILE OBJECT 101 | 34°41'37.0" NORTH LATITUDE | 135°30'7.1" EAST LONGITUDE | 2 | MOBILE OBJECT 101 MOBILE OBJECT 102 MOBILE OBJECT 103 MOBILE OBJECT 104 | MOBILE OBJECT 105 MOBILE OBJECT 106 MOBILE OBJECT 107 |

701

| TARGET POSITION INFORMATION | | | BASIC MOVEMENT VECTOR GROUP INFORMATION | | COMMUNICATION RESTORATION VECTOR INFORMATION (m/s) | ACTUAL MOVEMENT VECTOR INFORMATION (m/s) |
|---|---|---|---|---|---|---|
| LATITUDE | LONGITUDE | ASL (m) | MAIN BASIC MOVEMENT VECTOR INFORMATION (m/s) | OBSTACLE AVOIDANCE BASIC MOVEMENT VECTOR INFORMATION (m/s) | | |
| 34°41'37.6" NORTH LATITUDE | 135°30'9.1" EAST LONGITUDE | 2 | (−5, −2, 0) | (0, 5, 0) | (10, 2, 0) | (7.5, 6, 0) |

FIG. 11

| MOBILE OBJECT IDENTIFICATION INFORMATION | POSITION INFORMATION | | ASL (m) |
|---|---|---|---|
| | LATITUDE | LONGITUDE | |
| MOBILE OBJECT 102 | 34°41'37.5" NORTH LATITUDE | 135°30'7.6" EAST LONGITUDE | 2 |
| MOBILE OBJECT 103 | 34°41'37.4" NORTH LATITUDE | 135°30'7.7" EAST LONGITUDE | 2 |
| MOBILE OBJECT 104 | 34°41'38.0" NORTH LATITUDE | 135°30'8.1" EAST LONGITUDE | 2 |
| MOBILE OBJECT 105 | 34°41'37.5" NORTH LATITUDE | 135°30'8.6" EAST LONGITUDE | 2 |
| MOBILE OBJECT 106 | 34°41'37.8" NORTH LATITUDE | 135°30'9.1" EAST LONGITUDE | 2 |
| MOBILE OBJECT 107 | 34°41'37.5" NORTH LATITUDE | 135°30'9.6" EAST LONGITUDE | 2 |

| MOBILE OBJECT IDENTIFICATION INFORMATION | POSITION INFORMATION | | | DIRECT COMMUNICATION GROUP INFORMATION | KNOWN GROUP INFORMATION | UNKNOWN GROUP INFORMATION | TARGET POSITION INFORMATION | | |
|---|---|---|---|---|---|---|---|---|---|
| | LATITUDE | LONGITUDE | ASL (m) | | | | LATITUDE | LONGITUDE | ASL (m) |
| MOBILE OBJECT 101 | 34°41′37.0″ NORTH LATITUDE | 135°30′7.1″ EAST LONGITUDE | 2 | MOBILE OBJECT 102 | MOBILE OBJECT 101 MOBILE OBJECT 102 MOBILE OBJECT 103 MOBILE OBJECT 104 | MOBILE OBJECT 105 MOBILE OBJECT 106 MOBILE OBJECT 107 | 34°41′37.6″ NORTH LATITUDE | 135°30′9.1″ EAST LONGITUDE | 2 |

5801

| SECOND BASIC MOVEMENT VECTOR GROUP INFORMATION | | BASIC MOVEMENT VECTOR GROUP INFORMATION | | | | |
|---|---|---|---|---|---|---|
| COMMUNICATION MAINTAINING MOVEMENT VECTOR INFORMATION (m/s) | SECOND MAIN BASIC MOVEMENT VECTOR INFORMATION (m/s) | SECOND OBSTACLE AVOIDANCE BASIC MOVEMENT VECTOR INFORMATION (m/s) | MAIN BASIC MOVEMENT VECTOR INFORMATION (m/s) | OBSTACLE AVOIDANCE BASIC MOVEMENT VECTOR INFORMATION (m/s) | COMMUNICATION RESTORATION VECTOR INFORMATION (m/s) | ACTUAL MOVEMENT VECTOR INFORMATION (m/s) |
| (1, 1, 0) | (−5, −2, 0) | (0, 5, 0) | (−4.5, −1.5, 0) | (0.5, 5.5, 0) | (0, 0, 0) | (−1.75, 4.75, 0) |

FIG. 43

| MOBILE OBJECT IDENTIFICATION INFORMATION | POSITION INFORMATION 5802 | | | APPROACH VECTOR INFORMATION (m/s) | REPULSION VECTOR INFORMATION (m/s) |
|---|---|---|---|---|---|
| | LATITUDE | LONGITUDE | ASL (m) | | |
| MOBILE OBJECT 102 | 34°41'37.5" NORTH LATITUDE | 135°30'7.6" EAST LONGITUDE | 2 | (3, 3, 0) | (-2, -2, 0) |
| MOBILE OBJECT 103 | 34°41'37.4" NORTH LATITUDE | 135°30'7.7" EAST LONGITUDE | 2 | | |
| MOBILE OBJECT 104 | 34°41'38.0" NORTH LATITUDE | 135°30'8.1" EAST LONGITUDE | 2 | | |
| MOBILE OBJECT 105 | 34°41'37.5" NORTH LATITUDE | 135°30'8.6" EAST LONGITUDE | 2 | | |
| MOBILE OBJECT 106 | 34°41'37.8" NORTH LATITUDE | 135°30'9.1" EAST LONGITUDE | 2 | | |
| MOBILE OBJECT 107 | 34°41'37.5" NORTH LATITUDE | 135°30'9.6" EAST LONGITUDE | 2 | | |

FIG. 65

| MOBILE OBJECT IDENTIFICATION INFORMATION | POSITION INFORMATION | | | DIRECT COMMUNICATION GROUP INFORMATION | KNOWN GROUP INFORMATION | UNKNOWN GROUP INFORMATION | TARGET POSITION INFORMATION | | |
|---|---|---|---|---|---|---|---|---|---|
| | LATITUDE | LONGITUDE | ASL (m) | | | | LATITUDE | LONGITUDE | ASL (m) |
| MOBILE OBJECT 101 | 34°41'37.0" NORTH LATITUDE | 135°30'7.1" EAST LONGITUDE | 2 | MOBILE OBJECT 102 | MOBILE OBJECT 101<br>MOBILE OBJECT 102<br>MOBILE OBJECT 103<br>MOBILE OBJECT 104 | MOBILE OBJECT 105<br>MOBILE OBJECT 106<br>MOBILE OBJECT 107 | 34°41'37.6" NORTH LATITUDE | 135°30'9.1" EAST LONGITUDE | 2 |

5801

| SECOND BASIC MOVEMENT VECTOR GROUP INFORMATION | | BASIC MOVEMENT VECTOR GROUP INFORMATION | | | | |
|---|---|---|---|---|---|---|
| COMMUNICATION MAINTAINING MOVEMENT VECTOR INFORMATION (m/s) | SECOND MAIN BASIC MOVEMENT VECTOR INFORMATION (m/s) | SECOND OBSTACLE AVOIDANCE BASIC MOVEMENT VECTOR INFORMATION (m/s) | MAIN BASIC MOVEMENT VECTOR INFORMATION (m/s) | OBSTACLE AVOIDANCE BASIC MOVEMENT VECTOR INFORMATION (m/s) | COMMUNICATION RESTORATION VECTOR INFORMATION (m/s) | ACTUAL MOVEMENT VECTOR INFORMATION (m/s) |
| (1, 1, 0) | (−5, −2, 0) | (0, 5, 0) | (−4.5, −1.5, 0) | (0.5, 5.5, 0) | (0, 0, 0) | (−1.75, 4.75, 0) |

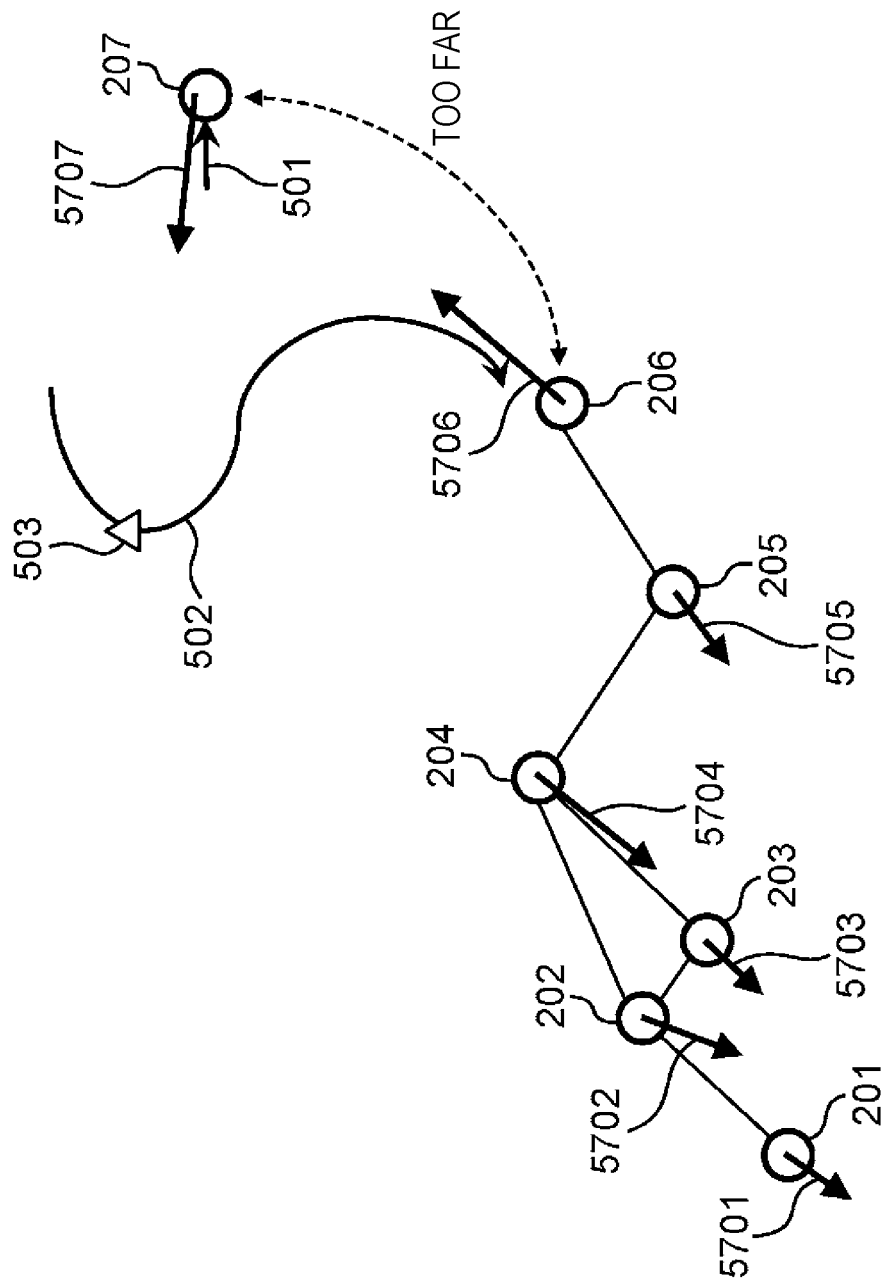

AUTONOMOUS MOBILE ROBOT AND MOVEMENT CONTROL METHOD

BACKGROUND

1. Technical Field

The present disclosure relates to an autonomous mobile robot that autonomously moves and a movement control method for controlling a movement of the autonomous mobile robot.

2. Description of the Related Art

As the related art regarding a method for controlling movements of a plurality of mobile objects that form an ad hoc network when the communication between some or all of the mobile objects is cut off, Japanese Unexamined Patent Application Publication No. 2004-165964 (hereinafter referred to as PTL 1) discloses the following technique. That is, if the communication between an ad hoc network and a mobile object belonging to a mobile object group is cut off, the mobile object moves in a reverse direction, in a direction toward another mobile object that the mobile object was communicating with before the cutoff, in a direction toward the center of the entire mobile object group, or in a direction toward a position where the mobile object is estimated to be able to restore communication on the basis of change in positions of nodes other than the mobile object before the cutoff.

PTL 1 also discloses a technique in which, if the communication between an ad hoc network and a mobile object belonging to a mobile object group is cut off, all mobile objects belonging to the mobile object group move toward the center of the entire group.

PTL 1 further discloses a technique in which, if the communication between an ad hoc network and a mobile object belonging to a mobile object group is cut off, another mobile object capable of moving to a position where the mobile object was located before the cutoff (cutoff position) is selected from the mobile object group, and the selected mobile object moves toward the cutoff position.

SUMMARY

In the configuration according to the related art, however, a mobile object that moves to restore communication and a mobile object that does not move to restore communication do not cooperate with each other, and thus communication is not restored. Furthermore, another communication cutoff may occur.

In one general aspect, the techniques disclosed here feature an autonomous mobile robot that autonomously moves while communicating with a communication-partner autonomous mobile robot. The autonomous mobile robot includes a driver that drives the autonomous mobile robot; a controller that outputs a first control command to the driver, the first control command causing the autonomous mobile robot to move by a first control amount corresponding to any one of a set of a first movement distance and a first movement direction, a set of a first velocity absolute value and a first velocity direction, and a set of a first acceleration absolute value and a first acceleration direction; and a communicator that receives, from a first communication-partner autonomous mobile robot that is different from the autonomous mobile robot and forms a network together with the autonomous mobile robot, first information indicating any one of a first position, a first velocity, and a first acceleration of the first communication-partner autonomous mobile robot. If the controller detects that the first information is ceased to be received by the communicator, the controller decides on a second control amount by which the autonomous mobile robot is to be moved based on the first information that has already been received, the second control amount corresponding to any one of a set of a second movement distance and a second movement direction, a set of a second velocity absolute value and a second velocity direction, and a set of a second acceleration absolute value and a second acceleration direction. The controller decides on, based on the first control amount and the second control amount, a third control amount corresponding to any one of a set of a third movement distance and a third movement direction, a set of a third velocity absolute value and a third velocity direction, and a set of a third acceleration absolute value and a third acceleration direction. The controller generates a second control command and outputs the second control command to the driver, the second control command causing the autonomous mobile robot to move by switching from the first control amount to the third control amount.

These general and specific aspects may be implemented using a system, a method, and a computer program, and any combination of systems, methods, and computer programs.

According to an embodiment of the present disclosure, an autonomous mobile robot and a communication-partner autonomous mobile robot eventually move in cooperation with each other, and accordingly both restoration of communication between the robots and a movement of the autonomous mobile robot for an original purpose can be achieved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10 is a diagram illustrating an example of own-mobile-object information stored in the storage unit of the mobile object according to the first embodiment of the present disclosure;

FIG. 11 is a diagram illustrating an example of other-mobile-object information stored in the storage unit of the mobile object according to the first embodiment of the present disclosure;

FIG. 42 is a diagram illustrating an example of own-mobile-object information stored in the storage unit of the mobile object according to the third embodiment of the present disclosure;

FIG. 43 is a diagram illustrating an example of other-mobile-object information stored in the storage unit of the mobile object according to the third embodiment of the present disclosure;

FIG. 65 is a diagram illustrating an example of own-mobile-object information stored in the storage unit of the mobile object according to the fourth embodiment of the present disclosure;

FIG. 84 is a conceptual diagram illustrating an example of actual movement vectors of mobile objects in the situation illustrated in FIG. 4 in the fourth embodiment of the present disclosure.

DETAILED DESCRIPTION

Underlying Knowledge Forming Basis of the Present Disclosure

There is a technique related to an ad hoc network in which a plurality of mobile objects, each having a communication function, communicate with each other directly or indirectly via communication between other mobile objects (see, for example, Japanese Unexamined Patent Application Publication No. 2004-165964, hereinafter referred to as PTL 1).

In an ad hoc network formed of a plurality of mobile objects, if one or some of the mobile objects fail or become too far from another mobile object, the communication between some or all of the mobile objects in the ad hoc network may be cut off, and the ad hoc network may be fractured.

PTL 1 discloses a technique for restoring the fractured ad hoc network in such a case.

Specifically, PTL 1 discloses a first technique in which, if the communication between an ad hoc network and a mobile object belonging to a mobile object group is cut off, the mobile object moves in a reverse direction, in a direction toward another mobile object that the mobile object was communicating with before the cutoff, in a direction toward the center of the entire mobile object group, or in a direction toward a position where the mobile object is estimated to be able to restore communication on the basis of change in positions of nodes other than the mobile object before the cutoff.

However, the first technique disclosed in PTL 1 is applicable only to a case where the communication between the ad hoc network and only one mobile object is cut off. The first technique does not have any suggestions about a case where the communication between the ad hoc network and two or more mobile objects is cut off, and is not applicable as is to the case.

Figure 1:
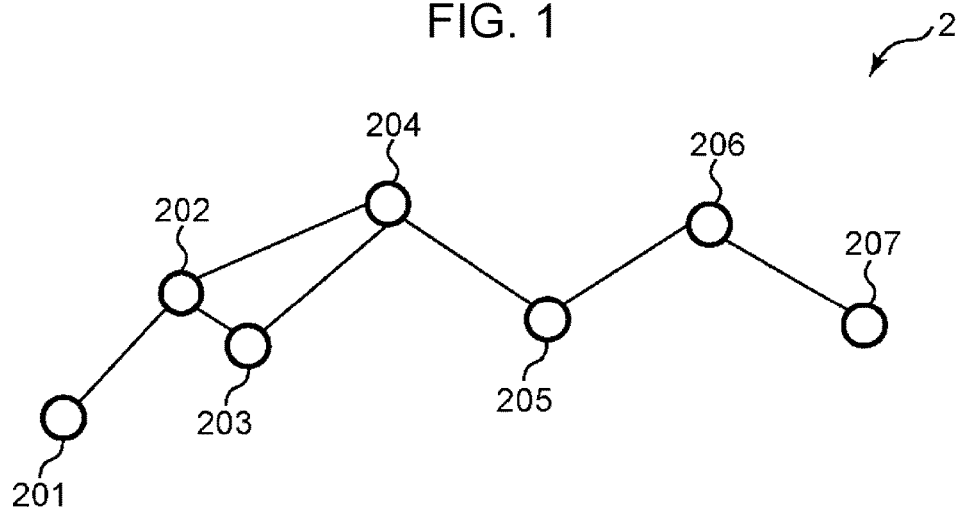
FIG. 1 is a conceptual diagram illustrating an example of an overall ad hoc network formed of a plurality of mobile objects.

For example, the situation illustrated in FIG. 1 is assumed.

FIG. 1 is a conceptual diagram illustrating an example of an overall ad hoc network formed of a plurality of mobile objects.

In FIG. 1, an ad hoc network 2 is formed of mobile objects 201 to 207, each having a communication function. A solid line between circles that represent mobile objects indicates that the mobile objects are capable of directly communicating with each other. In the figures illustrating an ad hoc network, a circle represents a mobile object, and a solid line between circles indicates that the mobile objects represented by the circles are capable of directly communicating with each other.

The mobile objects 201 and 202 are capable of directly communicating with each other, the mobile objects 202 and 203 are capable of directly communicating with each other, the mobile objects 202 and 204 are capable of directly communicating with each other, the mobile objects 203 and 204 are capable of directly communicating with each other, the mobile objects 204 and 205 are capable of directly communicating with each other, the mobile objects 205 and 206 are capable of directly communicating with each other, and the mobile objects 206 and 207 are capable of directly communicating with each other.

The mobile objects 201 to 207 are each capable of relaying communication between other mobile objects. Thus, for example, the mobile objects 201 and 207 are capable of indirectly communicating with each other via relayed communication along a path including the mobile objects 202, 204, 205, and 206 or a path including the mobile objects 202, 203, 204, 205, and 206.

Figure 2:
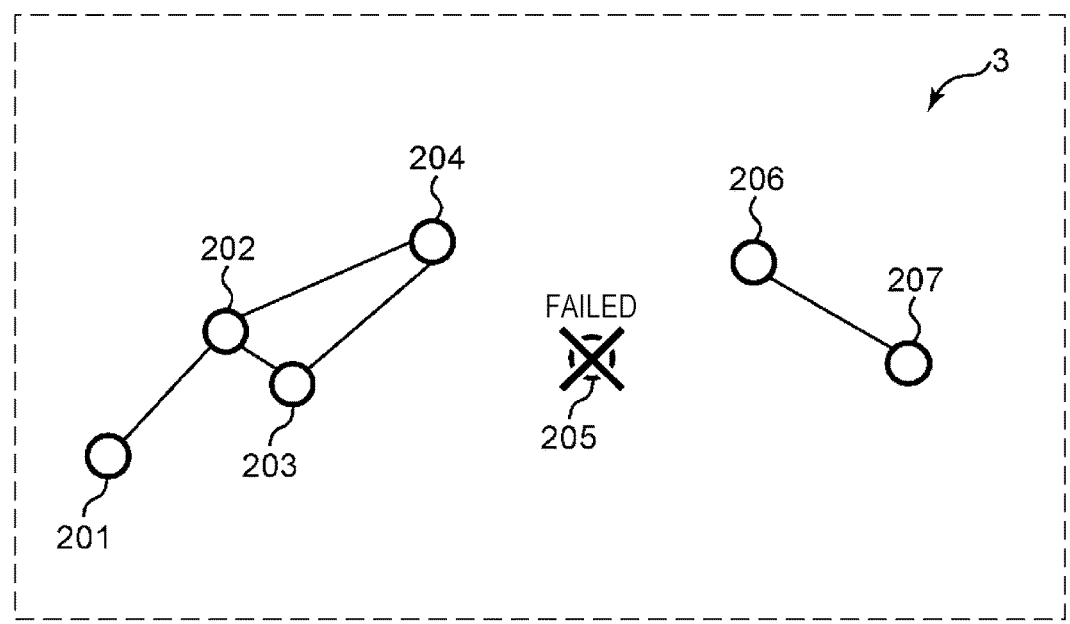
FIG. 2 is a conceptual diagram illustrating an example of an overall ad hoc network group formed of a plurality of mobile objects in a case where one mobile object fails in the ad hoc network.

FIG. 2 is a conceptual diagram illustrating an example of an overall ad hoc network group formed of a plurality of mobile objects in a case where the mobile object 205 in the ad hoc network 2 illustrated in FIG. 1 fails. In FIG. 2, the same elements as those in FIG. 1 are denoted by the same reference numerals and the description thereof will not be given.

If the mobile object 205 fails in the ad hoc network 2, the direct communication between the mobile objects 205 and 204 and the direct communication between the mobile objects 205 and 206 are cut off, and accordingly the ad hoc network 2 changes to an ad hoc network group 3.

In the ad hoc network group 3, when viewed from each of the mobile objects 201 to 204, the communication (through the ad hoc network) with each of the mobile objects 205 to 207 is cut off, and when viewed from each of the mobile objects 205 to 207, the communication (through the ad hoc network) with each of the mobile objects 201 to 204 is cut off. In this case, when viewed from each mobile object, there are two or more mobile objects disconnected from the ad hoc network to which the mobile object belongs, and thus the above-described first technique disclosed in PTL 1 is not applicable.

Another case is assumed in which the mobile objects 201 to 204 move to the left in FIG. 1 and the mobile objects 206 and 207 move to the right in FIG. 1 in the ad hoc network 2, so that the mobile objects 204 and 206 become too far from the mobile object 205 and become incapable of directly communicating with the mobile object 205.

Figure 3:
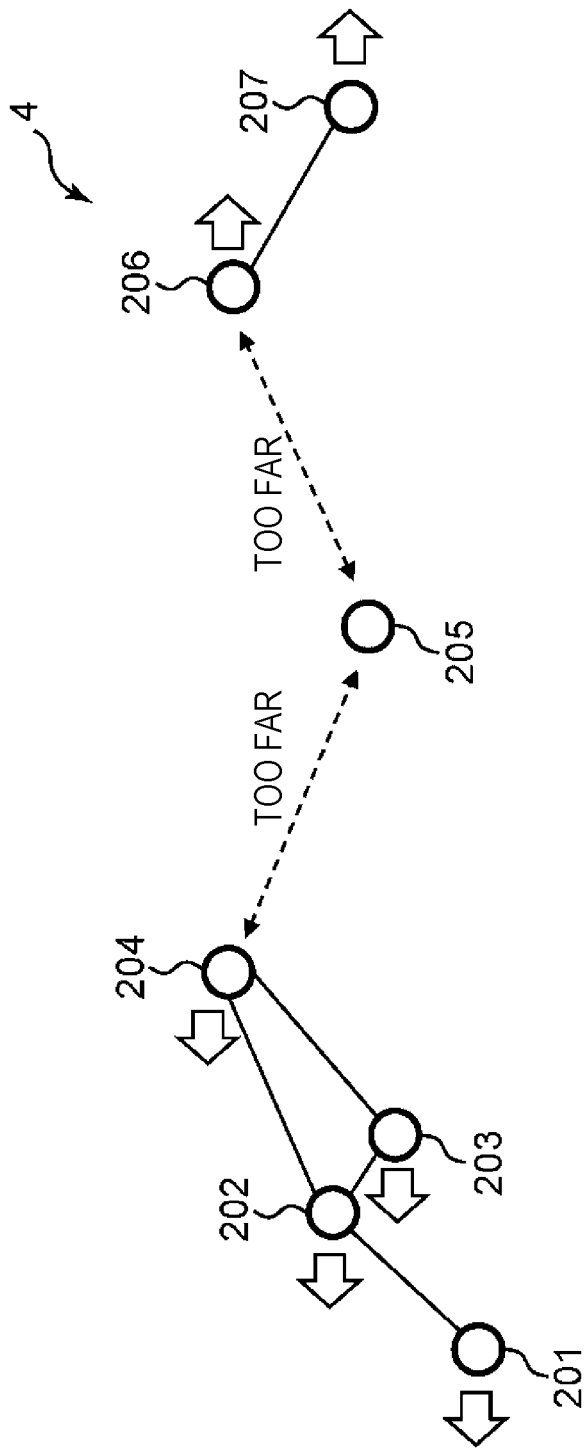
FIG. 3 is a conceptual diagram illustrating an example of an overall ad hoc network group formed of a plurality of mobile objects in a case where direct communication between first and second mobile objects and a third mobile object is cut off.

FIG. 3 is a conceptual diagram illustrating an example of an overall ad hoc network group formed of a plurality of mobile objects in a case where the mobile objects 201 to 204 move to the left in FIG. 1 and the mobile objects 206 and 207 move to the right in FIG. 1 in the ad hoc network 2, so that the mobile objects 204 and 206 become too far from the mobile object 205 and become incapable of directly communicating with the mobile object 205. In FIG. 3, the same elements as those in FIG. 1 are denoted by the same reference numerals and the description thereof will not be given.

In the ad hoc network 2, if the mobile objects 201 to 204 move to the left in FIG. 1 and the mobile objects 206 and 207 move to the right in FIG. 1 and if the mobile objects 204 and 206 become too far from the mobile object 205 and become incapable of directly communicating with the mobile object 205, the ad hoc network 2 changes to an ad hoc network group 4. In FIG. 3, an empty arrow roughly indicates a movement direction of each mobile object. In the figures, such an empty arrow is used to roughly indicate a movement direction of a mobile object.

In the ad hoc network group 4, the mobile object 205 is capable of detecting that the mobile object 205 has been disconnected from the ad hoc network. However, even if the mobile object 205 moves by applying the first technique disclosed in PTL 1, the direct communication with a mobile object belonging to one of a group of the mobile objects 201 to 204 and a group of the mobile objects 206 and 207 is restored at best and it is impossible to restore the direct communication with a mobile object belonging to the other group, as long as the group of the mobile objects 201 to 204 and the group of the mobile objects 206 and 207 continue to move away from each other.

Another case is assumed in which the mobile objects 201 to 206 move in a lower-left direction in FIG. 1 in the ad hoc network 2, so that the mobile object 206 becomes too far from the mobile object 207 and becomes incapable of directly communicating with the mobile object 207.

Figure 4:
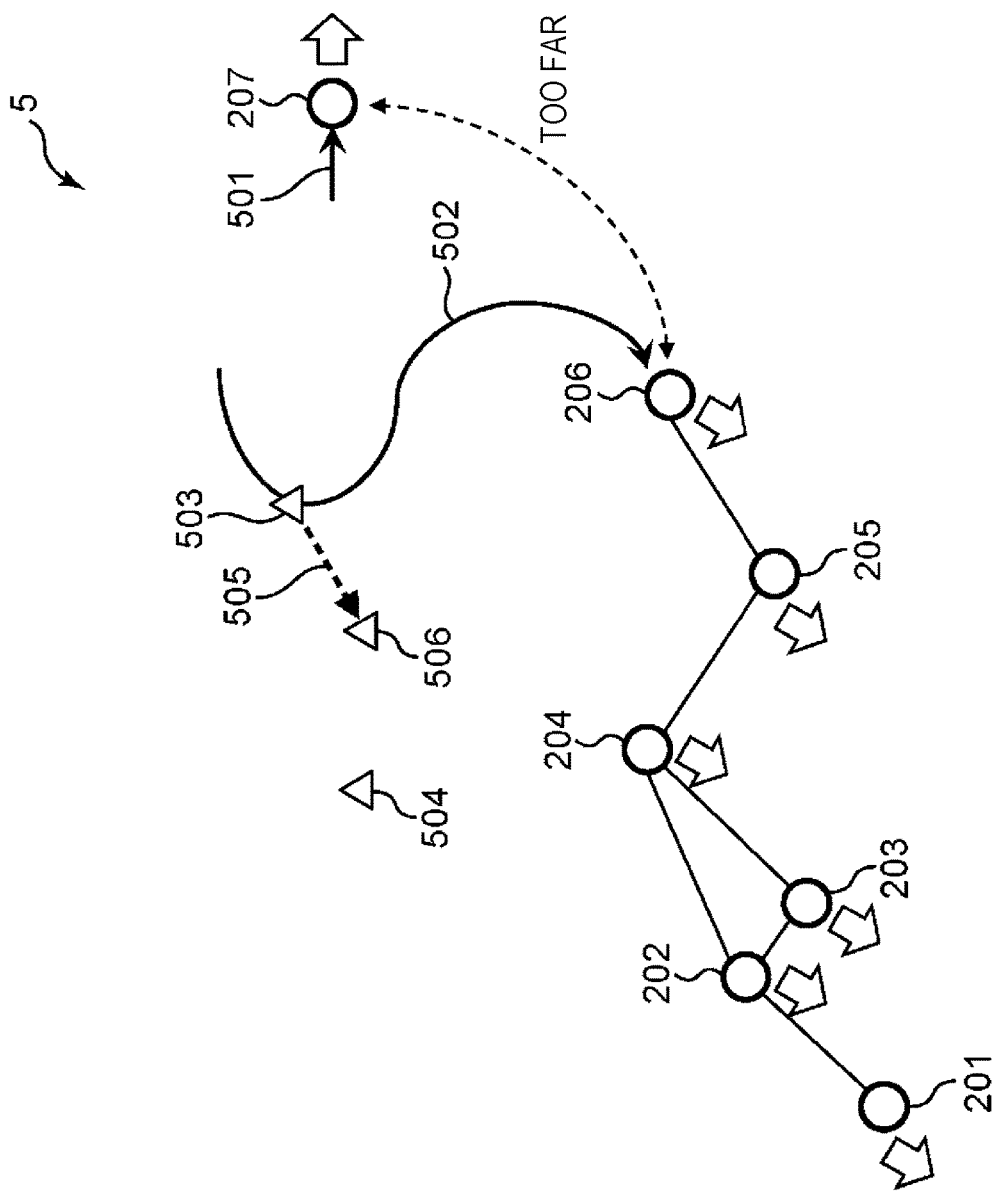
FIG. 4 is a conceptual diagram illustrating an example of an overall ad hoc network group formed of a plurality of mobile objects in a case where a first mobile object becomes too far from a second mobile object and direct communication between the first mobile object and the second mobile object is cut off.

FIG. 4 is a conceptual diagram illustrating an example of an overall ad hoc network group formed of a plurality of mobile objects in a case where the mobile objects 201 to 206 move in a lower-left direction in FIG. 1 in the ad hoc network 2, so that the mobile object 206 becomes too far from the mobile object 207 and becomes incapable of directly communicating with the mobile object 207. In FIG. 4, the same elements as those in FIG. 1 are denoted by the same reference numerals and the description thereof will not be given.

In the ad hoc network 2, if the mobile objects 201 to 206 move in a lower-left direction in FIG. 1 and if the mobile object 206 becomes too far from the mobile object 207 and becomes incapable of directly communicating with the mobile object 207, the ad hoc network 2 changes to an ad hoc network group 5.

In the ad hoc network group 5, the mobile object 207 is capable of detecting that the mobile object 207 has been disconnected from the ad hoc network. However, even if the mobile object 207 moves by applying the first technique disclosed in PTL 1, the direct communication with the mobile objects 201 to 206 is unlikely to be restored because the mobile objects 201 to 206 do not necessarily exist in the movement direction of the mobile object 207. Even if the mobile objects 201 to 206 exist in the movement direction of the mobile object 207, the mobile objects 201 to 206 continue to move away from the mobile object 207, and thus the mobile object 207 is unlikely to catch up with the mobile objects 201 to 206 and is unlikely to restore the direct communication with the mobile objects 201 to 206.

Hereinafter, these issues will be discussed with reference to FIG. 4.

FIG. 4 illustrates a movement path 501, which is a path along which the mobile object 207 moves while the situation in FIG. 1 changes to the situation in FIG. 4. FIG. 4 also illustrates a movement path 502, which is a path along which the mobile object 206, which was communicating with the mobile object 207 until just a short while ago, actually moves while the situation in FIG. 1 changes to the situation in FIG. 4.

Now, a description will be given of, in the first technique disclosed in PTL 1, the case of using a technique in which, if the communication between an ad hoc network and a mobile object is cut off, the mobile object moves in a reverse direction. If the communication between the ad hoc network and the mobile object 207 that is moving to the right in FIG. 4 is cut off, the mobile object 207 starts moving to the left in FIG. 4 to restore the communication. However, the mobile objects 201 to 206 do not exist in the movement direction, that is, the mobile objects 201 to 206 continue to move in a lower-left direction in FIG. 4, and thus the mobile object 207 is incapable of approaching the mobile objects 201 to 206 and is incapable of restoring the direct communication therewith. Even if the mobile objects 201 to 206 exist in the movement direction of the mobile object 207, the mobile object 207 is incapable of catching up with the mobile objects 201 to 206 and is incapable of restoring the direct communication therewith because the mobile objects 201 to 206 continue to move away from the mobile object 207.

Next, a description will be given of, in the first technique disclosed in PTL 1, the case of using a technique in which, if the communication between an ad hoc network and a mobile object is cut off, the mobile object moves in a direction toward another mobile object that the mobile object was communicating with before the cutoff. If the communication between the ad hoc network and the mobile object 207 that is communicating with the mobile object 206 is cut off, the mobile object 207 moves toward the position of the mobile object 206. Here, it is assumed that the mobile object 206 moves along the actual movement path 502 and that the mobile object 206 is at a position 503 in FIG. 4 at the point of time when the direct communication between the mobile objects 207 and 206 is cut off. In this case, the mobile object 207 starts moving toward the position 503. However, the mobile objects 201 to 206 do not exist in the movement direction, that is, the mobile objects 201 to 206 continue to move in a lower-left direction in FIG. 4, and thus the mobile object 207 is incapable of approaching the mobile objects 201 to 206 and is incapable of restoring the direct communication therewith. Even if the mobile objects 201 to 206 exist in the movement direction of the mobile object 207, the mobile object 207 is incapable of catching up with the mobile objects 201 to 206 and is incapable of restoring the direct communication therewith because the mobile objects 201 to 206 continue to move away from the mobile object 207.

Next, a description will be given of, in the first technique disclosed in PTL 1, the case of using a technique in which, if the communication between an ad hoc network and a mobile object is cut off, the mobile object moves in a direction toward the center of an entire mobile object group. Here, it is assumed that the center of the entire mobile object group is at a center position 504 in FIG. 4 at the point of time when the direct communication between the mobile objects 207 and 206 is cut off. In this case, the mobile object 207 disconnected from the ad hoc network starts moving toward the center position 504. However, the mobile objects 201 to 206 do not exist in the movement direction, that is, the mobile objects 201 to 206 continue to move in a lower-left direction in FIG. 4, and thus the mobile object 207 is incapable of approaching the mobile objects 201 to 206 and is incapable of restoring the direct communication therewith. Even if the mobile objects 201 to 206 exist in the movement direction of the mobile object 207, the mobile object 207 is incapable of catching up with the mobile objects 201 to 206 and is incapable of restoring the direct communication therewith because the mobile objects 201 to 206 continue to move away from the mobile object 207.

Next, a description will be given of, in the first technique disclosed in PTL 1, the case of using a technique in which, if the communication between an ad hoc network and a mobile object is cut off, the mobile object moves in a direction toward a position where the mobile object is estimated to be able to restore the communication on the basis of change in positions of nodes other than the mobile object before the cutoff. The mobile object 207 disconnected from the ad hoc network first decides on a predicted position that is based on change in positions of nodes other than the mobile object 207 before the cutoff. Here, the mobile object 207 estimates a current position of the mobile object 206 on the basis of change in the position of the mobile object 206 that was communicating with the mobile object 207 until just a short while ago, and decides on the estimated current position as a position where the communication can be restored. At the point of time when the direct communication between the mobile objects 207 and 206 is cut off, the mobile object 206 has reached the position 503 after moving along the actual movement path 502. Thus, the mobile object 207 estimates that the mobile object 206 is currently at a predicted position 506 in FIG. 4, which is on a line extending from the position 503 and which is based on change in positions of nodes other than the mobile object 207 just before the cutoff.

In this case, the mobile object 207 starts moving toward the predicted position 506. However, the mobile objects 201 to 206 do not exist in the movement direction, that is, the mobile objects 201 to 206 continue to move in a lower-left direction in FIG. 4, and thus the mobile object 207 is incapable of approaching the mobile objects 201 to 206 and is incapable of restoring the direct communication therewith. Even if the mobile objects 201 to 206 exist in the movement direction of the mobile object 207, the mobile object 207 is incapable of catching up with the mobile objects 201 to 206 and is incapable of restoring the direct communication therewith because the mobile objects 201 to 206 continue to move away from the mobile object 207.

Accordingly, PTL 1 discloses a second technique in which, if the communication between an ad hoc network and a mobile object belonging to a mobile object group is cut off, movements of all the other mobile objects that form the ad hoc network are stopped while the mobile object moves in a reverse direction, in a direction toward another mobile object that the mobile object was communicating with before the cutoff, in a direction toward the center of the mobile object group, or in a direction toward a position where the mobile object is estimated to be able to restore communication on the basis of change in positions of nodes other than the mobile object before the cutoff.

However, if the second technique disclosed in PTL 1 is applied, the mobile object disconnected from the ad hoc network moves to restore communication whereas all the other mobile objects that form the ad hoc network keep stopped until the communication between the ad hoc network and the disconnected mobile object is restored, and thus all the mobile objects are incapable of moving for an original purpose until the communication is restored.

In addition, PTL 1 discloses a third technique in which, if the communication between an ad hoc network and a mobile object belonging to a mobile object group is cut off, all mobile objects belonging to the mobile object group move toward the center of the group.

However, if the third technique disclosed in PTL 1 is applied, the region over which the mobile object group is deployed becomes smaller and all the mobile objects are incapable of moving for an original purpose until the communication is restored. Furthermore, after the communication is restored, the mobile objects need to move again for the original purpose from the positions at the point of time when the communication is restored.

In addition, PTL 1 discloses a fourth technique in which, if the communication between an ad hoc network and a mobile object belonging to a mobile object group is cut off, the mobile object stops, one mobile object capable of moving to a position where the mobile object was located before the cutoff (cutoff position) is selected from the mobile object group, and the selected mobile object moves toward the cutoff position.

However, if the fourth technique disclosed in PTL 1 is applied, when the selected mobile object moves toward the cutoff position, the communication between the selected mobile object and the mobile objects other than the mobile object disconnected from the ad hoc network is cut off. Accordingly, the ad hoc network may secondarily be fractured.

Hereinafter, these issues will be discussed with reference to FIG. 5.

Figure 5:
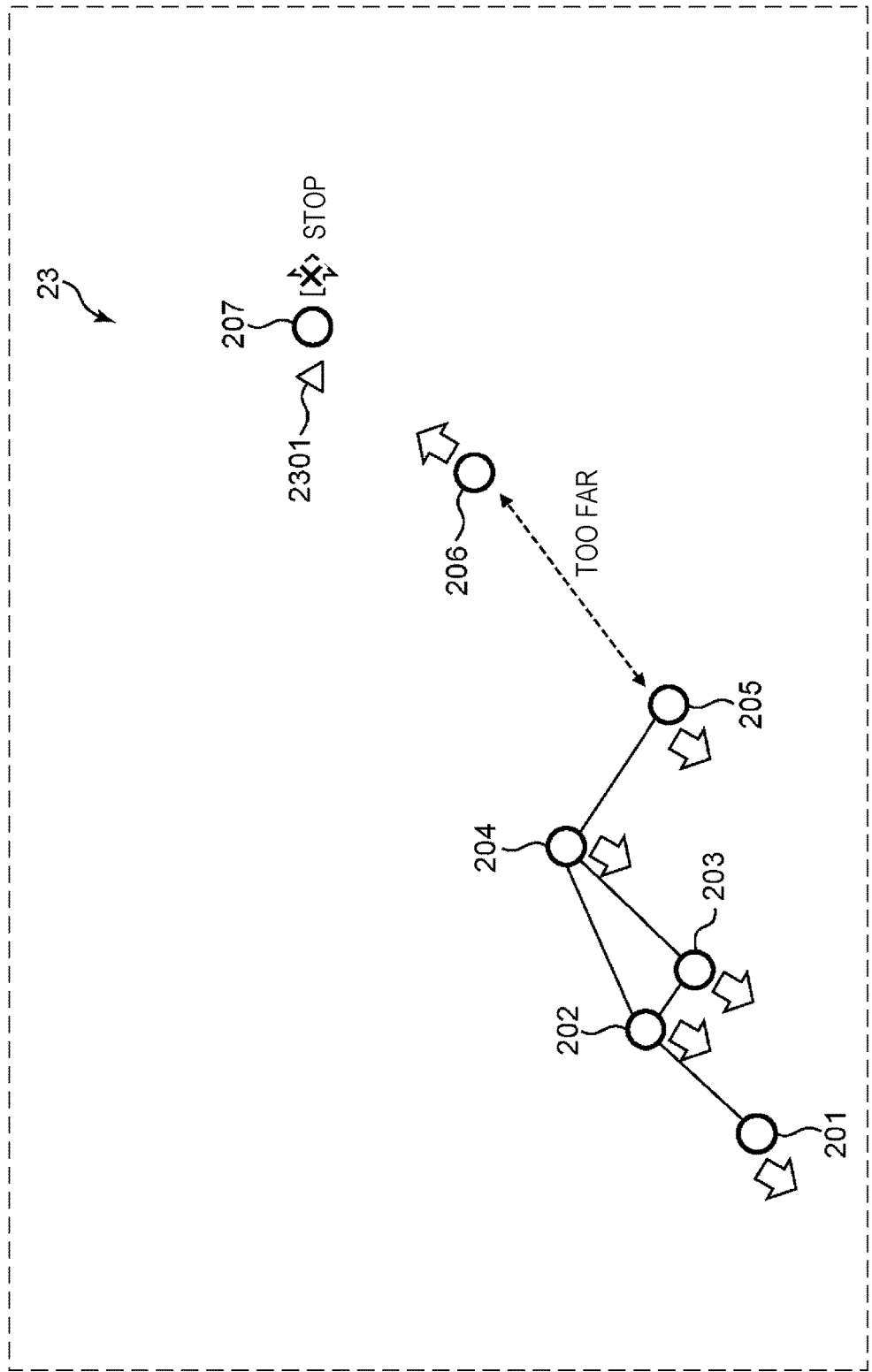
FIG. 5 is a conceptual diagram illustrating an example of an overall ad hoc network group formed of a plurality of mobile objects in a case where a fourth technique disclosed in PTL 1 is applied in an ad hoc network group.

FIG. 5 is a conceptual diagram illustrating an example of an overall ad hoc network group formed of a plurality of mobile objects in a case where the fourth technique disclosed in PTL 1 is applied. In FIG. 5, the same elements as those in FIG. 1 are denoted by the same reference numerals and the description thereof will not be given.

If the fourth technique disclosed in PTL 1 is applied to the ad hoc network group 5 illustrated in FIG. 4, the ad hoc network group 5 is changed to an ad hoc network group 23 illustrated in FIG. 5. This change will be described below.

If the fourth technique disclosed in PTL 1 is applied to the ad hoc network group 23, the mobile object 207 stops upon the communication with the ad hoc network being cut off. Here, it is assumed that the mobile object 206, which communicates with the mobile object 207 until just before the cutoff, is selected as a mobile object capable of moving to a cutoff position 2301. The mobile object 206 moves toward the cutoff position 2301 to attempt to restore the communication. However, the movement of the mobile object 206 toward the cutoff position 2301 causes the mobile objects 205 and 206 to become too far from each other. Accordingly, the communication between the mobile objects 205 and 206 is cut off and the ad hoc network is secondarily fractured. In this case, even if the mobile object 206 moves to restore the communication between the mobile objects 206 and 207, the communication between the mobile objects 205 and 206 is not restored and the communication in the overall ad hoc network is not restored because the mobile objects 205 and 206 move away from each other.

(1) An autonomous mobile robot according to an aspect of the present disclosure is an autonomous mobile robot that autonomously moves while communicating with a communication-partner autonomous mobile robot, including: a driver that drives the autonomous mobile robot; a controller that outputs a first control command to the driver, the first control command causing the autonomous mobile robot to move by a first control amount corresponding to any one of a set of a first movement distance and a first movement direction, a set of a first velocity absolute value and a first velocity direction, and a set of a first acceleration absolute value and a first acceleration direction; and a communicator that receives, from a first communication-partner autonomous mobile robot that is different from the autonomous mobile robot and forms a network together with the autonomous mobile robot, first information indicating any one of a first position, a first velocity, and a first acceleration of the first communication-partner autonomous mobile robot. If the controller detects that the first information is ceased to be received by the communicator, the controller decides on a second control amount by which the autonomous mobile robot is to be moved based on the first information that has already been received, the second control amount corresponding to any one of a set of a second movement distance and a second movement direction, a set of a second velocity absolute value and a second velocity direction, and a set of a second acceleration absolute value and a second acceleration direction. The controller decides on, based on the first control amount and the second control amount, a third control amount corresponding to any one of a set of a third movement distance and a third movement direction, a set of a third velocity absolute value and a third velocity direction, and a set of a third acceleration absolute value and a third acceleration direction. The controller generates a second control command and outputs the second control command to the driver, the second control command causing the autonomous mobile robot to move by switching from the first control amount to the third control amount.

With this configuration, the first control command, which causes the autonomous mobile robot to move by the first control amount corresponding to any one of the set of the first movement distance and the first movement direction, the set of the first velocity absolute value and the first velocity direction, and the set of the first acceleration absolute value and the first acceleration direction, is output to the driver. The first information, which indicates any one of the first position, the first velocity, and the first acceleration of the first communication-partner autonomous mobile robot, is received from the first communication-partner autonomous mobile robot that is different from the autonomous mobile robot and forms a network together with the autonomous mobile robot. If it is detected that the first information is ceased to be received, the second control amount by which the autonomous mobile robot is to be moved based on the first information that has already been received is decided on, the second control amount corresponding to any one of the set of the second movement distance and the second movement direction, the set of the second velocity absolute value and the second velocity direction, and the set of the second acceleration absolute value and the second acceleration direction. Based on the first control amount and the second control amount, the third control amount corresponding to any one of the set of the third movement distance and the third movement direction, the set of the third velocity absolute value and the third velocity direction, and the set of the third acceleration absolute value and the third acceleration direction is decided on. The second control command, which causes the autonomous mobile robot to move by switching from the first control amount to the third control amount, is generated and output to the driver.

Accordingly, in a case where the first control amount is a control amount for controlling a movement for an original purpose of the autonomous mobile robot and in a case where the second control amount is a control amount for controlling a movement for restoring communication with the first communication-partner autonomous mobile robot, the third control amount is decided on based on the first control amount and the second control amount. Thus, as a result of moving the autonomous mobile robot by switching from the first control amount to the third control amount, both a movement for an original purpose of the autonomous mobile robot and a movement for restoring communication with the first communication-partner autonomous mobile robot can be performed.

Furthermore, in a case where there are a plurality of autonomous mobile robots and in a case where the ratio of the first control amount to the second control amount for deciding on the third control amount varies in the individual autonomous mobile robots, there are an autonomous mobile robot in which the ratio of a movement for an original purpose of the autonomous mobile robot is large and an autonomous mobile robot in which the ratio of a movement for restoring communication with the first communication-partner autonomous mobile robot is large. As the overall movements of all the plurality of autonomous mobile robots, an autonomous mobile robot that gives priority to a movement for an original purpose of the autonomous mobile robot and an autonomous mobile robot that gives priority to a movement for restoring communication with the first communication-partner autonomous mobile robot share roles. As a result, the autonomous mobile robots move in cooperation with each other, and both a movement for an original purpose of the autonomous mobile robot and a movement for restoring communication with the first communication-partner autonomous mobile robot can be performed. Accordingly, a further effect can be obtained in addition to an effect in a case where there is one autonomous mobile robot.

(2) In the foregoing autonomous mobile robot, the first communication-partner autonomous mobile robot may include a plurality of first communication-partner autonomous mobile robots, and the communicator may receive the first information from each of the plurality of first communication-partner autonomous mobile robots.

With this configuration, the first information is received from each of the plurality of first communication-partner autonomous mobile robots. Thus, the autonomous mobile robot and the plurality of first communication-partner autonomous mobile robots can be moved in cooperation with each other, and both restoration of communication with the plurality of first communication-partner autonomous mobile robots and a movement for an original purpose of the autonomous mobile robot can be achieved.

(3) In the foregoing autonomous mobile robot, the communicator may further receive, from a second communication-partner autonomous mobile robot that is different from the autonomous mobile robot and the first communication-partner autonomous mobile robot and forms the network together with the autonomous mobile robot, second information indicating any one of a second position, a second velocity, and a second acceleration of the second communication-partner autonomous mobile robot, and if the controller detects that the first information is ceased to be received by the communicator, the controller may decide on, based on the second information, the second control amount.

With this configuration, the second information, which indicates any one of the second position, the second velocity, and the second acceleration of the second communication-partner autonomous mobile robot, is received from the second communication-partner autonomous mobile robot that is different from the autonomous mobile robot and the first communication-partner autonomous mobile robot and forms the network together with the autonomous mobile robot. If it is detected that the first information is ceased to be received, the second control amount is decided on based on the second information.

Thus, if it is detected that the first information is ceased to be received from the first communication-partner autonomous mobile robot, the second control amount is decided on based on the second information received from the second communication-partner autonomous mobile robot. Thus, the autonomous mobile robot and the second communication-partner autonomous mobile robot can be moved in cooperation with each other, and both restoration of communication with the first communication-partner autonomous mobile robot and a movement for an original purpose of the autonomous mobile robot and the second communication-partner autonomous mobile robot can be achieved.

(4) In the foregoing autonomous mobile robot, the second communication-partner autonomous mobile robot may include a plurality of second communication-partner autonomous mobile robots, and the communicator may receive the second information from each of the plurality of second communication-partner autonomous mobile robots.

With this configuration, the second information is received from each of the plurality of second communication-partner autonomous mobile robots. Thus, the autonomous mobile robot and the plurality of second communication-partner autonomous mobile robots can be moved in cooperation with each other, and both restoration of communication with the plurality of second communication-partner autonomous mobile robots and a movement for an original purpose of the autonomous mobile robot and the plurality of second communication-partner autonomous mobile robots can be achieved.

(5) In the foregoing autonomous mobile robot, the controller may obtain third information indicating a current position of the autonomous mobile robot, the controller may calculate, based on the first information and the third information, a distance between the autonomous mobile robot and the first communication-partner autonomous mobile robot, and the controller may decide on, based on the distance, the second control amount.

With this configuration, the third information indicating the current position of the autonomous mobile robot is obtained. The distance between the autonomous mobile robot and the first communication-partner autonomous mobile robot is calculated based on the first information and the third information. The second control amount is decided on based on the distance.

Accordingly, the second control amount is decided on based on the distance between the autonomous mobile robot and the first communication-partner autonomous mobile robot, and thus both restoration of communication and an original purpose can be achieved more efficiently.

In particular, if there are a plurality of autonomous mobile robots, the ratio of a movement for an original purpose of each autonomous mobile robot to a movement for restoring communication with the first communication-partner autonomous mobile robot is decided on based on the distance between each autonomous mobile robot and the first communication-partner autonomous mobile robot. Thus, role sharing between an autonomous mobile robot that gives priority to a movement for an original purpose of the autonomous mobile robot and an autonomous mobile robot that gives priority to a movement for restoring communication with the first communication-partner autonomous mobile robot is more efficiently decided on. As the overall movements of all the plurality of autonomous mobile robots, both a movement for an original purpose of the autonomous mobile robot and a movement for restoring communication with the first communication-partner autonomous mobile robot can be performed more efficiently.

(6) In the foregoing autonomous mobile robot, the controller may decrease the second movement distance, the second velocity absolute value, or the second acceleration absolute value as the distance decreases.

With this configuration, as a result of increasing the second movement distance, the second velocity absolute value, or the second acceleration absolute value as the distance between the autonomous mobile robot and the first communication-partner autonomous mobile robot increases, priority is given to restoration of communication with the first communication-partner autonomous mobile robot, and thus communication can be restored more quickly.

(7) In the foregoing autonomous mobile robot, the controller may decrease the second movement distance, the second velocity absolute value, or the second acceleration absolute value as the distance increases.

With this configuration, as a result of decreasing the second movement distance, the second velocity absolute value, or the second acceleration absolute value as the distance between the autonomous mobile robot and the first communication-partner autonomous mobile robot increases, priority is given to a movement in a case where the communication with the first communication-partner autonomous mobile robot is not cut off, and thus restoration of communication and an original purpose can be achieved more efficiently.

In particular, if there are a plurality of autonomous mobile robots, as the distance between each autonomous mobile robot and the first communication-partner autonomous mobile robot increases, the ratio of a movement for an original purpose of the autonomous mobile robot increases. Thus, role sharing between an autonomous mobile robot that gives priority to a movement for an original purpose of the autonomous mobile robot and an autonomous mobile robot that gives priority to a movement for restoring communication with the first communication-partner autonomous mobile robot is more efficiently decided on. As the overall movements of all the plurality of autonomous mobile robots, both a movement for an original purpose of the autonomous mobile robot and a movement for restoring communication with the first communication-partner autonomous mobile robot can be performed more efficiently.

(8) In the foregoing autonomous mobile robot, if the controller detects that the first information is ceased to be received by the communicator, the controller may output a third control command to the driver after a predetermined time period elapses from when the second control command is output to the driver, the third control command causing the autonomous mobile robot to move by switching from the third control amount to the first control amount.

With this configuration, if it is detected that the first information is ceased to be received, the third control command that causes the autonomous mobile robot to move by switching from the third control amount to the first control amount is output to the driver after the predetermined time period elapses from when the second control command is output to the driver.

Thus, if communication is not restored after the predetermined time period elapses from a movement for restoring communication, the movement for restoring communication can be stopped, and a situation can be prevented from occurring where a movement for restoring communication is endlessly performed.

(9) In the foregoing autonomous mobile robot, the first information may include the first position, and if the controller detects that the first information is ceased to be received by the communicator, the controller may determine whether or not a distance between the first position and a third position is equal to or less than a predetermined value, the third position being a position of the autonomous mobile robot after the second control command is output to the driver, and if the controller determines that the distance is equal to or less than the predetermined value, the controller may output a third control command to the driver, the third control command causing the autonomous mobile robot to move by switching from the third control amount to the first control amount.

With this configuration, the first information includes the first position. If it is detected that the first information is ceased to be received, it is determined whether or not the distance between the first position and the third position, which is the position of the autonomous mobile robot after the second control command is output to the driver, is equal to or less than the predetermined value. If it is determined that the distance is equal to or less than the predetermined value, the third control command that causes the autonomous mobile robot to move by switching from the third control amount to the first control amount is output to the driver.

Thus, after a movement for restoring communication is performed, if the communication is not restored even if the distance between the autonomous mobile robot and the communication-partner autonomous mobile robot becomes equal to or less than the predetermined value, the movement for restoring communication can be stopped, and a situation can be prevented from occurring where a movement for restoring communication is endlessly performed.

(10) In the foregoing autonomous mobile robot, the autonomous mobile robot may further include a memory, the communicator may further receive, from a second communication-partner autonomous mobile robot that is different from the autonomous mobile robot and the first communication-partner autonomous mobile robot and forms the network together with the autonomous mobile robot, second information indicating any one of a second position, a second velocity, and a second acceleration of the second communication-partner autonomous mobile robot, the memory may store fourth information including the first information and the second information, and the controller may update the fourth information stored in the memory by deleting the first information from the fourth information after outputting the third control command to the driver.

With this configuration, the second information indicating any one of the second position, the second velocity, and the second acceleration of the second communication-partner autonomous mobile robot is received from the second communication-partner autonomous mobile robot that is different from the autonomous mobile robot and the first communication-partner autonomous mobile robot and forms the network together with the autonomous mobile robot. The memory included in the autonomous mobile robot stores the fourth information including the first information and the second information. The fourth information stored in the memory is updated by deleting the first information from the fourth information after the third control command is output to the driver.

Accordingly, after the third control command is output to the driver, the fourth information stored in the memory is updated by deleting the first information from the fourth information. Thus, a situation can be prevented from occurring where stop and restart of a movement for restoring communication is endlessly repeated by restarting a movement for restoring communication with the first communication-partner autonomous mobile robot for which restoration of communication has failed.

(11) In the foregoing autonomous mobile robot, the controller may cause the communicator to transmit the fourth information to the second communication-partner autonomous mobile robot after updating the fourth information.

With this configuration, since the fourth information is transmitted to the second communication-partner autonomous mobile robot after the fourth information is updated, a situation can be prevented from occurring where stop and restart of a movement for restoring communication is endlessly repeated also in the second communication-partner autonomous mobile robot.

(12) In the foregoing autonomous mobile robot, if the controller detects that the first information is ceased to be received by the communicator and then detects that the first information is restarted to be received by the communicator, the controller may output a third control command to the driver, the third control command causing the autonomous mobile robot to move by switching from the third control amount to the first control amount.

With this configuration, if it is detected that the first information is ceased to be received and then it is detected that the first information is restarted to be received, the third control command that causes the autonomous mobile robot to move by switching from the third control amount to the first control amount is output to the driver.

Accordingly, if communication is restored by performing a movement for restoring communication, the movement for restoring communication can be stopped, and a situation can be prevented from occurring where a movement for restoring communication is endlessly performed.

(13) In the foregoing autonomous mobile robot, the first communication-partner autonomous mobile robot may include a plurality of first communication-partner autonomous mobile robots, and the communicator may receive the first information again from each of the plurality of first communication-partner autonomous mobile robots.

With this configuration, if it is detected that the first information is ceased to be received and then it is detected that the first information is restarted to be received from each of the plurality of first communication-partner autonomous mobile robots, the third control command that causes the autonomous mobile robot to move by switching from the third control amount to the first control amount is output to the driver.

Accordingly, if communication with the plurality of first communication-partner autonomous mobile robots is restored by performing a movement for restoring communication, the movement for restoring communication can be stopped, and a situation can be prevented from occurring where a movement for restoring communication is endlessly performed.

(14) In the foregoing autonomous mobile robot, the autonomous mobile may further include a memory that stores fourth information including the first information and the second information, after the second communication-partner autonomous mobile robot updates fifth information that includes information indicating the autonomous mobile robot and information indicating a third communication-partner autonomous mobile robot by deleting the information indicating the third communication-partner autonomous mobile robot from the fifth information, the second communication-partner autonomous mobile robot may transmit the fifth information to the autonomous mobile robot, the communicator may receive the fifth information from the second communication-partner autonomous mobile robot, and the controller may update the fourth information stored in the memory to the fifth information.

With this configuration, the autonomous mobile robot further includes the memory that stores the fourth information including the first information and the second information. After the second communication-partner autonomous mobile robot updates fifth information that includes the information indicating the autonomous mobile robot and the information indicating the third communication-partner autonomous mobile robot by deleting the information indicating the third communication-partner autonomous mobile robot from the fifth information, the second communication-partner autonomous mobile robot transmits the fifth information to the autonomous mobile robot. In the autonomous mobile robot, the fifth information is received from the second communication-partner autonomous mobile robot. The fourth information stored in the memory is updated to the fifth information.

Accordingly, if the information indicating the third communication-partner autonomous mobile robot is deleted from the fifth information that includes the information indicating the autonomous mobile robot and the information indicating the third communication-partner autonomous mobile robot in the second communication-partner autonomous mobile robot, the fifth information is transmitted to the autonomous mobile robot, and the fourth information stored in the memory of the autonomous mobile robot is updated to the fifth information. Thus, a determination result in the second communication-partner autonomous mobile robot can be reflected in the autonomous mobile robot.

(15) In the foregoing autonomous mobile robot, the third communication-partner autonomous mobile robot may be the first communication-partner autonomous mobile robot.

With this configuration, if the information indicating the first communication-partner autonomous mobile robot is deleted from the fifth information that includes the information indicating the autonomous mobile robot and the information indicating the first communication-partner autonomous mobile robot in the second communication-partner autonomous mobile robot, the fifth information is transmitted to the autonomous mobile robot, and the fourth information stored in the memory of the autonomous mobile robot is updated to the fifth information. Thus, a determination result in the second communication-partner autonomous mobile robot can be reflected in the autonomous mobile robot, and a situation can be prevented from occurring where the autonomous mobile robot performs a movement for restoring communication with the first communication-partner autonomous mobile robot for which restoration of communication has failed.

(16) In the foregoing autonomous mobile robot, the communicator may further receive, from a second communication-partner autonomous mobile robot that is different from the autonomous mobile robot and the first communication-partner autonomous mobile robot and forms the network together with the autonomous mobile robot, second information indicating any one of a second position, a second velocity, and a second acceleration of the second communication-partner autonomous mobile robot, the controller may decide on, based on the second information, a fourth control amount corresponding to any one of a set of a fourth movement distance and a fourth movement direction, a set of a fourth velocity absolute value and a fourth velocity direction, and a set of a fourth acceleration absolute value and a fourth acceleration direction, and the controller may update, based on the fourth control amount, the first control amount.

With this configuration, the second information indicating any one of the second position, the second velocity, and the second acceleration of the second communication-partner autonomous mobile robot is received from the second communication-partner autonomous mobile robot that is different from the autonomous mobile robot and the first communication-partner autonomous mobile robot and forms the network together with the autonomous mobile robot. The fourth control amount corresponding to any one of the set of the fourth movement distance and the fourth movement direction, the set of the fourth velocity absolute value and the fourth velocity direction, and the set of the fourth acceleration absolute value and the fourth acceleration direction is decided on based on the second information. The first control amount is updated based on the fourth control amount.

Accordingly, the fourth control amount corresponding to any one of the set of the fourth movement distance and the fourth movement direction, the set of the fourth velocity absolute value and the fourth velocity direction, and the set of the fourth acceleration absolute value and the fourth acceleration direction is decided on based on the second information indicating any one of the second position, the second velocity, and the second acceleration of the second communication-partner autonomous mobile robot, and the first control amount can be updated based on the fourth control amount.

(17) In the foregoing autonomous mobile robot, the second information may include the second position, and the controller may decides on, based on a distance calculated from a current position of the autonomous mobile robot and the second position, the fourth control amount.

With this configuration, the second information includes the second position. The fourth control amount is decided on based on the distance calculated from the current position of the autonomous mobile robot and the second position. Thus, the fourth control amount can be decided on based on the distance between the autonomous mobile robot and the second communication-partner autonomous mobile robot.

(18) In the foregoing autonomous mobile robot, the controller may decrease the fourth movement distance, the fourth velocity absolute value, or the fourth acceleration absolute value as the distance decreases.

With this configuration, as a result of decreasing the fourth movement distance, the fourth velocity absolute value, or the fourth acceleration absolute value as the distance between the autonomous mobile robot and the second communication-partner autonomous mobile robot decreases, the communication with the second communication-partner autonomous mobile robot can be appropriately maintained.

(19) In the foregoing autonomous mobile robot, the controller may increase the fourth movement distance, the fourth velocity absolute value, or the fourth acceleration absolute value as the distance decreases.

With this configuration, as a result of increasing the fourth movement distance, the fourth velocity absolute value, or the fourth acceleration absolute value as the distance between the autonomous mobile robot and the second communication-partner autonomous mobile robot decreases, control can be performed so that the communication with the second communication-partner autonomous mobile robot is not cut off.

(20) In the foregoing autonomous mobile robot, the autonomous mobile robot may further include a memory that stores a movement path of the autonomous mobile robot, the controller may decide on, based on a fourth control amount corresponding to any one of a set of a fourth movement distance and a fourth movement direction, a set of a fourth velocity absolute value and a fourth velocity direction, and a set of a fourth acceleration absolute value and a fourth acceleration direction, the first control amount, the fourth movement distance, the fourth velocity absolute value, or the fourth acceleration absolute value may be a predetermined value, and the fourth movement direction, the fourth velocity direction, or the fourth acceleration direction may be opposite to a movement direction specified by the movement path.

With this configuration, the autonomous mobile robot further includes the memory that stores the movement path of the autonomous mobile robot. The first control amount is decided on based on the fourth control amount corresponding to any one of the set of the fourth movement distance and the fourth movement direction, the set of the fourth velocity absolute value and the fourth velocity direction, and the set of the fourth acceleration absolute value and the fourth acceleration direction. The fourth movement distance, the fourth velocity absolute value, or the fourth acceleration absolute value is the predetermined value. The fourth movement direction, the fourth velocity direction, or the fourth acceleration direction is opposite to the movement direction specified by the movement path.

Accordingly, as a result of moving in the direction opposite to the movement direction specified by the movement path, the autonomous mobile robot can return to a position before the communication cutoff, and the communication can be quickly restored.

(21) A movement control method according to another aspect of the present disclosure is a movement control method for an autonomous mobile robot that autonomously moves while communicating with a communication-partner autonomous mobile robot, including: outputting a first control command that causes the autonomous mobile robot to move by a first control amount corresponding to any one of a set of a first movement distance and a first movement direction, a set of a first velocity absolute value and a first velocity direction, and a set of a first acceleration absolute value and a first acceleration direction; receiving, from a first communication-partner autonomous mobile robot that is different from the autonomous mobile robot and forms a network together with the autonomous mobile robot, first information indicating any one of a first position, a first velocity, and a first acceleration of the first communication-partner autonomous mobile robot; if a detection is made that the first information is ceased to be received, deciding on a second control amount by which the autonomous mobile robot is to be moved based on the first information that has already been received, the second control amount corresponding to any one of a set of a second movement distance and a second movement direction, a set of a second velocity absolute value and a second velocity direction, and a set of a second acceleration absolute value and a second acceleration direction; deciding on, based on the first control amount and the second control amount, a third control amount corresponding to any one of a set of a third movement distance and a third movement direction, a set of a third velocity absolute value and a third velocity direction, and a set of a third acceleration absolute value and a third acceleration direction; and generating and outputting a second control command that causes the autonomous mobile robot to move by switching from the first control amount to the third control amount.

With this configuration, the first control command, which causes the autonomous mobile robot to move by the first control amount corresponding to any one of the set of the first movement distance and the first movement direction, the set of the first velocity absolute value and the first velocity direction, and the set of the first acceleration absolute value and the first acceleration direction, is output to the driver. The first information, which indicates any one of the first position, the first velocity, and the first acceleration of the first communication-partner autonomous mobile robot, is received from the first communication-partner autonomous mobile robot that is different from the autonomous mobile robot and forms a network together with the autonomous mobile robot. If it is detected that the first information is ceased to be received, the second control amount by which the autonomous mobile robot is to be moved based on the first information that has already been received is decided on, the second control amount corresponding to any one of the set of the second movement distance and the second movement direction, the set of the second velocity absolute value and the second velocity direction, and the set of the second acceleration absolute value and the second acceleration direction. Based on the first control amount and the second control amount, the third control amount corresponding to any one of the set of the third movement distance and the third movement direction, the set of the third velocity absolute value and the third velocity direction, and the set of the third acceleration absolute value and the third acceleration direction is decided on. The second control command, which causes the autonomous mobile robot to move by switching from the first control amount to the third control amount, is generated and output to the driver.

Accordingly, in a case where the first control amount is a control amount for controlling a movement for an original purpose of the autonomous mobile robot and in a case where the second control amount is a control amount for controlling a movement for restoring communication with the first communication-partner autonomous mobile robot, the third control amount is decided on based on the first control amount and the second control amount. Thus, as a result of moving the autonomous mobile robot by switching from the first control amount to the third control amount, both a movement for an original purpose of the autonomous mobile robot and a movement for restoring communication with the first communication-partner autonomous mobile robot can be performed.

Furthermore, in a case where there are a plurality of autonomous mobile robots and in a case where the ratio of the first control amount to the second control amount for deciding on the third control amount varies in the individual autonomous mobile robots, there are an autonomous mobile robot in which the ratio of a movement for an original purpose of the autonomous mobile robot is large and an autonomous mobile robot in which the ratio of a movement for restoring communication with the first communication-partner autonomous mobile robot is large. As the overall movements of all the plurality of autonomous mobile robots, an autonomous mobile robot that gives priority to a movement for an original purpose of the autonomous mobile robot and an autonomous mobile robot that gives priority to a movement for restoring communication with the first communication-partner autonomous mobile robot share roles. As a result, the autonomous mobile robots move in cooperation with each other, and both a movement for an original purpose of the autonomous mobile robot and a movement for restoring communication with the first communication-partner autonomous mobile robot can be performed. Accordingly, a further effect can be obtained in addition to an effect in a case where there is one autonomous mobile robot.

Each of the embodiments described below is a specific example of the present disclosure. The values, shapes, elements, steps, and order of the steps described in the following embodiments are merely examples and do not limit the present disclosure. Among the elements described in the following embodiments, an element that is not described in an independent claim defining the broadest concept will be described as an optional element. In all the embodiments, any selective configurations can be combined.

First Embodiment

Figure 6:
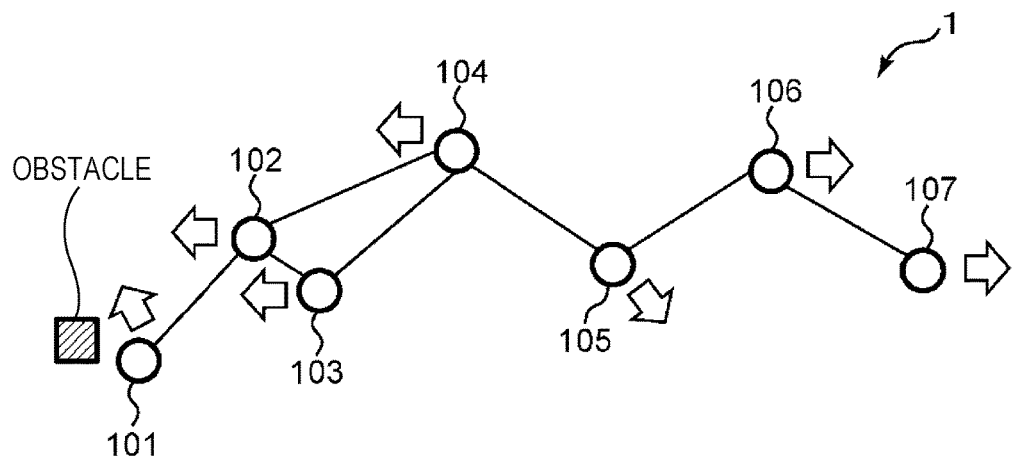
FIG. 6 is a conceptual diagram illustrating an overall ad hoc network formed of a plurality of mobile objects according to a first embodiment of the present disclosure.

FIG. 6 is a conceptual diagram illustrating an overall ad hoc network formed of a plurality of mobile objects according to a first embodiment of the present disclosure.

In FIG. 6, an ad hoc network 1 is formed of mobile objects 101 to 107, each having a communication function. A solid line between circles that represent mobile objects indicates that the mobile objects are capable of directly communicating with each other. In the figures illustrating an ad hoc network, a circle represents a mobile object, and a solid line between circles indicates that the mobile objects represented by the circles are capable of directly communicating with each other.

The mobile objects 101 and 102 are capable of directly communicating with each other, the mobile objects 102 and 103 are capable of directly communicating with each other, the mobile objects 102 and 104 are capable of directly communicating with each other, the mobile objects 103 and 104 are capable of directly communicating with each other, the mobile objects 104 and 105 are capable of directly communicating with each other, the mobile objects 105 and 106 are capable of directly communicating with each other, and the mobile objects 106 and 107 are capable of directly communicating with each other.

The mobile objects 101 to 107 are each capable of relaying communication between other mobile objects. Thus, for example, the mobile objects 101 and 107 are capable of indirectly communicating with each other via relayed communication along a path including the mobile objects 102, 104, 105, and 106 or a path including the mobile objects 102, 103, 104, 105, and 106.

The mobile objects 101 to 107 move in arbitrary directions. In FIG. 6, empty arrows indicate movement directions of the individual mobile objects. In the figures, such an empty arrow is used to indicate a movement direction of a mobile object.

FIG. 6 illustrates a horizontal two-dimensional plane viewed in a direction opposite to the direction of gravity. In FIG. 6, the right side corresponds to the direction of east, the left side corresponds to the direction of west, the upper side corresponds to the direction of north, and the lower side corresponds to the direction of south. In the figures, a plan view illustrating mobile objects that form an ad hoc network illustrates a horizontal two-dimensional plane viewed in a direction opposite to the direction of gravity, in which the right side corresponds to the direction of east, the left side corresponds to the direction of west, the upper side corresponds to the direction of north, and the lower side corresponds to the direction of south unless otherwise noted. Although FIG. 6 illustrates an example in which the mobile objects move on a two-dimensional plane for simplicity, the present disclosure is not limited to the movements of mobile objects on a two-dimensional plane, and is also applicable to the movements of mobile objects in a three-dimensional space.

Specific examples of a mobile object having a communication function include a drone (unmanned flying object) having a communication function, an autonomous robot having a communication function, a vehicle having a communication function and driven by a human, a cleaning robot having a communication function, and a human carrying a communication device.

Hereinafter, the functional configurations and overall operations of the mobile objects 101 to 107 will be described in detail. The description will be given mainly of the functional configuration and overall operation of the mobile object 101, and the description of the functional configurations and overall operations of the mobile objects 102 to 107 that are the same as those of the mobile object 101 will not be given.

Figure 7:
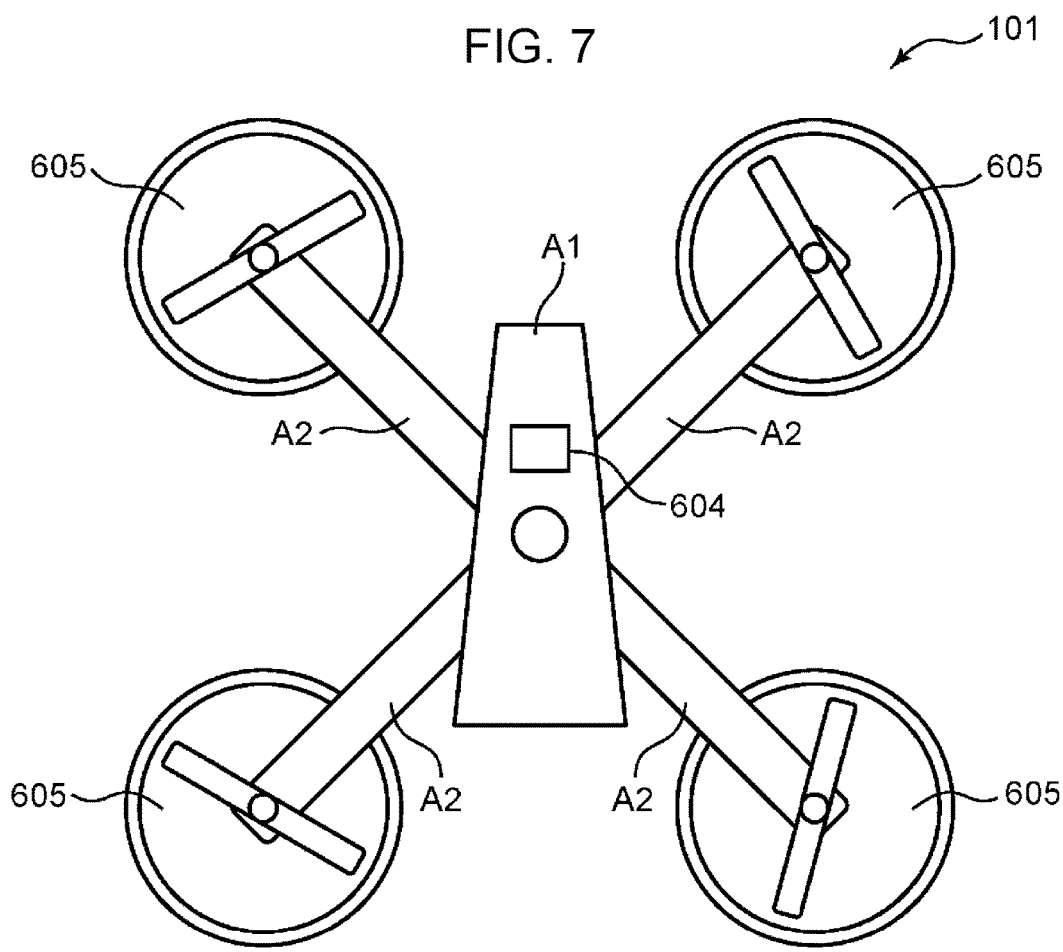
FIG. 7 illustrates an overview of a mobile object according to the first embodiment of the present disclosure.
Figure 8:
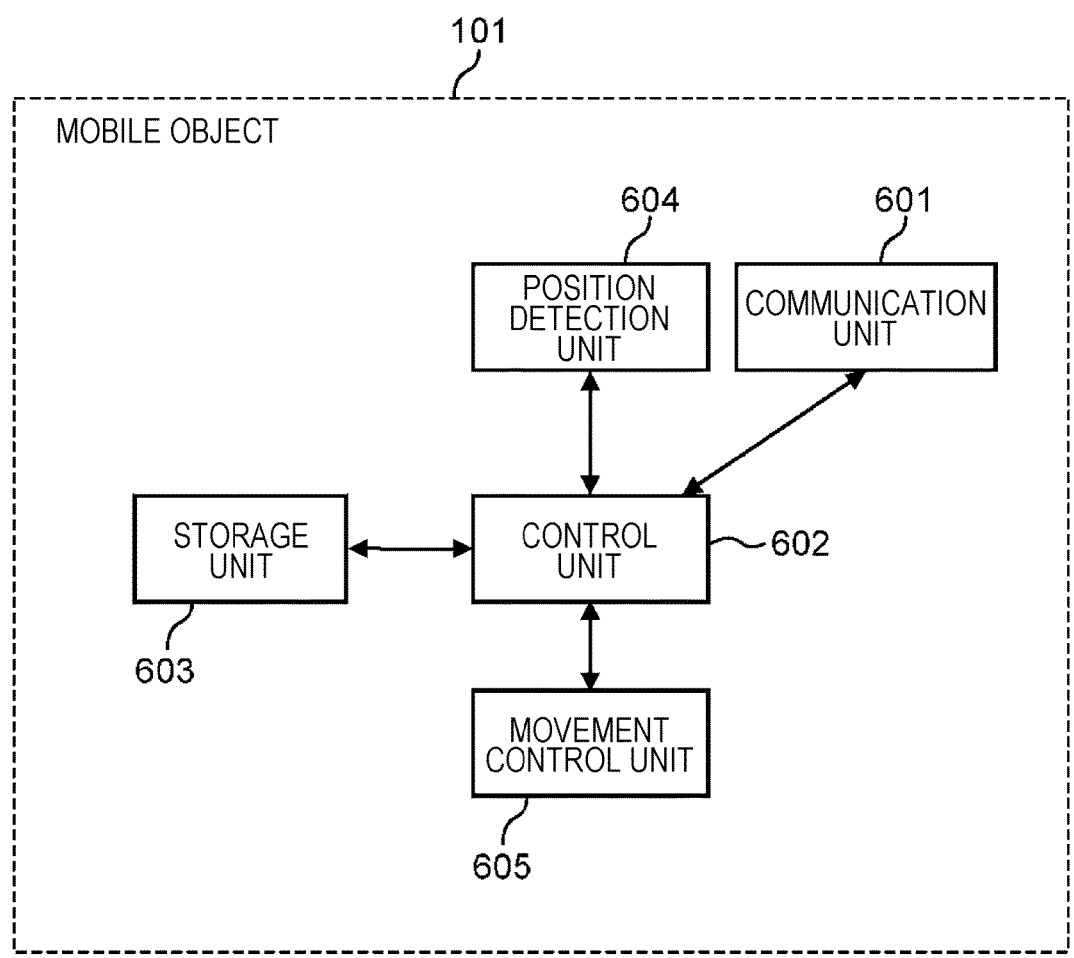
FIG. 8 is a block diagram illustrating the functional configuration of the mobile object according to the first embodiment of the present disclosure.

FIG. 7 illustrates an overview of the mobile object 101 according to the first embodiment of the present disclosure, and FIG. 8 is a block diagram illustrating the functional configuration of the mobile object 101 according to the first embodiment of the present disclosure. In FIG. 8, the same elements as those in FIG. 6 are denoted by the same reference numerals and the description thereof will not be given.

As illustrated in FIG. 7, the mobile object (autonomous mobile robot) 101 includes a main body A1 and movement control units 605 that generate a propulsive force of the mobile object 101. The movement control units 605 are attached to ends of supporting portions A2 that extend in four directions from the main body A1. A position detection unit 604 is attached on an upper side of the main body A1. The main body A1 includes a communication unit 601, a control unit 602, and a storage unit 603 therein.

As illustrated in FIG. 8, the mobile object 101 includes the communication unit 601, the control unit 602, the storage unit 603, the position detection unit 604, and the movement control units 605.

The communication unit 601 communicates with another mobile object (communication-partner autonomous mobile robot) by using a communication technology such as Wi-Fi and transmits/receives information. Also, the communication unit 601 relays communication between other mobile objects.

The control unit 602 controls the communication unit 601, the storage unit 603, the position detection unit 604, and the movement control units 605.

The storage unit 603 stores own-mobile-object information, which is information about the own mobile object, and other-mobile-object information, which is information about one or more other mobile objects received from the other mobile objects. The details of the information stored in the storage unit 603 will be described below with reference to FIGS. 9, 10, and 11.

The position detection unit 604 detects a current position of the own mobile object. The position detection unit 604 measures a position of the own mobile object by using, for example, the Global Positioning System (GPS).

The movement control units 605 control the movement of the own mobile object in response to an instruction from the control unit 602. Specifically, each movement control unit 605 includes a propeller and a motor for rotating the propeller. In FIG. 7, the mobile object 101 includes four movement control units 605, but the number of movement control units 605 is not limited to four. For example, the mobile object 101 may include five or more movement control units 605. The control unit 602 appropriately controls the rotation rates of the propellers of the movement control units 605, thereby controlling the movement direction or flying state of the mobile object 101. The movement control units 605 drive the mobile object 101.

The control unit 602 outputs a first control command to the movement control units 605. The first control command causes the mobile object 101 to move by a first control amount (basic movement vector group information) corresponding to any one of a set of a first movement distance and a first movement direction, a set of a first velocity absolute value and a first velocity direction, and a set of a first acceleration absolute value and a first acceleration direction.

The communication unit 601 receives, from a first communication-partner mobile object (for example, the mobile object 105) that is different from the mobile object 101 and forms a network together with the mobile object 101, first information indicating any one of a first position, a first velocity, and a first acceleration of the mobile object 105.

If the control unit 602 detects that the first information is ceased to be received by the communication unit 601, the control unit 602 decides on a second control amount (communication restoration vector information) by which the mobile object 101 is to be moved based on the first information that has already been received. The second control amount corresponds to any one of a set of a second movement distance and a second movement direction, a set of a second velocity absolute value and a second velocity direction, and a set of a second acceleration absolute value and a second acceleration direction. The control unit 602 decides on, based on the first control amount and the second control amount, a third control amount (actual movement vector information) corresponding to any one of a set of a third movement distance and a third movement direction, a set of a third velocity absolute value and a third velocity direction, and a set of a third acceleration absolute value and a third acceleration direction. The control unit 602 generates a second control command and outputs the second control command to the movement control units 605. The second control command causes the mobile object 101 to move by switching from the first control amount to the third control amount.

The communication unit 601 may receive the first information from each of a plurality of mobile objects (for example, the mobile objects 105, 106, and 107).

The communication unit 601 further receives, from a second communication-partner mobile object (for example, the mobile object 102) that is different from the mobile objects 101 and 105 and forms the network together with the mobile object 101, second information indicating any one of a second position, a second velocity, and a second acceleration of the mobile object 102. If the control unit 602 detects that the first information is ceased to be received by the communication unit 601, the control unit 602 decides on, based on the second information, the second control amount.

The communication unit 601 may receive the second information from each of a plurality of mobile objects (for example, the mobile objects 102, 103, and 104).

Figure 9:
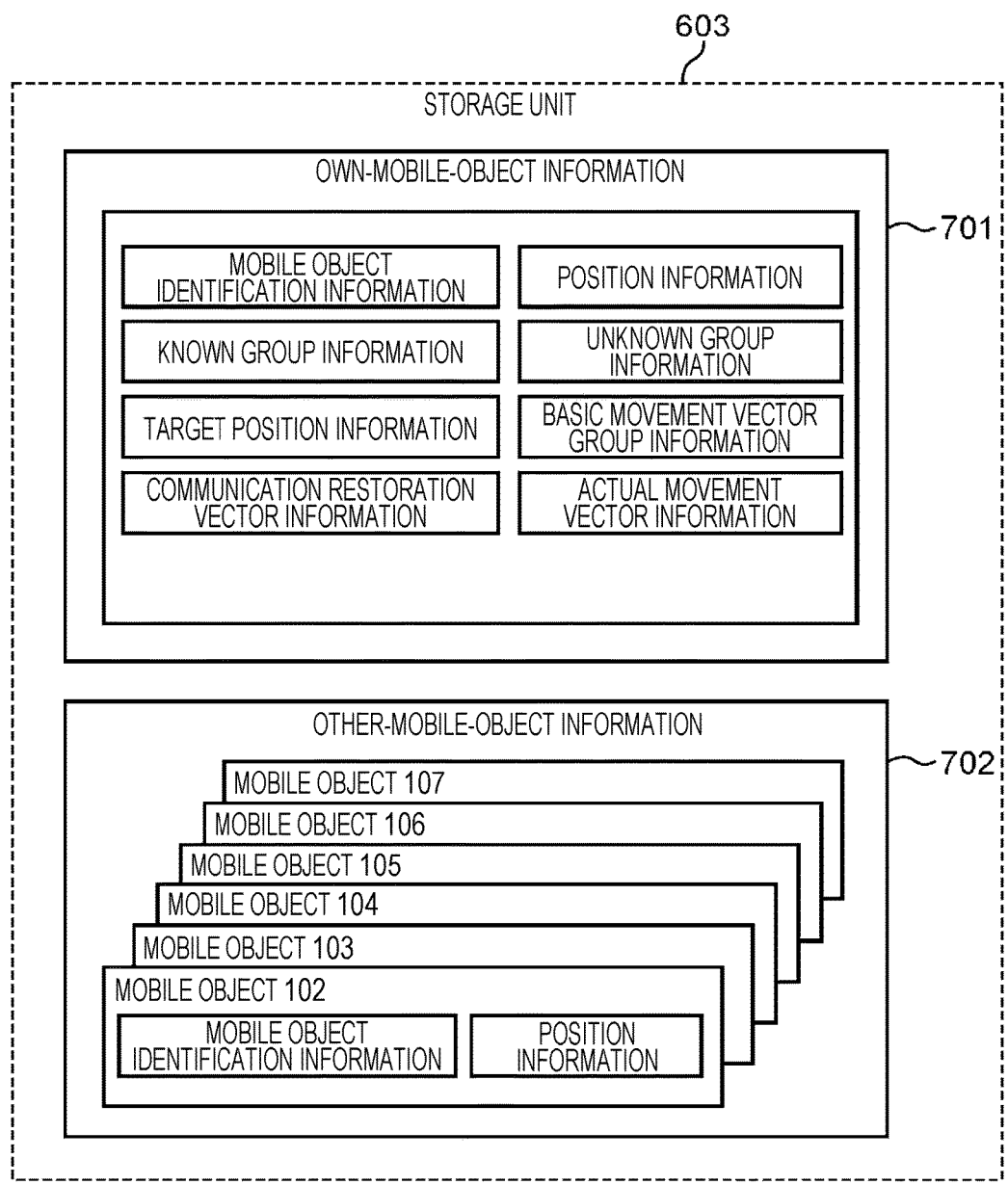
FIG. 9 is a diagram illustrating an example of information stored in a storage unit of the mobile object according to the first embodiment of the present disclosure.

FIG. 9 is a diagram illustrating an example of information stored in the storage unit 603 of the mobile object 101 according to the first embodiment of the present disclosure. In FIG. 9, the same elements as those in FIGS. 6 and 8 are denoted by the same reference numerals and the description thereof will not be given.

The storage unit 603 stores own-mobile-object information 701, which is information about the mobile object 101, and other-mobile-object information 702, which is information about one or more other mobile objects.

The own-mobile-object information 701 includes mobile object identification information for uniquely identifying the own mobile object; position information indicating the position of the own mobile object, which is detected by the position detection unit 604; known group information including mobile object identification information of the own mobile object and one or more other mobile objects that the own mobile object is capable of communicating with through an ad hoc network; unknown group information including mobile object identification information of one or more other mobile objects that the own mobile object is incapable of communicating with through the ad hoc network; target position information, which is position information indicating a target position to which the own mobile object moves to restore communication if there is an unknown group; basic movement vector group information, which is information about a basic movement vector group including one or more movement vectors for controlling a movement if there is no unknown group; communication restoration vector information, which is information about a communication restoration vector indicating a movement vector for moving toward a target position; and actual movement vector information, which is information about an actual movement vector defining an actual movement.

The other-mobile-object information 702 includes mobile object identification information for uniquely identifying one or more other mobile objects; and position information indicating the positions of the one or more other mobile objects.

FIG. 10 is a diagram illustrating an example of the own-mobile-object information 701 stored in the storage unit 603 of the mobile object 101 according to the first embodiment of the present disclosure. In FIG. 10, the same elements as those in FIGS. 6 and 9 are denoted by the same reference numerals and the description thereof will not be given.

In the mobile object 101, the storage unit 603 stores the own-mobile-object information 701 in the form illustrated in FIG. 10, for example. The own-mobile-object information 701 includes mobile object identification information for uniquely identifying the own mobile object; position information indicating the position of the own mobile object, which is detected by the position detection unit 604; known group information including mobile object identification information of the own mobile object and one or more other mobile objects that the own mobile object is capable of communicating with through an ad hoc network; unknown group information including mobile object identification information of one or more other mobile objects that the own mobile object is incapable of communicating with through the ad hoc network; target position information, which is position information indicating a target position to which the own mobile object moves to restore communication if there is an unknown group; basic movement vector group information, which is information about a basic movement vector group including one or more movement vectors for controlling a movement if there is no unknown group; communication restoration vector information, which is information about a communication restoration vector indicating a movement vector for moving toward a target position; and actual movement vector information, which is information about an actual movement vector defining an actual movement.

Here, a movement vector is a vector for controlling a movement of a mobile object, and typically represents a displacement, velocity, or acceleration of a movement.

The own-mobile-object information 701 illustrated in FIG. 10 indicates that the value of the own mobile object identification information is "mobile object 101", the value of the own position information is "34° 41'37.0" north latitude, 135° 30'7.1" east longitude, 2 m above sea level", the value of the known group information is "mobile object 101, mobile object 102, mobile object 103, and mobile object 104", the value of the unknown group information is "mobile object 105, mobile object 106, and mobile object 107", the value of the target position information is "34° 41'37.6" north latitude, 135° 30'9.1" east longitude, 2 m above sea level", the value of the main basic movement vector information in the basic movement vector group information is "(−5 m/s, −2 m/s, 0 m/s)", the value of the obstacle avoidance basic movement vector information in the basic movement vector group information is "(0 m/s, 5 m/s, 0 m/s)", the value of the communication restoration vector information is "(10 m/s, 2 m/s, 0 m/s)", and the value of the actual movement vector information is "(7.5 m/s, 6 m/s, 0 m/s)".

In FIG. 10, the position information is represented by a latitude, a longitude, and an altitude above sea level. Of course, the position information may be represented by using another method. For example, the position information may be represented by using an orthogonal coordinate system formed of an x-axis, a y-axis, and a z-axis. In this case, for example, a specific position is regarded as an origin, a positive direction along the x-axis corresponds to the direction of east, a positive direction along the y-axis corresponds to the direction of north, and a positive direction along the z-axis corresponds to a direction opposite to the direction of gravity. In this specification, the position information is represented by a latitude, a longitude, and an altitude above sea level, unless otherwise noted.

A movement vector (control amount) corresponds to any one of a set of a movement distance and a movement direction, a set of a velocity absolute value and a velocity direction, and a set of an acceleration absolute value and an acceleration direction.

In FIG. 10, a movement vector is represented by velocity, that is, represented in the unit of velocity per second (m/s) by using an orthogonal coordinate system formed of an x-axis, a y-axis, and a z-axis. A positive direction along the x-axis corresponds to the direction of east, a positive direction along the y-axis corresponds to the direction of north, and a positive direction along the z-axis corresponds to a direction opposite to the direction of gravity. Of course, a movement vector may be represented by displacement or acceleration or may be represented by using another method. For example, a movement vector may be represented by a difference in latitude, a difference in longitude, and a difference in altitude above sea level per unit time. In this specification, unless otherwise noted, a movement vector is represented by velocity in the unit of velocity per second (m/s) by using an orthogonal coordinate system formed of an x-axis, a y-axis, and a z-axis, in which a positive direction along the x-axis corresponds to the direction of east, a positive direction along the y-axis corresponds to the direction of north, and a positive direction along the z-axis corresponds to a direction opposite to the direction of gravity.

In FIG. 10, the basic movement vector group information is represented by a set of main basic movement vector information and obstacle avoidance basic movement vector information. That is, a basic movement vector group is a set of a main basic movement vector and an obstacle avoidance basic movement vector. Here, the main basic movement vector is a movement vector representing a movement of a mobile object for achieving an original purpose. The obstacle avoidance basic movement vector is a movement vector representing a movement of a mobile object for avoiding an obstacle near the mobile object. The number of movement vectors included in the basic movement vector group and the movements represented by the movement vectors have variations, which is not related to the gist of the present disclosure. In this specification, unless otherwise noted, a basic movement vector group is a set of a main basic movement vector and an obstacle avoidance basic movement vector described herein.

FIG. 11 is a diagram illustrating an example of the other-mobile-object information 702 stored in the storage unit 603 of the mobile object 101 according to the first embodiment of the present disclosure. In FIG. 11, the same elements as those in FIGS. 6 and 9 are denoted by the same reference numerals and the description thereof will not be given.

In the mobile object 101, the storage unit 603 stores the other-mobile-object information 702 in the form illustrated in FIG. 11, for example. The other-mobile-object information 702 includes mobile object identification information for uniquely identifying one or more other mobile objects and position information of the one or more other mobile objects received from the other mobile objects.

The other-mobile-object information 702 illustrated in FIG. 11 indicates that the value of the mobile object identification information of the mobile object 102 is "mobile object 102" and that the value of the position information of the mobile object 102 is "34° 41'37.5" north latitude, 135° 30'7.6" east longitude, 2 m above sea level". The mobile object identification information and the position information of the mobile objects 103 to 107 are similar thereto.

The control unit 602 generates a control command for causing the mobile object 101 to move by using the basic movement vector group, and outputs the control command to the movement control units 605. The movement control units 605 cause the mobile object 101 to actually move in accordance with the control command.

Figure 12:
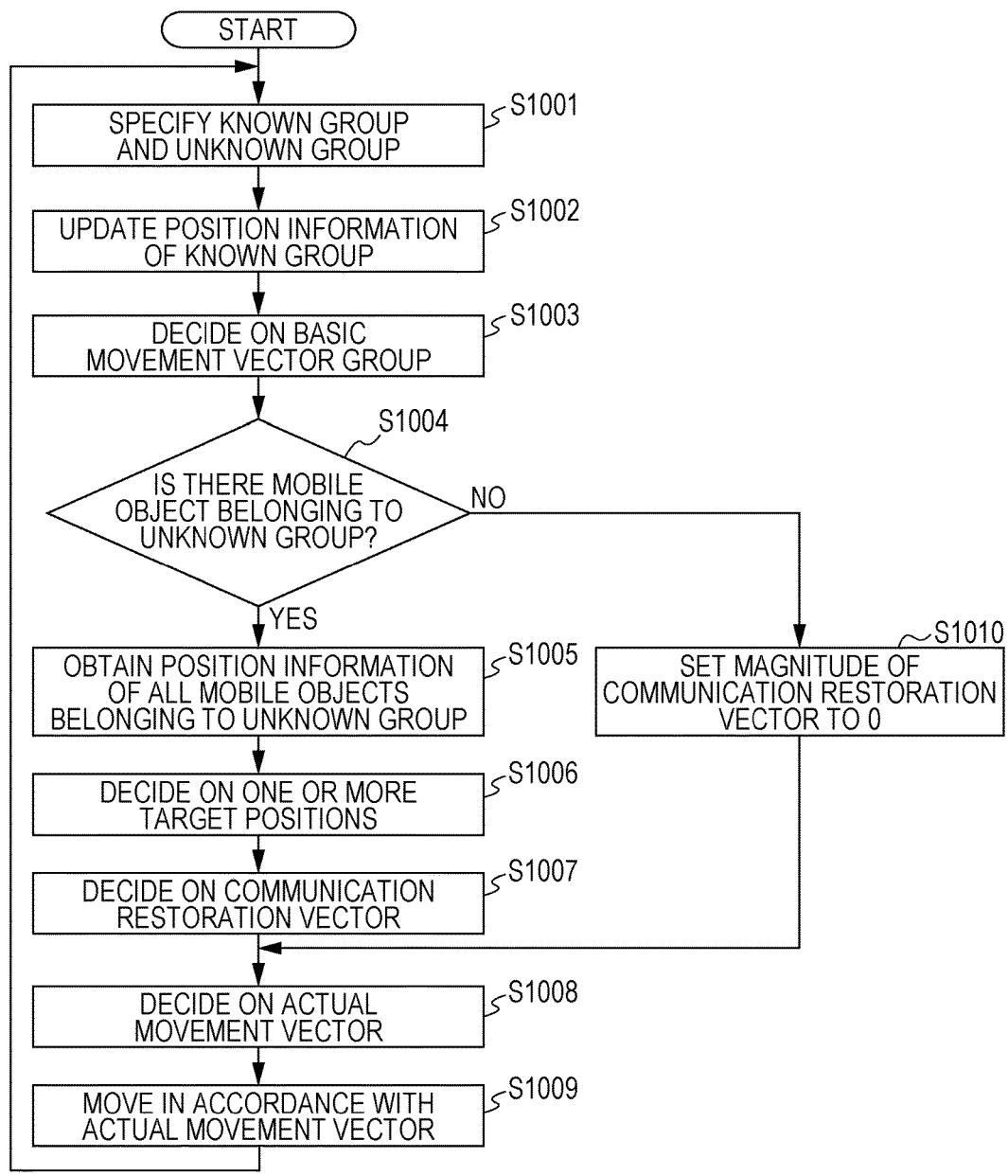
FIG. 12 is a flowchart illustrating an overall operation of movement control of the mobile object according to the first embodiment of the present disclosure.

FIG. 12 is a flowchart illustrating an overall operation of movement control of the mobile object 101 according to the first embodiment of the present disclosure.

First, the control unit 602 of the mobile object 101 attempts to communicate with the mobile objects 102 to 107 through the ad hoc network. In accordance with whether or not the communication therewith can be performed, the control unit 602 specifies a known group, which is a group of mobile objects that the mobile object 101 is capable of communicating with through the ad hoc network, and an unknown group, which is a group of mobile objects that the mobile object 101 is incapable of communicating with through the ad hoc network (step S1001). Subsequently, the control unit 602 updates the known group information, which includes mobile object identification information of all the mobile objects belonging to the known group, and the unknown group information, which includes mobile object identification information of all the mobile objects belonging to the unknown group, in the own-mobile-object information 701.

Subsequently, the control unit 602 of the mobile object 101 updates the position information of the known group (step S1002). At this time, the position detection unit 604 detects the position of the own mobile object and updates the position information in the own-mobile-object information 701. The communication unit 601 requests, through the ad hoc network, all the mobile objects belonging to the known group to transmit mobile object identification information and position information and receives the mobile object identification information and the position information from the mobile objects belonging to the known group. Subsequently, the control unit 602 updates the position information in the other-mobile-object information 702.

Subsequently, the control unit 602 of the mobile object 101 decides on a basic movement vector group including one or more movement vectors for controlling a movement if there is no unknown group (step S1003). The control unit 602 creates basic movement vector group information, which is information about the basic movement vector group, and updates the basic movement vector group information in the own-mobile-object information 701.

Figure 13:
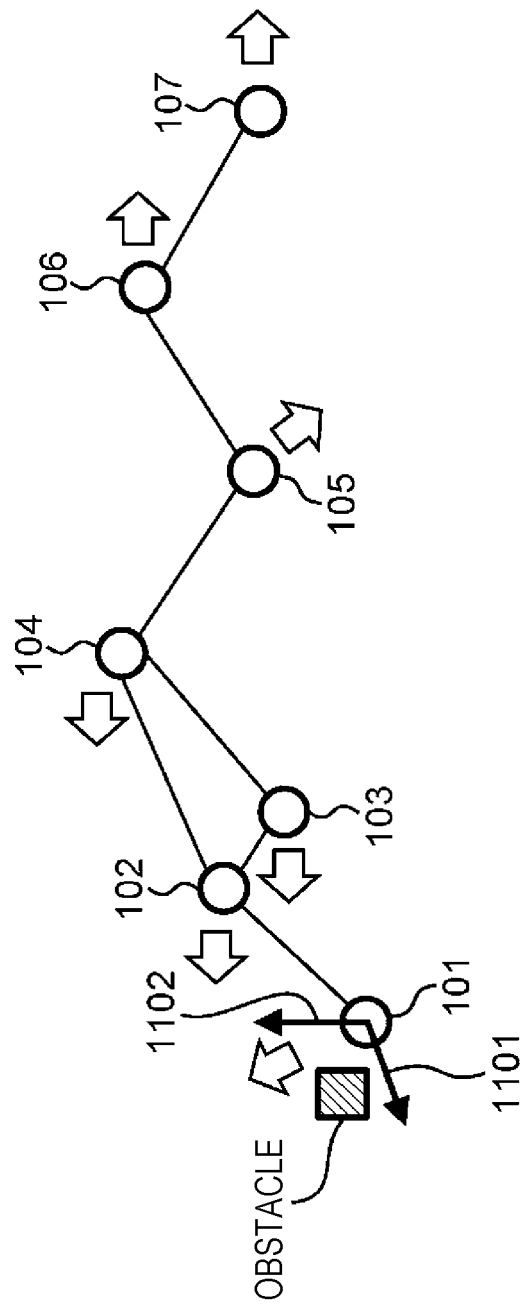
FIG. 13 is a conceptual diagram illustrating an example of a basic movement vector group according to the first embodiment of the present disclosure.

FIG. 13 is a conceptual diagram illustrating an example of a basic movement vector group according to the first embodiment of the present disclosure. In FIG. 13, the same elements as those in FIG. 6 are denoted by the same reference numerals and the description thereof will not be given.

In the situation illustrated in FIG. 13, it is the best for the mobile object 101 to move in the direction of west at 5 m/s and in the direction of south at 2 m/s to achieve an original purpose if there is no restriction. In this case, a main basic movement vector 1101 is (−5 m/s, −2 m/s, 0 m/s).

However, there is an obstacle to the west of the mobile object 101. Thus, the mobile object 101 needs to move while avoiding the obstacle. It is assumed that an operation of moving northward at a velocity of 5 m/s is necessary to avoid the obstacle. In this case, an obstacle avoidance basic movement vector 1102 is (0 m/s, 5 m/s, 0 m/s).

Subsequently, the control unit 602 of the mobile object 101 determines whether or not there is a mobile object belonging to an unknown group (step S1004).

If it is determined in step S1004 that there is no mobile object belonging to an unknown group (NO in step S1004), the control unit 602 of the mobile object 101 sets the magnitude of a communication restoration vector to 0 (step S1010), and then the process proceeds to step S1008, which will be described below.

For example, in the situation illustrated in FIG. 13, there is no unknown group and all the mobile objects 101 to 107 belong to a known group. Thus, the control unit 602 of the mobile object 101 sets the magnitude of a communication restoration vector to 0, and then the process proceeds to step S1008, which will be described below.

On the other hand, if it is determined in step S1004 that there is a mobile object belonging to an unknown group (YES in step S1004), the control unit 602 performs the process in steps S1005 to S1007.

If it is determined in step S1004 that there is a mobile object belonging to an unknown group, the control unit 602 of the mobile object 101 obtains, from the other-mobile-object information 702, the position information of all the mobile objects belonging to the unknown group (step S1005).

Figure 14:
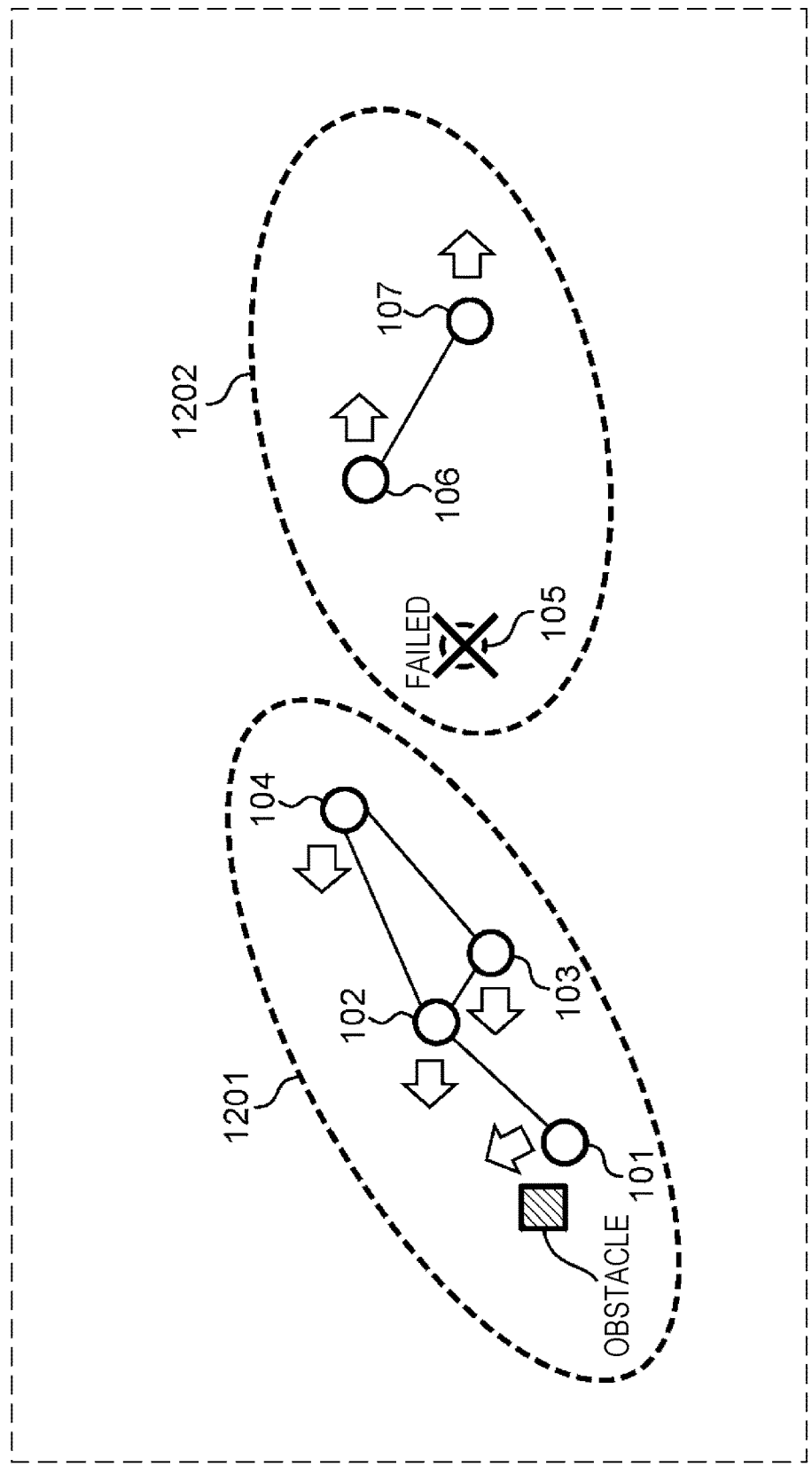
FIG. 14 is a conceptual diagram illustrating mobile objects belonging to a known group and mobile objects belonging to an unknown group in a case where one mobile object fails in the first embodiment of the present disclosure.

FIG. 14 is a conceptual diagram illustrating the mobile objects 101 to 104 belonging to a known group and the mobile objects 105 to 107 belonging to an unknown group in a case where one mobile object (the mobile object 105) fails in the first embodiment of the present disclosure. In FIG. 14, the same elements as those in FIG. 6 are denoted by the same reference numerals and the description thereof will not be given.

As illustrated in FIG. 14, the failure of the mobile object 105 causes the direct communication between the mobile objects 104 and 105 to be cut off, and thus the communication through the ad hoc network between each of the mobile objects 101 to 104 and the mobile objects 106 and 107 as well as the mobile object 105 is cut off. Accordingly, the mobile objects belonging to a known group 1201 are the mobile objects 101 to 104 and the mobile objects belonging to an unknown group 1202 are the mobile objects 105 to 107.

Figure 15:
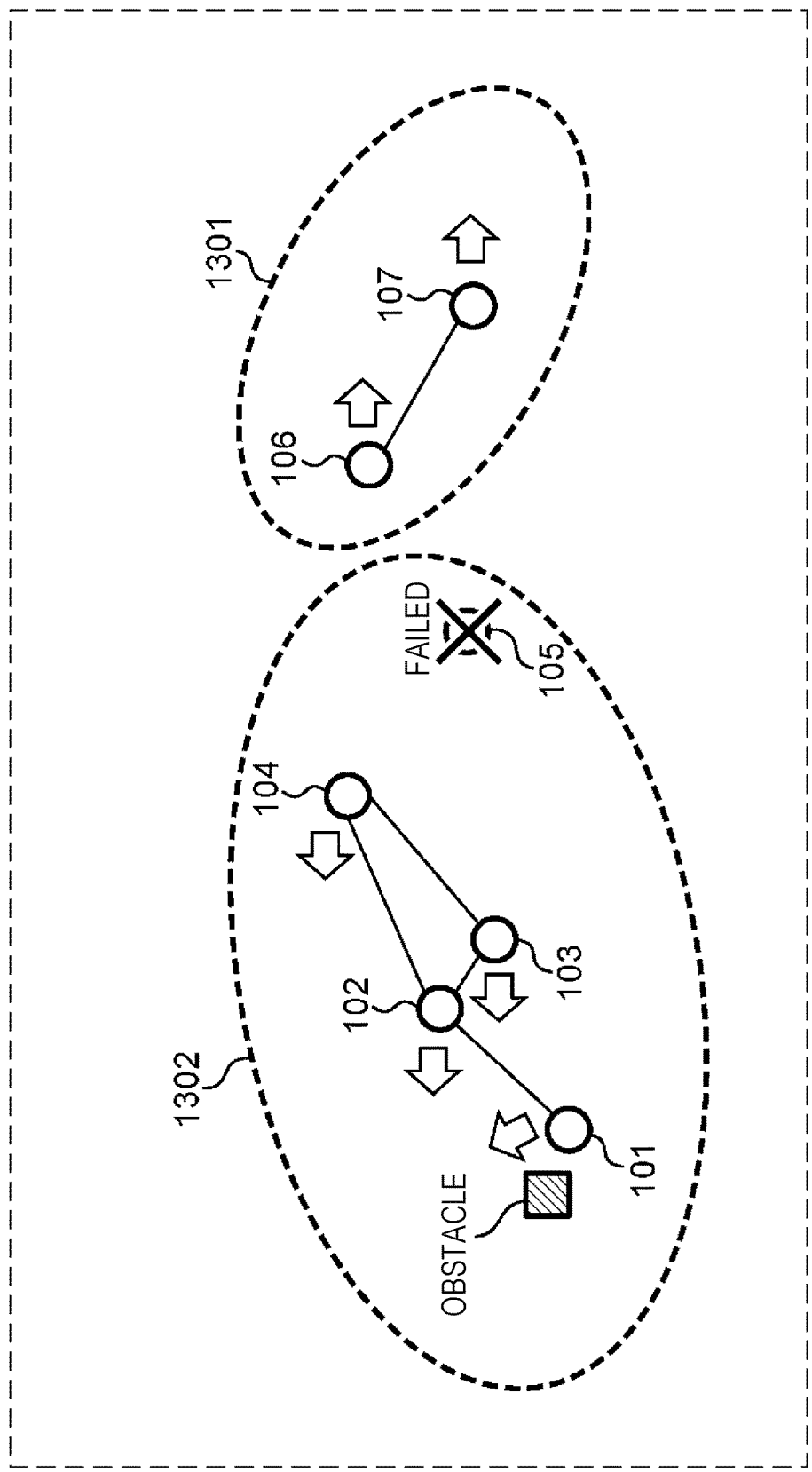
FIG. 15 is a conceptual diagram illustrating mobile objects belonging to a known group and mobile objects belonging to an unknown group in a case where one mobile object fails in the first embodiment of the present disclosure.

FIG. 15 is a conceptual diagram illustrating the mobile objects 106 and 107 belonging to a known group and the mobile objects 101 to 105 belonging to an unknown group in a case where one mobile object (the mobile object 105) fails in the first embodiment of the present disclosure. In FIG. 15, the same elements as those in FIG. 6 are denoted by the same reference numerals and the description thereof will not be given.

As illustrated in FIG. 15, the failure of the mobile object 105 causes the direct communication between the mobile objects 106 and 105 to be cut off, and thus the communication through the ad hoc network between each of the mobile objects 106 and 107 and the mobile objects 101 to 104 as well as the mobile object 105 is cut off. Accordingly, the mobile objects belonging to a known group 1301 are the mobile objects 106 and 107 and the mobile objects belonging to an unknown group 1302 are the mobile objects 101 to 105.

Subsequently, the control unit 602 of the mobile object 101 decides on one or more target positions on the basis of the position information of the mobile objects belonging to the unknown group obtained in step S1005 (step S1006).

The target position is, for example, a center position of all the mobile objects belonging to the unknown group or a position nearest to the own mobile object among the positions of all the mobile objects belonging to the unknown group.

Figure 16:
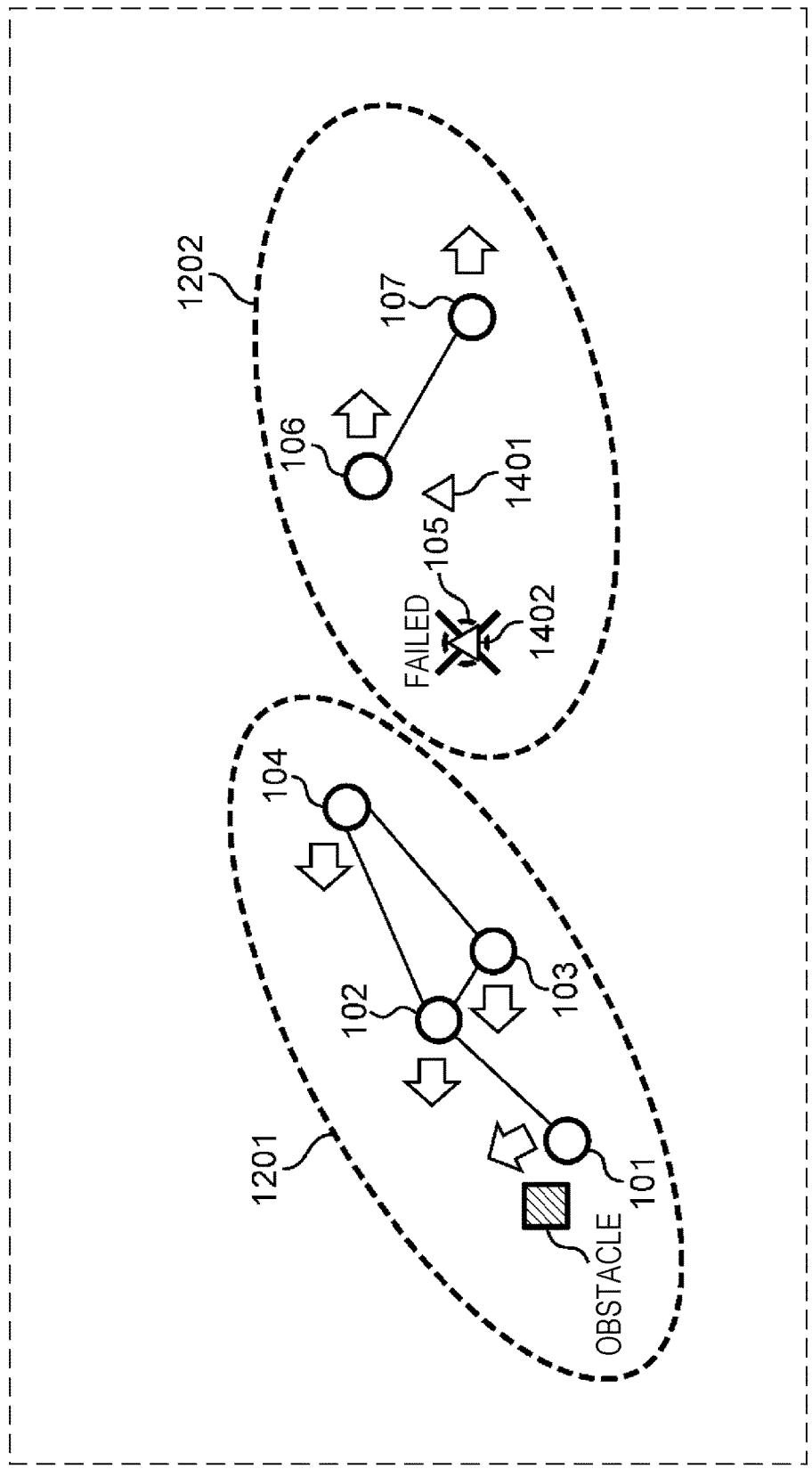
FIG. 16 is a diagram illustrating an example of a method for deciding on a target position and the target position decided on by using the method in each mobile object in a case where one mobile object fails in the first embodiment of the present disclosure.

FIG. 16 is a diagram illustrating an example of a method for deciding on a target position and the target position decided on by using the method in each of the mobile objects 101 to 104 in a case where one mobile object (the mobile object 105) fails in the first embodiment of the present disclosure. In FIG. 16, the same elements as those in FIGS. 6 and 14 are denoted by the same reference numerals and the description thereof will not be given. It is assumed that the mobile objects 105 to 107 are at the positions described in the other-mobile-object information 702 illustrated in FIG. 11.

For example, in the case of deciding on the center position of all the mobile objects belonging to the unknown group as a target position, the target position of each of the mobile objects 101 to 104 is a target position 1401 illustrated in FIG. 16. The value of the target position 1401 is "34° 41'37.6" north latitude, 135° 30'9.1" east longitude, 2 m above sea level". In the case of deciding on the position of the mobile object nearest to the own mobile object among the positions of all the mobile objects belonging to the unknown group as a target position, the target position of each of the mobile objects 101 to 104 is a target position 1402 illustrated in FIG. 16, that is, the position of the mobile object 105. The value of the target position 1402 is "34° 41'37.5" north latitude, 135° 30'8.6" east longitude, 2 m above sea level".

Figure 17:
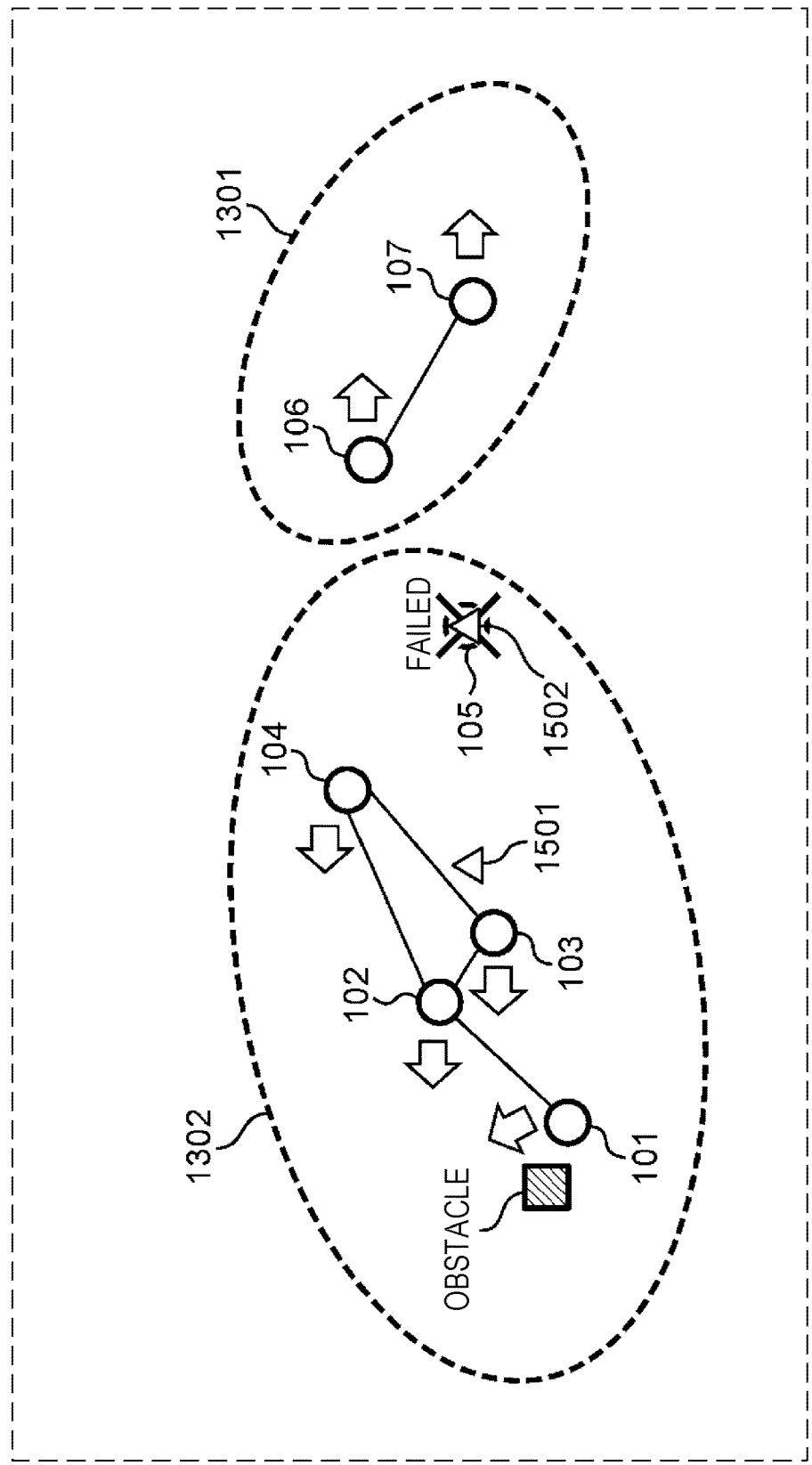
FIG. 17 is a diagram illustrating an example of a method for deciding on a target position and the target position decided on by using the method in each mobile object in a case where one mobile object fails in the first embodiment of the present disclosure.

FIG. 17 is a diagram illustrating an example of a method for deciding on a target position and the target position decided on by using the method in each of the mobile objects 106 and 107 in a case where one mobile object (the mobile object 105) fails in the first embodiment of the present disclosure. In FIG. 17, the same elements as those in FIGS. 6 and 15 are denoted by the same reference numerals and the description thereof will not be given. It is assumed that the mobile objects 101 to 105 are at the positions described in the other-mobile-object information 702 illustrated in FIG. 11.

For example, in the case of deciding on the center position of all the mobile objects belonging to the unknown group as a target position, the target position of each of the mobile objects 106 and 107 is a target position 1501 illustrated in FIG. 17. The value of the target position 1501 is "34° 41'37.48" north latitude, 135° 30'7.82" east longitude, 2 m above sea level". In the case of deciding on the position of the mobile object nearest to the own mobile object among the positions of all the mobile objects belonging to the unknown group as a target position, the target position of each of the mobile objects 106 and 107 is a target position 1502 illustrated in FIG. 17, that is, the position of the mobile object 105. The value of the target position 1502 is "34° 41'37.5" north latitude, 135° 30'8.6" east longitude, 2 m above sea level".

Subsequently, the control unit 602 of the mobile object 101 obtains, from the position information in the own-mobile-object information 701 and the position information in the other-mobile-object information 702, component group position information indicating the latest positions of individual mobile objects belonging to a component group including all mobile objects that form the ad hoc network. On the basis of the component group position information, the control unit 602 decides on a communication restoration vector, which is a movement vector for moving toward the target position (step S1007). Subsequently, the control unit 602 creates communication restoration vector information, which is information about the communication restoration vector, and updates the communication restoration vector information in the own-mobile-object information 701.

For example, if there are one or more mobile objects that are at a distance equal to or less than a predetermined value from the own mobile object, a communication restoration vector having a direction toward the target position and having a predetermined magnitude is decided on as a communication restoration vector of only one mobile object among the own mobile object and the one or more mobile objects, whereas a communication restoration vector having a magnitude of 0 is decided on as communication restoration vectors of the other mobile objects.

Now, an example of a communication restoration vector will be described. In the following description, if each of the mobile objects 101 to 107 decides on a center position of all the mobile objects belonging to the unknown group as a target position and if there are one or more mobile objects that are at a distance equal to or less than a predetermined value from the own mobile object, only one mobile object among the own mobile object and the one or more mobile objects decides on a communication restoration vector having a direction toward the target position and having a predetermined magnitude, whereas the other mobile objects decide on a communication restoration vector having a magnitude of 0.

Figure 18:
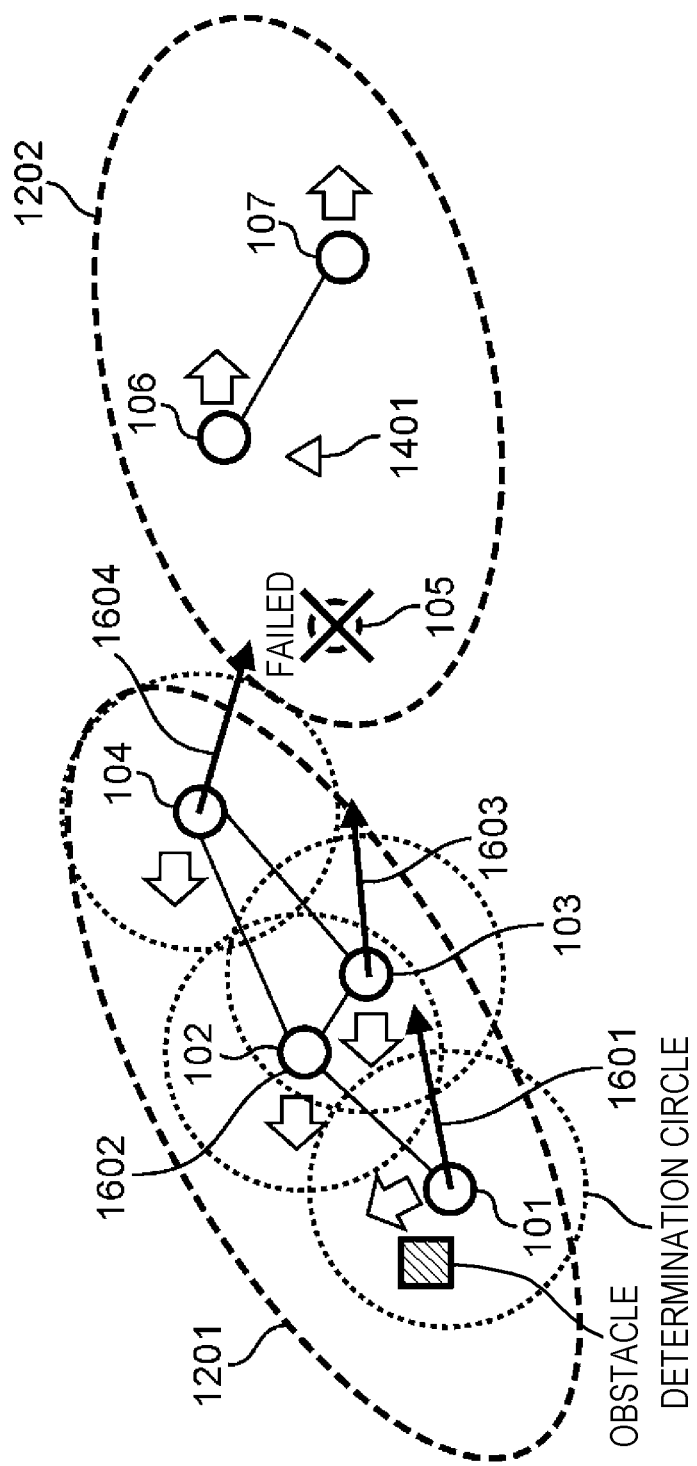
FIG. 18 is a conceptual diagram illustrating an example of communication restoration vectors of mobile objects in a case where one mobile object fails in the first embodiment of the present disclosure.

FIG. 18 is a conceptual diagram illustrating an example of communication restoration vectors of the mobile objects 101 to 104 in a case where one mobile object (the mobile object 105) fails in the first embodiment of the present disclosure. In FIG. 18, the same elements as those in FIGS. 6, 14, and 16 are denoted by the same reference numerals and the description thereof will not be given.

The control unit 602 of the mobile object 101 determines, on the basis of the component group position information, whether or not there are one or more mobile objects that are at a predetermined distance or less from the own mobile object. In FIG. 18, the positions that are at the predetermined distance or less from the mobile objects 101 to 104 are surrounded by dotted-line determination circles. There is no mobile object within the determination circle of the mobile object 101, and thus the control unit 602 of the mobile object 101 decides on, as its communication restoration vector, a communication restoration vector 1601 (10 m/s, 2 m/s, 0 m/s) having a direction toward the target position 1401 and having a predetermined magnitude.

Also, the control unit 602 of each of the mobile objects 102 and 103 determines, on the basis of the component group position information, whether or not there are one or more mobile objects that are at a predetermined distance or less from the own mobile object. There is the mobile object 103 within the determination circle of the mobile object 102 and there is the mobile object 102 within the determination circle of the mobile object 103. Thus, the mobile objects 102 and 103 communicate with each other and it is determined that only the mobile object 103 moves toward the target position 1401. The control unit 602 of the mobile object 102 decides on, as its communication restoration vector, a communication restoration vector 1602 having a magnitude of 0. The control unit 602 of the mobile object 103 decides on, as its communication restoration vector, a communication restoration vector 1603 (10.1 m/s, 1 m/s, 0 m/s) having a direction toward the target position 1401 and having a predetermined magnitude.

Also, the control unit 602 of the mobile object 104 determines, on the basis of the component group position information, whether or not there are one or more mobile objects that are at a predetermined distance or less from the own mobile object. There is no mobile object within the determination circle of the mobile object 104, and thus the control unit 602 of the mobile object 104 decides on, as its communication restoration vector, a communication restoration vector 1604 (10 m/s, −2 m/s, 0 m/s) having a direction toward the target position 1401 and having a predetermined magnitude.

Figure 19:
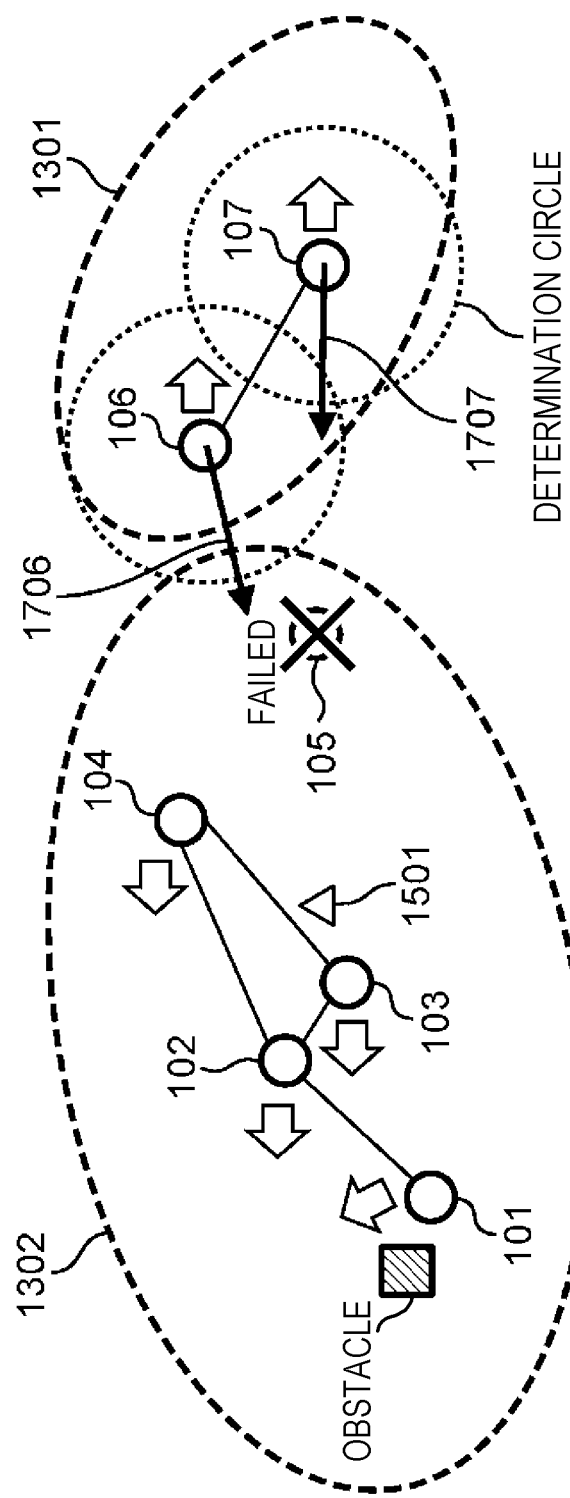
FIG. 19 is a conceptual diagram illustrating an example of communication restoration vectors of mobile objects in a case where one mobile object fails in the first embodiment of the present disclosure.

FIG. 19 is a conceptual diagram illustrating an example of communication restoration vectors of the mobile objects 106 and 107 in a case where one mobile object (the mobile object 105) fails in the first embodiment of the present disclosure. In FIG. 19, the same elements as those in FIGS. 6, 15, and 17 are denoted by the same reference numerals and the description thereof will not be given.

The control unit 602 of the mobile object 106 determines, on the basis of the component group position information, whether or not there are one or more mobile objects that are at a predetermined distance or less from the own mobile object. In FIG. 19, the positions that are at the predetermined distance or less from the mobile objects 106 and 107 are surrounded by dotted-line determination circles. There is no mobile object within the determination circle of the mobile object 106, and thus the control unit 602 of the mobile object 106 decides on, as its communication restoration vector, a communication restoration vector 1706 (−10 m/s, −2 m/s, 0 m/s) having a direction toward the target position 1501 and having a predetermined magnitude.

Also, the control unit 602 of the mobile object 107 determines, on the basis of the component group position information, whether or not there are one or more mobile objects that are at a predetermined distance or less from the own mobile object. There is no mobile object within the determination circle of the mobile object 107, and thus the control unit 602 of the mobile object 107 decides on, as its communication restoration vector, a communication restoration vector 1707 (−10.1 m/s, 1 m/s, 0 m/s) having a direction toward the target position 1501 and having a predetermined magnitude.

Subsequently, the control unit 602 of the mobile object 101 calculates the sum of movement vectors obtained by multiplying all the movement vectors belonging to the basic movement vector group and the communication restoration vector by a value other than 0, and decides on a movement vector obtained through the calculation as an actual movement vector (step S1008). Subsequently, the control unit 602 creates actual movement vector information, which is information about the actual movement vector, and updates the actual movement vector information in the own-mobile-object information 701.

Figure 20:
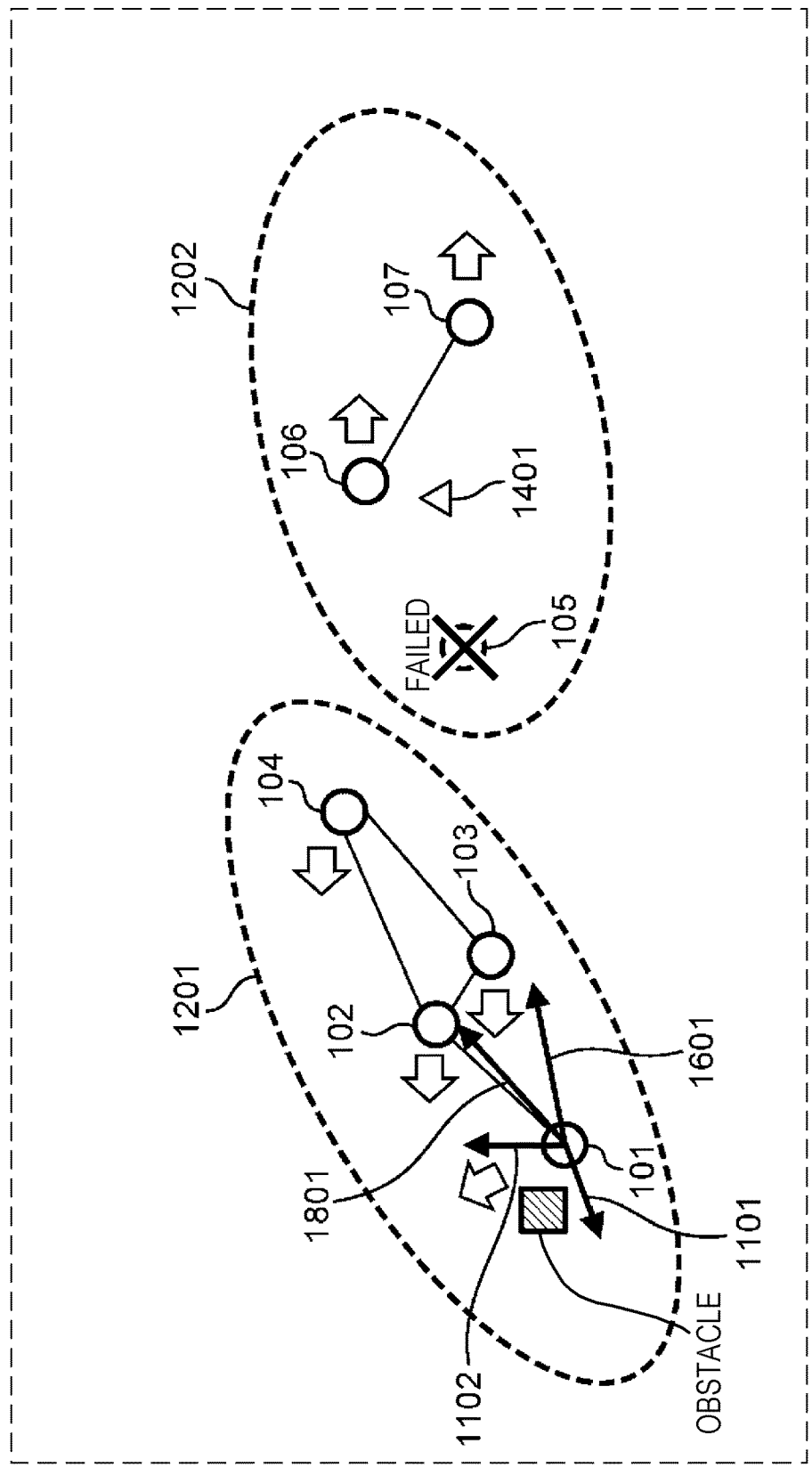
FIG. 20 is a conceptual diagram illustrating an example of a method for deciding on an actual movement vector in a mobile object in a case where one mobile object fails in the first embodiment of the present disclosure.

FIG. 20 is a conceptual diagram illustrating an example of a method for deciding on an actual movement vector in the mobile object 101 in a case where one mobile object (the mobile object 105) fails in the first embodiment of the present disclosure. In FIG. 20, the same elements as those in FIGS. 6, 13, 14, 16, and 18 are denoted by the same reference numerals and the description thereof will not be given.

To increase the ratio of a movement for avoiding an obstacle, the control unit 602 multiplies the main basic movement vector belonging to the basic movement vector group by 0.5, multiplies the obstacle avoidance basic movement vector belonging to the basic movement vector group by 1, and multiplies the communication restoration vector by 1, and then calculates the sum of the movement vectors as calculation results. The value by which each movement vector belonging to the basic movement vector group is multiplied may be a constant or may be a value that is dynamically decided on at the time of performing an actual process.

Referring to FIG. 20, as described above, in this example, the main basic movement vector 1101 of the mobile object 101 is (−5 m/s, −2 m/s, 0 m/s), the obstacle avoidance basic movement vector 1102 is (0 m/s, 5 m/s, 0 m/s), and the communication restoration vector 1601 is (10 m/s, 2 m/s, 0 m/s). Thus, the movement vector as a calculation result is (7.5 m/s, 6 m/s, 0 m/s). The control unit 602 of the mobile object 101 decides on the movement vector (7.5 m/s, 6 m/s, 0 m/s) obtained through the calculation as an actual movement vector 1801.

If the mobile object 105 does not fail and if there is no mobile object belonging to an unknown group, the mobile object 101 moves in accordance with an actual movement vector (−2.5 m/s, 4 m/s, 0 m/s) that is obtained by adding a vector obtained by multiplying the main basic movement vector 1101 (−5 m/s, −2 m/s, 0 m/s) by 0.5, a vector obtained by multiplying the obstacle avoidance basic movement vector 1102 (0 m/s, 5 m/s, 0 m/s) by 1, and a vector obtained by multiplying the communication restoration vector having a magnitude of 0 and decided on in step S1010 by 1. Accordingly, as illustrated in FIG. 13, the mobile object 101 moves substantially north-northwestward while avoiding the obstacle. However, if the mobile object 105 fails and if a mobile object belonging to an unknown group emerges, the mobile object 101 moves substantially northeastward in accordance with the actual movement vector 1801 (7.5 m/s, 6 m/s, 0 m/s) to attempt to restore communication, as illustrated in FIG. 20.

The actual movement vectors of the mobile objects 102 to 104, 106, and 107 are decided on similarly to the case of the mobile object 101.

Figure 21:
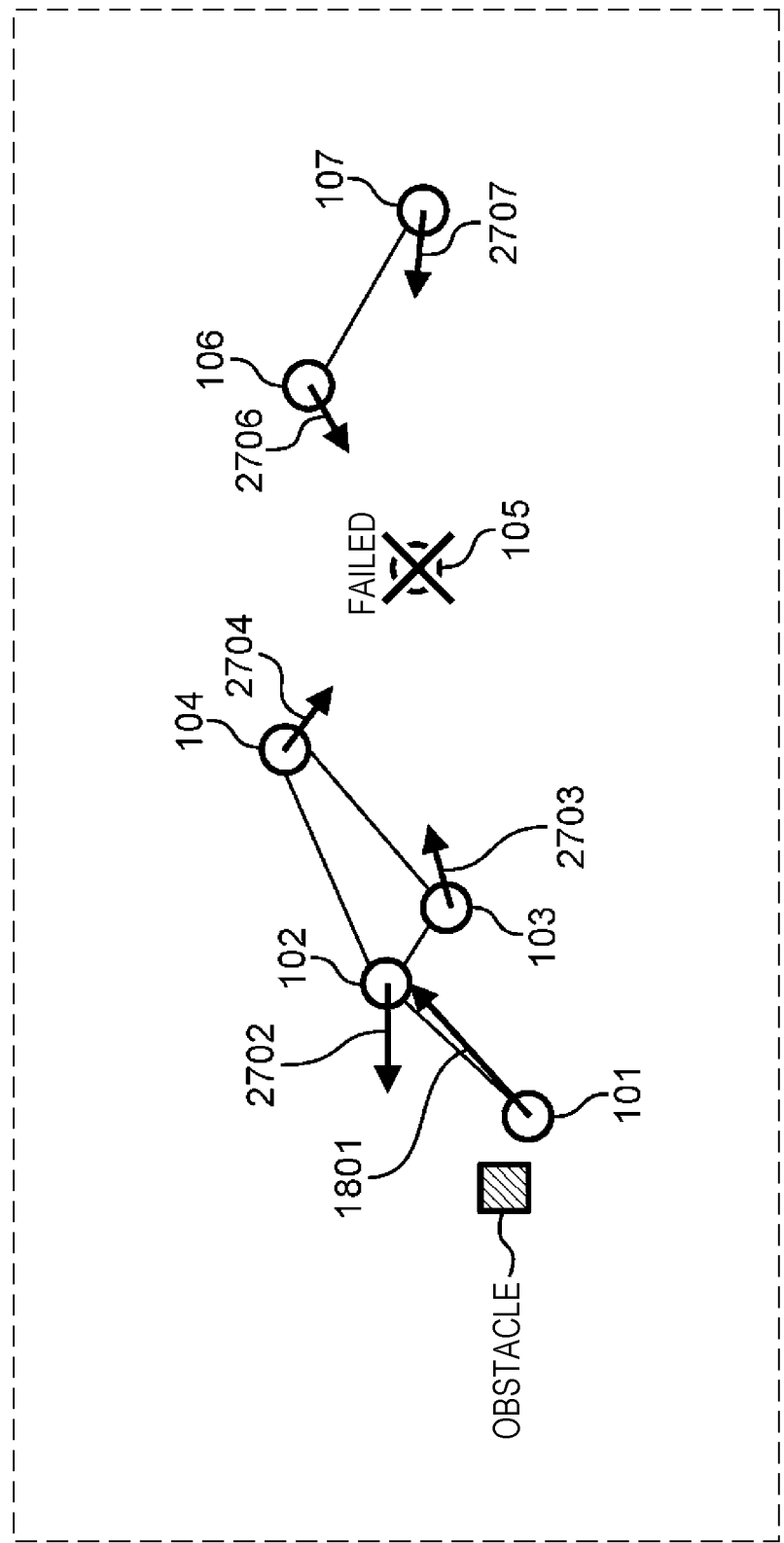
FIG. 21 is a conceptual diagram illustrating an example of actual movement vectors of mobile objects in a case where one mobile object fails in the first embodiment of the present disclosure.

FIG. 21 is a conceptual diagram illustrating an example of actual movement vectors of the mobile objects 101 to 104, 106, and 107 in a case where one mobile object (the mobile object 105) fails in the first embodiment of the present disclosure. In FIG. 21, the same elements as those in FIGS. 6 and 20 are denoted by the same reference numerals and the description thereof will not be given.

Here, among the movement vectors belonging to the basic movement vector groups of the mobile objects 102 to 104, the value of the main basic movement vector is (−10 m/s, 0 m/s, 0 m/s) and the value of the obstacle avoidance basic movement vector is (0 m/s, 0 m/s, 0 m/s). Among the movement vectors belonging to the basic movement vector groups of the mobile objects 106 and 107, the value of the main basic movement vector is (10 m/s, 0 m/s, 0 m/s) and the value of the obstacle avoidance basic movement vector is (0 m/s, 0 m/s, 0 m/s).

Here, the control unit 602 decides on, as an actual movement vector, the sum of a movement vector obtained by multiplying the main basic movement vector by 0.5, a movement vector obtained by multiplying the obstacle avoidance basic movement vector by 1, and a movement vector obtained by multiplying the communication restoration vector by 1.

If the mobile object 105 does not fail and if there is no mobile object belonging to an unknown group, the mobile object 103 moves westward in accordance with the actual movement vector (−5 m/s, 0 m/s, 0 m/s) as illustrated in FIG. 13. However, if the mobile object 105 fails and if a mobile object belonging to an unknown group emerges, the mobile object 103 moves substantially east-northeastward in accordance with an actual movement vector 2703 (5.1 m/s, 1 m/s, 0 m/s) to attempt to restore communication, as illustrated in FIG. 21.

If the mobile object 105 does not fail and if there is no mobile object belonging to an unknown group, the mobile object 104 moves westward in accordance with the actual movement vector (−5 m/s, 0 m/s, 0 m/s) as illustrated in FIG. 13. However, if the mobile object 105 fails and if a mobile object belonging to an unknown group emerges, the mobile object 104 moves substantially east-southeastward in accordance with an actual movement vector 2704 (5 m/s, −2 m/s, 0 m/s) to attempt to restore communication, as illustrated in FIG. 21.

On the other hand, the mobile object 102, which has the communication restoration vector 1602 having a magnitude of 0, moves westward in accordance with an actual movement vector 2702 (−5 m/s, 0 m/s, 0 m/s) to implement an original purpose, as illustrated in FIG. 21, even if the mobile object 105 fails and if a mobile object belonging to an unknown group emerges, as in the case where the mobile object 105 does not fail and there is no mobile object belonging to an unknown group.

In this way, the mobile objects 101, 103, and 104 mainly perform a communication restoration operation whereas the mobile object 102 moves in the same way as in the case where there is no unknown group, and accordingly both restoration of communication and an original purpose can be achieved by the entire component group. At the point of time when the communication restoration operation starts, the distance between the mobile objects 102 and 103 is equal to or less than the radius of the determination circle illustrated in FIG. 18, and thus the direct communication between the mobile objects 102 and 103 is unlikely to be immediately cut off.

The same applies to the mobile objects 106 and 107 that are incapable of communicating with the mobile objects 101 to 104 due to the failure of the mobile object 105.

If the mobile object 105 does not fail and if there is no mobile object belonging to an unknown group, the mobile object 106 moves eastward in accordance with the actual movement vector (5 m/s, 0 m/s, 0 m/s) as illustrated in FIG. 13. However, if the mobile object 105 fails and if a mobile object belonging to an unknown group emerges, the mobile object 106 moves substantially west-southwestward in accordance with an actual movement vector 2706 (−5 m/s, −2 m/s, 0 m/s) to attempt to restore communication, as illustrated in FIG. 21.

If the mobile object 105 does not fail and if there is no mobile object belonging to an unknown group, the mobile object 107 moves eastward in accordance with the actual movement vector (5 m/s, 0 m/s, 0 m/s) as illustrated in FIG. 13. However, if the mobile object 105 fails and if a mobile object belonging to an unknown group emerges, the mobile object 107 moves substantially west-northwestward in accordance with an actual movement vector 2707 (−5.1 m/s, 1 m/s, 0 m/s) to attempt to restore communication, as illustrated in FIG. 21.

As a result, the mobile objects 101, 103, 104, 106, and 107 move to get together, and thus restoration of communication is performed more efficiently.

Subsequently, the control unit 602 of the mobile object 101 obtains the actual movement vector information from the own-mobile-object information 701 and actually moves the mobile object 101 in accordance with the actual movement vector 1801 that has been obtained (step S1009). The control unit 602 generates a control command that causes the mobile object 101 to move in accordance with the actual movement vector 1801 and outputs the control command to the movement control units 605. The movement control units 605 actually cause the mobile object 101 to move in accordance with the control command.

Hereinafter, a description will be given of, by using specific examples, the issues that are not overcome by the techniques disclosed in PTL 1 and that are overcome by the first embodiment of the present disclosure.

As described above, the first technique disclosed in PTL 1 is not applicable as is if there are two or more mobile objects disconnected from the ad hoc network when viewed from any mobile object, as in the example illustrated in FIG. 2.

In contrast, in the first embodiment of the present disclosure, an attempt can be made to restore communication even if there are two or more mobile objects disconnected from the ad hoc network when viewed from any mobile object, as in the example illustrated in FIG. 21. In this case, that is, in the case where there are two or more mobile objects disconnected from the ad hoc network when viewed from any mobile object, some or all of the mobile objects belonging to the component group move to get together and thus an attempt to restore communication can be made. In the example illustrated in FIG. 21, the mobile objects 101, 103, 104, 106, and 107 move to get together and accordingly an attempt to restore communication can be made.

The second technique disclosed in PTL 1 has an issue that all mobile objects are incapable of moving for an original purpose until communication is restored. In contrast, in the first embodiment of the present disclosure, the mobile object 102 is capable of moving mainly for an original purpose in the example illustrated in FIG. 21, for example, and the foregoing issue can be overcome.

The third technique disclosed in PTL 1 has an issue that a region over which a mobile object group is deployed gradually becomes smaller and all mobile objects are incapable of moving for an original purpose until communication is restored. Furthermore, after the communication is restored, the mobile objects need to move again for the original purpose from the positions at the point of time when the communication is restored. In contrast, in the first embodiment of the present disclosure, the mobile object 102 is capable of moving mainly for an original purpose in the example illustrated in FIG. 21, for example, and the foregoing issue can be overcome.

The fourth technique disclosed in PTL 1 has an issue that, if a selected mobile object moves toward a cutoff position, the communication between the selected mobile object and a mobile object other than a mobile object disconnected from the ad hoc network is cut off, and accordingly the ad hoc network may be secondarily fractured. In contrast, in the first embodiment of the present disclosure, the mobile objects 101, 103, 104, 106, and 107 move to get together to attempt to restore communication, and the distance between the mobile object 103, which is one of mobile objects that attempt to restore communication, and the mobile object 102, which moves mainly for an original purpose, is equal to or less than the radius of the determination circle illustrated in FIG. 18 in the example illustrated in FIG. 21, for example. Thus, the direct communication between the mobile objects 102 and 103 is unlikely to be immediately cut off, and the foregoing issue can be overcome.

As described above, in the first technique disclosed in PTL 1, if some or all of the mobile objects move to get away from each other as in the example illustrated in FIG. 3, communication can be restored only partially at best. In the example illustrated in FIG. 3, if the group of the mobile objects 201 to 204 and the group of the mobile objects 206 and 207 continue to move to get away from each other, the direct communication with a mobile object belonging to one of the group of the mobile objects 201 to 204 and the group of the mobile objects 206 and 207 is restored at best, and it is impossible to restore the direct communication with a mobile object belonging to the other group.

In contrast, in the first embodiment of the present disclosure, an attempt to restore communication can be made even if some mobile objects move to get away from each other as in the example illustrated in FIG. 3. This will be described below.

To increase the ratio of a movement for avoiding an obstacle, the control unit 602 multiplies the main basic movement vector belonging to the basic movement vector group by 0.5, multiplies the obstacle avoidance basic movement vector belonging to the basic movement vector group by 1, and multiplies the communication restoration vector by 1, and then calculates the sum of the movement vectors as calculation results.

Here, among the movement vectors belonging to the basic movement vector groups of the mobile objects 202 to 204, the value of the main basic movement vector is (−10 m/s, 0 m/s, 0 m/s) and the value of the obstacle avoidance basic movement vector is (0 m/s, 0 m/s, 0 m/s). Among the movement vectors belonging to the basic movement vector groups of the mobile objects 206 and 207, the value of the main basic movement vector is (10 m/s, 0 m/s, 0 m/s) and the value of the obstacle avoidance basic movement vector is (0 m/s, 0 m/s, 0 m/s).

Here, the control unit 602 decides on, as an actual movement vector, the sum of a movement vector obtained by multiplying the main basic movement vector by 0.5, a movement vector obtained by multiplying the obstacle avoidance basic movement vector by 1, and a movement vector obtained by multiplying the communication restoration vector by 1.

Figure 22:
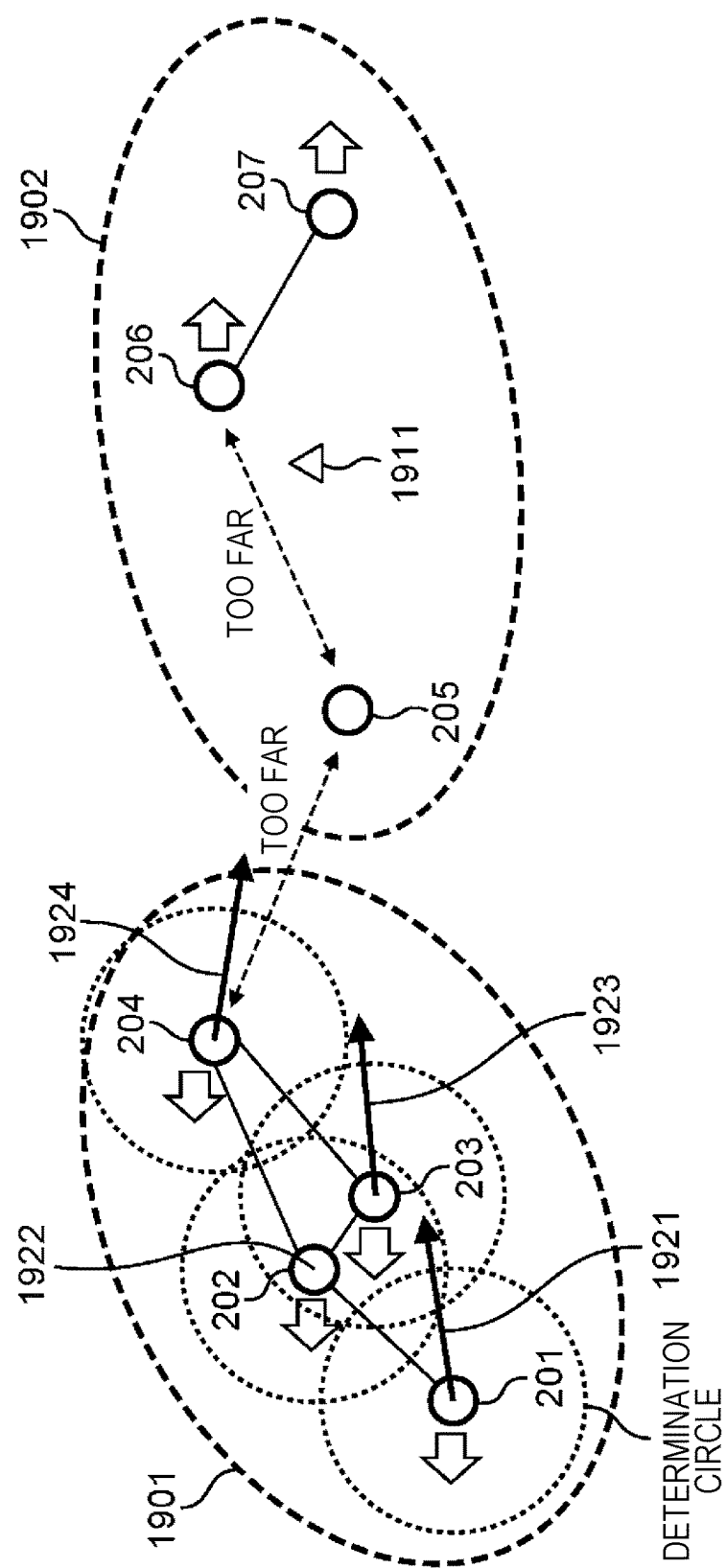
FIG. 22 is a conceptual diagram illustrating an example of communication restoration vectors of mobile objects in the situation illustrated in FIG. 3 in the first embodiment of the present disclosure.

FIG. 22 is a conceptual diagram illustrating an example of communication restoration vectors of the mobile objects 201 to 204 in the situation illustrated in FIG. 3 in the first embodiment of the present disclosure. In FIG. 22, the same elements as those in FIG. 1 are denoted by the same reference numerals and the description thereof will not be given.

As illustrated in FIG. 22, for each of the mobile objects 201 to 204, the mobile objects belonging to a known group 1901 are the mobile objects 201 to 204, and the mobile objects belonging to an unknown group 1902 are the mobile objects 205 to 207.

The control unit 602 of the mobile object 201 determines, on the basis of the component group position information, whether or not there are one or more mobile objects that are at a predetermined distance or less from the own mobile object. In FIG. 22, the positions that are at the predetermined distance or less from the mobile objects 201 to 204 are surrounded by dotted-line determination circles. There is no mobile object within the determination circle of the mobile object 201, and thus the control unit 602 of the mobile object 201 decides on, as its communication restoration vector, a communication restoration vector 1921 having a direction toward a target position 1911 that is at the center of all the mobile objects belonging to the unknown group and having a predetermined magnitude.

Also, the control unit 602 of each of the mobile objects 202 and 203 determines, on the basis of the component group position information, whether or not there are one or more mobile objects that are at a predetermined distance or less from the own mobile object. There is the mobile object 203 within the determination circle of the mobile object 202 and there is the mobile object 202 within the determination circle of the mobile object 203. Thus, the mobile objects 202 and 203 communicate with each other and it is determined that only the mobile object 203 moves toward the target position 1911. The control unit 602 of the mobile object 202 decides on, as its communication restoration vector, a communication restoration vector 1922 having a magnitude of 0. The control unit 602 of the mobile object 203 decides on, as its communication restoration vector, a communication restoration vector 1923 having a direction toward the target position 1911 and having a predetermined magnitude.

Also, the control unit 602 of the mobile object 204 determines, on the basis of the component group position information, whether or not there are one or more mobile objects that are at a predetermined distance or less from the own mobile object. There is no mobile object within the determination circle of the mobile object 204, and thus the control unit 602 of the mobile object 204 decides on, as its communication restoration vector, a communication restoration vector 1924 having a direction toward the target position 1911 and having a predetermined magnitude.

Figure 23:
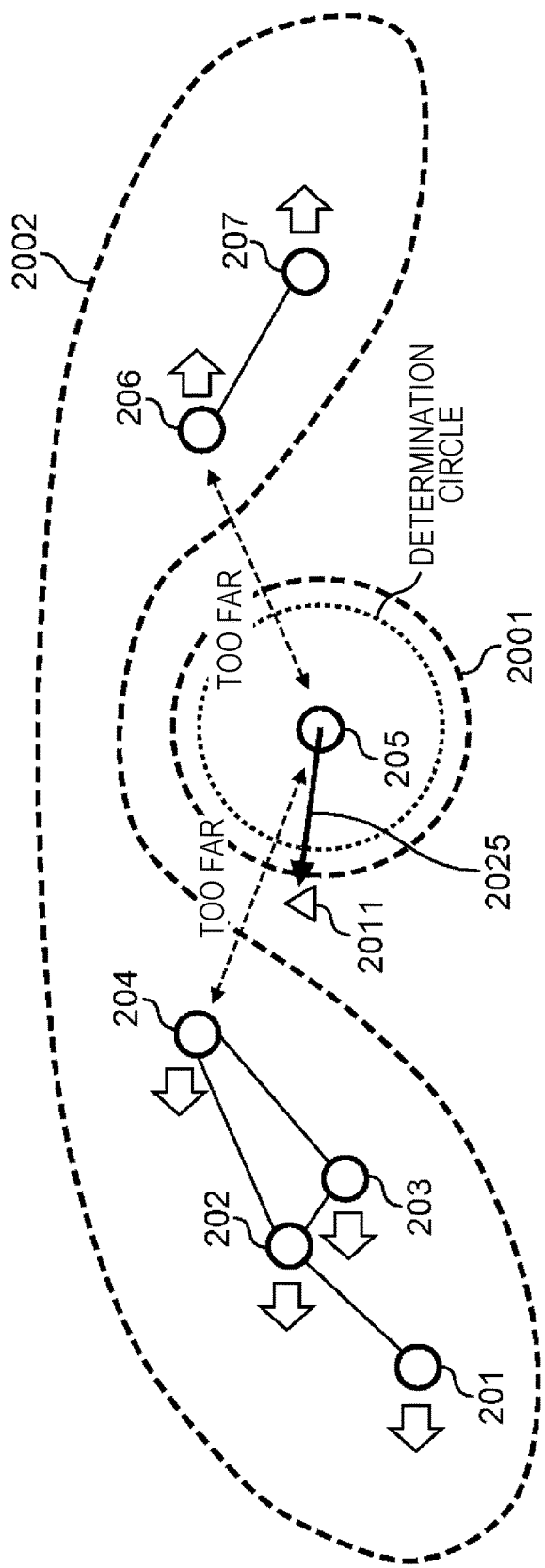
FIG. 23 is a conceptual diagram illustrating an example of a communication restoration vector of a mobile object in the situation illustrated in FIG. 3 in the first embodiment of the present disclosure.

FIG. 23 is a conceptual diagram illustrating an example of a communication restoration vector of the mobile object 205 in the situation illustrated in FIG. 3 in the first embodiment of the present disclosure. In FIG. 23, the same elements as those in FIG. 1 are denoted by the same reference numerals and the description thereof will not be given.

As illustrated in FIG. 23, for the mobile object 205, the mobile object belonging to a known group 2001 is the mobile object 205, and the mobile objects belonging to an unknown group 2002 are the mobile objects 201 to 204, 206, and 207.

The control unit 602 of the mobile object 205 determines, on the basis of the component group position information, whether or not there are one or more mobile objects that are at a predetermined distance or less from the own mobile object. In FIG. 23, the positions that are at the predetermined distance or less from the mobile object 205 are surrounded by a dotted-line determination circle. There is no mobile object within the determination circle of the mobile object 205, and thus the control unit 602 of the mobile object 205 decides on, as its communication restoration vector, a communication restoration vector 2025 having a direction toward a target position 2011 that is at the center of all the mobile objects belonging to the unknown group and having a predetermined magnitude.

Figure 24:
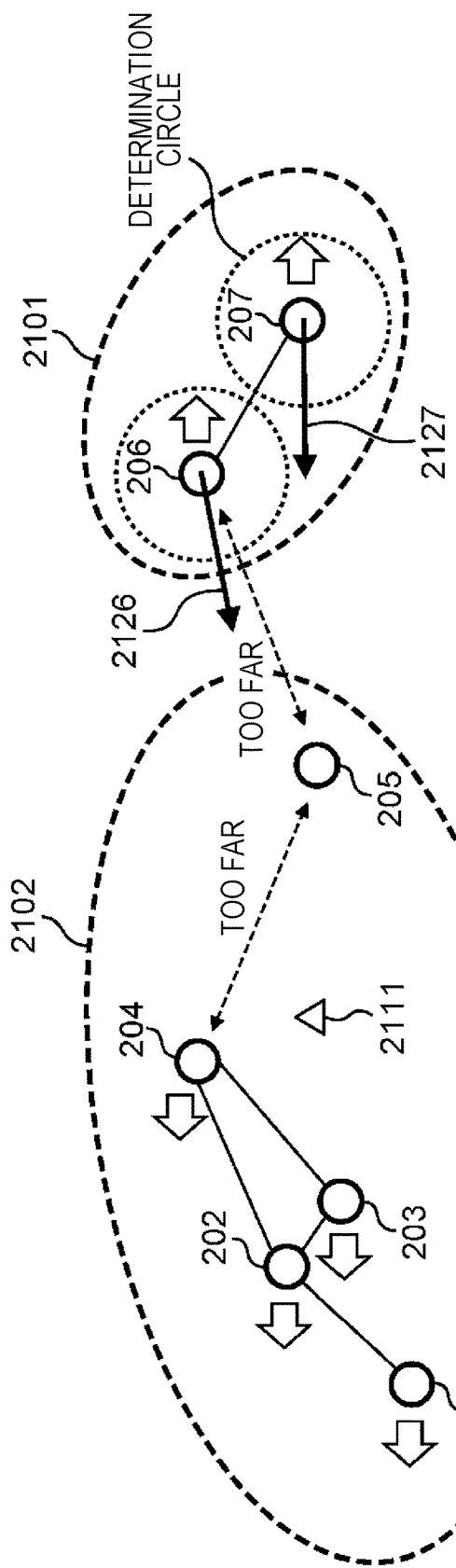
FIG. 24 is a conceptual diagram illustrating an example of communication restoration vectors of mobile objects in the situation illustrated in FIG. 3 in the first embodiment of the present disclosure.

FIG. 24 is a conceptual diagram illustrating an example of communication restoration vectors of the mobile objects 206 and 207 in the situation illustrated in FIG. 3 in the first embodiment of the present disclosure. In FIG. 24, the same elements as those in FIG. 1 are denoted by the same reference numerals and the description thereof will not be given.

As illustrated in FIG. 24, for each of the mobile objects 206 and 207, the mobile objects belonging to a known group 2101 are the mobile objects 206 and 207, and the mobile objects belonging to an unknown group 2102 are the mobile objects 201 to 205.

The control unit 602 of the mobile object 206 determines, on the basis of the component group position information, whether or not there are one or more mobile objects that are at a predetermined distance or less from the own mobile object. In FIG. 24, the positions that are at the predetermined distance or less from the mobile objects 206 and 207 are surrounded by dotted-line determination circles. There is no mobile object within the determination circle of the mobile object 206, and thus the control unit 602 of the mobile object 206 decides on, as its communication restoration vector, a communication restoration vector 2126 having a direction toward a target position 2111 that is at the center of all the mobile objects belonging to the unknown group and having a predetermined magnitude.

Also, the control unit 602 of the mobile object 207 determines, on the basis of the component group position information, whether or not there are one or more mobile objects that are at a predetermined distance or less from the own mobile object. There is no mobile object within the determination circle of the mobile object 207, and thus the control unit 602 of the mobile object 207 decides on, as its communication restoration vector, a communication restoration vector 2127 having a direction toward the target position 2111 and having a predetermined magnitude.

Figure 25:
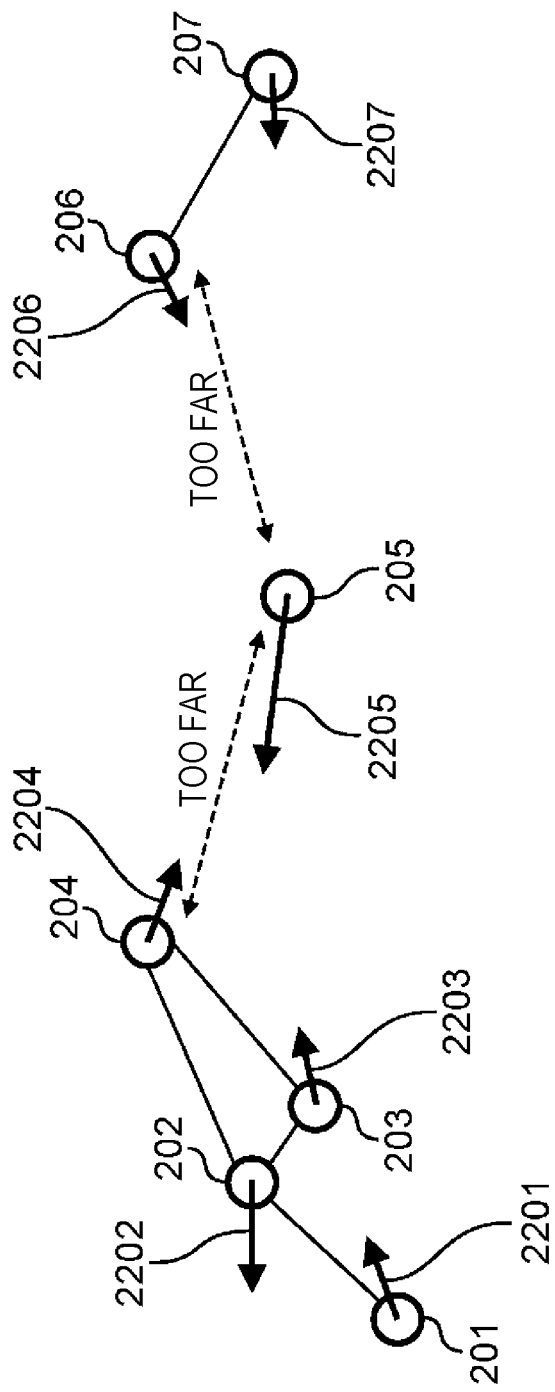
FIG. 25 is a conceptual diagram illustrating an example of actual movement vectors of mobile objects in the situation illustrated in FIG. 3 in the first embodiment of the present disclosure.

FIG. 25 is a conceptual diagram illustrating an example of actual movement vectors of the mobile objects 201 to 207 in the situation illustrated in FIG. 3 in the first embodiment of the present disclosure. In FIG. 25, the same elements as those in FIG. 1 are denoted by the same reference numerals and the description thereof will not be given.

The mobile object 201 decides on a basic movement vector group for moving westward, and if the mobile object 205 does not become too far from another mobile object and if there is no mobile object belonging to an unknown group, the mobile object 201 decides on an actual movement vector for moving westward, as illustrated in FIG. 3. However, if the mobile object 205 becomes too far from another mobile object and if a mobile object belonging to an unknown group emerges, the mobile object 201 moves substantially east-northeastward in accordance with an actual movement vector 2201, which is calculated on the basis of the communication restoration vector 1921 in addition to the basic movement vector group, so as to attempt to restore communication, as illustrated in FIG. 25.

The mobile object 203 decides on a basic movement vector group for moving westward, and if the mobile object 205 does not become too far from another mobile object and if there is no mobile object belonging to an unknown group, the mobile object 203 decides on an actual movement vector for moving westward, as illustrated in FIG. 3. However, if the mobile object 205 becomes too far from another mobile object and if a mobile object belonging to an unknown group emerges, the mobile object 203 moves substantially east-northeastward in accordance with an actual movement vector 2203, which is calculated on the basis of the communication restoration vector 1923 in addition to the basic movement vector group, so as to attempt to restore communication, as illustrated in FIG. 25.

The mobile object 204 decides on a basic movement vector group for moving westward, and if the mobile object 205 does not become too far from another mobile object and if there is no mobile object belonging to an unknown group, the mobile object 204 decides on an actual movement vector for moving westward, as illustrated in FIG. 3. However, if the mobile object 205 becomes too far from another mobile object and if a mobile object belonging to an unknown group emerges, the mobile object 204 moves substantially east-southeastward in accordance with an actual movement vector 2204, which is calculated on the basis of the communication restoration vector 1924 in addition to the basic movement vector group, so as to attempt to restore communication, as illustrated in FIG. 25.

The mobile object 205 decides on a basic movement vector group for hardly moving, and if the mobile object 205 does not become too far from another mobile object and if there is no mobile object belonging to an unknown group, the mobile object 205 decides on an actual movement vector for stopping at the position, as illustrated in FIG. 3. However, if the mobile object 205 becomes too far from another mobile object and if a mobile object belonging to an unknown group emerges, the mobile object 205 moves substantially west-northwestward in accordance with an actual movement vector 2205, which is calculated on the basis of the communication restoration vector 2025 in addition to the basic movement vector group, so as to attempt to restore communication, as illustrated in FIG. 25.

The mobile object 206 decides on a basic movement vector group for moving eastward, and if the mobile object 205 does not become too far from another mobile object and if there is no mobile object belonging to an unknown group, the mobile object 206 decides on an actual movement vector for moving eastward, as illustrated in FIG. 3. However, if the mobile object 205 becomes too far from another mobile object and if a mobile object belonging to an unknown group emerges, the mobile object 206 moves substantially west-southwestward in accordance with an actual movement vector 2206, which is calculated on the basis of the communication restoration vector 2126 in addition to the basic movement vector group, so as to attempt to restore communication, as illustrated in FIG. 25.

The mobile object 207 decides on a basic movement vector group for moving eastward, and if the mobile object 205 does not become too far from another mobile object and if there is no mobile object belonging to an unknown group, the mobile object 207 decides on an actual movement vector for moving eastward, as illustrated in FIG. 3. However, if the mobile object 205 becomes too far from another mobile object and if a mobile object belonging to an unknown group emerges, the mobile object 207 moves substantially westward in accordance with an actual movement vector 2207, which is calculated on the basis of the communication restoration vector 2127 in addition to the basic movement vector group, so as to attempt to restore communication, as illustrated in FIG. 25.

On the other hand, the mobile object 202 decides on a basic movement vector group for moving westward, and if the mobile object 205 does not become too far from another mobile object and if there is no mobile object belonging to an unknown group, the mobile object 202 decides on an actual movement vector for moving westward, as illustrated in FIG. 3. However, since the mobile object 202 has the communication restoration vector 1922 having a magnitude of 0, the mobile object 202 moves substantially westward in accordance with an actual movement vector 2202, which is calculated on the basis of the communication restoration vector 1922 having a magnitude of 0 in addition to the basic movement vector group, even if the mobile object 205 becomes too far from another mobile object and even if a mobile object belonging to an unknown group emerges, as in the case where the mobile object 205 does not become too far from another mobile object and there is no mobile object belonging to an unknown group, and is capable of implementing an original purpose, as illustrated in FIG. 25.

In this way, the mobile objects 201 and 203 to 207 mainly perform a communication restoration operation whereas the mobile object 202 moves in the same way as in the case where there is no unknown group, and accordingly both restoration of communication and an original purpose can be achieved by the entire component group. At the point of time when the communication restoration operation starts, the distance between the mobile objects 202 and 203 is equal to or less than the radius of the determination circle illustrated in FIG. 22, and thus the direct communication between the mobile objects 202 and 203 is unlikely to be immediately cut off.

The second technique disclosed in PTL 1 has an issue that all mobile objects are incapable of moving for an original purpose until communication is restored. In contrast, in the first embodiment of the present disclosure, the mobile object 202 is capable of moving mainly for an original purpose in the example illustrated in FIG. 25, for example, and the foregoing issue can be overcome.

The third technique disclosed in PTL 1 has an issue that a region over which a mobile object group is deployed gradually becomes smaller and all mobile objects are incapable of moving for an original purpose until communication is restored. Furthermore, after the communication is restored, the mobile objects need to move again for the original purpose from the positions at the point of time when the communication is restored. In contrast, in the first embodiment of the present disclosure, the mobile object 202 is capable of moving mainly for an original purpose in the example illustrated in FIG. 25, for example, and the foregoing issue can be overcome.

The fourth technique disclosed in PTL 1 has an issue that, if a selected mobile object moves toward a cutoff position, the communication between the selected mobile object and a mobile object other than a mobile object disconnected from the ad hoc network is cut off, and accordingly the ad hoc network may be secondarily fractured. In contrast, in the first embodiment of the present disclosure, the mobile objects 201 and 203 to 207 move to get together to efficiently restore communication, and the distance between the mobile object 203, which is one of mobile objects that attempt to restore communication, and the mobile object 202, which moves mainly for an original purpose, is equal to or less than the radius of the determination circle illustrated in FIG. 22 in the example illustrated in FIG. 25, for example. Thus, the direct communication between the mobile objects 202 and 203 is unlikely to be immediately cut off, and the foregoing issue can be overcome.

As described above, in the first technique disclosed in PTL 1, if a mobile object disconnected from the ad hoc network moves to restore communication with the ad hoc network but there is no mobile object in the movement direction or if a mobile object moves in a direction of getting away from the mobile object disconnected from the ad hoc network, it is impossible to restore communication, as in the example illustrated in FIG. 4. In the example illustrated in FIG. 4, the mobile objects 201 to 206 do not exist in the direction in which the mobile object 207, which has been disconnected from the ad hoc network, moves to restore communication, and the mobile objects 201 to 206 continue to move in a lower-left direction in FIG. 4. Thus, the mobile object 207 is incapable of approaching the mobile objects 201 to 206 and restoring the direct communication therewith even if the first technique disclosed in PTL 1 is used. Furthermore, even if the mobile objects 201 to 206 exist in the direction in which the mobile object 207 moves, the mobile object 207 is incapable of catching up with the mobile objects 201 to 206 and restoring the direct communication with the mobile objects 201 to 206 because the mobile objects 201 to 206 continue to move in a direction of getting away from the mobile object 207.

In contrast, in the first embodiment of the present disclosure, even if a mobile object disconnected from the ad hoc network moves to restore communication with the ad hoc network but there is no mobile object in the movement direction or even if a mobile object moves in a direction of getting away from the mobile object disconnected from the ad hoc network, as in the example illustrated in FIG. 4, an attempt to restore communication can be made. This will be described below.

Figure 26:
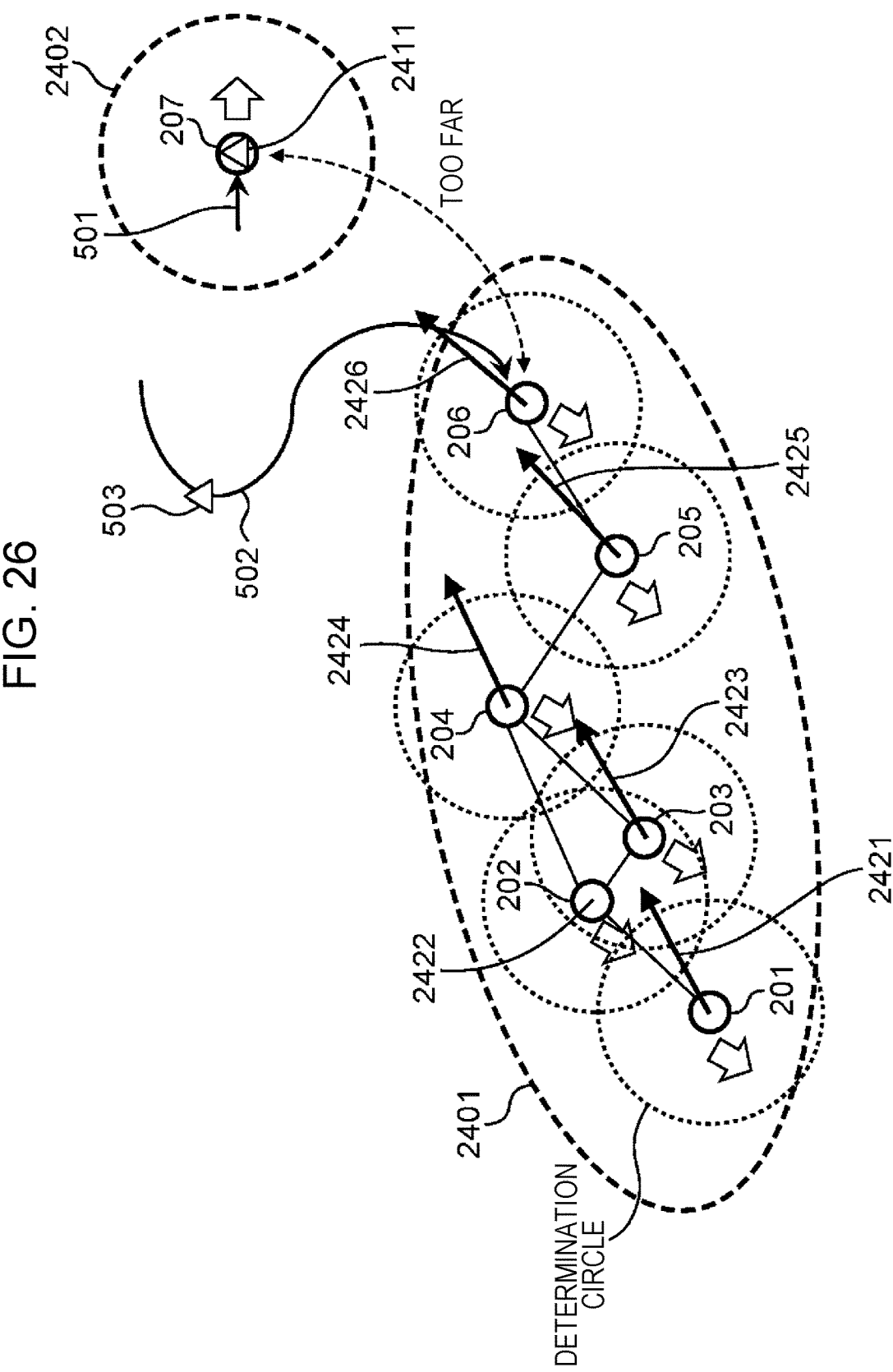
FIG. 26 is a conceptual diagram illustrating an example of communication restoration vectors that are decided on by mobile objects in the situation illustrated in FIG. 4 in the first embodiment of the present disclosure.

FIG. 26 is a conceptual diagram illustrating an example of communication restoration vectors that are decided on by the mobile objects 201 to 206 in the situation illustrated in FIG. 4 in the first embodiment of the present disclosure. In FIG. 26, the same elements as those in FIGS. 1 and 4 are denoted by the same reference numerals and the description thereof will not be given.

As illustrated in FIG. 26, for each of the mobile objects 201 to 206, the mobile objects belonging to a known group 2401 are the mobile objects 201 to 206, and the mobile object belonging to an unknown group 2402 is the mobile object 207.

The control unit 602 of the mobile object 201 determines, on the basis of the component group position information, whether or not there are one or more mobile objects that are at a predetermined distance or less from the own mobile object. In FIG. 26, the positions that are at the predetermined distance or less from the mobile objects 201 to 206 are surrounded by dotted-line determination circles. There is no mobile object within the determination circle of the mobile object 201, and thus the control unit 602 of the mobile object 201 decides on, as its communication restoration vector, a communication restoration vector 2421 having a direction toward a target position 2411 that is at the center of all the mobile objects belonging to the unknown group 2402 and having a predetermined magnitude.

Also, the control unit 602 of each of the mobile objects 202 and 203 determines, on the basis of the component group position information, whether or not there are one or more mobile objects that are at a predetermined distance or less from the own mobile object. There is the mobile object 203 within the determination circle of the mobile object 202 and there is the mobile object 202 within the determination circle of the mobile object 203. Thus, the mobile objects 202 and 203 communicate with each other and it is determined that only the mobile object 203 moves toward the target position 2411. The control unit 602 of the mobile object 202 decides on, as its communication restoration vector, a communication restoration vector 2422 having a magnitude of 0. The control unit 602 of the mobile object 203 decides on, as its communication restoration vector, a communication restoration vector 2423 having a direction toward the target position 2411 and having a predetermined magnitude.

Also, the control unit 602 of the mobile object 204 determines, on the basis of the component group position information, whether or not there are one or more mobile objects that are at a predetermined distance or less from the own mobile object. There is no mobile object within the determination circle of the mobile object 204, and thus the control unit 602 of the mobile object 204 decides on, as its communication restoration vector, a communication restoration vector 2424 having a direction toward the target position 2411 and having a predetermined magnitude.

Also, the control unit 602 of the mobile object 205 determines, on the basis of the component group position information, whether or not there are one or more mobile objects that are at a predetermined distance or less from the own mobile object. There is no mobile object within the determination circle of the mobile object 205, and thus the control unit 602 of the mobile object 205 decides on, as its communication restoration vector, a communication restoration vector 2425 having a direction toward the target position 2411 and having a predetermined magnitude.

Also, the control unit 602 of the mobile object 206 determines, on the basis of the component group position information, whether or not there are one or more mobile objects that are at a predetermined distance or less from the own mobile object. There is no mobile object within the determination circle of the mobile object 206, and thus the control unit 602 of the mobile object 206 decides on, as its communication restoration vector, a communication restoration vector 2426 having a direction toward the target position 2411 and having a predetermined magnitude.

Figure 27:
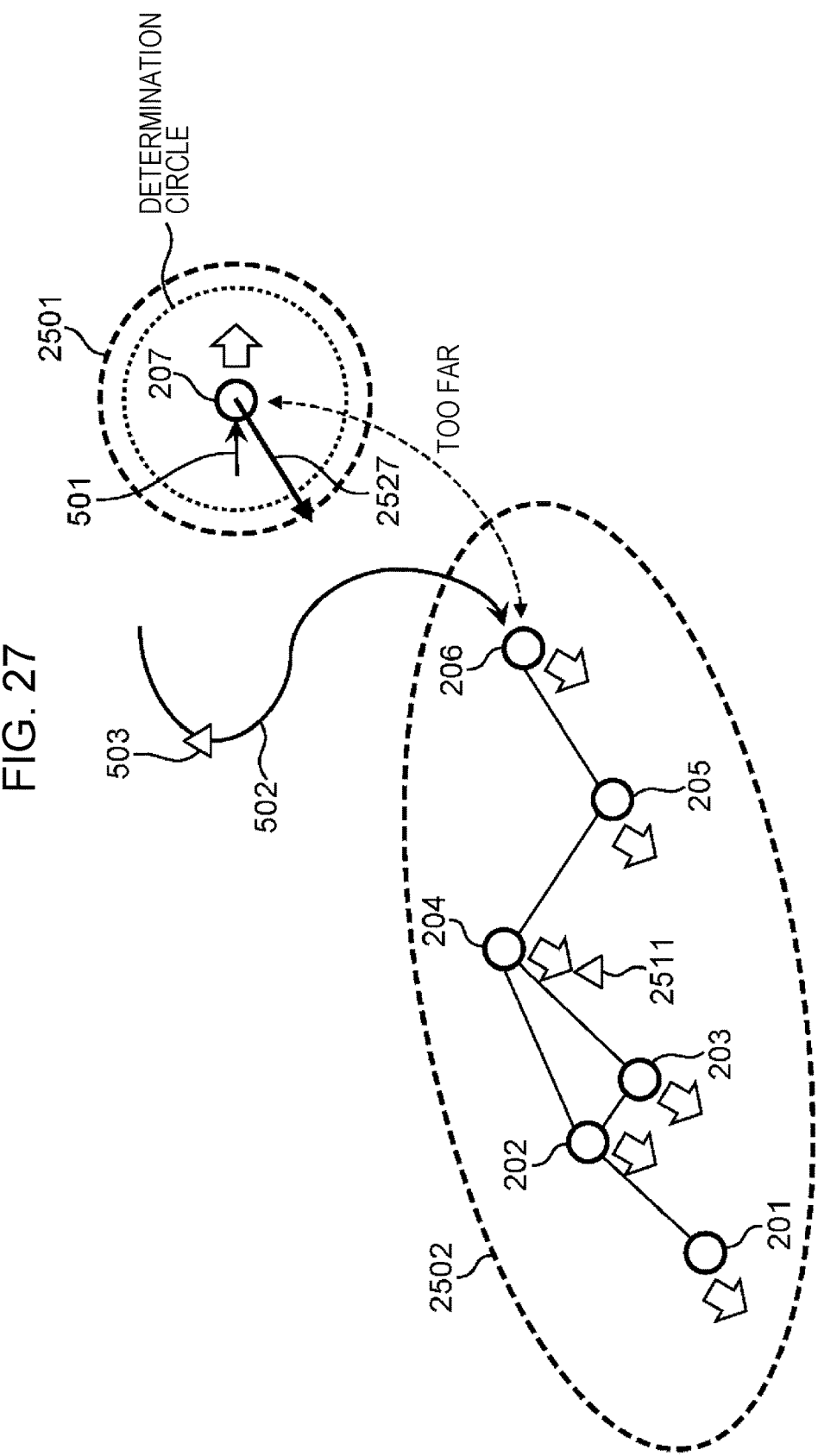
FIG. 27 is a conceptual diagram illustrating an example of a communication restoration vector that is decided on by mobile object in the situation illustrated in FIG. 4 in the first embodiment of the present disclosure.

FIG. 27 is a conceptual diagram illustrating an example of a communication restoration vector that is decided on by the mobile object 207 in the situation illustrated in FIG. 4 in the first embodiment of the present disclosure. In FIG. 27, the same elements as those in FIGS. 1 and 4 are denoted by the same reference numerals and the description thereof will not be given.

As illustrated in FIG. 27, for the mobile object 207, the mobile object belonging to a known group 2501 is the mobile object 207, and the mobile objects belonging to an unknown group 2502 are the mobile objects 201 to 206.

The control unit 602 of the mobile object 207 determines, on the basis of the component group position information, whether or not there are one or more mobile objects that are at a predetermined distance or less from the own mobile object. In FIG. 27, the positions that are at the predetermined distance or less from the mobile object 207 are surrounded by a dotted-line determination circle. There is no mobile object within the determination circle of the mobile object 207, and thus the control unit 602 of the mobile object 207 decides on, as its communication restoration vector, a communication restoration vector 2527 having a direction toward a target position 2511 that is at the center of all the mobile objects belonging to the unknown group 2502 and having a predetermined magnitude.

Figure 28:
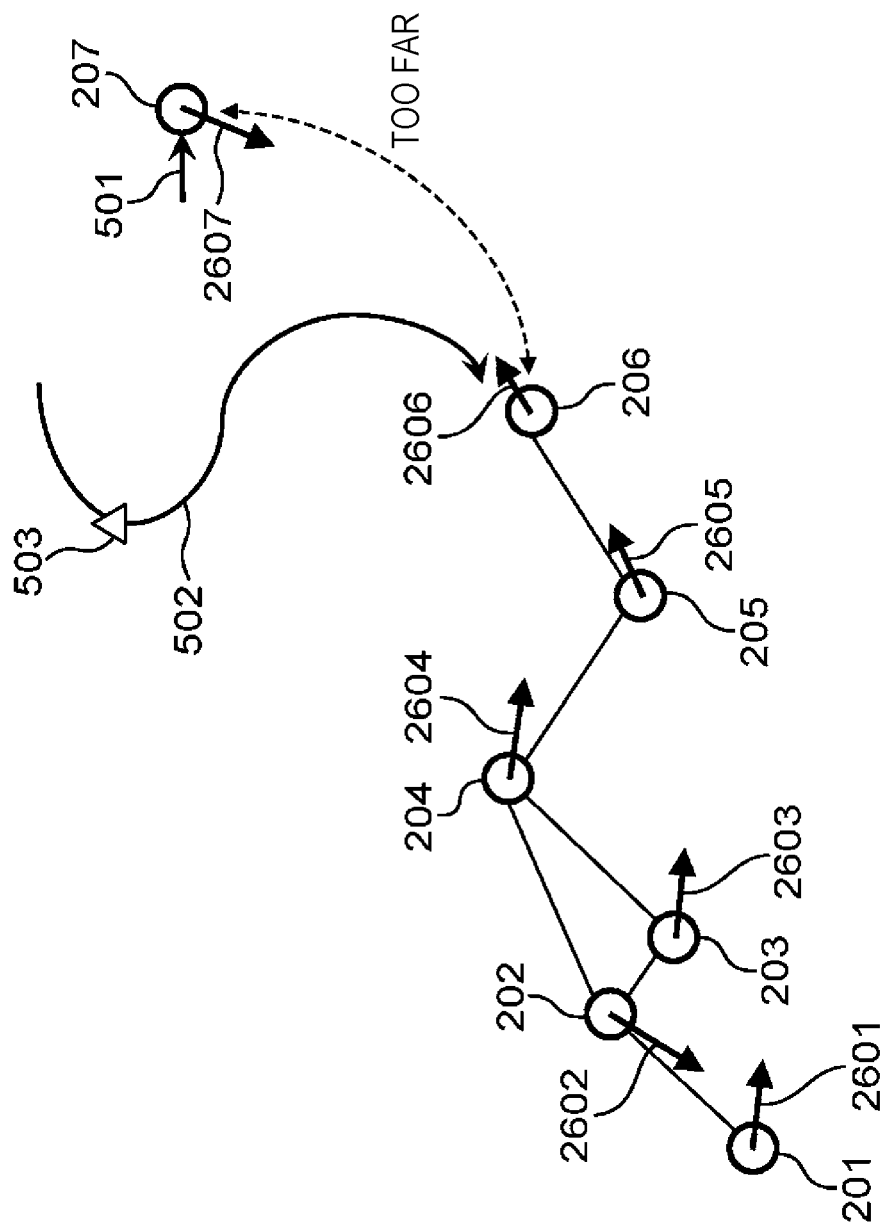
FIG. 28 is a conceptual diagram illustrating an example of actual movement vectors of mobile objects in the situation illustrated in FIG. 4 in the first embodiment of the present disclosure.

FIG. 28 is a conceptual diagram illustrating an example of actual movement vectors of the mobile objects 201 to 207 in the situation illustrated in FIG. 4 in the first embodiment of the present disclosure. In FIG. 28, the same elements as those in FIGS. 1 and 4 are denoted by the same reference numerals and the description thereof will not be given.

The mobile object 201 decides on a basic movement vector group for moving substantially south-southwestward, and if the mobile object 207 does not become too far from another mobile object and if there is no mobile object belonging to an unknown group, the mobile object 201 decides on an actual movement vector for moving substantially south-southwestward, as illustrated in FIG. 4. However, if the mobile object 207 becomes too far from another mobile object and if a mobile object belonging to an unknown group emerges, the mobile object 201 moves substantially eastward in accordance with an actual movement vector 2601, which is calculated on the basis of the communication restoration vector 2421 in addition to the basic movement vector group, so as to attempt to restore communication, as illustrated in FIG. 28.

The mobile object 203 decides on a basic movement vector group for moving substantially south-southwestward, and if the mobile object 207 does not become too far from another mobile object and if there is no mobile object belonging to an unknown group, the mobile object 203 decides on an actual movement vector for moving substantially south-southwestward, as illustrated in FIG. 4. However, if the mobile object 207 becomes too far from another mobile object and if a mobile object belonging to an unknown group emerges, the mobile object 203 moves substantially eastward in accordance with an actual movement vector 2603, which is calculated on the basis of the communication restoration vector 2423 in addition to the basic movement vector group, so as to attempt to restore communication, as illustrated in FIG. 28.

The mobile object 204 decides on a basic movement vector group for moving substantially south-southwestward, and if the mobile object 207 does not become too far from another mobile object and if there is no mobile object belonging to an unknown group, the mobile object 204 decides on an actual movement vector for moving substantially south-southwestward, as illustrated in FIG. 4. However, if the mobile object 207 becomes too far from another mobile object and if a mobile object belonging to an unknown group emerges, the mobile object 204 moves substantially eastward in accordance with an actual movement vector 2604, which is calculated on the basis of the communication restoration vector 2424 in addition to the basic movement vector group, so as to attempt to restore communication, as illustrated in FIG. 28.

The mobile object 205 decides on a basic movement vector group for moving substantially south-southwestward, and if the mobile object 207 does not become too far from another mobile object and if there is no mobile object belonging to an unknown group, the mobile object 205 decides on an actual movement vector for moving substantially south-southwestward, as illustrated in FIG. 4. However, if the mobile object 207 becomes too far from another mobile object and if a mobile object belonging to an unknown group emerges, the mobile object 205 moves substantially east-northeastward in accordance with an actual movement vector 2605, which is calculated on the basis of the communication restoration vector 2425 in addition to the basic movement vector group, so as to attempt to restore communication, as illustrated in FIG. 28.

The mobile object 206 decides on a basic movement vector group for moving substantially south-southwestward, and if the mobile object 207 does not become too far from another mobile object and if there is no mobile object belonging to an unknown group, the mobile object 206 decides on an actual movement vector for moving substantially south-southwestward, as illustrated in FIG. 4. However, if the mobile object 207 becomes too far from another mobile object and if a mobile object belonging to an unknown group emerges, the mobile object 206 moves substantially east-northeastward in accordance with an actual movement vector 2606, which is calculated on the basis of the communication restoration vector 2426 in addition to the basic movement vector group, so as to attempt to restore communication, as illustrated in FIG. 28.

The mobile object 207 decides on a basic movement vector group for moving substantially eastward, and if the mobile object 207 does not become too far from another mobile object and if there is no mobile object belonging to an unknown group, the mobile object 207 decides on an actual movement vector for moving substantially eastward, as illustrated in FIG. 4. However, if the mobile object 207 becomes too far from another mobile object and if a mobile object belonging to an unknown group emerges, the mobile object 207 moves substantially south-southwestward in accordance with an actual movement vector 2607, which is calculated on the basis of the communication restoration vector 2527 in addition to the basic movement vector group, so as to attempt to restore communication, as illustrated in FIG. 28.

On the other hand, the mobile object 202 decides on a basic movement vector group for moving substantially south-southwestward, and if the mobile object 207 does not become too far from another mobile object and if there is no mobile object belonging to an unknown group, the mobile object 202 decides on an actual movement vector for moving substantially south-southwestward, as illustrated in FIG. 4. However, since the mobile object 202 has the communication restoration vector 2422 having a magnitude of 0, the mobile object 202 moves substantially south-southwestward in accordance with an actual movement vector 2602, which is calculated on the basis of the communication restoration vector 2422 having a magnitude of 0 in addition to the basic movement vector group, even if the mobile object 207 becomes too far from another mobile object and even if a mobile object belonging to an unknown group emerges, as in the case where the mobile object 207 does not become too far from another mobile object and there is no mobile object belonging to an unknown group, and is capable of implementing an original purpose, as illustrated in FIG. 28.

In this way, the mobile objects 201 and 203 to 207 mainly perform a communication restoration operation whereas the mobile object 202 moves in the same way as in the case where there is no unknown group, and accordingly both restoration of communication and an original purpose can be achieved by the entire component group. At the point of time when the communication restoration operation starts, the distance between the mobile objects 202 and 203 is equal to or less than the radius of the determination circle illustrated in FIG. 26, and thus the direct communication between the mobile objects 202 and 203 is unlikely to be immediately cut off.

The second technique disclosed in PTL 1 has an issue that all mobile objects are incapable of moving for an original purpose until communication is restored. In contrast, in the first embodiment of the present disclosure, the mobile object 202 is capable of moving mainly for an original purpose in the example illustrated in FIG. 28, for example, and the foregoing issue can be overcome.

The third technique disclosed in PTL 1 has an issue that a region over which a mobile object group is deployed gradually becomes smaller and all mobile objects are incapable of moving for an original purpose until communication is restored. Furthermore, after the communication is restored, the mobile objects need to move again for the original purpose from the positions at the point of time when the communication is restored. In contrast, in the first embodiment of the present disclosure, the mobile object 202 is capable of moving mainly for an original purpose in the example illustrated in FIG. 28, for example, and the foregoing issue can be overcome.

The fourth technique disclosed in PTL 1 has an issue that, if a selected mobile object moves toward a cutoff position, the communication between the selected mobile object and a mobile object other than a mobile object disconnected from the ad hoc network is cut off, and accordingly the ad hoc network may be secondarily fractured. In contrast, in the first embodiment of the present disclosure, the mobile objects 201 and 203 to 207 move to get together to efficiently restore communication, and the distance between the mobile object 203, which is one of mobile objects that attempt to restore communication, and the mobile object 202, which moves mainly for an original purpose, is equal to or less than the radius of the determination circle illustrated in FIG. 26 in the example illustrated in FIG. 28, for example. Thus, the direct communication between the mobile objects 202 and 203 is unlikely to be immediately cut off, and the foregoing issue can be overcome.

In the first embodiment of the present disclosure, a target position is decided on in step S1006 every time before a communication restoration vector is decided on in step S1007, as long as there is a mobile object belonging to an unknown group. Alternatively, in a second configuration of the first embodiment, a target position may be decided on only if a mobile object belonging to the unknown group is changed.

In the second configuration of the first embodiment, a target position is decided on only if a mobile object belonging to the unknown group is changed, and thus the processing efficiency can be enhanced.

In the first embodiment of the present disclosure, it is determined in step S1004 whether or not there is a mobile object belonging to an unknown group, and if there is a mobile object belonging to an unknown group, steps S1005 to S1007 are performed to decide on a communication restoration vector having a magnitude that is not 0. Alternatively, in a third configuration of the first embodiment, the time when step S1005 is performed for the first time may be stored, and if a restoration period longer than 0 elapses from the time, the magnitude of the communication restoration vector may be set to 0 (step S1010) and the process may proceed to step S1008 without performing steps S1005 to S1007 even if there is a mobile object belonging to the unknown group. The value of the restoration period may be a constant or may be a value that is dynamically decided on when an actual process is performed.

That is, if the control unit 602 detects that the first information is ceased to be received by the communication unit 601, the control unit 602 may output a third control command to the movement control units 605 after a predetermined time period elapses from when the second control command is output to the movement control units 605. The third control command causes the mobile object 101 to move by switching from the third control amount to the first control amount.

In the third configuration of the first embodiment, if restoration of communication is not completed within the restoration period, the operation for restoration is stopped. Thus, a situation can be prevented from occurring where a communication restoration operation is endlessly performed.

In the third configuration of the first embodiment, the time when step S1005 is performed for the first time may be reset at an appropriate timing after the restoration period elapses, so that the process in steps S1005 to S1007 can be performed again. The appropriate timing may be, for example, when a mobile object belonging to the unknown group is changed or when a predetermined period further elapses (a fourth configuration of the first embodiment).

In the fourth configuration of the first embodiment, if a predetermined condition is satisfied after the restoration period elapses, the communication restoration operation can be retried.

In the first embodiment of the present disclosure, it is determined in step S1004 whether or not there is a mobile object belonging to an unknown group, and if there is a mobile object belonging to an unknown group, steps S1005 to S1007 are performed to decide on a communication restoration vector having a magnitude that is not 0. In a fifth configuration of the first embodiment, if a mobile object reaches a position where the distance to a target position is equal to or less than a movement stop determination distance, the magnitude of the communication restoration vector may be set to 0 (step S1010) and the process may proceed to step S1008 without performing steps S1005 to S1007, even if there is a mobile object belonging to an unknown group. The value of the movement stop determination distance may be a constant or may be a value that is dynamically decided on when an actual process is performed.

That is, if the control unit 602 detects that the first information is ceased to be received by the communication unit 601, the control unit 602 may determine whether or not the distance between the first position and a third position, which is a position of the mobile object 101 after the second control command is output to the movement control units 605, is equal to or less than a predetermined value. If the distance is equal to or less than the predetermined value, the control unit 602 may output, to the movement control units 605, the third control command that causes the mobile object 101 to move by switching from the third control amount to the first control amount.

In the fifth configuration of the first embodiment, if restoration of communication is not completed even if the mobile object reaches the position where the distance to the target position is equal to or less than the movement stop determination distance, the operation for restoration is stopped. Thus, a situation can be prevented from occurring where a communication restoration operation is endlessly performed.

In the fifth configuration of the first embodiment, after the mobile object reaches the position where the distance to the target position is equal to or less than the movement stop determination distance, the magnitude of the communication restoration vector may be set to 0 (step S1010) and the process may proceed to step S1008 without performing steps S1005 to S1007, until a mobile object belonging to the unknown group is changed (a sixth configuration of the first embodiment).

In the sixth configuration of the first embodiment, if the mobile object reaches the position where the distance to the target position is equal to or less than the movement stop determination distance and then moves away to a position where the distance to the target position exceeds the movement stop determination distance, a communication restoration operation may be started again, so that a situation can be prevented from occurring where a communication restoration operation and a movement for an original purpose are alternately repeated.

In the first embodiment of the present disclosure, it is determined in step S1004 whether or not there is a mobile object belonging to an unknown group, and if there is a mobile object belonging to an unknown group, steps S1005 to S1007 are performed to decide on a communication restoration vector having a magnitude that is not 0. In a seventh configuration of the first embodiment, a second movement stop determination distance is calculated by multiplying the distance from a specific position to a target position by a movement stop determination coefficient. If the mobile object reaches a position where the distance to the target position is equal to or less than the second movement stop determination distance, the magnitude of the communication restoration vector may be set to 0 (step S1010) and the process may proceed to step S1008 without performing steps S1005 to S1007, even if there is a mobile object belonging to the unknown group. The value of the second movement stop determination coefficient may be a constant or may be a value that is dynamically decided on when an actual process is performed.

In the seventh configuration of the first embodiment, if restoration of communication is not completed even if the mobile object reaches the position where the distance to the target position is equal to or less than the second movement stop determination distance, the operation for restoration is stopped. Thus, a situation can be prevented from occurring where a communication restoration operation is endlessly performed.

In the seventh configuration of the first embodiment, after the mobile object reaches the position where the distance to the target position is equal to or less than the second movement stop determination distance, the magnitude of the communication restoration vector may be set to 0 (step S1010) and the process may proceed to step S1008 without performing steps S1005 to S1007, until a mobile object belonging to the unknown group is changed (an eighth configuration of the first embodiment).

In the eighth configuration of the first embodiment, if the mobile object reaches the position where the distance to the target position is equal to or less than the second movement stop determination distance and then moves away to a position where the distance to the target position exceeds the second movement stop determination distance, a communication restoration operation may be started again, so that a situation can be prevented from occurring where a communication restoration operation and a movement for an original purpose are alternately repeated.

In the first embodiment of the present disclosure, it is determined in step S1004 whether or not there is a mobile object belonging to an unknown group, and if there is a mobile object belonging to an unknown group, steps S1005 to S1007 are performed to decide on a communication restoration vector having a magnitude that is not 0. In a ninth configuration of the first embodiment, when the mobile object reaches the target position, the magnitude of the communication restoration vector may be set to 0 (step S1010) and the process may proceed to step S1008 without performing steps S1005 to S1007, even if there is a mobile object belonging to the unknown group.

In the ninth configuration of the first embodiment, if restoration of communication is not completed even if the mobile object reaches the target position, the operation for restoration is stopped. Thus, a situation can be prevented from occurring where a communication restoration operation is endlessly performed.

In the ninth configuration of the first embodiment, after the mobile object reaches the target position, the magnitude of the communication restoration vector may be set to 0 (step S1010) and the process may proceed to step S1008 without performing steps S1005 to S1007, until a mobile object belonging to the unknown group is changed (a tenth configuration of the first embodiment).

In the tenth configuration of the first embodiment, if the mobile object reaches the target position and then moves away from the target position, a communication restoration operation may be started again, so that a situation can be prevented from occurring where a communication restoration operation and a movement for an original purpose are alternately repeated.

In the third to tenth configurations of the first embodiment of the present disclosure, at the time of performing step S1004, in order to stop a communication restoration operation when the conditions described above regarding the individual configurations are satisfied, the magnitude of the communication restoration vector may be set to 0 (step S1010), and when the process proceeds to step S1008 without performing steps S1005 to S1007, the mobile objects belonging to the known group may be specified again as a component group, thereby dividing the ad hoc network (an eleventh configuration of the first embodiment).

The communication unit 601 may further receive, from a second communication-partner mobile object (for example, the mobile object 102) that is different from the mobile objects 101 and 105 and forms the network together with the mobile object 101, second information indicating any one of a second position, a second velocity, and a second acceleration of the mobile object 102. The storage unit 603 may store fourth information (other-mobile-object information 702) including the first information and the second information. The control unit 602 may update the fourth information stored in the storage unit 603 by deleting the first information from the fourth information after outputting the third control command to the movement control units 605.

In the eleventh configuration of the first embodiment, each mobile object belonging to the known group is capable of avoiding endless repetition of stop and restart of a communication restoration operation by restarting the communication restoration operation for the unknown group for which restoration of communication has failed.

In the third to tenth configurations of the first embodiment of the present disclosure, at the time of performing step S1004, in order to stop a communication restoration operation when the conditions described above regarding the individual configurations are satisfied, the magnitude of the communication restoration vector may be set to 0 (step S1010), and when the process proceeds to step S1008 without performing steps S1005 to S1007, a division notification indicating that the ad hoc network is to be divided may be transmitted to all the mobile objects belonging to the known group other than the own mobile object (a twelfth configuration of the first embodiment). When a division notification is received from another mobile object, the magnitude of the communication restoration vector may be set to 0 (step S1010), and the process may proceed to step S1008 without performing steps S1005 to S1007 even if there is a mobile object belonging to the unknown group in step S1004. Accordingly, the communication restoration operation is stopped and the mobile objects belonging to the known group at the time are specified again as a component group, thereby dividing the ad hoc network.

In the twelfth configuration of the first embodiment, each mobile object belonging to the known group is capable of specifying the same component group and is also capable of avoiding endless repetition of stop and restart of a communication restoration operation by restarting the communication restoration operation for the unknown group for which restoration of communication has failed.

In the third to tenth configurations of the first embodiment of the present disclosure, at the time of performing step S1004, in order to stop a communication restoration operation when the conditions described above regarding the individual configurations are satisfied, the magnitude of the communication restoration vector may be set to 0 (step S1010), and when the process proceeds to step S1008 without performing steps S1005 to S1007, known group information specifying the mobile objects belonging to the known group may be transmitted to all the mobile objects belonging to the known group other than the own mobile object (a thirteenth configuration of the first embodiment). When known group information is received from another mobile object, the magnitude of the communication restoration vector may be set to 0 (step S1010), and the process may proceed to step S1008 without performing steps S1005 to S1007 even if there is a mobile object belonging to the unknown group in step S1004. Accordingly, the communication restoration operation is stopped and the mobile objects specified by the known group information are specified again as a component group, thereby dividing the ad hoc network.

The control unit 602 may cause the communication unit 601 to transmit the fourth information (other-mobile-object information 702) to the second communication-partner mobile object (for example, the mobile object 102) after updating the fourth information.

The storage unit 603 may store the fourth information including the first information and the second information. After the second communication-partner mobile object (for example, the mobile object 102) updates fifth information (the other-mobile-object information stored in the mobile object 102) including information indicating the mobile object 101 and information indicating a third communication-partner mobile object (for example, any one of the mobile objects 105, 106, and 107) by deleting the information indicating the third communication-partner mobile object from the fifth information, the second communication-partner mobile object may transmit the fifth information to the mobile object 101. The communication unit 601 of the mobile object 101 may receive the fifth information from the second communication-partner mobile object. The control unit 602 may update the fourth information stored in the storage unit 603 to the fifth information.

In the thirteenth configuration of the first embodiment, each mobile object belonging to the known group is capable of reliably specifying the same component group without being affected by a time lag in communication and is also capable of avoiding endless repetition of stop and restart of a communication restoration operation by restarting the communication restoration operation for the unknown group for which restoration of communication has failed.

After the mobile object 101 actually moves in accordance with the actual movement vector 1801 in step S1009, the mobile object 101 restarts an original movement upon communication with the mobile object 105 being restarted. That is, the control unit 602 generates a control command for moving the mobile object 101 in accordance with a basic movement vector group and outputs the control command to the movement control units 605. The movement control units 605 cause the mobile object 101 to actually move in accordance with the control command.

That is, if the control unit 602 detects that the first information is ceased to be received by the communication unit 601 and then detects that the first information is restarted to be received by the communication unit 601, the control unit 602 may output the third control command to the movement control units 605, the third control command causing the mobile object 101 to move by switching from the third control amount to the first control amount.

After the mobile object 101 actually moves in accordance with the actual movement vector 1801 in step S1009, the mobile object 101 restarts an original movement upon communication with all the mobile objects 105, 106, and 107 being restarted. That is, the control unit 602 generates a control command for moving the mobile object 101 in accordance with a basic movement vector group and outputs the control command to the movement control units 605. The movement control units 605 cause the mobile object 101 to actually move in accordance with the control command.

That is, the communication unit 601 may receive the first information again from a plurality of first communication-partner mobile objects (for example, the mobile objects 105, 106, and 107). If the control unit 602 detects that a plurality of pieces of first information are ceased to be received by the communication unit 601 and then detects that a plurality of pieces of first information are restarted to be received by the communication unit 601, the control unit 602 may output the third control command to the movement control units 605, the third control command causing the mobile object 101 to move by switching from the third control amount to the first control amount.

Second Embodiment

The conceptual diagram illustrating an overall ad hoc network formed of a plurality of mobile objects according to a second embodiment of the present disclosure is the same as FIG. 6, and thus the description thereof will not be given.

The block diagram illustrating the functional configuration of the mobile object 101 according to the second embodiment of the present disclosure is the same as FIG. 8, and thus the description thereof will not be given.

The diagram illustrating the information stored in the storage unit 603 of the mobile object 101 according to the second embodiment of the present disclosure is the same as FIG. 9, and thus the description thereof will not be given.

The diagram illustrating an example of the own-mobile-object information 701 stored in the storage unit 603 of the mobile object 101 according to the second embodiment of the present disclosure is the same as FIG. 10, and thus the description thereof will not be given.

The diagram illustrating an example of the other-mobile-object information 702 stored in the storage unit 603 of the mobile object 101 according to the second embodiment of the present disclosure is the same as FIG. 11, and thus the description thereof will not be given.

Figure 29:
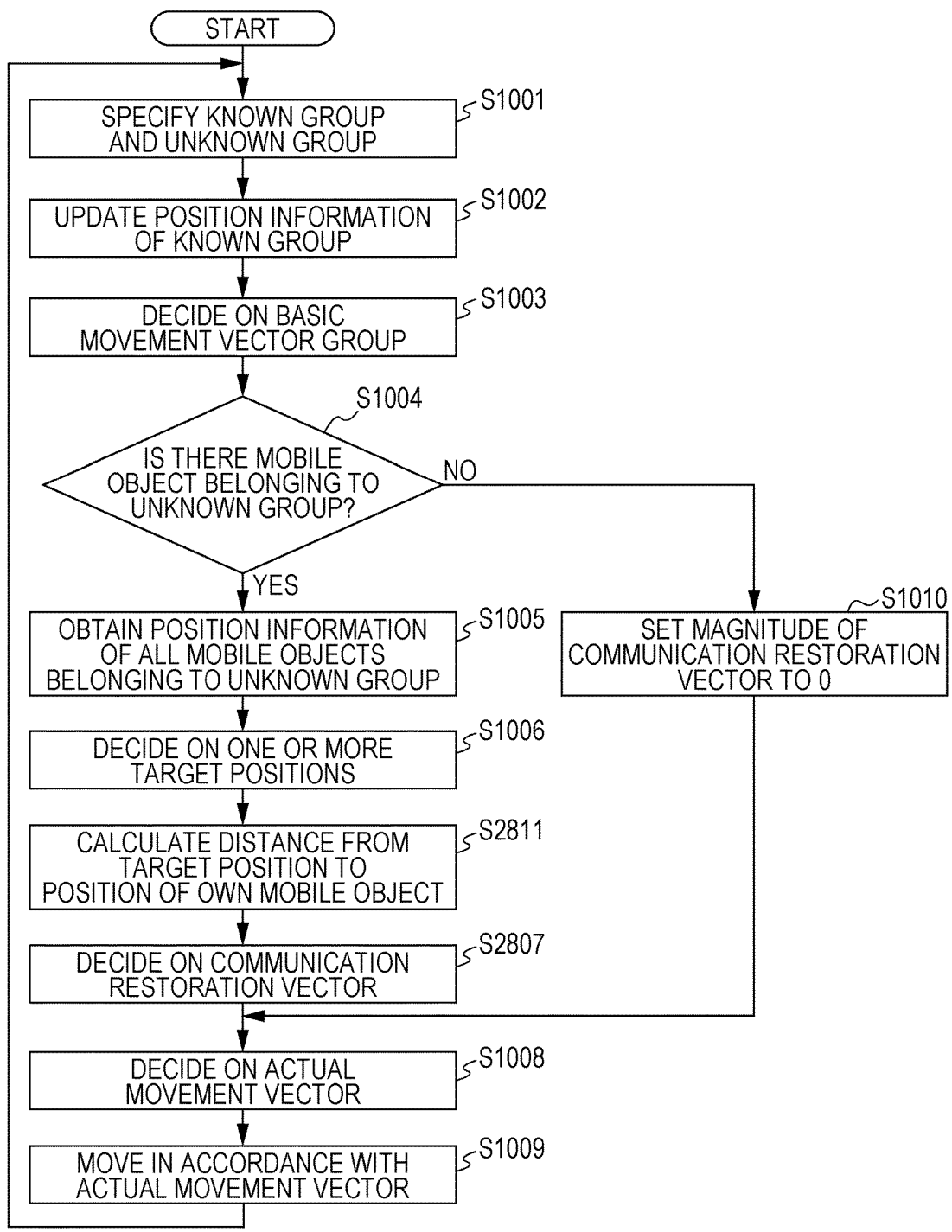
FIG. 29 is a flowchart illustrating an overall operation of movement control of a mobile object according to a second embodiment of the present disclosure.

FIG. 29 is a flowchart illustrating an overall operation of movement control of the mobile object 101 according to the second embodiment of the present disclosure. In FIG. 29, the same steps as those in FIG. 12 are denoted by the same reference numerals and the description thereof will not be given.

In the second embodiment of the present disclosure, if it is determined in step S1004 that there is a mobile object belonging to an unknown group, the process in steps S1005 to S2807 is performed.

After deciding on a target position in step S1006, the control unit 602 of the mobile object 101 calculates the distance from the target position to the position of the own mobile object (step S2811).

The conceptual diagram of an example of a basic movement vector group is the same as FIG. 13, and thus the description thereof will not be given.

The conceptual diagram illustrating a known group and an unknown group in each of the mobile objects 101 to 104 in a case where the mobile object 105 fails is the same as FIG. 14, and thus the description thereof will not be given.

The conceptual diagram illustrating a known group and an unknown group in each of the mobile objects 106 and 107 in a case where the mobile object 105 fails is the same as FIG. 15, and thus the description thereof will not be given.

The diagram illustrating an example of a method for deciding on a target position in each of the mobile objects 101 to 104 and the target position decided on by using the method in a case where the mobile object 105 fails is the same as FIG. 16. It is assumed that the mobile objects 105 to 107 are at the positions described in the other-mobile-object information 702 illustrated in FIG. 11.

In each of the mobile objects 101 to 104, for example, in the case of deciding on the center position of all the mobile objects belonging to the unknown group as a target position, the target position is the target position 1401 illustrated in FIG. 16. The value of the target position 1401 is "34° 41'37.6" north latitude, 135° 30'9.1" east longitude, 2 m above sea level". In this case, the distances from the target position 1401 to the mobile objects 101 to 104 are 53.3 m, 37.6 m, 35.5 m, and 27.9 m, respectively.

In the case of deciding on the position nearest to the own mobile object among the positions of all the mobile objects belonging to the unknown group as a target position, the target position is the target position 1402 illustrated in FIG. 16, that is, the position of the mobile object 105. The value of the target position 1402 is "34° 41'37.5" north latitude, 135° 30'8.6" east longitude, 2 m above sea level". In this case, the distances from the target position 1402 to the mobile objects 101 to 104 are 40.6 m, 25.0 m, 22.7 m, and 19.9 m, respectively. Here, approximate values are calculated in an abbreviated manner under the assumption that the distance corresponding to one second in latitude is 31 m and the distance corresponding to one second in longitude is 25 m. However, the method for calculating a distance on the basis of a difference in latitude and longitude is not related to the gist of the present disclosure. In this specification, unless otherwise noted, a distance is calculated on the basis of a difference in latitude and longitude by using the simple method described herein.

The diagram illustrating an example of a method for deciding on a target position in each of the mobile objects 106 and 107 and the target position decided on by using the method in a case where the mobile object 105 fails is the same as FIG. 17. It is assumed that the mobile objects 101 to 105 are at the positions described in the other-mobile-object information 702 illustrated in FIG. 11.

In each of the mobile objects 106 and 107, for example, in the case of deciding on the center position of all the mobile objects belonging to the unknown group as a target position, the target position is the target position 1501 illustrated in FIG. 17. The value of the target position 1501 is "34° 41'37.48" north latitude, 135° 30'7.82" east longitude, 2 m above sea level". In this case, the distances from the target position 1501 to the mobile objects 106 and 107 are 33.5 m and 44.5 m, respectively.

In the case of deciding on the position nearest to the own mobile object among the positions of all the mobile objects belonging to the unknown group as a target position, the target position is the target position 1502 illustrated in FIG. 17, that is, the position of the mobile object 105. The value of the target position 1502 is "34° 41'37.5" north latitude, 135° 30'8.6" east longitude, 2 m above sea level". In this case, the distances from the target position 1502 to the mobile objects 106 and 107 are 15.6 m and 25.0 m, respectively.

Subsequently, the control unit 602 of the mobile object 101 decides on a communication restoration vector, which is a movement vector for moving toward the target position, in accordance with the distance from the target position to the position of the own mobile object (step S2807). Subsequently, the control unit 602 creates communication restoration vector information, which is information about the communication restoration vector, and updates the communication restoration vector information in the own-mobile-object information 701. That is, the control unit 602 obtains third information indicating the current position of the mobile object 101, calculates the distance between the mobile object 101 and the first communication-partner mobile object (for example, the mobile object 105) on the basis of the first information and the third information, and decides on the second control amount (communication restoration vector) on the basis of the distance.

The direction of the communication restoration vector may be the direction of the target position, and the magnitude of the communication restoration vector may be a value inversely proportional to the distance from the target position to the position of the own mobile object. That is, the control unit 602 may decrease the second movement distance, the second velocity absolute value, or the second acceleration absolute value as the distance decreases. Alternatively, the control unit 602 may decrease the second movement distance, the second velocity absolute value, or the second acceleration absolute value as the distance increases.

Now, a description will be given of an example of a communication restoration vector in a case where each of the mobile objects 101 to 107 decides on, as a target position, a position nearest to the own mobile object among the positions of all the mobile objects belonging to the unknown group, and decides on a communication restoration vector having a direction toward the target position and having a magnitude which is a value inversely proportional to the cube of the distance from the target position to the position of the own mobile object. Here, a value obtained by dividing a constant 80.000 by the cube of the distance from the target position to the position of the own mobile object is regarded as the magnitude of the communication restoration vector.

Figure 30:
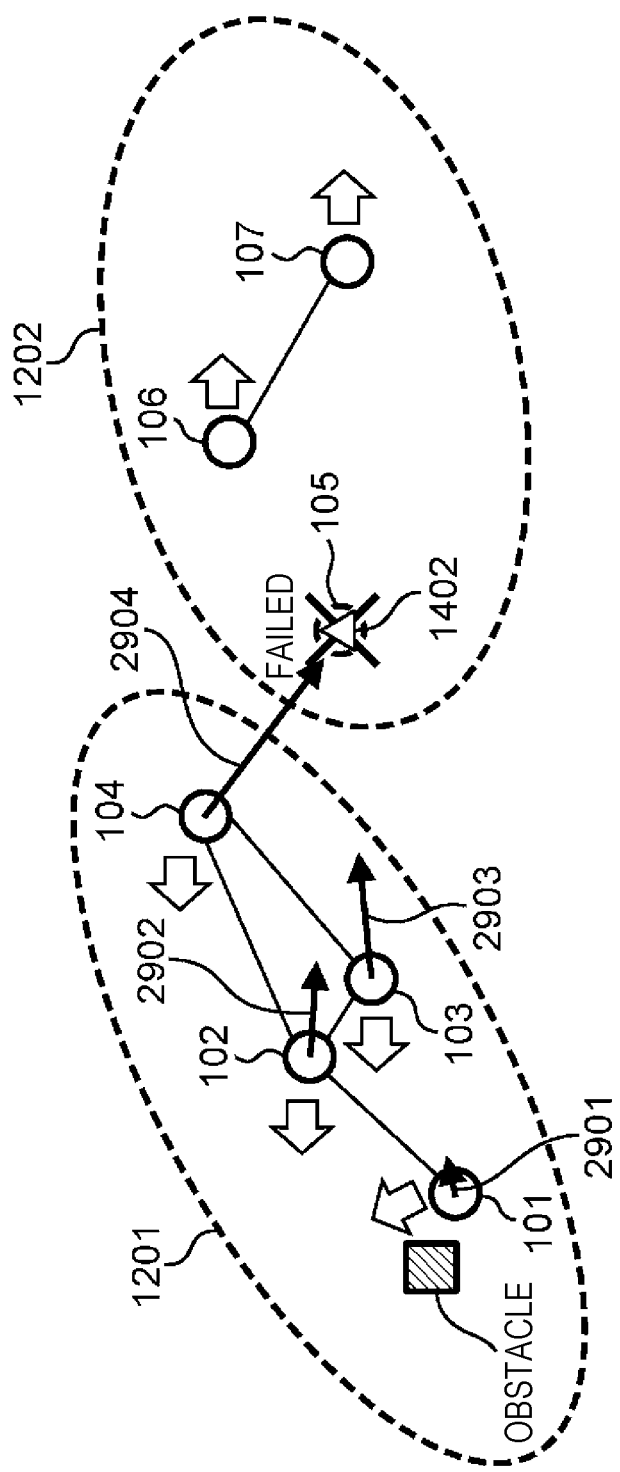
FIG. 30 is a conceptual diagram illustrating an example of communication restoration vectors of mobile objects in a case where one mobile object fails in the second embodiment of the present disclosure.

FIG. 30 is a conceptual diagram illustrating an example of communication restoration vectors of the mobile objects 101 to 104 in a case where one mobile object (the mobile object 105) fails in the second embodiment of the present disclosure. In FIG. 30, the same elements as those in FIGS. 6, 14, and 16 are denoted by the same reference numerals and the description thereof will not be given.

As described above, the distances from the target position 1402 to the mobile objects 101 to 104 are 40.6 m, 25.0 m, 22.7 m, and 19.9 m, respectively. Thus, the communication restoration vectors of the mobile objects 101 to 104 have magnitudes of 1.2 m/s, 5.1 m/s, 6.8 m/s, and 10.2 m/s, respectively, and have directions toward the target position 1402. That is, a communication restoration vector 2901 of the mobile object 101 is (1.2 m/s, 0.2 m/s, 0 m/s), a communication restoration vector 2902 of the mobile object 102 is (5.1 m/s, −0.6 m/s, 0 m/s), a communication restoration vector 2903 of the mobile object 103 is (6.8 m/s, 0.6 m/s, 0 m), and a communication restoration vector 2904 of the mobile object 104 is (7.3 m/s, −7.3 m/s, 0 m/s).

Figure 31:
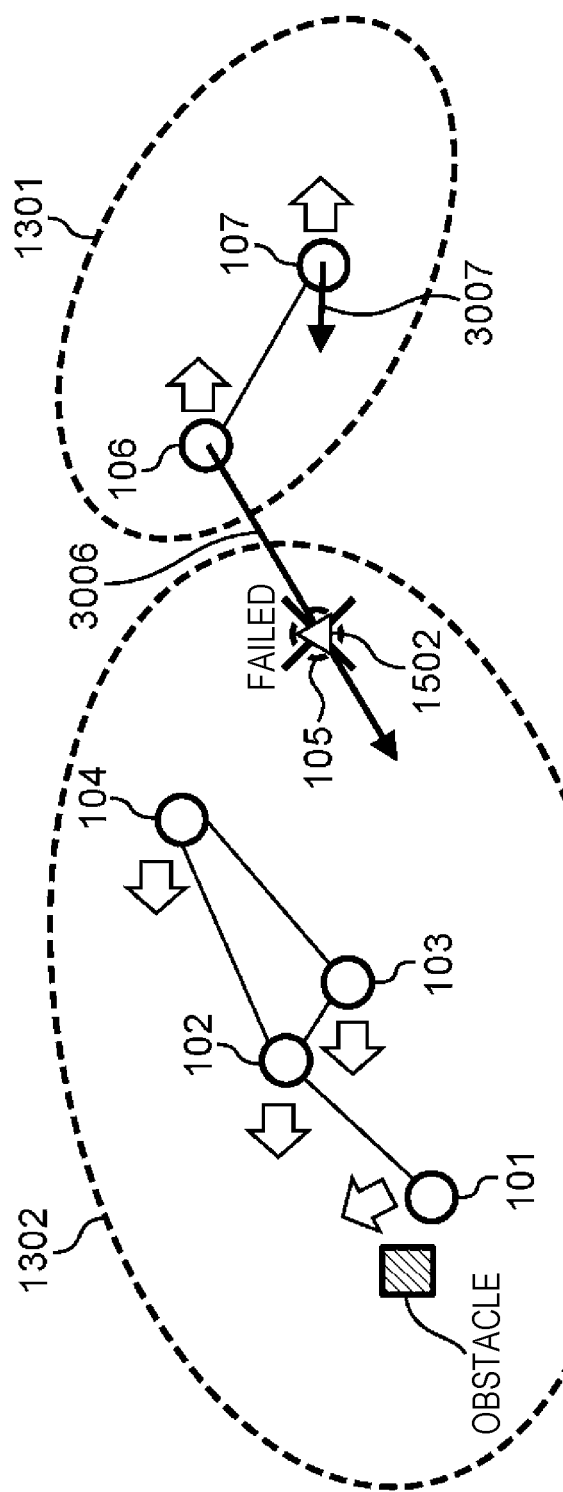
FIG. 31 is a conceptual diagram illustrating an example of communication restoration vectors of mobile objects in a case where one mobile object fails in the second embodiment of the present disclosure.

FIG. 31 is a conceptual diagram illustrating an example of communication restoration vectors of the mobile objects 106 and 107 in a case where one mobile object (the mobile object 105) fails in the second embodiment of the present disclosure. In FIG. 31, the same elements as those in FIGS. 6, 15, and 17 are denoted by the same reference numerals and the description thereof will not be given.

As described above, the distances from the target position 1502 to the mobile objects 106 and 107 are 15.6 m and 25.0 m, respectively. Thus, the communication restoration vectors of the mobile objects 106 and 107 have magnitudes of 21.1 m/s and 5.1 m/s, respectively, and have directions toward the target position 1502. That is, a communication restoration vector 3006 of the mobile object 106 is (−16.9 m/s, −12.7 m/s, 0 m/s), and a communication restoration vector 3007 of the mobile object 107 is (−5.1 m/s, 0 m/s, 0 m/s).

Subsequently, the control unit 602 of the mobile object 101 calculates the sum of movement vectors that are obtained by multiplying all the movement vectors belonging to the basic movement vector group and the communication restoration vector by a value other than 0, and decides on a movement vector obtained through the calculation as an actual movement vector (step S1008). Subsequently, the control unit 602 creates actual movement vector information, which is information about the actual movement vector, and updates the actual movement vector information in the own-mobile-object information 701.

Figure 32:
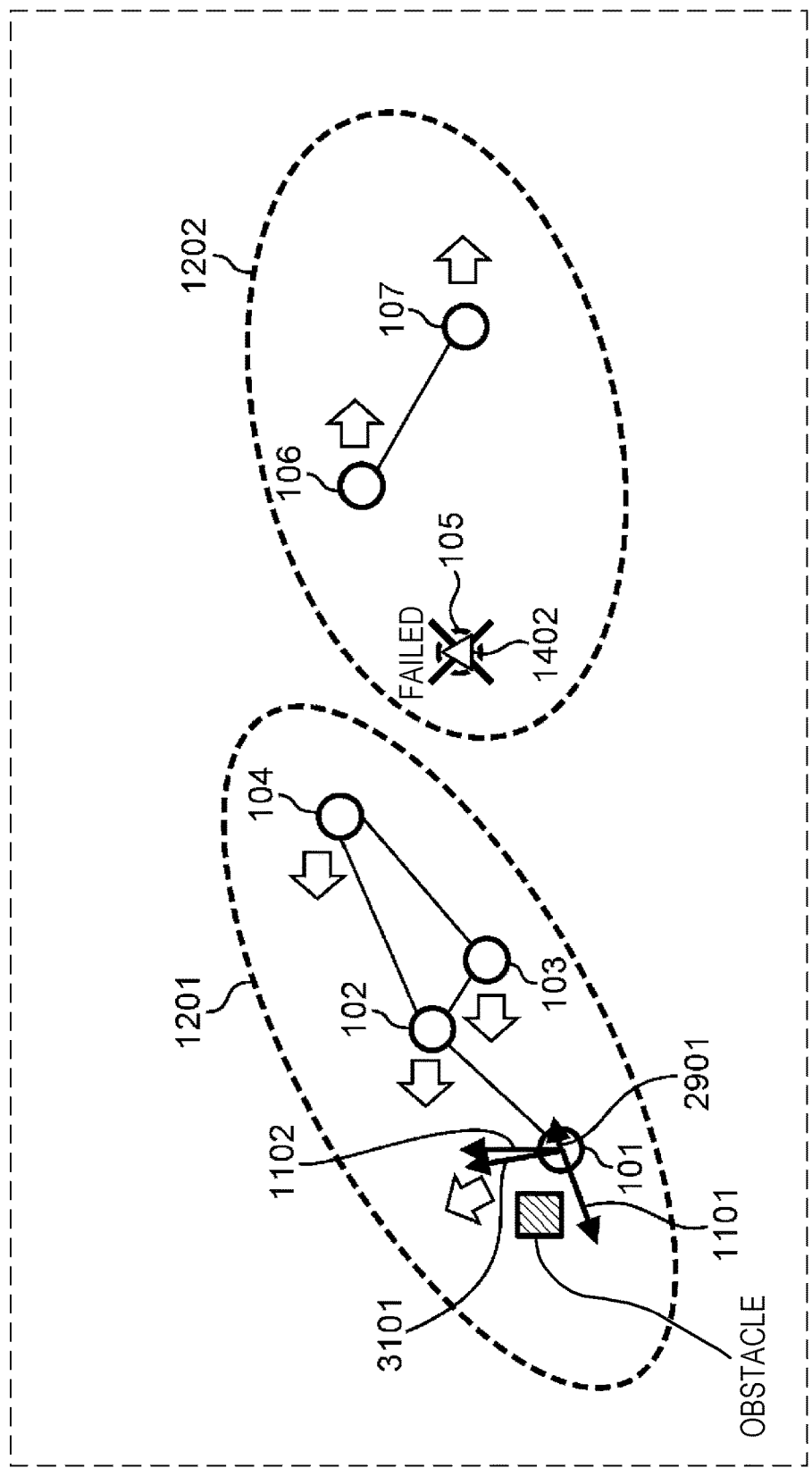
FIG. 32 is a conceptual diagram illustrating an example of a method for deciding on an actual movement vector in a mobile object in a case where one mobile object fails in the second embodiment of the present disclosure.

FIG. 32 is a conceptual diagram illustrating an example of a method for deciding on an actual movement vector in the mobile object 101 in a case where one mobile object (the mobile object 105) fails in the second embodiment of the present disclosure. In FIG. 32, the same elements as those in FIGS. 6, 14, 16, and 30 are denoted by the same reference numerals and the description thereof will not be given.

To increase the ratio of a movement for avoiding an obstacle, the control unit 602 multiplies the main basic movement vector belonging to the basic movement vector group by 0.5, multiplies the obstacle avoidance basic movement vector belonging to the basic movement vector group by 1, and multiplies the communication restoration vector by 1, and then calculates the sum of the movement vectors as calculation results. The value by which each movement vector belonging to the basic movement vector group is multiplied may be a constant or may be a value that is dynamically decided on at the time of performing an actual process.

In the example illustrated in FIG. 32, the main basic movement vector 1101 of the mobile object 101 is (−5 m/s, −2 m/s, 0 m/s), the obstacle avoidance basic movement vector 1102 is (0 m/s, 5 m/s, 0 m/s), and the communication restoration vector 2901 is (10 m/s, 2 m/s, 0 m/s). Thus, the movement vector as a calculation result is (−1.3 m/s, 4.2 m/s, 0 m/s). The control unit 602 of the mobile object 101 decides on the movement vector (−1.3 m/s, 4.2 m/s, 0 m/s) obtained through the calculation as an actual movement vector 3101.

If the mobile object 105 does not fail and if there is no mobile object belonging to an unknown group, the mobile object 101 moves in accordance with an actual movement vector (−2.5 m/s, 4 m/s, 0 m/s) that is obtained by adding a vector obtained by multiplying the main basic movement vector 1101 (−5 m/s, −2 m/s, 0 m/s) by 0.5, a vector obtained by multiplying the obstacle avoidance basic movement vector 1102 (0 m/s, 5 m/s, 0 m/s) by 1, and a vector obtained by multiplying the communication restoration vector having a magnitude of 0 and decided on in step S1010 by 1. Accordingly, as illustrated in FIG. 13, the mobile object 101 moves substantially north-northwestward while avoiding the obstacle. However, if the mobile object 105 fails and if a mobile object belonging to an unknown group emerges, the mobile object 101 moves substantially north-northwestward in accordance with the actual movement vector 3101 (−1.3 m/s, 4.2 m/s, 0 m/s), as illustrated in FIG. 32. Since the mobile object 101 is farther from the target position 1402 than the mobile objects 102 to 104 are, the mobile object 101 is capable of substantially implementing an original purpose although it has some ratio of a movement for attempting to restore communication.

The actual movement vectors of the mobile objects 102 to 104, 106, and 107 are decided on similarly to the actual movement vector of the mobile object 101.

Figure 33:
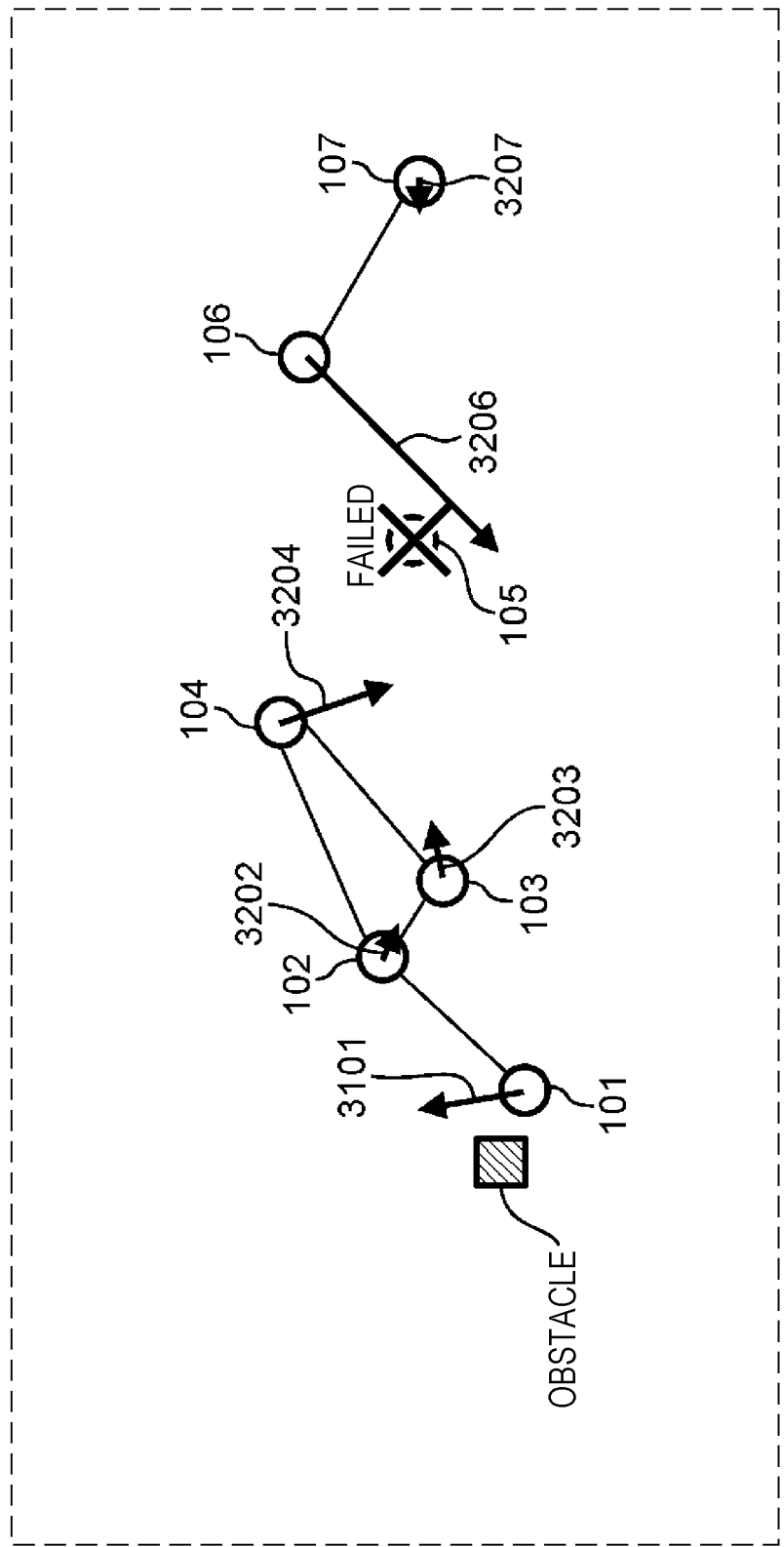
FIG. 33 is a conceptual diagram illustrating an example of actual movement vectors of mobile objects in a case where one mobile object fails in the second embodiment of the present disclosure.

FIG. 33 is a conceptual diagram illustrating an example of actual movement vectors of the mobile objects 101 to 104, 106, and 107 in a case where one mobile object (the mobile object 105) fails in the second embodiment of the present disclosure. In FIG. 33, the same elements as those in FIGS. 6 and 32 are denoted by the same reference numerals and the description thereof will not be given.

Here, among the movement vectors belonging to the basic movement vector groups of the mobile objects 102 to 104, the value of the main basic movement vector is (−10 m/s, 0 m/s, 0 m/s) and the value of the obstacle avoidance basic movement vector is (0 m/s, 0 m/s, 0 m/s). Among the movement vectors belonging to the basic movement vector groups of the mobile objects 106 and 107, the value of the main basic movement vector is (10 m/s, 0 m/s, 0 m/s) and the value of the obstacle avoidance basic movement vector is (0 m/s, 0 m/s, 0 m/s).

Here, the control unit 602 decides on, as an actual movement vector, the sum of a movement vector obtained by multiplying the main basic movement vector by 0.5, a movement vector obtained by multiplying the obstacle avoidance basic movement vector by 1, and a movement vector obtained by multiplying the communication restoration vector by 1.

If the mobile object 105 does not fail and if there is no mobile object belonging to an unknown group, the mobile object 102 moves westward in accordance with the actual movement vector (−5 m/s, 0 m/s, 0 m/s) as illustrated in FIG. 13. However, if the mobile object 105 fails and if a mobile object belonging to an unknown group emerges, the mobile object 102 moves substantially south-southeastward in accordance with an actual movement vector 3202 (0.1 m/s, −0.6 m/s, 0 m/s), as illustrated in FIG. 33.

If the mobile object 105 does not fail and if there is no mobile object belonging to an unknown group, the mobile object 103 moves westward in accordance with the actual movement vector (−5 m/s, 0 m/s, 0 m/s) as illustrated in FIG. 13. However, if the mobile object 105 fails and if a mobile object belonging to an unknown group emerges, the mobile object 103 moves substantially east-northeastward in accordance with an actual movement vector 3203 (1.8 m/s, 0.6 m/s, 0 m/s), as illustrated in FIG. 33.

If the mobile object 105 does not fail and if there is no mobile object belonging to an unknown group, the mobile object 104 moves westward in accordance with the actual movement vector (−5 m/s, 0 m/s, 0 m/s) as illustrated in FIG. 13. However, if the mobile object 105 fails and if a mobile object belonging to an unknown group emerges, the mobile object 104 moves substantially south-southeastward in accordance with an actual movement vector 3204 (2.3 m/s, −7.3 m/s, 0 m/s), as illustrated in FIG. 33.

The mobile object 104, which is nearer to the target position 1402 than the mobile objects 102 and 103 are, moves faster than the mobile objects 102 and 103 to the position where restoration of communication is expected, and mainly performs a communication restoration operation. The mobile objects 102 and 103, which are farther from the target position 1402 than the mobile object 104 is, move slower than the mobile object 104 to the positions where restoration of communication is expected, and are thus capable of implementing an original purpose while preventing cutoff of the direct communication with the mobile object 104, which may be caused by becoming too far from the mobile object 104. The mobile object 101, which is farther from the target position 1402 than the mobile objects 102 and 103 are, is capable of substantially implementing an original purpose although it has some ratio of a movement for attempting to restore communication.

The same applies to the mobile objects 106 and 107, which are incapable of communicating with the mobile objects 101 to 104 due to the failure of the mobile object 105.

If the mobile object 105 does not fail and if there is no mobile object belonging to an unknown group, the mobile object 106 moves eastward in accordance with the actual movement vector (5 m/s, 0 m/s, 0 m/s) as illustrated in FIG. 13. However, if the mobile object 105 fails and if a mobile object belonging to an unknown group emerges, the mobile object 106 moves substantially southwestward in accordance with an actual movement vector 3206 (−11.9 m/s, −12.7 m/s, 0 m/s), as illustrated in FIG. 33.

If the mobile object 105 does not fail and if there is no mobile object belonging to an unknown group, the mobile object 107 moves eastward in accordance with the actual movement vector (5 m/s, 0 m/s, 0 m/s) as illustrated in FIG. 13. However, if the mobile object 105 fails and if a mobile object belonging to an unknown group emerges, the mobile object 107 moves substantially westward in accordance with an actual movement vector 3207 (−0.1 m/s, 0 m/s, 0 m/s), as illustrated in FIG. 33.

The mobile object 106, which is nearer to the target position 1502 than the mobile object 107 is, moves faster than the mobile object 107 to the position where restoration of communication is expected, and mainly performs a communication restoration operation. The mobile object 107, which is farther from the target position 1502 than the mobile object 106 is, moves slower than the mobile object 106 to the position where restoration of communication is expected, and is thus capable of implementing an original purpose while preventing cutoff of the direct communication with the mobile object 106, which may be caused by becoming too far from the mobile object 106.

As a result, the mobile objects 102 to 107 move to get together, and thus restoration of communication is performed more efficiently.

Subsequently, the control unit 602 of the mobile object 101 obtains the actual movement vector information from the own-mobile-object information 701 and actually moves the mobile object 101 in accordance with the actual movement vector 1801 that has been obtained (step S1009). The control unit 602 generates a control command that causes the mobile object 101 to move in accordance with the actual movement vector 1801 and outputs the control command to the movement control units 605. The movement control units 605 actually cause the mobile object 101 to move in accordance with the control command.

Hereinafter, a description will be given of, by using specific examples, the issues that are not overcome by the techniques disclosed in PTL 1 and that are overcome by the second embodiment of the present disclosure.

As described above, the first technique disclosed in PTL 1 is not applicable as is if there are two or more mobile objects disconnected from the ad hoc network when viewed from any mobile object, as in the example illustrated in FIG. 2.

In contrast, in the second embodiment of the present disclosure, an attempt can be made to restore communication even if there are two or more mobile objects disconnected from the ad hoc network when viewed from any mobile object, as in the example illustrated in FIG. 33. In this case, that is, in the case where there are two or more mobile objects disconnected from the ad hoc network when viewed from any mobile object, some or all of the mobile objects belonging to the component group move to get together and thus an attempt to restore communication can be made. In the example illustrated in FIG. 33, the mobile objects 102 to 104, 106, and 107 move to get together and accordingly an attempt to restore communication can be made.

The second technique disclosed in PTL 1 has an issue that all mobile objects are incapable of moving for an original purpose until communication is restored. In contrast, in the second embodiment of the present disclosure, the mobile object 101 is capable of moving mainly for an original purpose in the example illustrated in FIG. 33, for example, and the foregoing issue can be overcome.

The third technique disclosed in PTL 1 has an issue that a region over which a mobile object group is deployed gradually becomes smaller and all mobile objects are incapable of moving for an original purpose until communication is restored. Furthermore, after the communication is restored, the mobile objects need to move again for the original purpose from the positions at the point of time when the communication is restored. In contrast, in the second embodiment of the present disclosure, the mobile object 101 is capable of moving mainly for an original purpose in the example illustrated in FIG. 33, for example, and the foregoing issue can be overcome.

The fourth technique disclosed in PTL 1 has an issue that, if a selected mobile object moves toward a cutoff position, the communication between the selected mobile object and a mobile object other than a mobile object disconnected from the ad hoc network is cut off, and accordingly the ad hoc network may be secondarily fractured. In contrast, in the second embodiment of the present disclosure, the mobile objects 102 to 104, 106, and 107 move to get together to attempt to restore communication, and the mobile object 101, which is the farthest from the target position 1402, is capable of moving mainly for an original purpose, in the example illustrated in FIG. 33, for example.

The movement velocity of each of the mobile objects 101 to 104 is decided on in accordance with a communication restoration vector that has a value inversely proportional to the cube of the distance from the target position 1402 to the mobile object. The distance from the target position 1402 decreases in the order of the mobile object 101, the mobile object 102, the mobile object 103, and the mobile object 104. Thus, the mobile object 101 is capable of moving mainly for an original purpose, the mobile object 102 moves toward a position where restoration of communication is expected at a velocity lower than that of the mobile object 103, the mobile object 103 moves toward a position where restoration of communication is expected at a velocity lower than that of the mobile object 104, and the mobile object 104 moves toward a position where restoration of communication is expected at a velocity higher than that of the mobile objects 102 and 103, and mainly performs a communication restoration operation.

Accordingly, a relative velocity at which the mobile objects 101 to 104 get away from each other can be suppressed to a small value, and thus the direct communications between the mobile objects 101 and 102, between the mobile objects 102 and 103, between the mobile objects 102 and 104, and between the mobile objects 103 and 104 are unlikely to be immediately cut off.

The movement velocity of each of the mobile objects 106 and 107 is decided on in accordance with a communication restoration vector that has a value inversely proportional to the cube of the distance from the target position 1502 to the mobile object. The distance from the target position 1502 decreases in the order of the mobile object 107 and the mobile object 106. Thus, the mobile object 107 moves toward a position where restoration of communication is expected at a velocity lower than that of the mobile object 106, and the mobile object 106 moves toward a position where restoration of communication is expected at a velocity higher than that of the mobile object 107, and mainly performs a communication restoration operation.

Accordingly, a relative velocity at which the mobile objects 106 and 107 get away from each other can be suppressed to a small value, and thus the direct communication between the mobile objects 106 and 107 is unlikely to be immediately cut off. Therefore, it can be understood that the issue of the fourth technique disclosed in PTL 1 is overcome.

As described above, in the first technique disclosed in PTL 1, if some or all of the mobile objects move to get away from each other as in the example illustrated in FIG. 3, communication can be restored only partially at best. In the example illustrated in FIG. 3, if the group of the mobile objects 201 to 204 and the group of the mobile objects 206 and 207 continue to move to get away from each other, the direct communication with a mobile object belonging to one of the group of the mobile objects 201 to 204 and the group of the mobile objects 206 and 207 is restored at best, and it is impossible to restore the direct communication with a mobile object belonging to the other group.

In contrast, in the second embodiment of the present disclosure, an attempt to restore communication can be made even if some mobile objects move to get away from each other as in the example illustrated in FIG. 3. This will be described below.

Here, each of the mobile objects 201 to 207 decides on, as a target position, the position nearest to the own mobile object among the positions of all the mobile objects belonging to the unknown group, and also decides on a communication restoration vector having a direction toward the target position and having a magnitude that is a value inversely proportional to the cube of the distance from the target position to the own mobile object.

To increase the ratio of a movement for avoiding an obstacle, the control unit 602 of each of the mobile objects 201 to 207 multiplies the main basic movement vector belonging to the basic movement vector group by 0.5, multiplies the obstacle avoidance basic movement vector belonging to the basic movement vector group by 1, and multiplies the communication restoration vector by 1, and then calculates the sum of the movement vectors as calculation results.

Here, among the movement vectors belonging to the basic movement vector groups of the mobile objects 202 to 204, the value of the main basic movement vector is (−10 m/s, 0 m/s, 0 m/s) and the value of the obstacle avoidance basic movement vector is (0 m/s, 0 m/s, 0 m/s). Among the movement vectors belonging to the basic movement vector groups of the mobile objects 206 and 207, the value of the main basic movement vector is (10 m/s, 0 m/s, 0 m/s) and the value of the obstacle avoidance basic movement vector is (0 m/s, 0 m/s, 0 m/s).

Here, the control unit 602 of each of the mobile objects 201 to 207 decides on, as an actual movement vector, the sum of a movement vector obtained by multiplying the main basic movement vector by 0.5, a movement vector obtained by multiplying the obstacle avoidance basic movement vector by 1, and a movement vector obtained by multiplying the communication restoration vector by 1.

Figure 34:
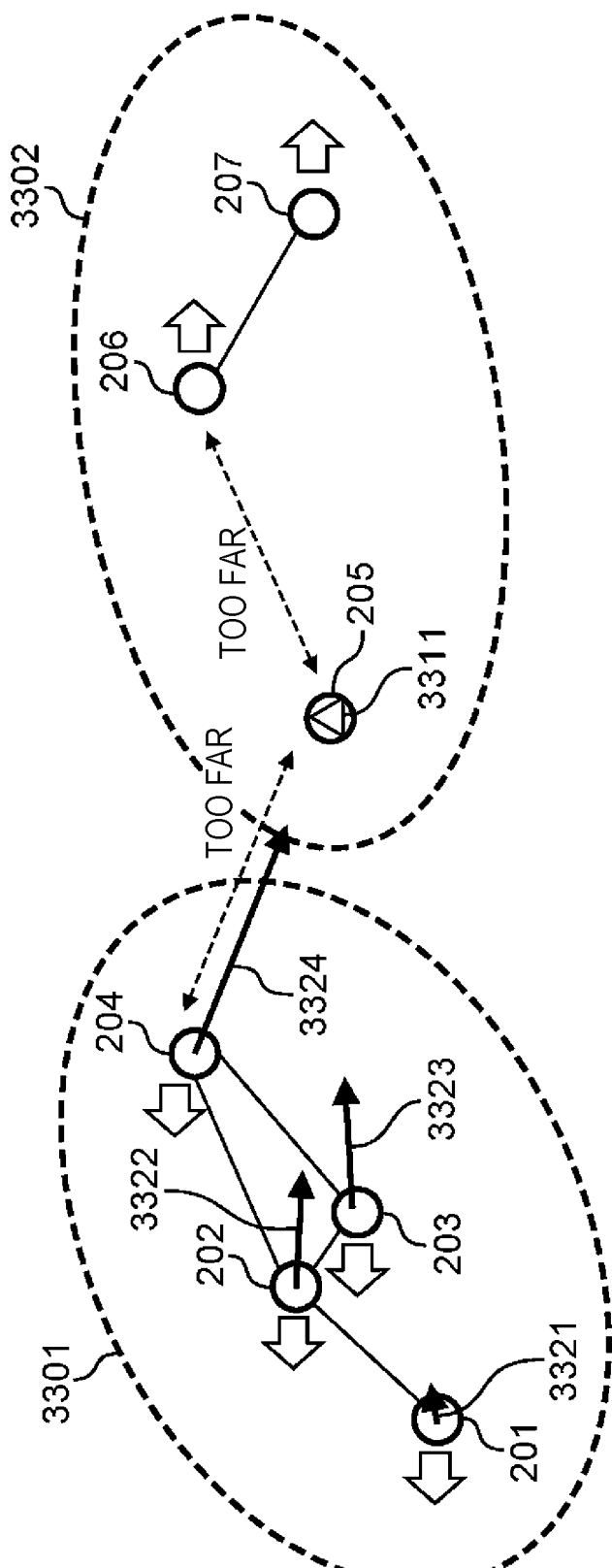
FIG. 34 is a conceptual diagram illustrating an example of communication restoration vectors of mobile objects in the situation illustrated in FIG. 3 in the second embodiment of the present disclosure.

FIG. 34 is a conceptual diagram illustrating an example of communication restoration vectors of the mobile objects 201 to 204 in the situation illustrated in FIG. 3 in the second embodiment of the present disclosure. In FIG. 34, the same elements as those in FIG. 1 are denoted by the same reference numerals and the description thereof will not be given.

As illustrated in FIG. 34, for each of the mobile objects 201 to 204, the mobile objects belonging to a known group 3301 are the mobile objects 201 to 204, and the mobile objects belonging to an unknown group 3302 are the mobile objects 205 to 207.

The control units 602 of the mobile objects 201 to 204 respectively decide on communication restoration vectors 3321 to 3324, each having a direction toward a target position 3311 and having a magnitude that is a value inversely proportional to the cube of the distance from the target position 3311 to the own mobile object.

Figure 35:
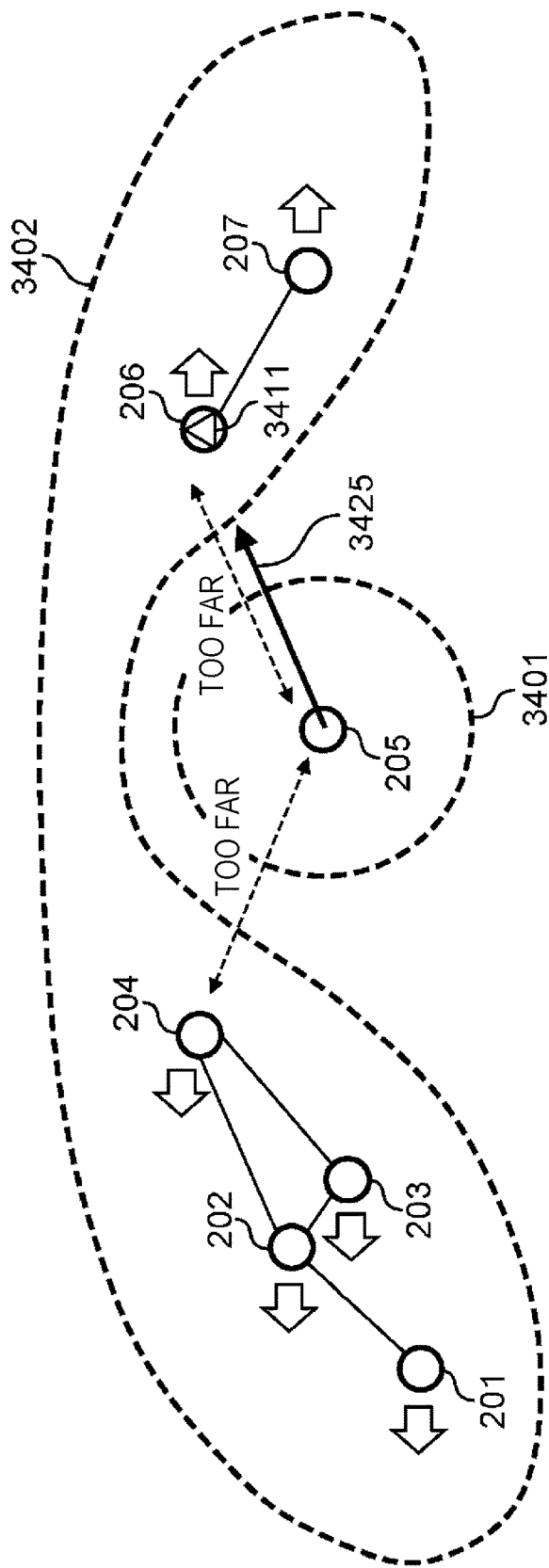
FIG. 35 is a conceptual diagram illustrating an example of a communication restoration vector of a mobile object in the situation illustrated in FIG. 3 in the second embodiment of the present disclosure.

FIG. 35 is a conceptual diagram illustrating an example of a communication restoration vector of the mobile object 205 in the situation illustrated in FIG. 3 in the second embodiment of the present disclosure. In FIG. 35, the same elements as those in FIG. 1 are denoted by the same reference numerals and the description thereof will not be given.

As illustrated in FIG. 35, for the mobile object 205, the mobile object belonging to a known group 3401 is the mobile object 205, and the mobile objects belonging to an unknown group 3402 are the mobile objects 201 to 204, 206, and 207.

The control unit 602 of the mobile object 205 decides on a communication restoration vector 3425 having a direction toward a target position 3411 and having a magnitude that is a value inversely proportional to the cube of the distance from the target position 3411 to the own mobile object.

Figure 36:
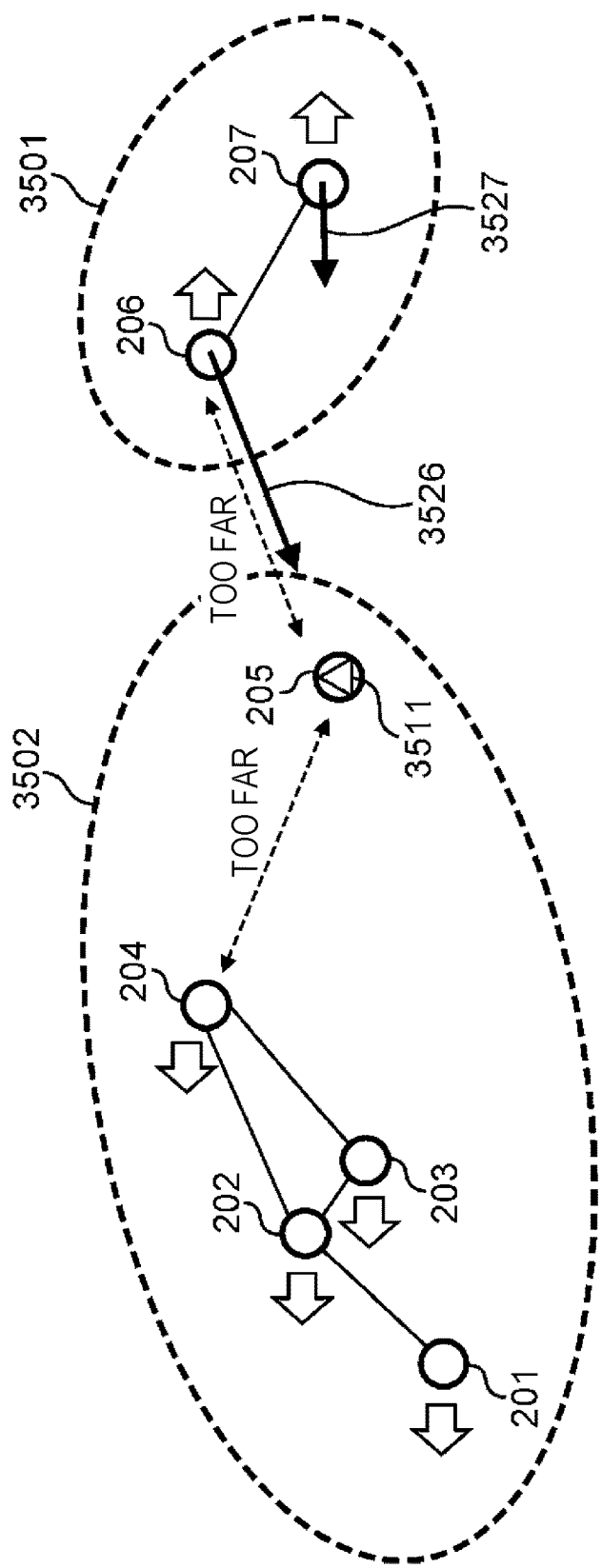
FIG. 36 is a conceptual diagram illustrating an example of communication restoration vectors of mobile objects in the situation illustrated in FIG. 3 in the second embodiment of the present disclosure.

FIG. 36 is a conceptual diagram illustrating an example of communication restoration vectors of the mobile objects 206 and 207 in the situation illustrated in FIG. 3 in the second embodiment of the present disclosure. In FIG. 36, the same elements as those in FIG. 1 are denoted by the same reference numerals and the description thereof will not be given.

As illustrated in FIG. 36, for each of the mobile objects 206 and 207, the mobile objects belonging to a known group 3501 are the mobile objects 206 and 207, and the mobile objects belonging to an unknown group 3502 are the mobile objects 201 to 205.

The control units 602 of the mobile objects 206 and 207 respectively decide on communication restoration vectors 3526 and 3527, each having a direction toward a target position 3511 and having a magnitude that is a value inversely proportional to the cube of the distance from the target position 3511 to the own mobile object.

Figure 37:
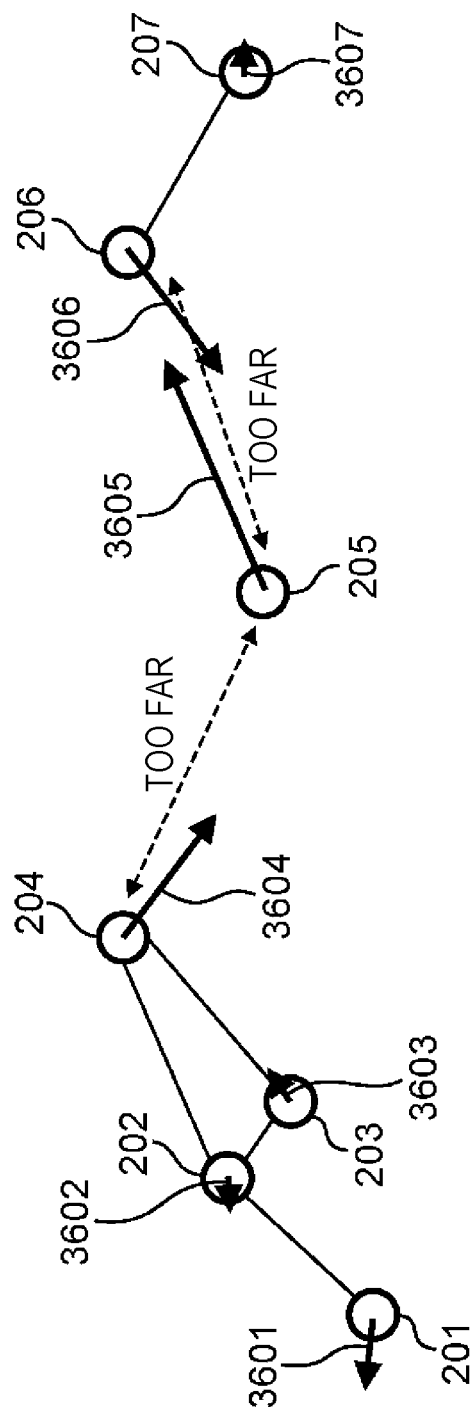
FIG. 37 is a conceptual diagram illustrating an example of actual movement vectors of mobile objects in the situation illustrated in FIG. 3 in the second embodiment of the present disclosure.

FIG. 37 is a conceptual diagram illustrating an example of actual movement vectors of the mobile objects 201 to 207 in the situation illustrated in FIG. 3 in the second embodiment of the present disclosure. In FIG. 37, the same elements as those in FIG. 1 are denoted by the same reference numerals and the description thereof will not be given.

The mobile object 201 decides on a basic movement vector group for moving westward, and if the mobile object 205 does not become too far from another mobile object and if there is no mobile object belonging to an unknown group, the mobile object 201 decides on an actual movement vector for moving westward, as illustrated in FIG. 3. However, if the mobile object 205 becomes too far from another mobile object and if a mobile object belonging to an unknown group emerges, the mobile object 201 moves substantially westward in accordance with an actual movement vector 3601, which is calculated on the basis of the communication restoration vector 3321 in addition to the basic movement vector group, as illustrated in FIG. 37. Since the mobile object 201 is farther from the target position 3311 than the mobile objects 202 to 204 are, the mobile object 201 is capable of substantially implementing an original purpose although it has some ratio of a movement for attempting to restore communication.

The mobile object 202 decides on a basic movement vector group for moving westward, and if the mobile object 205 does not become too far from another mobile object and if there is no mobile object belonging to an unknown group, the mobile object 202 decides on an actual movement vector for moving westward, as illustrated in FIG. 3. However, if the mobile object 205 becomes too far from another mobile object and if a mobile object belonging to an unknown group emerges, the mobile object 202 moves substantially westward in accordance with an actual movement vector 3602, which is calculated on the basis of the communication restoration vector 3322 in addition to the basic movement vector group, as illustrated in FIG. 37. Since the mobile object 202 is nearer to the target position 3311 than the mobile object 201 is, the mobile object 202 is capable of implementing an original purpose although it has a larger ratio of a movement for attempting to restore communication than the mobile object 201.

The mobile object 203 decides on a basic movement vector group for moving westward, and if the mobile object 205 does not become too far from another mobile object and if there is no mobile object belonging to an unknown group, the mobile object 203 decides on an actual movement vector for moving westward, as illustrated in FIG. 3. However, if the mobile object 205 becomes too far from another mobile object and if a mobile object belonging to an unknown group emerges, the mobile object 203 moves substantially northeastward in accordance with an actual movement vector 3603, which is calculated on the basis of the communication restoration vector 3323 in addition to the basic movement vector group, as illustrated in FIG. 37. Since the mobile object 203 is farther from the target position 3311 than the mobile object 204 is, the mobile object 203 attempts to restore communication although it has a smaller ratio of a movement for attempting to restore communication than the mobile object 204.

The mobile object 204 decides on a basic movement vector group for moving westward, and if the mobile object 205 does not become too far from another mobile object and if there is no mobile object belonging to an unknown group, the mobile object 204 decides on an actual movement vector for moving westward, as illustrated in FIG. 3. However, if the mobile object 205 becomes too far from another mobile object and if a mobile object belonging to an unknown group emerges, the mobile object 204 moves substantially east-southeastward in accordance with an actual movement vector 3604, which is calculated on the basis of the communication restoration vector 3324 in addition to the basic movement vector group, so as to mainly attempt to restore communication, as illustrated in FIG. 37.

The mobile object 205 decides on a basic movement vector group for hardly moving, and if the mobile object 205 does not become too far from another mobile object and if there is no mobile object belonging to an unknown group, the mobile object 205 decides on an actual movement vector for stopping at the position, as illustrated in FIG. 3. However, if the mobile object 205 becomes too far from another mobile object and if a mobile object belonging to an unknown group emerges, the mobile object 205 moves substantially east-northeastward in accordance with an actual movement vector 3605, which is calculated on the basis of the communication restoration vector 3425 in addition to the basic movement vector group, so as to mainly attempt to restore communication, as illustrated in FIG. 37.

The mobile object 206 decides on a basic movement vector group for moving eastward, and if the mobile object 205 does not become too far from another mobile object and if there is no mobile object belonging to an unknown group, the mobile object 206 decides on an actual movement vector for moving eastward, as illustrated in FIG. 3. However, if the mobile object 205 becomes too far from another mobile object and if a mobile object belonging to an unknown group emerges, the mobile object 206 moves substantially southwestward in accordance with an actual movement vector 3606, which is calculated on the basis of the communication restoration vector 3526 in addition to the basic movement vector group, so as to mainly attempt to restore communication, as illustrated in FIG. 37.

The mobile object 207 decides on a basic movement vector group for moving eastward, and if the mobile object 205 does not become too far from another mobile object and if there is no mobile object belonging to an unknown group, the mobile object 207 decides on an actual movement vector for moving eastward, as illustrated in FIG. 3. However, if the mobile object 205 becomes too far from another mobile object and if a mobile object belonging to an unknown group emerges, the mobile object 207 moves substantially eastward in accordance with an actual movement vector 3607, which is calculated on the basis of the communication restoration vector 3527 in addition to the basic movement vector group, as illustrated in FIG. 37. Since the mobile object 207 is farther from the target position 3311 than the mobile object 206 is, the mobile object 207 is capable of implementing an original purpose although it has a ratio of a movement for attempting to restore communication.

In this way, the mobile objects 203 to 206 mainly perform a communication restoration operation whereas the mobile objects 201, 202, and 207 move in the same manner as in a case where there is no unknown group, and accordingly both restoration of communication and an original purpose can be achieved by the entire component group. The movement velocity of each of the mobile objects 201 to 204 is decided on in accordance with a communication restoration vector that has a value inversely proportional to the cube of the distance from the target position 3311 to the mobile object. The distance from the target position 3311 decreases in the order of the mobile object 201, the mobile object 202, the mobile object 203, and the mobile object 204. Thus, the mobile object 201 is capable of moving mainly for an original purpose. The mobile object 202 moves for an original purpose although it has a larger ratio of a movement for attempting to restore communication than the mobile object 201. The mobile object 203 moves toward a position where restoration of communication is expected at a velocity lower than that of the mobile object 204. The mobile object 204 moves toward a position where restoration of communication is expected at a velocity higher than that of the mobile object 203, and mainly performs a communication restoration operation.

Accordingly, a relative velocity at which the mobile objects 201 to 204 get away from each other can be suppressed to a small value, and thus the direct communications between the mobile objects 201 and 202, between the mobile objects 202 and 203, between the mobile objects 202 and 204, and between the mobile objects 203 and 204 are unlikely to be immediately cut off.

The movement velocity of each of the mobile objects 206 and 207 is decided on in accordance with a communication restoration vector that has a value inversely proportional to the cube of the distance from the target position 3511 to the mobile object. The distance from the target position 3511 decreases in the order of the mobile object 207 and the mobile object 206. Thus, the mobile object 207 has a ratio of a movement for attempting to restore communication although it moves for an original purpose. The mobile object 206 moves toward a position where restoration of communication is expected, and mainly performs a communication restoration operation.

Accordingly, a relative velocity at which the mobile objects 206 and 207 get away from each other can be suppressed to a small value, and thus the direct communication between the mobile objects 206 and 207 is unlikely to be immediately cut off.

The second technique disclosed in PTL 1 has an issue that all mobile objects are incapable of moving for an original purpose until communication is restored. In contrast, in the second embodiment of the present disclosure, the mobile objects 201, 202, and 207 are capable of moving for an original purpose in the example illustrated in FIG. 37, for example, and the foregoing issue can be overcome.

The third technique disclosed in PTL 1 has an issue that a region over which a mobile object group is deployed gradually becomes smaller and all mobile objects are incapable of moving for an original purpose until communication is restored. Furthermore, after the communication is restored, the mobile objects need to move again for the original purpose from the positions at the point of time when the communication is restored. In contrast, in the second embodiment of the present disclosure, the mobile objects 201, 202, and 207 are capable of moving for an original purpose in the example illustrated in FIG. 37, for example, and the foregoing issue can be overcome.

The fourth technique disclosed in PTL 1 has an issue that, if a selected mobile object moves toward a cutoff position, the communication between the selected mobile object and a mobile object other than a mobile object disconnected from the ad hoc network is cut off, and accordingly the ad hoc network may be secondarily fractured. In contrast, in the second embodiment of the present disclosure, the mobile objects 203 to 206 move to get together to attempt to restore communication, and the mobile objects 201, 202, and 207, which are far from the target position 3311, are capable of moving for an original purpose, in the example illustrated in FIG. 37, for example.

The movement velocity of each of the mobile objects 201 to 204 is decided on in accordance with a communication restoration vector that has a value inversely proportional to the cube of the distance from the target position 3311 to the mobile object. The distance from the target position 3311 decreases in the order of the mobile object 201, the mobile object 202, the mobile object 203, and the mobile object 204. Thus, the mobile object 201 is capable of moving mainly for an original purpose. The mobile object 202 moves for an original purpose although it has a larger ratio of a movement for attempting to restore communication than the mobile object 201. The mobile object 203 moves toward a position where restoration of communication is expected at a velocity lower than that of the mobile object 204. The mobile object 204 moves toward a position where restoration of communication is expected at a velocity higher than that of the mobile object 203, and mainly performs a communication restoration operation.

Accordingly, a relative velocity at which the mobile objects 201 to 204 get away from each other can be suppressed to a small value, and thus the direct communications between the mobile objects 201 and 202, between the mobile objects 202 and 203, between the mobile objects 202 and 204, and between the mobile objects 203 and 204 are unlikely to be immediately cut off.

The movement velocity of each of the mobile objects 206 and 207 is decided on in accordance with a communication restoration vector that has a value inversely proportional to the cube of the distance from the target position 3511 to the mobile object. The distance from the target position 3511 decreases in the order of the mobile object 207 and the mobile object 206. Thus, the mobile object 207 has a ratio of a movement for attempting to restore communication although it moves for an original purpose. The mobile object 206 moves toward a position where restoration of communication is expected and mainly performs a communication restoration operation.

Accordingly, a relative velocity at which the mobile objects 206 and 207 get away from each other can be suppressed to a small value, and thus the direct communication between the mobile objects 206 and 207 is unlikely to be immediately cut off. Therefore, it can be understood that the issue of the fourth technique disclosed in PTL 1 is overcome.

As described above, in the first technique disclosed in PTL 1, if a mobile object disconnected from the ad hoc network moves to restore communication with the ad hoc network but there is no mobile object in the movement direction or if a mobile object moves in a direction of getting away from the mobile object disconnected from the ad hoc network, it is impossible to restore communication, as in the example illustrated in FIG. 4. In the example illustrated in FIG. 4, the mobile objects 201 to 206 do not exist in the direction in which the mobile object 207, which has been disconnected from the ad hoc network, moves to restore communication, and the mobile objects 201 to 206 continue to move in a lower-left direction in FIG. 4. Thus, the mobile object 207 is incapable of approaching the mobile objects 201 to 206 and restoring the direct communication therewith even if the first technique disclosed in PTL 1 is used. Furthermore, even if the mobile objects 201 to 206 exist in the direction in which the mobile object 207 moves, the mobile object 207 is incapable of catching up with the mobile objects 201 to 206 and restoring the direct communication with the mobile objects 201 to 206 because the mobile objects 201 to 206 continue to move in a direction of getting away from the mobile object 207.

In contrast, in the second embodiment of the present disclosure, even if a mobile object disconnected from the ad hoc network moves to restore communication with the ad hoc network but there is no mobile object in the movement direction or even if a mobile object moves in a direction of getting away from the mobile object disconnected from the ad hoc network, as in the example illustrated in FIG. 4, an attempt to restore communication can be made. This will be described below.

Here, the control unit 602 of each of the mobile objects 201 to 207 decides on, as a target position, the position nearest to the own mobile object among the positions of all the mobile objects belonging to the unknown group, and also decides on a communication restoration vector having a direction toward the target position and having a magnitude that is a value inversely proportional to the cube of the distance from the target position to the own mobile object.

Figure 38:
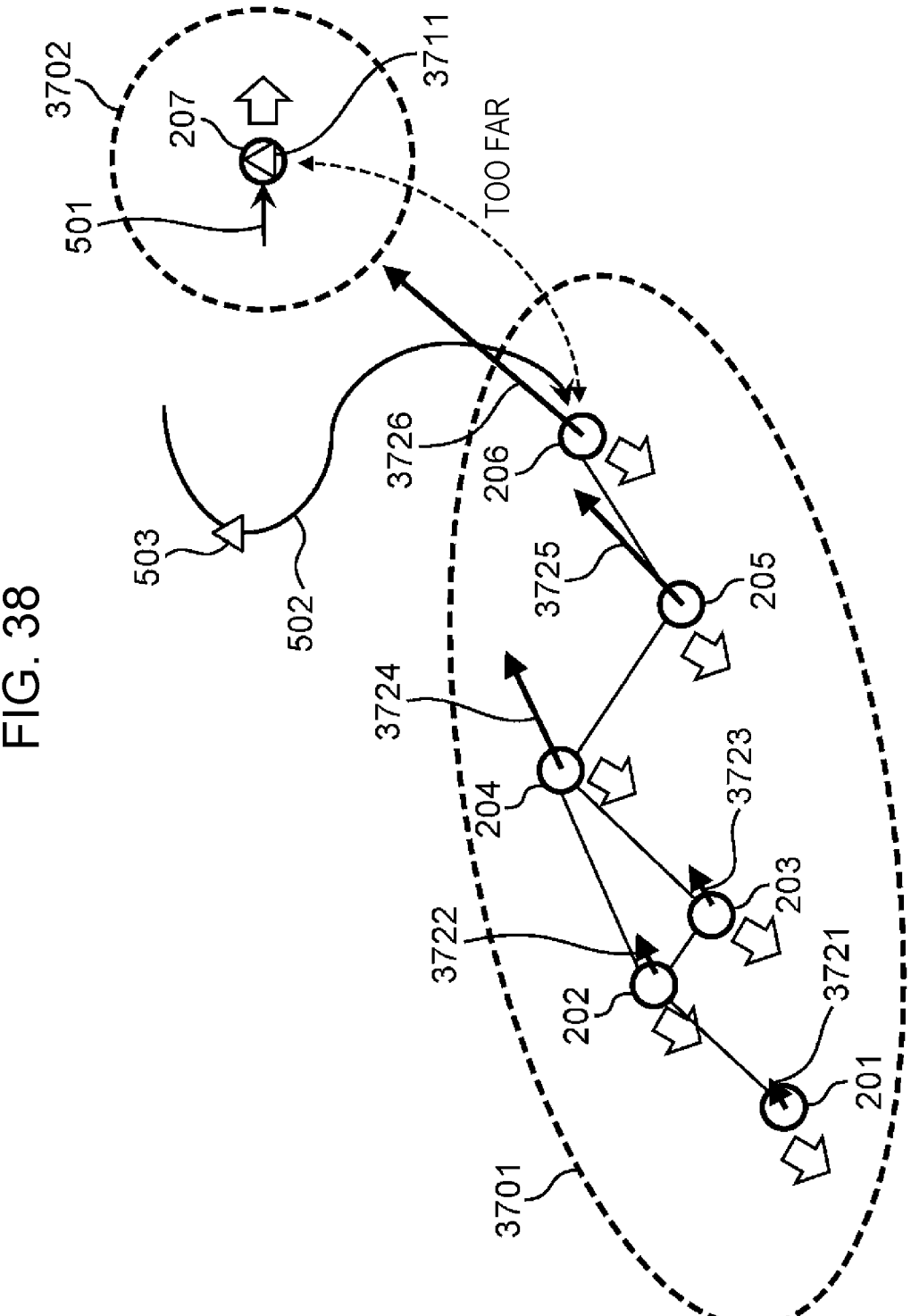
FIG. 38 is a conceptual diagram illustrating an example of communication restoration vectors that are decided on by mobile objects in the situation illustrated in FIG. 4 in the second embodiment of the present disclosure.

FIG. 38 is a conceptual diagram illustrating an example of communication restoration vectors that are decided on by the mobile objects 201 to 206 in the situation illustrated in FIG. 4 in the second embodiment of the present disclosure. In FIG. 38, the same elements as those in FIGS. 1 and 4 are denoted by the same reference numerals and the description thereof will not be given.

As illustrated in FIG. 38, for each of the mobile objects 201 to 206, the mobile objects belonging to a known group 3701 are the mobile objects 201 to 206, and the mobile object belonging to an unknown group 3702 is the mobile object 207.

The control units 602 of the mobile objects 201 to 206 respectively decide on communication restoration vectors 3721 to 3726, each having a direction toward a target position 3711 and having a magnitude that is a value inversely proportional to the cube of the distance from the target position 3711 to the own mobile object.

Figure 39:
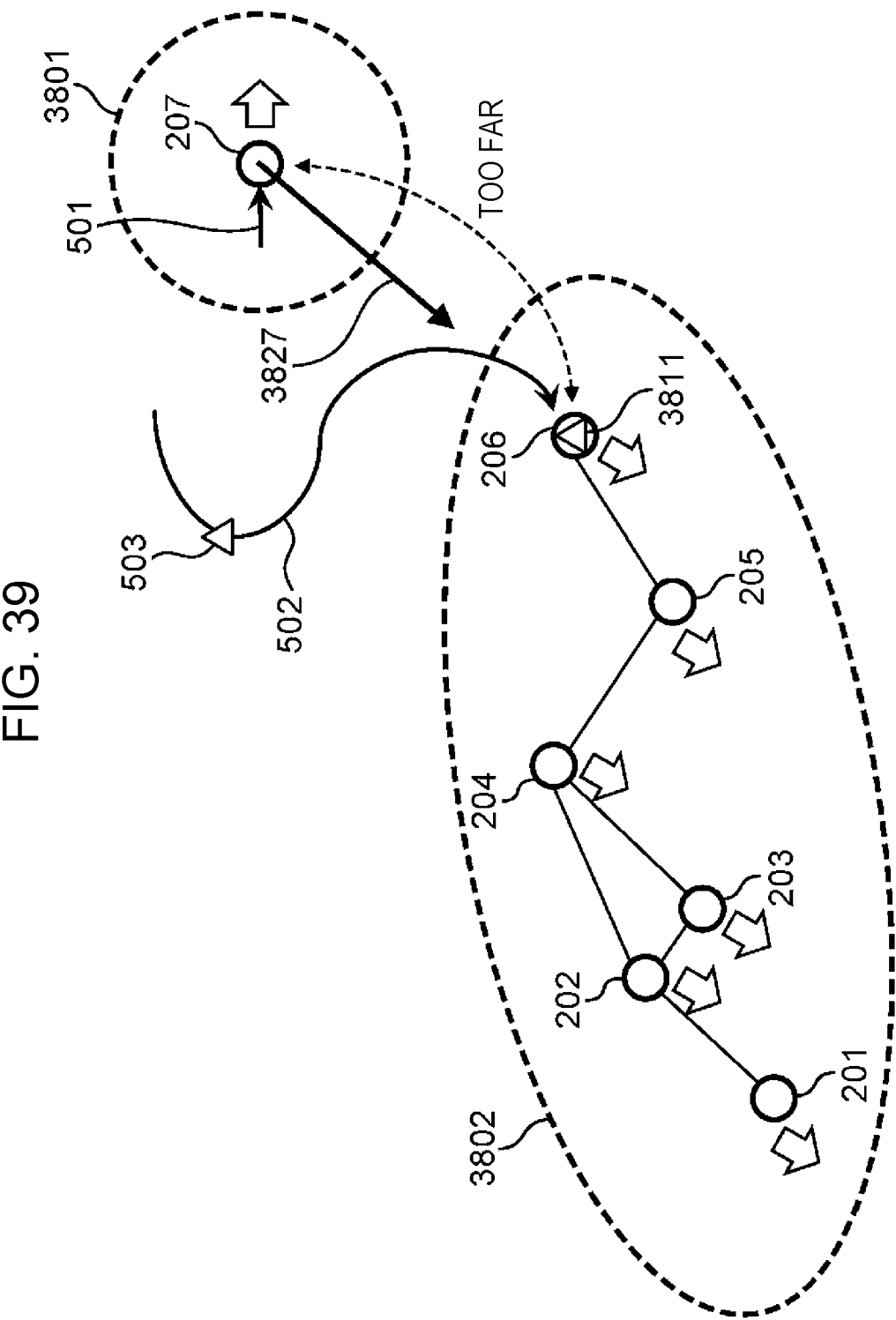
FIG. 39 is a conceptual diagram illustrating an example of a communication restoration vector that is decided on by a mobile object in the situation illustrated in FIG. 4 in the second embodiment of the present disclosure.

FIG. 39 is a conceptual diagram illustrating an example of a communication restoration vector that is decided on by the mobile object 207 in the situation illustrated in FIG. 4 in the second embodiment of the present disclosure. In FIG. 39, the same elements as those in FIGS. 1 and 4 are denoted by the same reference numerals and the description thereof will not be given.

As illustrated in FIG. 39, for the mobile object 207, the mobile object belonging to a known group 3801 is the mobile object 207, and the mobile objects belonging to an unknown group 3802 are the mobile objects 201 to 206.

The control unit 602 of the mobile object 207 decides on a communication restoration vector 3827 having a direction toward a target position 3811 and having a magnitude that is a value inversely proportional to the cube of the distance from the target position 3811 to the own mobile object.

Figure 40:
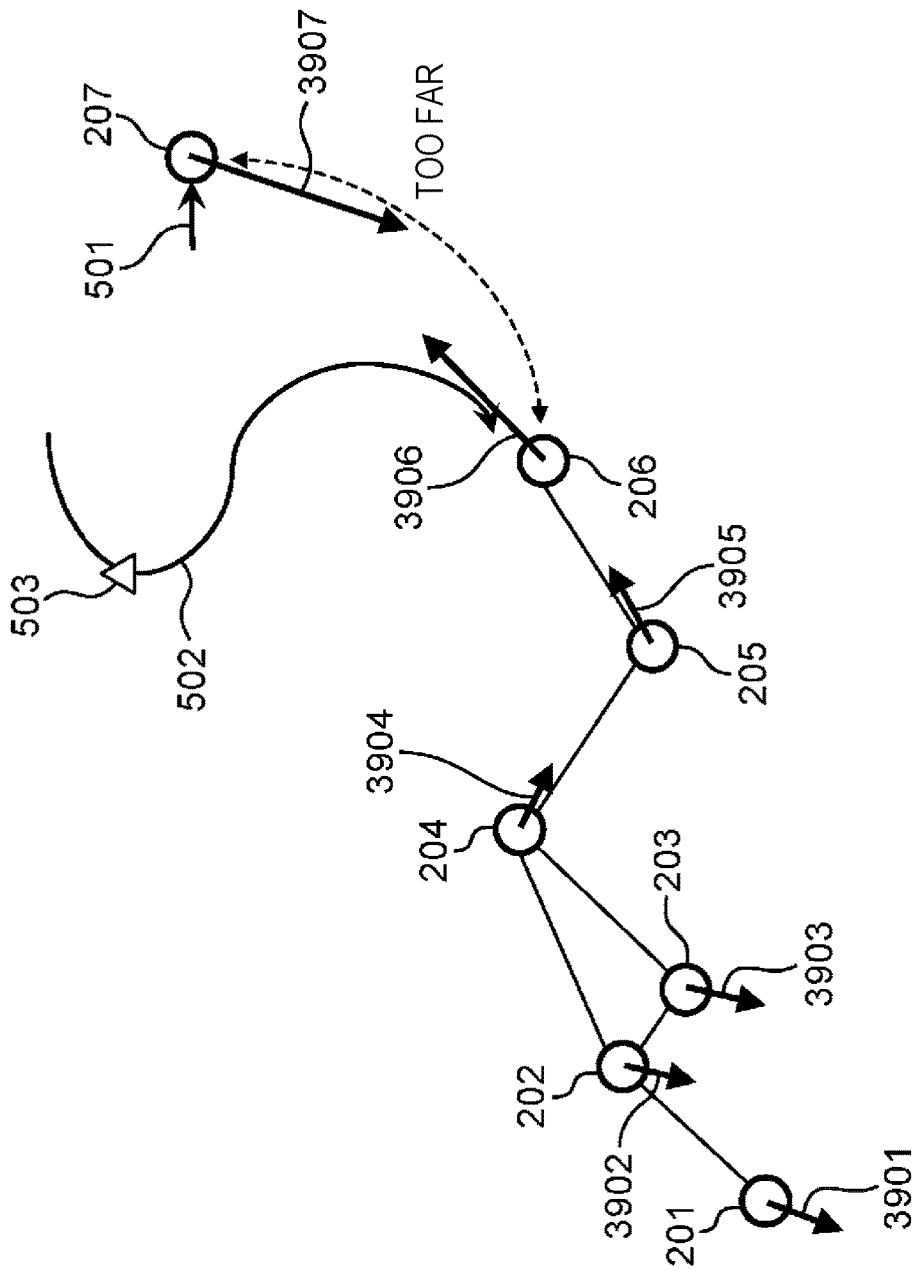
FIG. 40 is a conceptual diagram illustrating an example of actual movement vectors of mobile objects in the situation illustrated in FIG. 4 in the second embodiment of the present disclosure.

FIG. 40 is a conceptual diagram illustrating an example of actual movement vectors of the mobile objects 201 to 207 in the situation illustrated in FIG. 4 in the second embodiment of the present disclosure. In FIG. 40, the same elements as those in FIGS. 1 and 4 are denoted by the same reference numerals and the description thereof will not be given.

The mobile object 201 decides on a basic movement vector group for moving substantially south-southwestward, and if the mobile object 207 does not become too far from another mobile object and if there is no mobile object belonging to an unknown group, the mobile object 201 decides on an actual movement vector for moving substantially south-southwestward, as illustrated in FIG. 4. However, if the mobile object 207 becomes too far from another mobile object and if a mobile object belonging to an unknown group emerges, the mobile object 201 moves substantially south-southwestward in accordance with an actual movement vector 3901, which is calculated on the basis of the communication restoration vector 3721 in addition to the basic movement vector group, as illustrated in FIG. 40. The mobile object 201 is farther from the target position 3711 than the mobile objects 202 to 206 are, and is thus capable of substantially implementing an original purpose although it has some ratio of a movement for attempting to restore communication.

The mobile object 202 decides on a basic movement vector group for moving substantially south-southwestward, and if the mobile object 207 does not become too far from another mobile object and if there is no mobile object belonging to an unknown group, the mobile object 202 decides on an actual movement vector for moving substantially south-southwestward, as illustrated in FIG. 4. However, if the mobile object 207 becomes too far from another mobile object and if a mobile object belonging to an unknown group emerges, the mobile object 202 moves substantially south-southwestward in accordance with an actual movement vector 3902, which is calculated on the basis of the communication restoration vector 3722 in addition to the basic movement vector group, as illustrated in FIG. 40. The mobile object 202 is nearer to the target position 3711 than the mobile object 201 is, and is thus capable of implementing an original purpose although it has a larger ratio of a movement for attempting to restore communication than the mobile object 201.

The mobile object 203 decides on a basic movement vector group for moving substantially south-southwestward, and if the mobile object 207 does not become too far from another mobile object and if there is no mobile object belonging to an unknown group, the mobile object 203 decides on an actual movement vector for moving substantially south-southwestward, as illustrated in FIG. 4. However, if the mobile object 207 becomes too far from another mobile object and if a mobile object belonging to an unknown group emerges, the mobile object 203 moves substantially south-southwestward in accordance with an actual movement vector 3903, which is calculated on the basis of the communication restoration vector 3723 in addition to the basic movement vector group, as illustrated in FIG. 40. The mobile object 203 is nearer to the target position 3711 than the mobile object 202 is, and is thus capable of implementing an original purpose although it has a larger ratio of a movement for attempting to restore communication than the mobile object 202.

The mobile object 204 decides on a basic movement vector group for moving substantially south-southwestward, and if the mobile object 207 does not become too far from another mobile object and if there is no mobile object belonging to an unknown group, the mobile object 204 decides on an actual movement vector for moving substantially south-southwestward, as illustrated in FIG. 4. However, if the mobile object 207 becomes too far from another mobile object and if a mobile object belonging to an unknown group emerges, the mobile object 204 moves substantially east-southeastward in accordance with an actual movement vector 3904, which is calculated on the basis of the communication restoration vector 3724 in addition to the basic movement vector group, as illustrated in FIG. 40. The mobile object 204 is farther from the target position 3711 than the mobile object 205 is, and thus attempts to restore communication although it has a smaller ratio of a movement for attempting to restore communication than the mobile object 205.

The mobile object 205 decides on a basic movement vector group for moving substantially south-southwestward, and if the mobile object 207 does not become too far from another mobile object and if there is no mobile object belonging to an unknown group, the mobile object 205 decides on an actual movement vector for moving substantially south-southwestward, as illustrated in FIG. 4. However, if the mobile object 207 becomes too far from another mobile object and if a mobile object belonging to an unknown group emerges, the mobile object 205 moves substantially northeastward in accordance with an actual movement vector 3905, which is calculated on the basis of the communication restoration vector 3725 in addition to the basic movement vector group, as illustrated in FIG. 40. The mobile object 205 is farther from the target position 3711 than the mobile object 206 is, and thus attempts to restore communication although it has a smaller ratio of a movement for attempting to restore communication than the mobile object 206.

The mobile object 206 decides on a basic movement vector group for moving substantially south-southwestward, and if the mobile object 207 does not become too far from another mobile object and if there is no mobile object belonging to an unknown group, the mobile object 206 decides on an actual movement vector for moving substantially south-southwestward, as illustrated in FIG. 4. However, if the mobile object 207 becomes too far from another mobile object and if a mobile object belonging to an unknown group emerges, the mobile object 206 moves substantially northeastward in accordance with an actual movement vector 3906, which is calculated on the basis of the communication restoration vector 3726 in addition to the basic movement vector group, so as to mainly attempt to restore communication, as illustrated in FIG. 40.

The mobile object 207 decides on a basic movement vector group for moving substantially eastward, and if the mobile object 207 does not become too far from another mobile object and if there is no mobile object belonging to an unknown group, the mobile object 207 decides on an actual movement vector for moving substantially eastward, as illustrated in FIG. 4. However, if the mobile object 207 becomes too far from another mobile object and if a mobile object belonging to an unknown group emerges, the mobile object 207 moves substantially south-southwestward in accordance with an actual movement vector 3907, which is calculated on the basis of the communication restoration vector 3827 in addition to the basic movement vector group, so as to mainly attempt to restore communication, as illustrated in FIG. 40.

In this way, the mobile objects 204 to 207 mainly perform a communication restoration operation whereas the mobile objects 201 to 203 move in the same manner as in a case where there is no unknown group, and accordingly both restoration of communication and an original purpose can be achieved by the entire component group. The movement velocity of each of the mobile objects 201 to 206 is decided on in accordance with a communication restoration vector that has a value inversely proportional to the cube of the distance from the target position 3711 to the mobile object. The distance from the target position 3711 decreases in the order of the mobile object 201, the mobile object 202, the mobile object 203, the mobile object 204, the mobile object 205, and the mobile object 206.

Thus, the mobile object 201 is capable of moving mainly for an original purpose. The mobile object 202 moves for an original purpose although it has a larger ratio of a movement for attempting to restore communication than the mobile object 201. The mobile object 203 moves for an original purpose although it has a larger ratio of a movement for attempting to restore communication than the mobile object 202. The mobile object 204 moves toward a position where restoration of communication is expected at a velocity lower than that of the mobile object 205. The mobile object 205 moves toward a position where restoration of communication is expected at a velocity lower than that of the mobile object 206. The mobile object 206 moves toward a position where restoration of communication is expected at a velocity higher than that of the mobile object 205, and mainly performs a communication restoration operation.

Accordingly, a relative velocity at which the mobile objects 201 to 206 get away from each other can be suppressed to a small value, and thus the direct communications between the mobile objects 201 and 202, between the mobile objects 202 and 203, between the mobile objects 202 and 204, between the mobile objects 203 and 204, between the mobile objects 204 and 205, and between the mobile objects 205 and 206 are unlikely to be immediately cut off.

The second technique disclosed in PTL 1 has an issue that all mobile objects are incapable of moving for an original purpose until communication is restored. In contrast, in the second embodiment of the present disclosure, the mobile objects 201 to 203 are capable of moving for an original purpose in the example illustrated in FIG. 40, for example, and the foregoing issue can be overcome.

The third technique disclosed in PTL 1 has an issue that a region over which a mobile object group is deployed gradually becomes smaller and all mobile objects are incapable of moving for an original purpose until communication is restored. Furthermore, after the communication is restored, the mobile objects need to move again for the original purpose from the positions at the point of time when the communication is restored. In contrast, in the second embodiment of the present disclosure, the mobile objects 201 to 203 are capable of moving for an original purpose in the example illustrated in FIG. 40, for example, and the foregoing issue can be overcome.

The fourth technique disclosed in PTL 1 has an issue that, if a selected mobile object moves toward a cutoff position, the communication between the selected mobile object and a mobile object other than a mobile object disconnected from the ad hoc network is cut off, and accordingly the ad hoc network may be secondarily fractured. In contrast, in the second embodiment of the present disclosure, the mobile objects 204 to 207 move to get together to attempt to restore communication, and the mobile objects 201 to 203, which are far from the target position 3711, are capable of moving for an original purpose, in the example illustrated in FIG. 40, for example. The movement velocity of each of the mobile objects 201 to 206 is decided on in accordance with a communication restoration vector that has a value inversely proportional to the cube of the distance from the target position 3711 to the mobile object. The distance from the target position 3711 decreases in the order of the mobile object 201, the mobile object 202, the mobile object 203, the mobile object 204, the mobile object 205, and the mobile object 206.

Thus, the mobile object 201 is capable of moving mainly for an original purpose. The mobile object 202 moves for an original purpose although it has a larger ratio of a movement for attempting to restore communication than the mobile object 201. The mobile object 203 moves for an original purpose although it has a larger ratio of a movement for attempting to restore communication than the mobile object 202. The mobile object 204 moves toward a position where restoration of communication is expected at a velocity lower than that of the mobile object 205. The mobile object 205 moves toward a position where restoration of communication is expected at a velocity lower than that of the mobile object 206. The mobile object 206 moves toward a position where restoration of communication is expected at a velocity higher than that of the mobile object 205, and mainly performs a communication restoration operation.

Accordingly, a relative velocity at which the mobile objects 201 to 206 get away from each other can be suppressed to a small value, and thus the direct communications between the mobile objects 201 and 202, between the mobile objects 202 and 203, between the mobile objects 202 and 204, between the mobile objects 203 and 204, between the mobile objects 204 and 205, and between the mobile objects 205 and 206 are unlikely to be immediately cut off. Therefore, it can be understood that the issue of the fourth technique disclosed in PTL 1 is overcome.

In the second embodiment of the present disclosure, a target position is decided on in step S1006 every time before a communication restoration vector is decided on in step S2807, as long as there is a mobile object belonging to an unknown group. Alternatively, in a second configuration of the second embodiment, a target position may be decided on only if a mobile object belonging to the unknown group is changed.

In the second configuration of the second embodiment, a target position is decided on only if a mobile object belonging to the unknown group is changed, and thus the processing efficiency can be enhanced.

In the second embodiment of the present disclosure, it is determined in step S1004 whether or not there is a mobile object belonging to an unknown group, and if there is a mobile object belonging to an unknown group, steps S1005 to S2807 are performed to decide on a communication restoration vector having a magnitude that is not 0. Alternatively, in a third configuration of the second embodiment, the time when step S1005 is performed for the first time may be stored, and if a restoration period longer than 0 elapses from the time, the magnitude of the communication restoration vector may be set to 0 (step S1010) and the process may proceed to step S1008 without performing steps S1005 to S2807 even if there is a mobile object belonging to the unknown group. The value of the restoration period may be a constant or may be a value that is dynamically decided on when an actual process is performed.

In the third configuration of the second embodiment, if restoration of communication is not completed within the restoration period, the operation for restoration is stopped. Thus, a situation can be prevented from occurring where a communication restoration operation is endlessly performed.

In the third configuration of the second embodiment, the time when step S1005 is performed for the first time may be reset at an appropriate timing after the restoration period elapses, so that the process in steps S1005 to S2807 can be performed again. The appropriate timing may be, for example, when a mobile object belonging to the unknown group is changed or when a predetermined period further elapses (a fourth configuration of the second embodiment).

In the fourth configuration of the second embodiment, if a predetermined condition is satisfied after the restoration period elapses, the communication restoration operation can be retried.

In the second embodiment of the present disclosure, it is determined in step S1004 whether or not there is a mobile object belonging to an unknown group, and if there is a mobile object belonging to an unknown group, steps S1005 to S2807 are performed to decide on a communication restoration vector having a magnitude that is not 0. In a fifth configuration of the second embodiment, if a mobile object reaches a position where the distance to a target position is equal to or less than a movement stop determination distance, the magnitude of the communication restoration vector may be set to 0 (step S1010) and the process may proceed to step S1008 without performing steps S1005 to S2807, even if there is a mobile object belonging to an unknown group. The value of the movement stop determination distance may be a constant or may be a value that is dynamically decided on when an actual process is performed.

In the fifth configuration of the second embodiment, if restoration of communication is not completed even if the mobile object reaches the position where the distance to the target position is equal to or less than the movement stop determination distance, the operation for restoration is stopped. Thus, a situation can be prevented from occurring where a communication restoration operation is endlessly performed.

In the fifth configuration of the second embodiment, after the mobile object reaches the position where the distance to the target position is equal to or less than the movement stop determination distance, the magnitude of the communication restoration vector may be set to 0 (step S1010) and the process may proceed to step S1008 without performing steps S1005 to S2807, until a mobile object belonging to the unknown group is changed (a sixth configuration of the second embodiment).

In the sixth configuration of the second embodiment, if the mobile object reaches the position where the distance to the target position is equal to or less than the movement stop determination distance and then moves away to a position where the distance to the target position exceeds the movement stop determination distance, a communication restoration operation may be started again, so that a situation can be prevented from occurring where a communication restoration operation and a movement for an original purpose are alternately repeated.

In the second embodiment of the present disclosure, it is determined in step S1004 whether or not there is a mobile object belonging to an unknown group, and if there is a mobile object belonging to an unknown group, steps S1005 to S2807 are performed to decide on a communication restoration vector having a magnitude that is not 0. In a seventh configuration of the second embodiment, a second movement stop determination distance is calculated by multiplying the distance from a specific position to a target position by a movement stop determination coefficient. If the mobile object reaches a position where the distance to the target position is equal to or less than the second movement stop determination distance, the magnitude of the communication restoration vector may be set to 0 (step S1010) and the process may proceed to step S1008 without performing steps S1005 to S2807, even if there is a mobile object belonging to the unknown group. The value of the second movement stop determination coefficient may be a constant or may be a value that is dynamically decided on when an actual process is performed.

In the seventh configuration of the second embodiment, if restoration of communication is not completed even if the mobile object reaches the position where the distance to the target position is equal to or less than the second movement stop determination distance, the operation for restoration is stopped. Thus, a situation can be prevented from occurring where a communication restoration operation is endlessly performed.

In the seventh configuration of the second embodiment, after the mobile object reaches the position where the distance to the target position is equal to or less than the second movement stop determination distance, the magnitude of the communication restoration vector may be set to 0 (step S1010) and the process may proceed to step S1008 without performing steps S1005 to S2807, until a mobile object belonging to the unknown group is changed (an eighth configuration of the second embodiment).

In the eighth configuration of the second embodiment, if the mobile object reaches the position where the distance to the target position is equal to or less than the second movement stop determination distance and then moves away to a position where the distance to the target position exceeds the second movement stop determination distance, a communication restoration operation may be started again, so that a situation can be prevented from occurring where a communication restoration operation and a movement for an original purpose are alternately repeated.

In the second embodiment of the present disclosure, it is determined in step S1004 whether or not there is a mobile object belonging to an unknown group, and if there is a mobile object belonging to an unknown group, steps S1005 to S2807 are performed to decide on a communication restoration vector having a magnitude that is not 0. In a ninth configuration of the second embodiment, when the mobile object reaches the target position, the magnitude of the communication restoration vector may be set to 0 (step S1010) and the process may proceed to step S1008 without performing steps S1005 to S2807, even if there is a mobile object belonging to the unknown group.

In the ninth configuration of the second embodiment, if restoration of communication is not completed even if the mobile object reaches the target position, the operation for restoration is stopped. Thus, a situation can be prevented from occurring where a communication restoration operation is endlessly performed.

In the ninth configuration of the second embodiment, after the mobile object reaches the target position, the magnitude of the communication restoration vector may be set to 0 (step S1010) and the process may proceed to step S1008 without performing steps S1005 to S2807, until a mobile object belonging to the unknown group is changed (a tenth configuration of the second embodiment).

In the tenth configuration of the second embodiment, if the mobile object reaches the target position and then moves away from the target position, a communication restoration operation may be started again, so that a situation can be prevented from occurring where a communication restoration operation and a movement for an original purpose are alternately repeated.

In the third to tenth configurations of the second embodiment of the present disclosure, at the time of performing step S1004, in order to stop a communication restoration operation when the conditions described above regarding the individual configurations are satisfied, the magnitude of the communication restoration vector may be set to 0 (step S1010), and when the process proceeds to step S1008 without performing steps S1005 to S2807, the mobile objects belonging to the known group may be specified again as a component group, thereby dividing the ad hoc network (an eleventh configuration of the second embodiment).

In the eleventh configuration of the second embodiment, each mobile object belonging to the known group is capable of avoiding endless repetition of stop and restart of a communication restoration operation by restarting the communication restoration operation for the unknown group for which restoration of communication has failed.

In the third to tenth configurations of the second embodiment of the present disclosure, at the time of performing step S1004, in order to stop a communication restoration operation when the conditions described above regarding the individual configurations are satisfied, the magnitude of the communication restoration vector may be set to 0 (step S1010), and when the process proceeds to step S1008 without performing steps S1005 to S2807, a division notification indicating that the ad hoc network is to be divided may be transmitted to all the mobile objects belonging to the known group other than the own mobile object (a twelfth configuration of the second embodiment). When a division notification is received from another mobile object, the magnitude of the communication restoration vector may be set to 0 (step S1010), and the process may proceed to step S1008 without performing steps S1005 to S2807 even if there is a mobile object belonging to the unknown group in step S1004. Accordingly, the communication restoration operation is stopped and the mobile objects belonging to the known group at the time are specified again as a component group, thereby dividing the ad hoc network.

In the twelfth configuration of the second embodiment, each mobile object belonging to the known group is capable of specifying the same component group and is also capable of avoiding endless repetition of stop and restart of a communication restoration operation by restarting the communication restoration operation for the unknown group for which restoration of communication has failed.

In the third to tenth configurations of the second embodiment of the present disclosure, at the time of performing step S1004, in order to stop a communication restoration operation when the conditions described above regarding the individual configurations are satisfied, the magnitude of the communication restoration vector may be set to 0 (step S1010), and when the process proceeds to step S1008 without performing steps S1005 to S2807, known group information specifying the mobile objects belonging to the known group may be transmitted to all the mobile objects belonging to the known group other than the own mobile object (a thirteenth configuration of the second embodiment). When known group information is received from another mobile object, the magnitude of the communication restoration vector may be set to 0 (step S1010), and the process may proceed to step S1008 without performing steps S1005 to S2807 even if there is a mobile object belonging to the unknown group in step S1004. Accordingly, the communication restoration operation is stopped and the mobile objects specified by the known group information are specified again as a component group, thereby dividing the ad hoc network.

In the thirteenth configuration of the second embodiment, each mobile object belonging to the known group is capable of reliably specifying the same component group without being affected by a time lag in communication and is also capable of avoiding endless repetition of stop and restart of a communication restoration operation by restarting the communication restoration operation for the unknown group for which restoration of communication has failed.

Third Embodiment

The conceptual diagram illustrating an overall ad hoc network formed of a plurality of mobile objects according to a third embodiment of the present disclosure is the same as FIG. 6, and thus the description thereof will not be given.

The block diagram illustrating the functional configuration of the mobile object 101 according to the third embodiment of the present disclosure is the same as FIG. 8, and thus the description thereof will not be given. However, the details of the information stored in the storage unit 603 are different from those in FIGS. 9, 10, and 11, and thus will be described with reference to FIGS. 41, 42, and 43.

Figure 41:
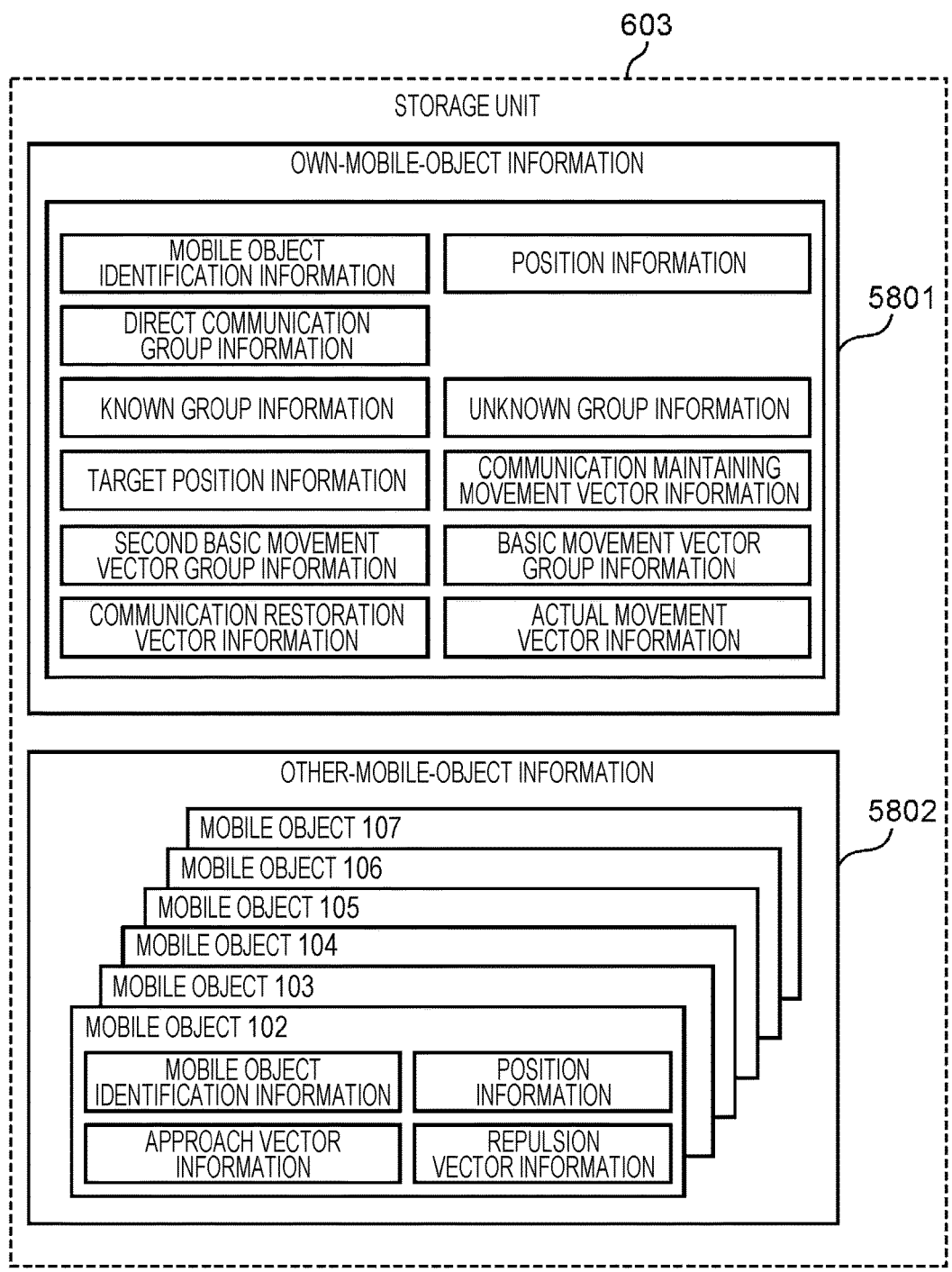
FIG. 41 is a diagram illustrating an example of information stored in the storage unit of the mobile object according to a third embodiment of the present disclosure.

FIG. 41 is a diagram illustrating an example of the information stored in the storage unit 603 of the mobile object 101 according to the third embodiment of the present disclosure. In FIG. 41, the same elements as those in FIGS. 6 and 8 are denoted by the same reference numerals and the description thereof will not be given.

The storage unit 603 stores own-mobile-object information 5801, which is information about the mobile object 101, and other-mobile-object information 5802, which is information about one or more other mobile objects.

The own-mobile-object information 5801 includes mobile object identification information for uniquely identifying the own mobile object; position information indicating the position of the own mobile object, which is detected by the position detection unit 604; direct communication group information including mobile object identification information of one or more other mobile objects belonging to a direct communication group that the own mobile object is capable of directly communicating with; known group information including mobile object identification information of the own mobile object and one or more other mobile objects that the own mobile object is capable of communicating with through an ad hoc network; unknown group information including mobile object identification information of one or more other mobile objects that the own mobile object is incapable of communicating with through the ad hoc network; target position information, which is position information indicating a target position to which the own mobile object moves to restore communication if there is an unknown group; communication maintaining movement vector information, which is information about a communication maintaining movement vector indicating a movement vector for maintaining direct communication with some or all of mobile objects included in a direct communication group; second basic movement vector group information, which is information about a second basic movement vector group including one or more movement vectors for controlling a movement if direct communication is not maintained; basic movement vector group information, which is information about a basic movement vector group including one or more movement vectors for controlling a movement if there is no unknown group; communication restoration vector information, which is information about a communication restoration vector indicating a movement vector for moving toward a target position; and actual movement vector information, which is information about an actual movement vector defining an actual movement.

The other-mobile-object information 5802 includes mobile object identification information for uniquely identifying one or more other mobile objects; position information indicating the positions of the one or more other mobile objects; approach vector information, which is information about an approach vector that is decided on for each of one or more mobile objects belonging to a direct communication group and that indicates a movement vector for moving toward the mobile object; and repulsion vector information, which is information about a repulsion vector that is decided on for each of one or more mobile objects belonging to a direct communication group and that indicates a movement vector for moving to get away from the mobile object.

The communication unit 601 further receives, from a second communication-partner mobile object (for example, the mobile object 102) that is different from the mobile object 101 and the first communication-partner mobile object (for example, the mobile object 105) and forms the network together with the mobile object 101, second information indicating any one of a second position, a second velocity, and a second acceleration of the mobile object 102. On the basis of the second information, the control unit 602 decides on a fourth control amount (second basic movement vector group information) corresponding to any one of a set of a fourth movement distance and a fourth movement direction, a set of a fourth velocity absolute value and a fourth velocity direction, or a set of a fourth acceleration absolute value and a fourth acceleration direction. The control unit 602 updates the first control amount (basic movement vector group information) on the basis of the fourth control amount. The control unit 602 decides on the fourth control amount (second basic movement vector group information) on the basis of a distance calculated from the current position of the mobile object 101 and the second position of the second communication-partner mobile object (for example, the mobile object 102).

FIG. 42 is a diagram illustrating an example of the own-mobile-object information 5801 stored in the storage unit 603 of the mobile object 101 according to the third embodiment of the present disclosure. In FIG. 42, the same elements as those in FIGS. 6 and 41 are denoted by the same reference numerals and the description thereof will not be given. In FIG. 42, the description will not be given of the same information as that included in the own-mobile-object information 701 illustrated in FIG. 10.

In the mobile object 101, the storage unit 603 stores the own-mobile-object information 5801 in the form illustrated in FIG. 42, for example. The own-mobile-object information 5801 includes mobile object identification information for uniquely identifying the own mobile object; position information indicating the position of the own mobile object, which is detected by the position detection unit 604; direct communication group information including mobile object identification information of one or more other mobile objects belonging to a direct communication group that the own mobile object is capable of directly communicating with; known group information including mobile object identification information of the own mobile object and one or more other mobile objects that the own mobile object is capable of communicating with through an ad hoc network; unknown group information including mobile object identification information of one or more other mobile objects that the own mobile object is incapable of communicating with through the ad hoc network; target position information, which is position information indicating a target position to which the own mobile object moves to restore communication if there is an unknown group; communication maintaining movement vector information, which is information about a communication maintaining movement vector indicating a movement vector for maintaining direct communication with some or all of mobile objects included in a direct communication group; second basic movement vector group information, which is information about a second basic movement vector group including one or more movement vectors for controlling a movement if direct communication is not maintained; basic movement vector group information, which is information about a basic movement vector group including one or more movement vectors for controlling a movement if there is no unknown group; communication restoration vector information, which is information about a communication restoration vector indicating a movement vector for moving toward a target position; and actual movement vector information, which is information about an actual movement vector defining an actual movement.

The own-mobile-object information 5801 illustrated in FIG. 42 indicates that the value of the own mobile object identification information is "mobile object 101", the value of the own position information is "34° 41'37.0" north latitude, 135° 30'7.1" east longitude, 2 m above sea level", the value of the known group information is "mobile object 101, mobile object 102, mobile object 103, and mobile object 104", the value of the unknown group information is "mobile object 105, mobile object 106, and mobile object 107", the value of the target position information is "34° 41'37.6" north latitude, 135° 30'9.1" east longitude, 2 m above sea level", the value of the communication maintaining movement vector information is "(1 m/s, 1 m/s, 0 m/s)", the value of the second main basic movement vector information in the second basic movement vector group information is "(−5 m/s, −2 m/s, 0 m/s)", the value of the second obstacle avoidance basic movement vector information in the second basic movement vector group information is "(0 m/s, 5 m/s, 0 m/s)", the value of the main basic movement vector information in the basic movement vector group information is "(−4.5 m/s, −1.5 m/s, 0 m/s)", the value of the obstacle avoidance basic movement vector information in the basic movement vector group information is "(0.5 m/s, 5.5 m/s, 0 m/s)", the value of the communication restoration vector information is "(0 m/s, 0 m/s, 0 m/s)", and the value of the actual movement vector information is "(−1.75 m/s, 4.75 m/s, 0 m/s)".

In FIG. 42, the second basic movement vector group information is represented by a set of second main basic movement vector information and second obstacle avoidance basic movement vector information. That is, a second basic movement vector group is a set of a second main basic movement vector and a second obstacle avoidance basic movement vector. Here, the second main basic movement vector is a movement vector representing a movement of a mobile object for achieving an original purpose in the case of not making an attempt to maintain direct communication. The second obstacle avoidance basic movement vector is a movement vector representing a movement of a mobile object for avoiding an obstacle near the mobile object in the case of not making an attempt to maintain direct communication. The number of movement vectors included in the second basic movement vector group and the movements represented by the movement vectors have variations, which is not related to the gist of the present disclosure. In this specification, unless otherwise noted, a second basic movement vector group is a set of a second main basic movement vector and a second obstacle avoidance basic movement vector described herein.

FIG. 43 is a diagram illustrating an example of the other-mobile-object information 5802 stored in the storage unit 603 of the mobile object 101 according to the third embodiment of the present disclosure. In FIG. 43, the same elements as those in FIGS. 6 and 41 are denoted by the same reference numerals and the description thereof will not be given. Also, in FIG. 43, the same information as that included in the other-mobile-object information 702 illustrated in FIG. 11 will not be described.

In the mobile object 101, the storage unit 603 stores the other-mobile-object information 5802 in the form illustrated in FIG. 43, for example. The other-mobile-object information 5802 includes mobile object identification information for uniquely identifying one or more other mobile objects; position information indicating the positions of the one or more other mobile objects and received from the one or more other mobile objects; approach vector information, which is information about an approach vector that is decided on for each of one or more mobile objects belonging to a direct communication group and that indicates a movement vector for moving toward the mobile object; and repulsion vector information, which is information about a repulsion vector that is decided on for each of one or more mobile objects belonging to a direct communication group and that indicates a movement vector for moving to get away from the mobile object.

The other-mobile-object information 5802 illustrated in FIG. 43 indicates that the value of the mobile object identification information of the mobile object 102 is "mobile object 102", the value of the position information of the mobile object 102 is "34° 41'37.5" north latitude, 135° 30'7.6" east longitude, 2 m above sea level", the value of the approach vector information is "the number of approach vectors is 1 and the value of the approach vector is (3 m/s, 3 m/s, 0 m/s)", and the value of the repulsion vector information is "the number of repulsion vectors is 1 and the value of the repulsion vector is (−2 m/s, −2 m/s, 0 m/s)". The same applies to the mobile object identification information, position information, approach vector information, and repulsion vector information of the mobile objects 103 to 107.

Figure 44:
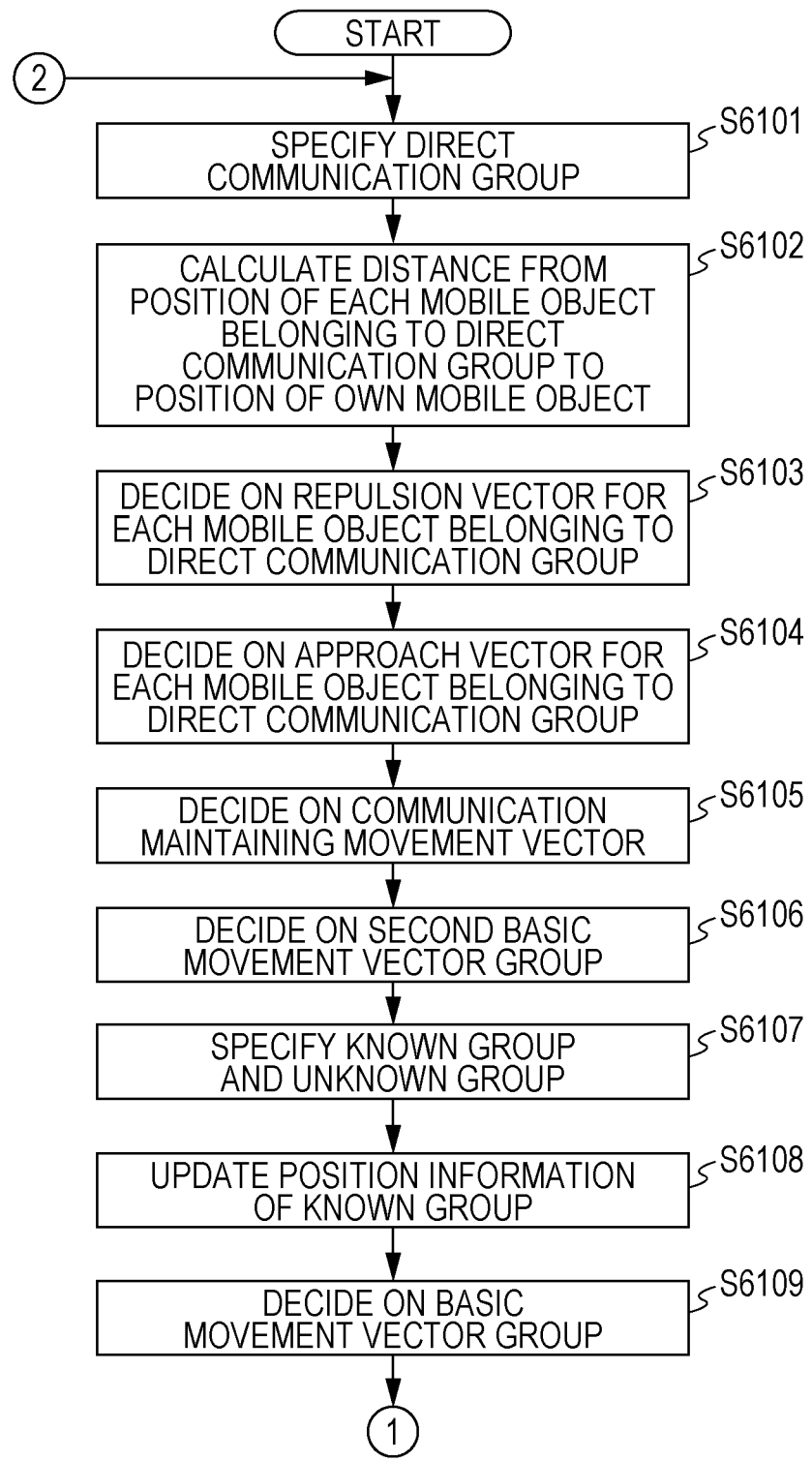
FIG. 44 is a first flowchart illustrating an overall operation of movement control of the mobile object according to the third embodiment of the present disclosure.
Figure 45:
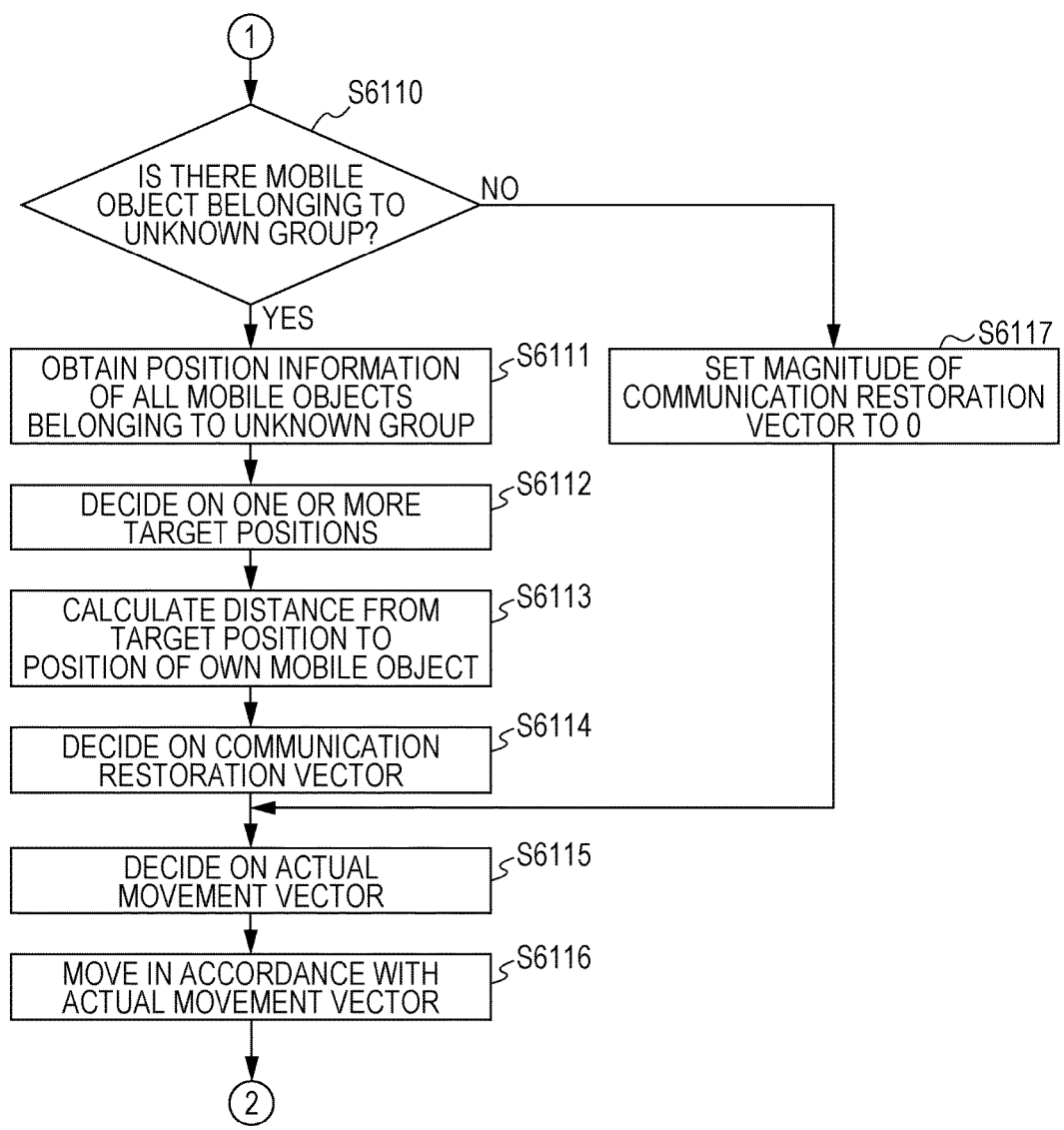
FIG. 45 is a second flowchart illustrating the overall operation of movement control of the mobile object according to the third embodiment of the present disclosure.

FIG. 44 is a first flowchart illustrating an overall operation of movement control of the mobile object 101 according to the third embodiment of the present disclosure. FIG. 45 is a second flowchart illustrating the overall operation of movement control of the mobile object 101 according to the third embodiment of the present disclosure.

The operations performed in steps S6101 to S6109 are the same regardless of whether there is a mobile object belonging to an unknown group. Thus, a description will be given below under the assumption that the mobile object 105 fails, unless otherwise noted.

The conceptual diagram of an example of a basic movement vector group is the same as FIG. 13, and thus the description thereof will not be given.

The conceptual diagram illustrating a known group and an unknown group in each of the mobile objects 101 to 104 in a case where the mobile object 105 fails is the same as FIG. 14, and thus the description thereof will not be given.

The conceptual diagram illustrating a known group and an unknown group in each of the mobile objects 106 and 107 in a case where the mobile object 105 fails is the same as FIG. 15, and thus the description thereof will not be given.

First, the control unit 602 of the mobile object 101 attempts to communicate with the mobile objects 102 to 107 and specifies, as a direct communication group, one or more of the mobile objects 102 to 107 with which direct communication has succeeded (step S6101). Subsequently, the control unit 602 updates the direct communication group information including the mobile object identification information of all the mobile objects belonging to the direct communication group in the own-mobile-object information 5801.

As illustrated in FIGS. 6, 13, 14, and 15, the mobile object 101 is capable of directly communicating with only the mobile object 102 in both cases where the mobile object 105 fails and where the mobile object 105 does not fail. Thus, the control unit 602 specifies only the mobile object 102 as a direct communication group and updates the direct communication group information in the own-mobile-object information 5801.

Subsequently, the control unit 602 of the mobile object 101 calculates the distance from the position of each mobile object belonging to the direct communication group to the position of the own mobile object (step S6102).

It is assumed that the mobile objects 105 to 107 are at the positions described in the other-mobile-object information 5802 illustrated in FIG. 43 at the point of time when the mobile object 105 fails.

Since only the mobile object 102 belongs to the direct communication group of the mobile object 101, the control unit 602 of the mobile object 101 calculates the distance from the position of the mobile object 102 to the position of the own mobile object. The distance between the mobile objects 101 and 102 is 19.9 m.

Subsequently, the control unit 602 of the mobile object 101 decides on a repulsion vector for each mobile object belonging to the direct communication group (step S6103).

Here, the control unit 602 decides on, for each mobile object belonging to the direct communication group, a movement vector as a repulsion vector having a predetermined magnitude and having a direction opposite to the direction toward the mobile object, regardless of the distance from the position of the mobile object to the own mobile object. It is assumed that the magnitude of the repulsion vector is 2.8 m/s.

Figure 46:
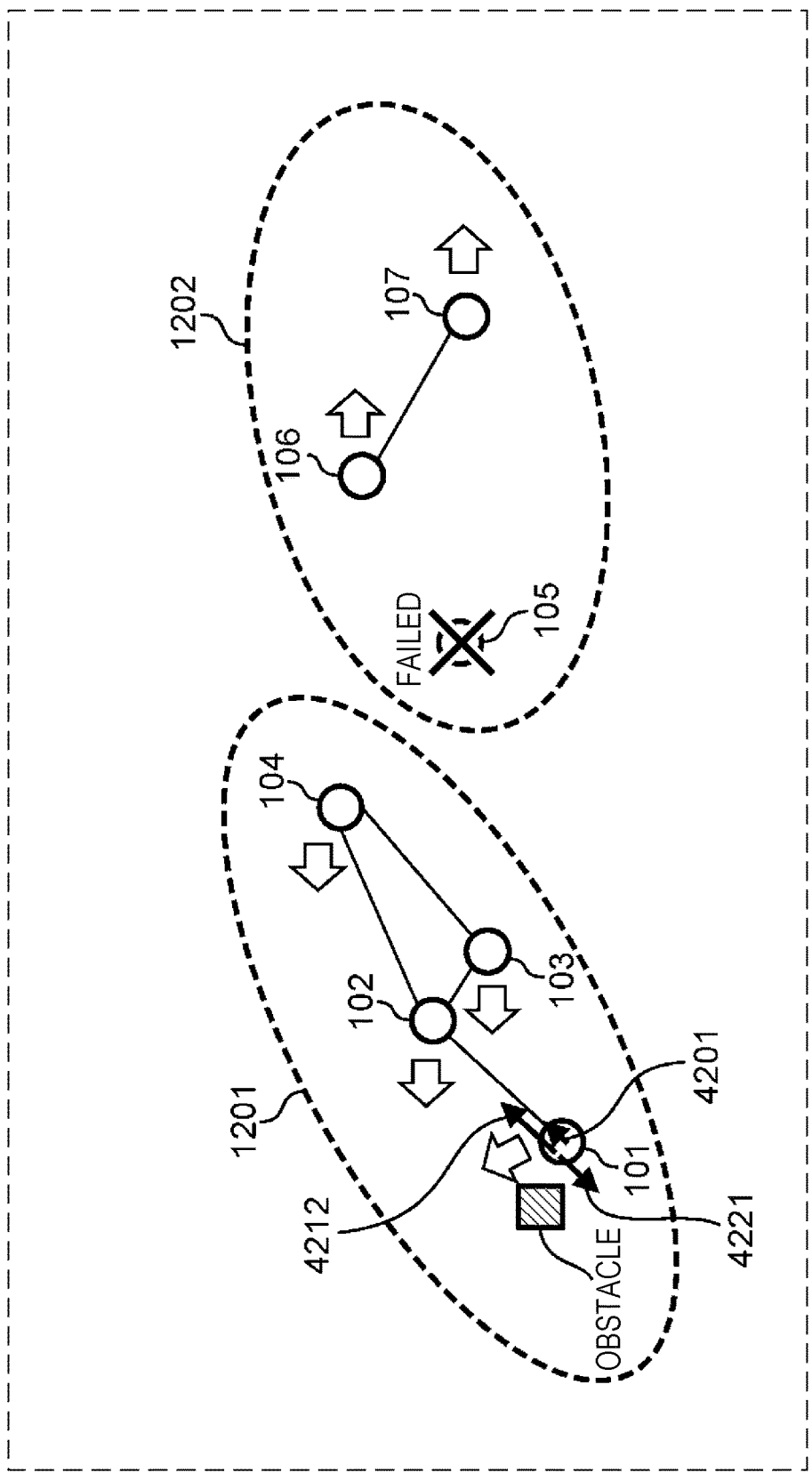
FIG. 46 is a conceptual diagram for describing a method for deciding on a repulsion vector, an approach vector, and a communication maintaining movement vector in a mobile object in a case where one mobile object fails in the third embodiment of the present disclosure.

FIG. 46 is a conceptual diagram for describing a method for deciding on a repulsion vector, an approach vector, and a communication maintaining movement vector in the mobile object 101 in a case where one mobile object (the mobile object 105) fails in the third embodiment of the present disclosure. In FIG. 46, the same elements as those in FIGS. 6 and 14 are denoted by the same reference numerals, and the description thereof will not be given.

As illustrated in FIG. 46, only the mobile object 102 belongs to the direct communication group of the mobile object 101. Thus, the control unit 602 of the mobile object 101 decides on, as a repulsion vector 4221 for the mobile object 102, a movement vector having a magnitude of 2.8 m/s and having a direction opposite to the direction toward the mobile object 102. In this case, the repulsion vector 4221 is (−2 m/s, −2 m/s, 0 m/s).

The repulsion vectors of the mobile objects 102 to 104, 106, and 107 are decided on similarly to the repulsion vector of the mobile object 101.

Figure 47:
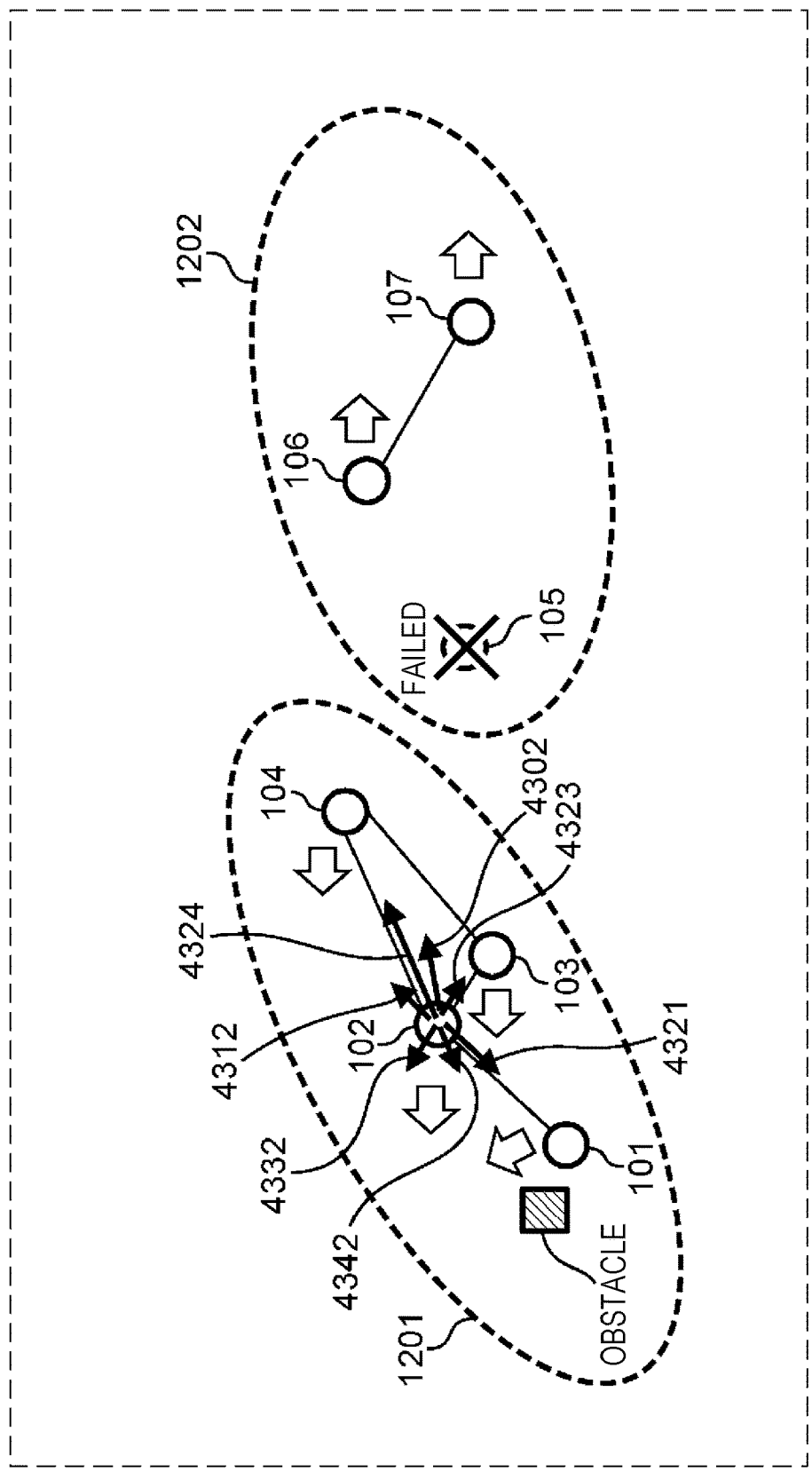
FIG. 47 is a conceptual diagram for describing a method for deciding on a repulsion vector, an approach vector, and a communication maintaining movement vector in a mobile object in a case where one mobile object fails in the third embodiment of the present disclosure.

FIG. 47 is a conceptual diagram for describing a method for deciding on a repulsion vector, an approach vector, and a communication maintaining movement vector in the mobile object 102 in a case where one mobile object (the mobile object 105) fails in the third embodiment of the present disclosure. In FIG. 47, the same elements as those in FIGS. 6 and 14 are denoted by the same reference numerals, and the description thereof will not be given.

As illustrated in FIG. 47, the mobile objects 101, 103, and 104 belong to the direct communication group of the mobile object 102. Thus, the control unit 602 of the mobile object 102 decides on, as a repulsion vector 4312 for the mobile object 101, a movement vector having a magnitude of 2.8 m/s and having a direction opposite to the direction toward the mobile object 101. The control unit 602 of the mobile object 102 decides on, as a repulsion vector 4332 for the mobile object 103, a movement vector having a magnitude of 2.8 m/s and having a direction opposite to the direction toward the mobile object 103. The control unit 602 of the mobile object 102 decides on, as a repulsion vector 4342 for the mobile object 104, a movement vector having a magnitude of 2.8 m/s and having a direction opposite to the direction toward the mobile object 104.

Figure 48:
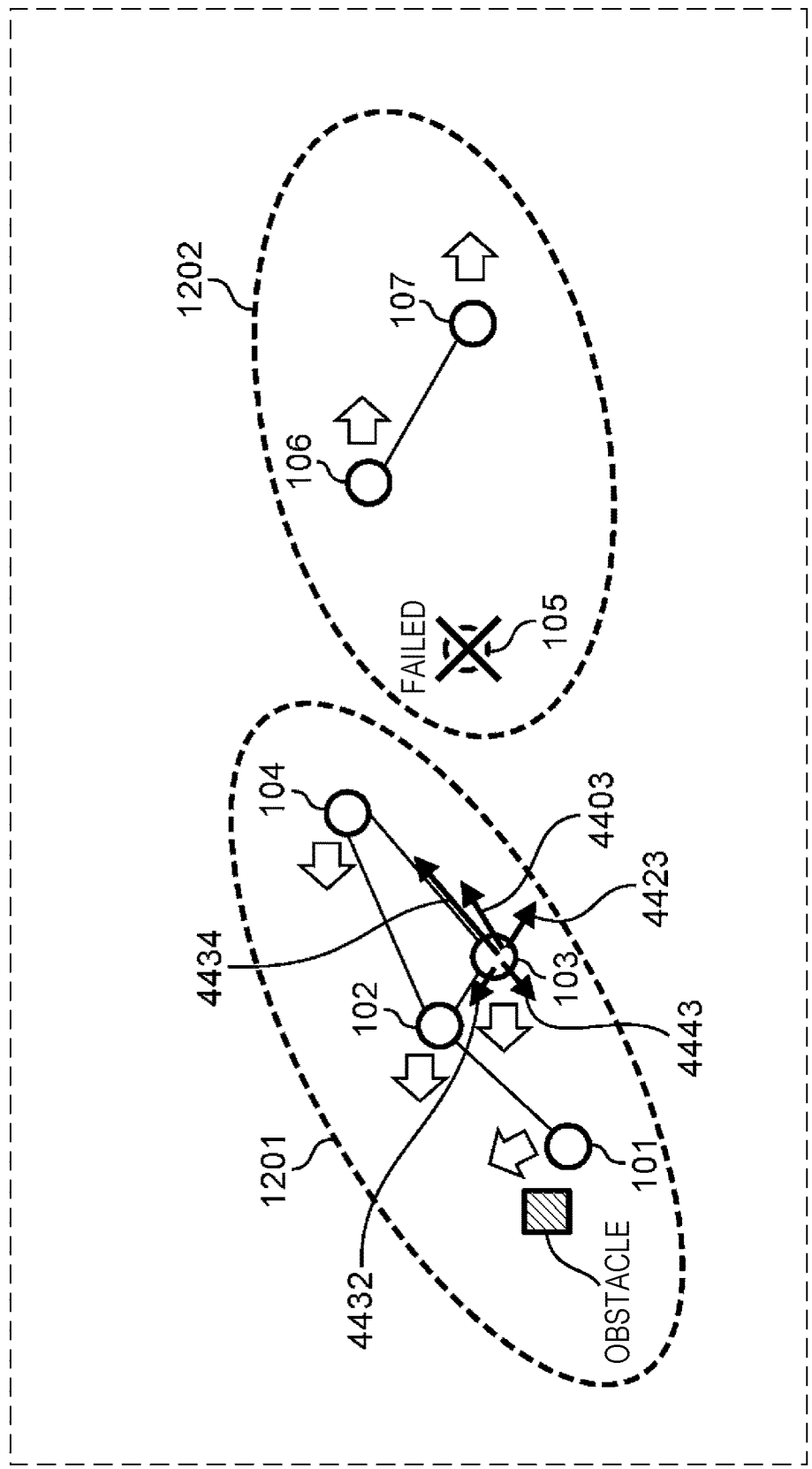
FIG. 48 is a conceptual diagram for describing a method for deciding on a repulsion vector, an approach vector, and a communication maintaining movement vector in a mobile object in a case where one mobile object fails in the third embodiment of the present disclosure.

FIG. 48 is a conceptual diagram for describing a method for deciding on a repulsion vector, an approach vector, and a communication maintaining movement vector in the mobile object 103 in a case where one mobile object (the mobile object 105) fails in the third embodiment of the present disclosure. In FIG. 48, the same elements as those in FIGS. 6 and 14 are denoted by the same reference numerals, and the description thereof will not be given.

As illustrated in FIG. 48, the mobile objects 102 and 104 belong to the direct communication group of the mobile object 103. Thus, the control unit 602 of the mobile object 103 decides on, as a repulsion vector 4423 for the mobile object 102, a movement vector having a magnitude of 2.8 m/s and having a direction opposite to the direction toward the mobile object 102. The control unit 602 of the mobile object 103 decides on, as a repulsion vector 4443 for the mobile object 104, a movement vector having a magnitude of 2.8 m/s and having a direction opposite to the direction toward the mobile object 104.

Figure 49:
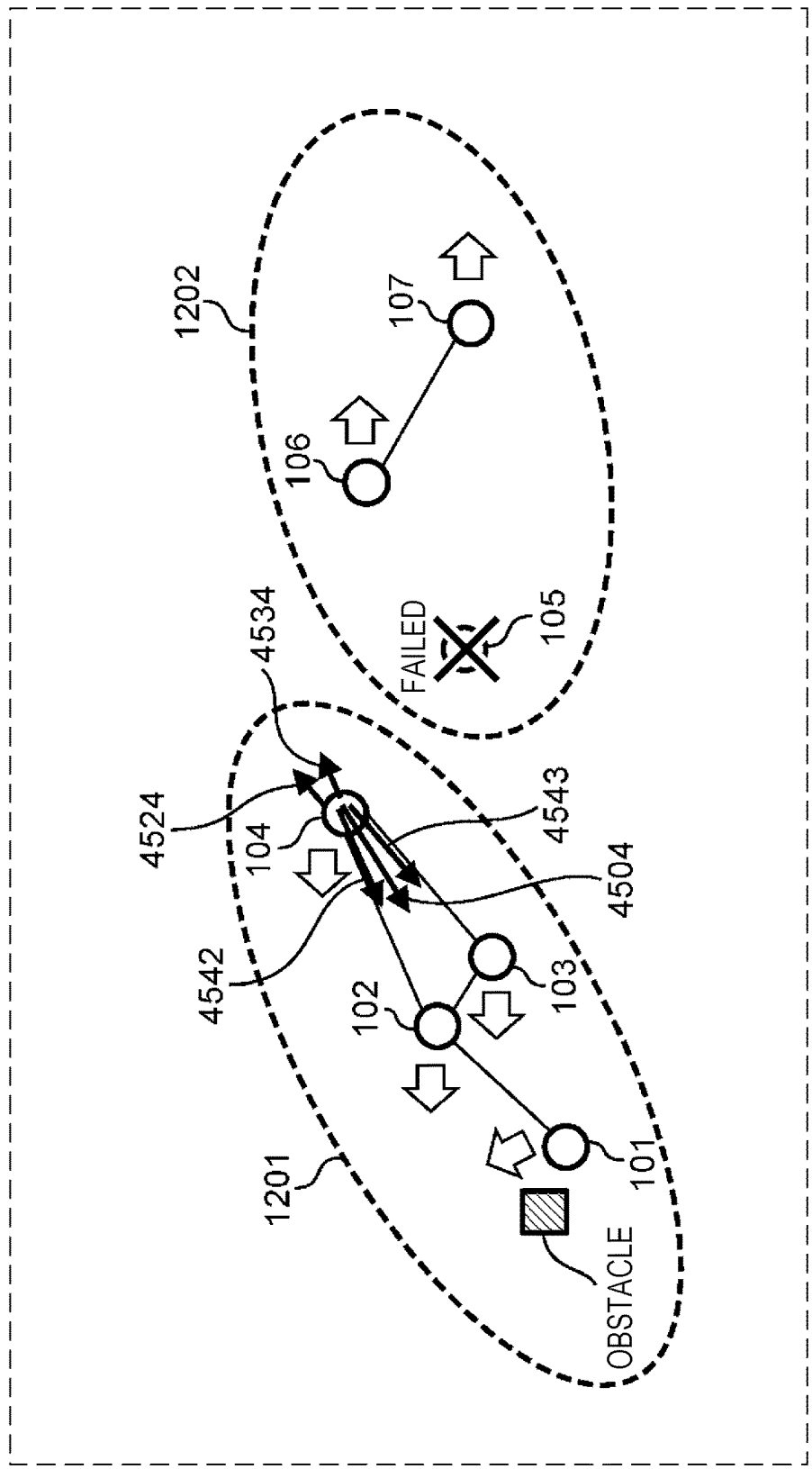
FIG. 49 is a conceptual diagram for describing a method for deciding on a repulsion vector, an approach vector, and a communication maintaining movement vector in a mobile object in a case where one mobile object fails in the third embodiment of the present disclosure.

FIG. 49 is a conceptual diagram for describing a method for deciding on a repulsion vector, an approach vector, and a communication maintaining movement vector in the mobile object 104 in a case where one mobile object (the mobile object 105) fails in the third embodiment of the present disclosure. In FIG. 49, the same elements as those in FIGS. 6 and 14 are denoted by the same reference numerals, and the description thereof will not be given.

As illustrated in FIG. 49, the mobile objects 102 and 103 belong to the direct communication group of the mobile object 104. Thus, the control unit 602 of the mobile object 104 decides on, as a repulsion vector 4524 for the mobile object 102, a movement vector having a magnitude of 2.8 m/s and having a direction opposite to the direction toward the mobile object 102. The control unit 602 of the mobile object 104 decides on, as a repulsion vector 4534 for the mobile object 103, a movement vector having a magnitude of 2.8 m/s and having a direction opposite to the direction toward the mobile object 103.

Figure 50:
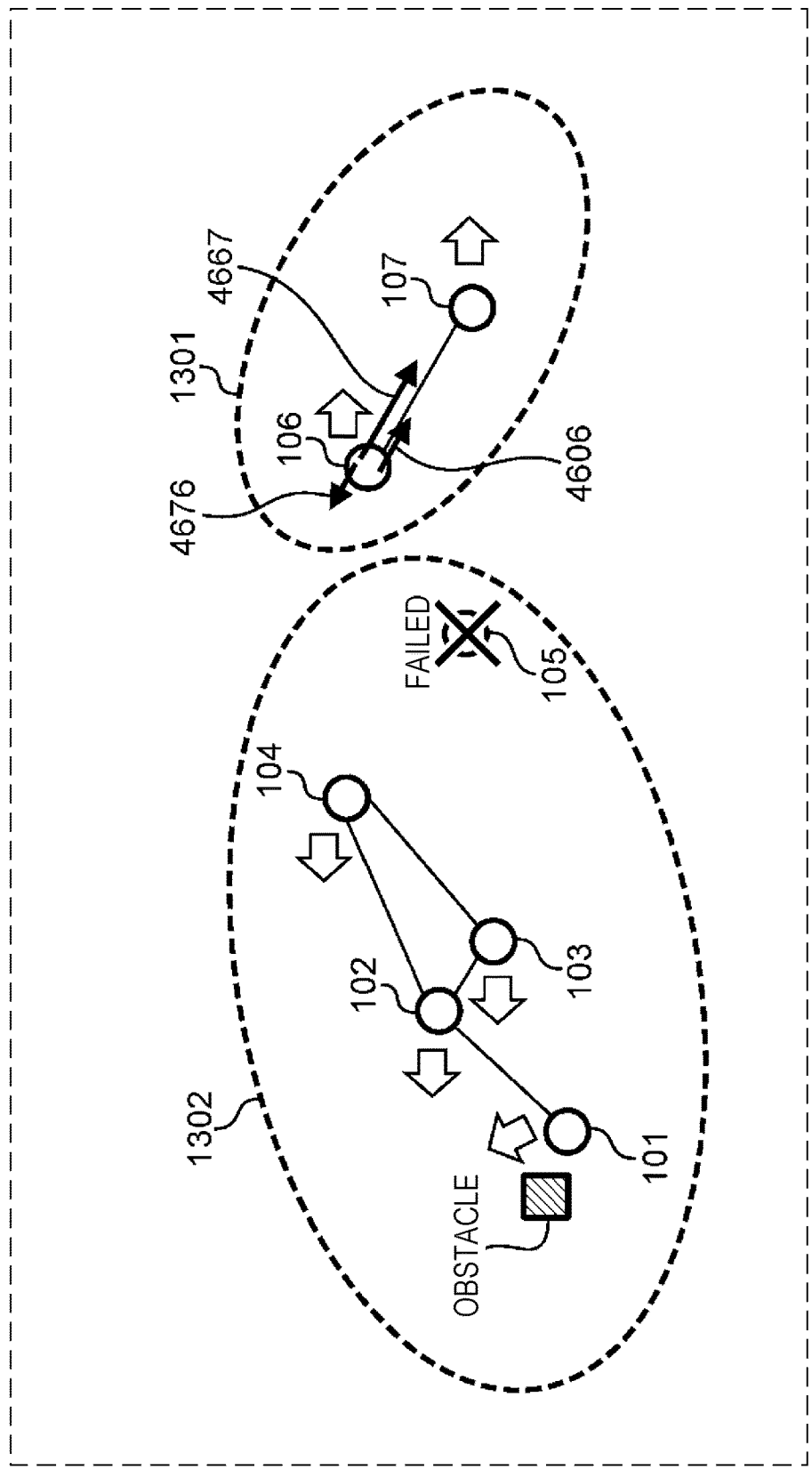
FIG. 50 is a conceptual diagram for describing a method for deciding on a repulsion vector, an approach vector, and a communication maintaining movement vector in a mobile object in a case where one mobile object fails in the third embodiment of the present disclosure.

FIG. 50 is a conceptual diagram for describing a method for deciding on a repulsion vector, an approach vector, and a communication maintaining movement vector in the mobile object 106 in a case where one mobile object (the mobile object 105) fails in the third embodiment of the present disclosure. In FIG. 50, the same elements as those in FIGS. 6 and 14 are denoted by the same reference numerals, and the description thereof will not be given.

As illustrated in FIG. 50, only the mobile object 107 belongs to the direct communication group of the mobile object 106. Thus, the control unit 602 of the mobile object 106 decides on, as a repulsion vector 4676 for the mobile object 107, a movement vector having a magnitude of 2.8 m/s and having a direction opposite to the direction toward the mobile object 107.

Figure 51:
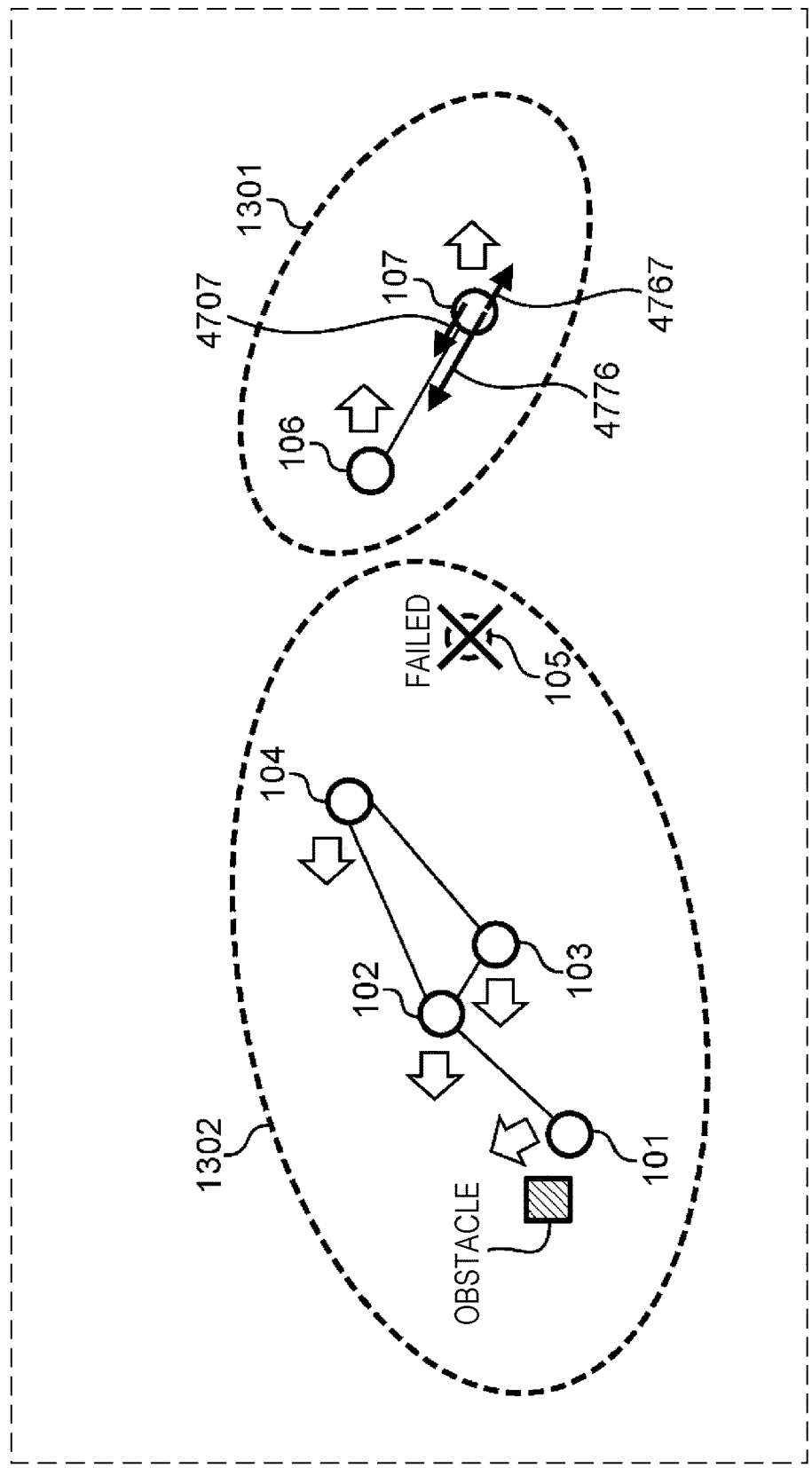
FIG. 51 is a conceptual diagram for describing a method for deciding on a repulsion vector, an approach vector, and a communication maintaining movement vector in a mobile object in a case where one mobile object fails in the third embodiment of the present disclosure.

FIG. 51 is a conceptual diagram for describing a method for deciding on a repulsion vector, an approach vector, and a communication maintaining movement vector in the mobile object 107 in a case where one mobile object (the mobile object 105) fails in the third embodiment of the present disclosure. In FIG. 51, the same elements as those in FIGS. 6 and 14 are denoted by the same reference numerals, and the description thereof will not be given.

As illustrated in FIG. 51, only the mobile object 106 belongs to the direct communication group of the mobile object 107. Thus, the control unit 602 of the mobile object 107 decides on, as a repulsion vector 4767 for the mobile object 106, a movement vector having a magnitude of 2.8 m/s and having a direction opposite to the direction toward the mobile object 106.

Subsequently, the control unit 602 of the mobile object 101 decides on an approach vector for each mobile object belonging to the direct communication group (step S6104).

Here, the control unit 602 decides on, for each mobile object belonging to the direct communication group, a movement vector as an approach vector having a magnitude proportional to the square of the distance from the position of the mobile object to the position of the own mobile object and having a direction toward the mobile object. It is assumed that the magnitude proportional to the square of the distance 19.9 m from the position of the mobile object 102 to the position of the mobile object 101 is 4.2 m/s. That is, the magnitude of the approach vector decided on by the control unit 602 increases as the distance between mobile objects increases. The control unit 602 may decrease a movement distance (fourth movement distance), a velocity absolute value (fourth velocity absolute value), or an acceleration absolute value (fourth acceleration absolute value) as the distance calculated from the current position of the mobile object 101 and the position of the mobile object 102 decreases.

As illustrated in FIG. 46, only the mobile object 102 belongs to the direct communication group of the mobile object 101. Thus, the control unit 602 of the mobile object 101 decides on, as an approach vector 4212 for the mobile object 102, a movement vector having a magnitude of 4.2 m/s that is proportional to the square of the distance 19.9 m from the position of the mobile object 102 to the position of the own mobile object and having a direction toward the mobile object 102. In this case, the approach vector 4212 is (3 m/s, 3 m/s, 0 m/s).

The approach vectors of the mobile objects 102 to 104, 106, and 107 are decided on similarly to the approach vector of the mobile object 101.

As illustrated in FIG. 47, the mobile objects 101, 103, and 104 belong to the direct communication group of the mobile object 102. Thus, the control unit 602 of the mobile object 102 decides on, as an approach vector 4321 for the mobile object 101, a movement vector having a magnitude proportional to the square of the distance from the position of the mobile object 101 to the position of the own mobile object and having a direction toward the mobile object 101. The control unit 602 of the mobile object 102 decides on, as an approach vector 4323 for the mobile object 103, a movement vector having a magnitude proportional to the square of the distance from the position of the mobile object 103 to the position of the own mobile object and having a direction toward the mobile object 103. The control unit 602 of the mobile object 102 decides on, as an approach vector 4324 for the mobile object 104, a movement vector having a magnitude proportional to the square of the distance from the position of the mobile object 104 to the position of the own mobile object and having a direction toward the mobile object 104.

As illustrated in FIG. 48, the mobile objects 102 and 104 belong to the direct communication group of the mobile object 103. Thus, the control unit 602 of the mobile object 103 decides on, as an approach vector 4432 for the mobile object 102, a movement vector having a magnitude proportional to the square of the distance from the position of the mobile object 102 to the position of the own mobile object and having a direction toward the mobile object 102. The control unit 602 of the mobile object 103 decides on, as an approach vector 4434 for the mobile object 104, a movement vector having a magnitude proportional to the square of the distance from the position of the mobile object 104 to the position of the own mobile object and having a direction toward the mobile object 104.

As illustrated in FIG. 49, the mobile objects 102 and 103 belong to the direct communication group of the mobile object 104. Thus, the control unit 602 of the mobile object 104 decides on, as an approach vector 4542 for the mobile object 102, a movement vector having a magnitude proportional to the square of the distance from the position of the mobile object 102 to the position of the own mobile object and having a direction toward the mobile object 102. The control unit 602 of the mobile object 104 decides on, as an approach vector 4543 for the mobile object 103, a movement vector having a magnitude proportional to the square of the distance from the position of the mobile object 103 to the position of the own mobile object and having a direction toward the mobile object 103.

As illustrated in FIG. 50, only the mobile object 107 belongs to the direct communication group of the mobile object 106. Thus, the control unit 602 of the mobile object 106 decides on, as an approach vector 4667 for the mobile object 107, a movement vector having a magnitude proportional to the square of the distance from the position of the mobile object 107 to the position of the own mobile object and having a direction toward the mobile object 107.

As illustrated in FIG. 51, only the mobile object 106 belongs to the direct communication group of the mobile object 107. Thus, the control unit 602 of the mobile object 107 decides on, as an approach vector 4776 for the mobile object 106, a movement vector having a magnitude proportional to the square of the distance from the position of the mobile object 106 to the position of the own mobile object and having a direction toward the mobile object 106.

The control unit 602 of the mobile object 101 may decides on, for each mobile object belonging to the direct communication group, a movement vector as an approach vector having a magnitude inversely proportional to the square of the distance from the position of the mobile object to the position of the own mobile object and having a direction toward the mobile object. That is, the control unit 602 may increase a movement distance (fourth movement distance), a velocity absolute value (fourth velocity absolute value), or an acceleration absolute value (fourth acceleration absolute value) as the distance calculated from the current position of the mobile object 101 and the position of the mobile object 102 decreases.

Subsequently, the control unit 602 of the mobile object 101 calculates the sum of movement vectors that are obtained by multiplying the individual repulsion vectors and the individual approach vectors by a value other than 0, and decides on a movement vector obtained through the calculation as a communication maintaining movement vector (step S6105). Subsequently, the control unit 602 creates communication maintaining movement vector information, which is information about the communication maintaining movement vector, and updates the communication maintaining movement vector information in the own-mobile-object information 5801.

Here, the control unit 602 multiplies the individual repulsion vectors and the individual approach vectors by 1 and then calculates the sum of all the movement vectors. The values by which the individual repulsion vectors and the individual approach vectors are multiplied may be a constant or may be a value that is dynamically decided on when an actual process is performed.

As illustrated in FIG. 46, only the mobile object 102 belongs to the direct communication group of the mobile object 101. Thus, the control unit 602 of the mobile object 101 decides on, as a communication maintaining movement vector 4201, the sum (1 m/s, 1 m/s, 0 m/s) of a movement vector obtained by multiplying the repulsion vector 4221 (−2 m/s, −2 m/s, 0 m/s) for the mobile object 102 by 1 and a movement vector obtained by multiplying the approach vector 4212 (3 m/s, 3 m/s, 0 m/s) for the mobile object 102 by 1.

The communication maintaining movement vectors of the mobile objects 102 to 104, 106, and 107 are decided on similarly to the communication maintaining movement vector of the mobile object 101.

As illustrated in FIG. 47, the mobile objects 101, 103, and 104 belong to the direct communication group of the mobile object 102. Thus, the control unit 602 of the mobile object 102 decides on, as a communication maintaining movement vector 4302, the sum of a movement vector obtained by multiplying the repulsion vector 4312 for the mobile object 101 by 1, a movement vector obtained by multiplying the repulsion vector 4332 for the mobile object 103 by 1, a movement vector obtained by multiplying the repulsion vector 4342 for the mobile object 104 by 1, a movement vector obtained by multiplying the approach vector 4321 for the mobile object 101 by 1, a movement vector obtained by multiplying the approach vector 4323 for the mobile object 103 by 1, and a movement vector obtained by multiplying the approach vector 4324 for the mobile object 104 by 1.

As illustrated in FIG. 48, the mobile objects 102 and 104 belong to the direct communication group of the mobile object 103. Thus, the control unit 602 of the mobile object 103 decides on, as a communication maintaining movement vector 4403, the sum of a movement vector obtained by multiplying the repulsion vector 4423 for the mobile object 102 by 1, a movement vector obtained by multiplying the repulsion vector 4443 for the mobile object 104 by 1, a movement vector obtained by multiplying the approach vector 4432 for the mobile object 102 by 1, and a movement vector obtained by multiplying the approach vector 4434 for the mobile object 104 by 1.

As illustrated in FIG. 49, the mobile objects 102 and 103 belong to the direct communication group of the mobile object 104. Thus, the control unit 602 of the mobile object 104 decides on, as a communication maintaining movement vector 4504, the sum of a movement vector obtained by multiplying the repulsion vector 4524 for the mobile object 102 by 1, a movement vector obtained by multiplying the repulsion vector 4534 for the mobile object 103 by 1, a movement vector obtained by multiplying the approach vector 4542 for the mobile object 102 by 1, and a movement vector obtained by multiplying the approach vector 4543 for the mobile object 103 by 1.

As illustrated in FIG. 50, only the mobile object 107 belongs to the direct communication group of the mobile object 106. Thus, the control unit 602 of the mobile object 106 decides on, as a communication maintaining movement vector 4606, the sum of a movement vector obtained by multiplying the repulsion vector 4676 for the mobile object 107 by 1 and a movement vector obtained by multiplying the approach vector 4667 for the mobile object 107 by 1.

As illustrated in FIG. 51, only the mobile object 106 belongs to the direct communication group of the mobile object 107. Thus, the control unit 602 of the mobile object 107 decides on, as a communication maintaining movement vector 4707, the sum of a movement vector obtained by multiplying the repulsion vector 4767 for the mobile object 106 by 1 and a movement vector obtained by multiplying the approach vector 4776 for the mobile object 106 by 1.

Subsequently, the control unit 602 of the mobile object 101 decides on a second basic movement vector group including one or more movement vectors for controlling a movement in the case of not attempting to maintain direct communication (step S6106). Subsequently, the control unit 602 creates second basic movement vector group information, which is information about the second basic movement vector group, and updates the second basic movement vector group information in the own-mobile-object information 5801.

Figure 52:
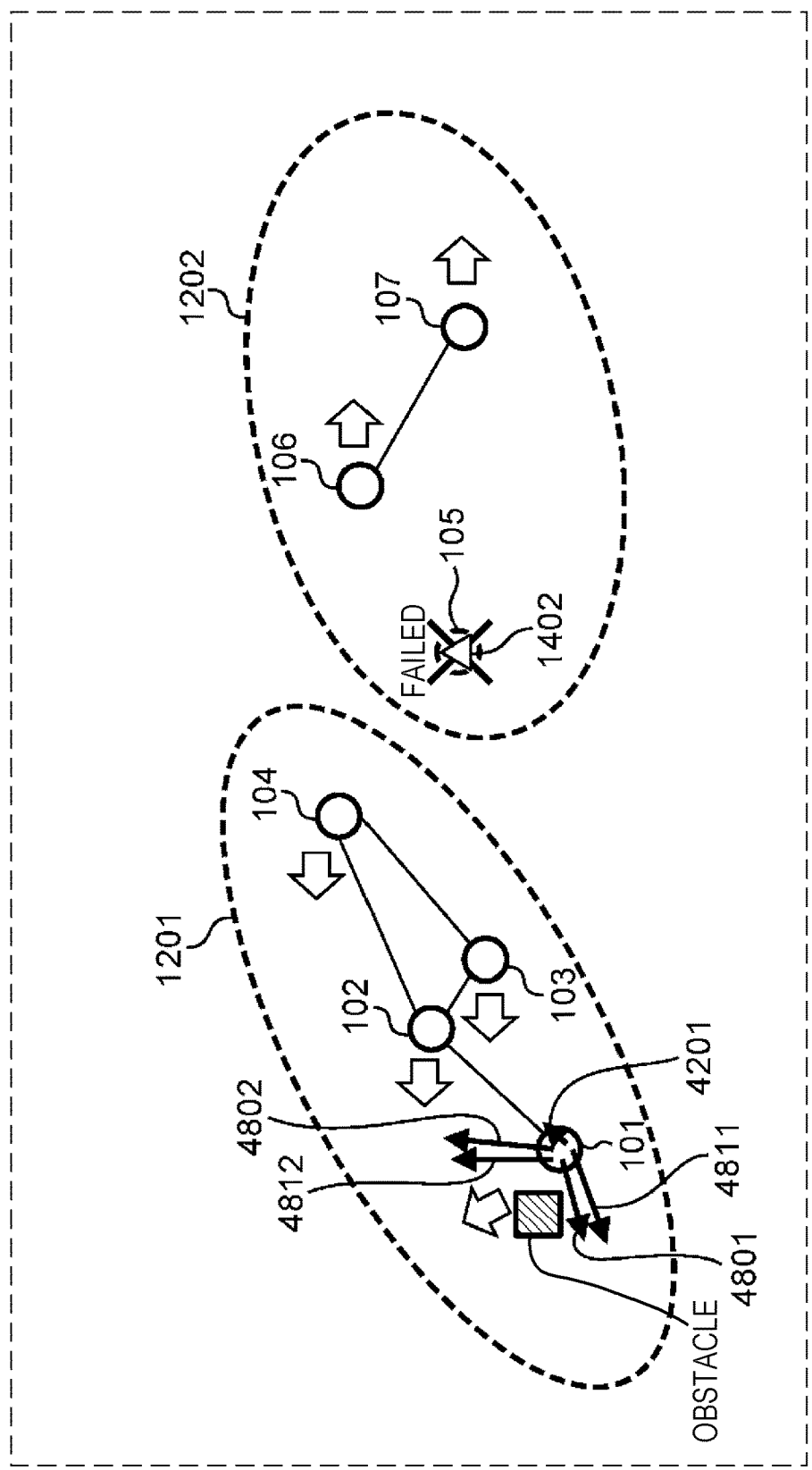
FIG. 52 is a conceptual diagram illustrating an example of a second basic movement vector group in the third embodiment of the present disclosure.

FIG. 52 is a conceptual diagram illustrating an example of a second basic movement vector group in the third embodiment of the present disclosure. In FIG. 52, the same elements as those in FIGS. 6, 14, 16, and 46 are denoted by the same reference numerals and the description thereof will not be given.

In the situation illustrated in FIG. 52, it is the best for the mobile object 101 to move in accordance with a movement vector including a movement component of 5 m/s in the direction of west and a movement component of 2 m/s in the direction of south to achieve an original purpose if no attempt is made to maintain direct communication and if there is no restriction. In this case, a second main basic movement vector 4811 is (−5 m/s, −2 m/s, 0 m/s).

However, there is an obstacle to the west of the mobile object 101. Thus, the mobile object 101 needs to move while avoiding the obstacle. Thus, if no attempt is made to maintain direct communication, the mobile object 101 needs to move in accordance with a movement vector including a movement component of 5 m/s in the direction of north to avoid the obstacle. In this case, a second obstacle avoidance basic movement vector 4812 is (0 m/s, 5 m/s, 0 m/s).

Subsequently, the control unit 602 of the mobile object 101 attempts to communicate with the mobile objects 102 to 107 through the ad hoc network. In accordance with whether or not the communication therewith can be performed, the control unit 602 specifies a known group, which is a group of mobile objects that the mobile object 101 is capable of communicating with through the ad hoc network, and an unknown group, which is a group of mobile objects that the mobile object 101 is incapable of communicating with through the ad hoc network (step S6107). Subsequently, the control unit 602 updates the known group information, which includes mobile object identification information of all the mobile objects belonging to the known group, and the unknown group information, which includes mobile object identification information of all the mobile objects belonging to the unknown group, in the own-mobile-object information 5801.

Subsequently, the control unit 602 of the mobile object 101 updates the position information of the known group (step S6108). At this time, the position detection unit 604 detects the position of the own mobile object and updates the position information in the own-mobile-object information 5801. Furthermore, the communication unit 601 requests, through the ad hoc network, all the mobile objects belonging to the known group to transmit mobile object identification information and position information and receives the mobile object identification information and the position information from the mobile objects belonging to the known group. Subsequently, the control unit 602 updates the position information in the other-mobile-object information 5802.

Subsequently, the control unit 602 of the mobile object 101 calculates the sum of movement vectors that are obtained by multiplying individual movement vectors belonging to the second basic movement vector group and the communication maintaining movement vector by a value other than 0, and decides on a movement vector group obtained through the calculation as a basic movement vector group (step S6109). Subsequently, the control unit 602 creates basic movement vector group information, which is information about the basic movement vector group, and updates the basic movement vector information in the own-mobile-object information 5801.

Here, the control unit 602 multiplies the second main basic movement vector belonging to the second basic movement vector group by 1 and multiplies the communication maintaining movement vector by 0.5, which is a value obtained by dividing 1 by the number of movement vectors belonging to the second basic movement vector group, and decides on the sum of the two movement vectors obtained through the calculation as a main basic movement vector. Also, the control unit 602 multiplies the second obstacle avoidance basic movement vector by 1 and multiplies the communication maintaining movement vector by 0.5, which is a value obtained by dividing 1 by the number of movement vectors belonging to the second basic movement vector group, and decides on the sum of the two movement vectors obtained through the calculation as an obstacle avoidance basic movement vector. The value by which each movement vector belonging to the second basic movement vector group is multiplied may be a constant or may be a value that is dynamically decided on when an actual process is performed.

As illustrated in FIG. 52 and as described above, in this example, the second main basic movement vector 4811 of the mobile object 101 is (−5 m/s, −2 m/s, 0 m/s) and the communication maintaining movement vector 4201 is (1 m/s, 1 m/s, 0 m/s), and thus the movement vector as a calculation result is (−4.5 m/s, −1.5 m/s, 0 m/s). Thus, the control unit 602 of the mobile object 101 decides on the movement vector as a calculation result (−4.5 m/s, −1.5 m/s, 0 m/s) as a main basic movement vector 4801 in the basic movement vector group. Also, in this example, the second obstacle avoidance basic movement vector 4812 of the mobile object 101 is (0 m/s, 5 m/s, 0 m/s) and the communication maintaining movement vector 4201 is (1 m/s, 1 m/s, 0 m/s), and thus the movement vector as a calculation result is (0.5 m/s, 5.5 m/s, 0 m/s). Thus, the control unit 602 of the mobile object 101 decides on the movement vector as a calculation result (0.5 m/s, 5.5 m/s, 0 m/s) as an obstacle avoidance basic movement vector 4802 in the basic movement vector group.

Subsequently, the control unit 602 of the mobile object 101 determines whether or not there is a mobile object belonging to an unknown group (step S6110).

If it is determined in step S6110 that there is no mobile object belonging to an unknown group (NO in step S6110), the control unit 602 of the mobile object 101 sets the magnitude of the communication restoration vector to 0 (step S6117) and the process proceeds to step S6115, which will be described below.

For example, in the situation illustrated in FIG. 13, there is no unknown group and all the mobile objects 101 to 107 belong to a known group. Thus, the control unit 602 of the mobile object 101 sets the magnitude of the communication restoration vector to 0, and then the process proceeds to step S6115, which will be described below.

On the other hand, if it is determined in step S6110 that there is a mobile object belonging to an unknown group (YES in step S6110), the control unit 602 performs the process in steps S6111 to S6114.

If it is determined in step S6110 that there is a mobile object belonging to an unknown group, the control unit 602 of the mobile object 101 obtains, from the other-mobile-object information 5802, the position information of all the mobile objects belonging to the unknown group (step S6111).

The conceptual diagram illustrating the mobile objects 101 to 104 belonging to the known group and the mobile objects 105 to 107 belonging to the unknown group in a case where one mobile object (the mobile object 105) fails in the third embodiment of the present disclosure is the same as FIG. 14, and thus the description thereof will not be given.

The conceptual diagram illustrating the mobile objects 106 and 107 belonging to the known group and the mobile objects 101 to 104 belonging to the unknown group in a case where one mobile object (the mobile object 105) fails in the third embodiment of the present disclosure is the same as FIG. 15, and thus the description thereof will not be given.

Subsequently, the control unit 602 of the mobile object 101 decides on one or more target positions on the basis of the position information of the mobile objects belonging to the unknown group obtained in step S6111 (step S6112).

The target position is, for example, a center position of all the mobile objects belonging to the unknown group or a position nearest to the own mobile object among the positions of all the mobile objects belonging to the unknown group.

Subsequently, the control unit 602 of the mobile object 101 calculates the distance from the target position to the position of the own mobile object (step S6113).

The diagram illustrating an example of a method for deciding on a target position and the target position decided on by using the method in each of the mobile objects 101 to 104 in a case where one mobile object (the mobile object 105) fails in the third embodiment of the present disclosure is the same as FIG. 16. It is assumed that the mobile objects 105 to 107 are at the positions described in the other-mobile-object information 5802 illustrated in FIG. 43.

For example, in the case of deciding on the center position of all the mobile objects belonging to the unknown group as a target position, the target position of each of the mobile objects 101 to 104 is the target position 1401 illustrated in FIG. 16. The value of the target position 1401 is "34° 41'37.6" north latitude, 135° 30'9.1" east longitude, 2 m above sea level". In this case, the distances from the target position 1401 to the mobile objects 101 to 104 are 53.3 m, 37.6 m, 35.5 m, and 27.9 m, respectively.

In the case of deciding on the position nearest to the own mobile object among the positions of all the mobile objects belonging to the unknown group as a target position, the target position of each of the mobile objects 101 to 104 is the target position 1402 illustrated in FIG. 16, that is, the position of the mobile object 105. The value of the target position 1402 is "34° 41'37.5" north latitude, 135° 30'8.6" east longitude, 2 m above sea level". In this case, the distances from the target position 1402 to the mobile objects 101 to 104 are 40.6 m, 25.0 m, 22.7 m, and 19.9 m, respectively. Here, approximate values are calculated in an abbreviated manner under the assumption that the distance corresponding to one second in latitude is 31 m and the distance corresponding to one second in longitude is 25 m. However, the method for calculating a distance on the basis of a difference in latitude and longitude is not related to the gist of the present disclosure. In this specification, unless otherwise noted, a distance is calculated on the basis of a difference in latitude and longitude by using the simple method described herein.

The diagram illustrating an example of a method for deciding on a target position and the target position decided on by using the method in each of the mobile objects 106 and 107 in a case where one mobile object (the mobile object 105) fails in the third embodiment of the present disclosure is the same as FIG. 17. It is assumed that the mobile objects 101 to 105 are at the positions described in the other-mobile-object information 5802 illustrated in FIG. 43.

For example, in the case of deciding on the center position of all the mobile objects belonging to the unknown group as a target position, the target position of each of the mobile objects 106 and 107 is the target position 1501 illustrated in FIG. 17. The value of the target position 1501 is "34° 41'37.48" north latitude, 135° 30'7.82" east longitude, 2 m above sea level". In this case, the distances from the target position 1501 to the mobile objects 106 and 107 are 33.5 m and 44.5 m, respectively. In the case of deciding on the position nearest to the own mobile object among the positions of all the mobile objects belonging to the unknown group as a target position, the target position of each of the mobile objects 106 and 107 is the target position 1502 illustrated in FIG. 17, that is, the position of the mobile object 105. The value of the target position 1502 is "34° 41'37.5" north latitude, 135° 30'8.6" east longitude, 2 m above sea level". In this case, the distances from the target position 1502 to the mobile objects 106 and 107 are 15.6 m and 25.0 m, respectively.

Subsequently, the control unit 602 of the mobile object 101 decides on a communication restoration vector, which is a movement vector for moving toward the target position, in accordance with the distance from the target position to the position of the own mobile object (step S6114). Subsequently, the control unit 602 creates communication restoration vector information, which is information about the communication restoration vector, and updates the communication restoration vector information in the own-mobile-object information 5801.

Now, an example of a communication restoration vector will be described. The control unit 602 of each of the mobile objects 101 to 107 decides on, as a target position, the position nearest to the own mobile object among the positions of all the mobile objects belonging to the unknown group. If the own mobile object is the nearest to the target position among the mobile objects belonging to the known group, the control unit 602 decides on a communication restoration vector having a direction toward the target position and having a magnitude of 6.4 m/s. If the own mobile object is not the nearest to the target position, the control unit 602 decides on a communication restoration vector having a magnitude of 0.

Figure 53:
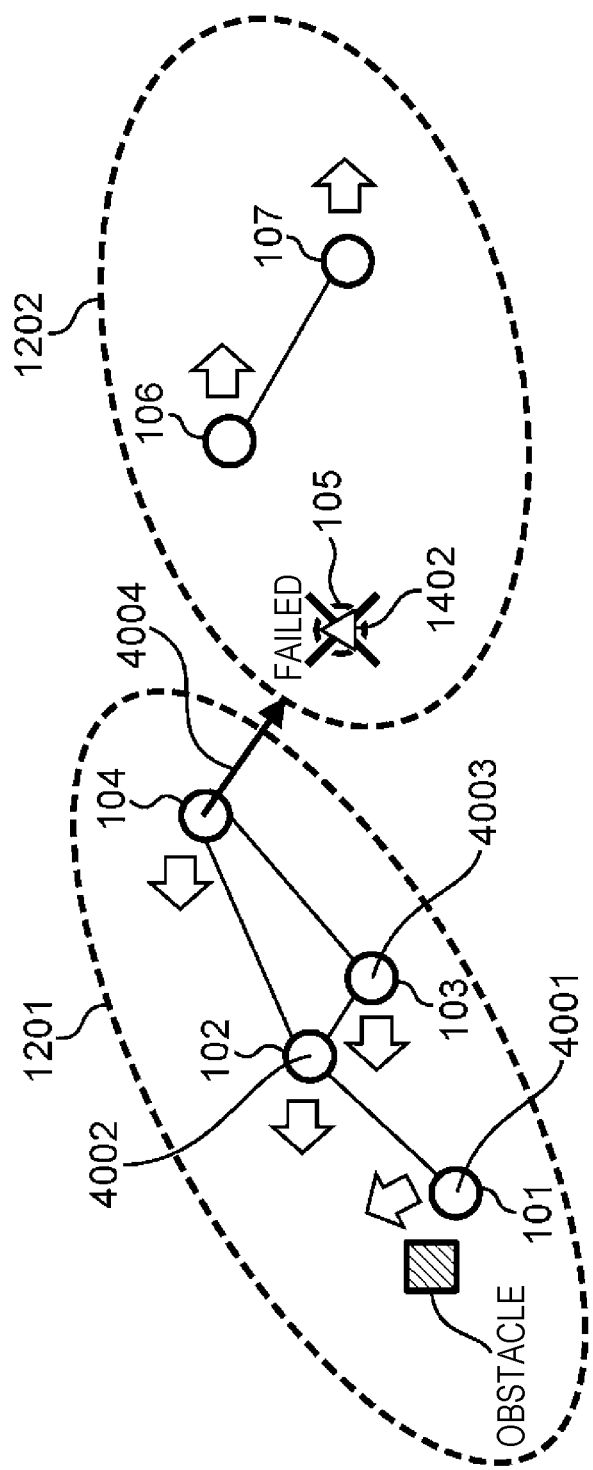
FIG. 53 is a conceptual diagram illustrating an example of communication restoration vectors of mobile objects in a case where one mobile object fails in the third embodiment of the present disclosure.

FIG. 53 is a conceptual diagram illustrating an example of communication restoration vectors of the mobile objects 101 to 104 in a case where one mobile object (the mobile object 105) fails in the third embodiment of the present disclosure. In FIG. 53, the same elements as those in FIGS. 6, 14, and 16 are denoted by the same reference numerals and the description thereof will not be given.

As described above, the distances from the target position 1402 to the mobile objects 101 to 104 are 40.6 m, 25.0 m, 22.7 m, and 19.9 m, respectively. Thus, the control unit 602 of the mobile object 104 that is the nearest to the target position 1402 decides on, as a communication restoration vector 4004, a communication restoration vector (5 m/s, −4 m/s, 0 m/s) having a direction toward the target position and having a magnitude of 6.4 m/s. Also, the control units 602 of the mobile objects 101 to 103 decide on communication restoration vectors 4001 to 4003 having a magnitude of 0, respectively.

Figure 54:
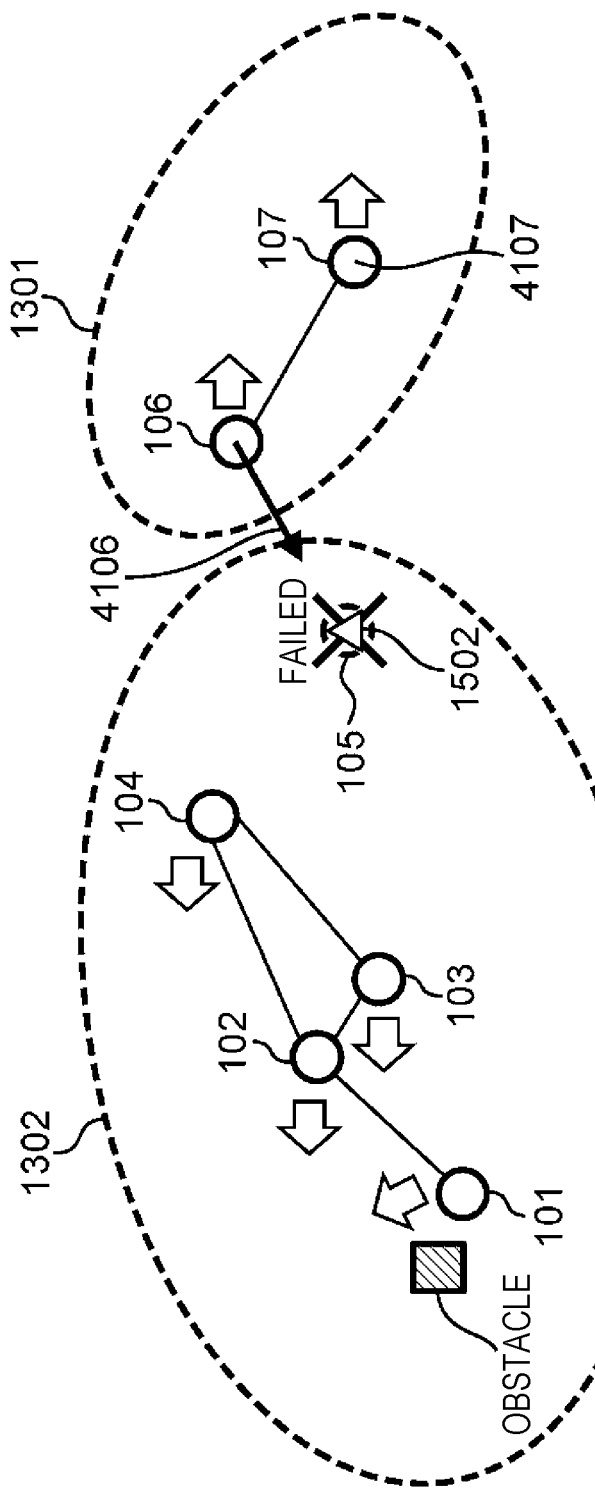
FIG. 54 is a conceptual diagram illustrating an example of communication restoration vectors of mobile objects in a case where one mobile object fails in the third embodiment of the present disclosure.

FIG. 54 is a conceptual diagram illustrating an example of communication restoration vectors of the mobile objects 106 and 107 in a case where one mobile object (the mobile object 105) fails in the third embodiment of the present disclosure. In FIG. 54, the same elements as those in FIGS. 6, 15, and 17 are denoted by the same reference numerals and the description thereof will not be given.

As described above, the distances from the target position 1502 to the mobile objects 106 and 107 are 15.6 m and 25.0 m, respectively. Thus, the control unit 602 of the mobile object 106 that is the nearest to the target position 1502 decides on, as a communication restoration vector 4106, a communication restoration vector (−5 m/s, −4 m/s, 0 m/s) having a direction toward the target position and having a magnitude of 6.4 m/s. Also, the control unit 602 of the mobile object 107 decides on a communication restoration vector 4107 having a magnitude of 0.

Subsequently, the control unit 602 of the mobile object 101 calculates the sum of movement vectors obtained by multiplying all the movement vectors belonging to the basic movement vector group and the communication restoration vector by a value other than 0, and decides on a movement vector obtained through the calculation as an actual movement vector (step S6115). Subsequently, the control unit 602 creates actual movement vector information, which is information about the actual movement vector, and updates the actual movement vector information in the own-mobile-object information 5801.

Figure 55:
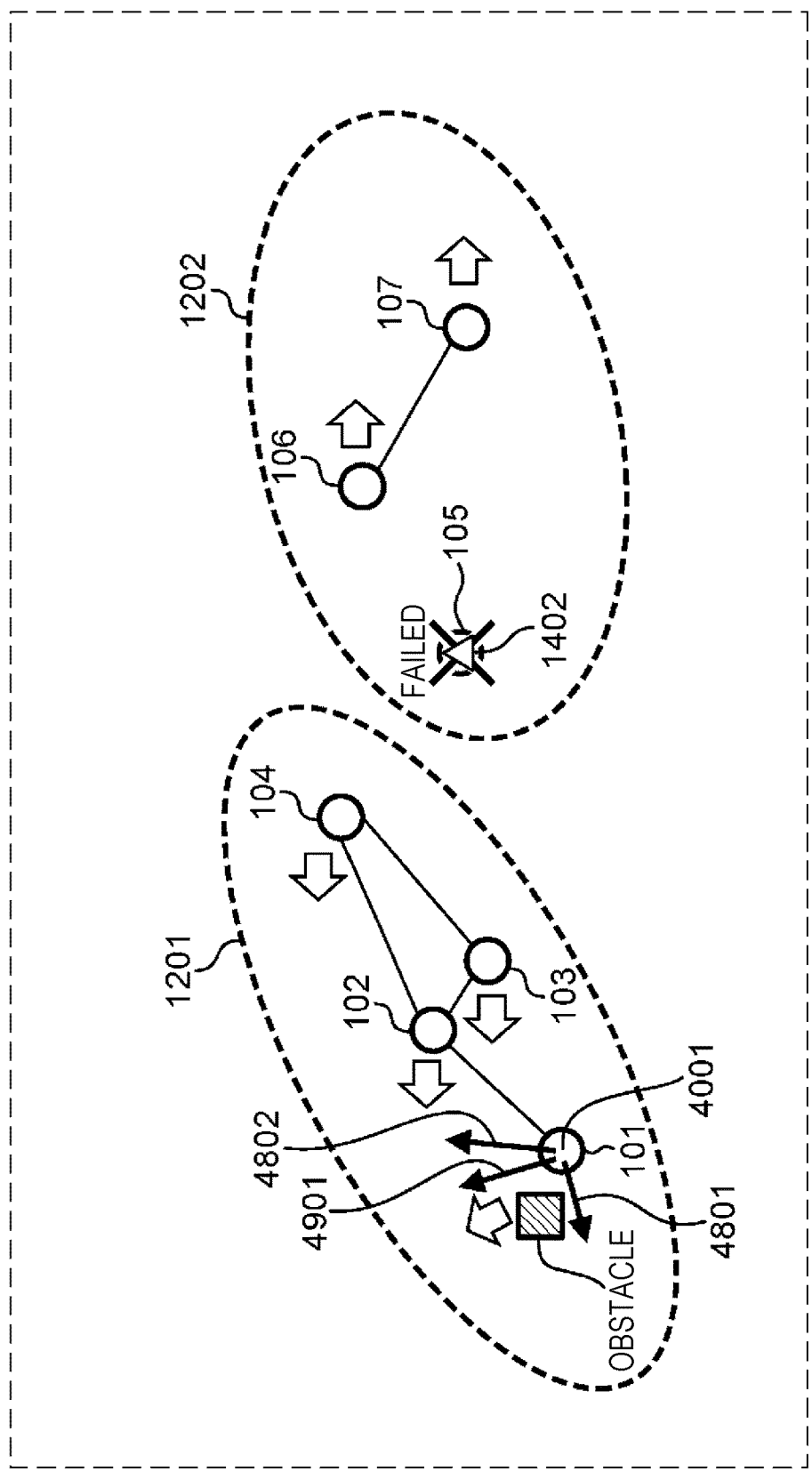
FIG. 55 is a conceptual diagram illustrating an example of a method for deciding on an actual movement vector in a mobile object in a case where one mobile object fails in the third embodiment of the present disclosure.

FIG. 55 is a conceptual diagram illustrating an example of a method for deciding on an actual movement vector in the mobile object 101 in a case where one mobile object (the mobile object 105) fails in the third embodiment of the present disclosure. In FIG. 55, the same elements as those in FIGS. 6, 14, 16, 52, and 53 are denoted by the same reference numerals and the description thereof will not be given.

To increase the ratio of a movement for avoiding an obstacle, the control unit 602 multiplies the main basic movement vector belonging to the basic movement vector group by 0.5, multiplies the obstacle avoidance basic movement vector belonging to the basic movement vector group by 1, and multiplies the communication restoration vector by 1, and then calculates the sum of the movement vectors as calculation results. The value by which each movement vector belonging to the basic movement vector group is multiplied may be a constant or may be a value that is dynamically decided on at the time of performing an actual process.

In the example illustrated in FIG. 55, the main basic movement vector 4801 of the mobile object 101 is (−4.5 m/s, −1.5 m/s, 0 m/s), the obstacle avoidance basic movement vector 4802 is (0.5 m/s, 5.5 m/s, 0 m/s), and the communication restoration vector 4001 is (0 m/s, 0 m/s, 0 m/s). Thus, the movement vector as a calculation result is (−1.75 m/s, 4.75 m/s, 0 m/s). The control unit 602 of the mobile object 101 decides on the movement vector (−1.75 m/s, 4.75 m/s, 0 m/s) obtained through the calculation as an actual movement vector 4901.

If the mobile object 105 fails, the magnitude of the communication restoration vector 4001 is 0. Thus, even if the mobile object 105 fails and even if a mobile object belonging to an unknown group emerges, the mobile object 101 moves substantially north-northwestward in accordance with the actual movement vector 4901 (−1.75 m/s, 4.75 m/s, 0 m/s) as illustrated in FIG. 55, as in the case where the mobile object 105 does not fail and there is no mobile object belonging to an unknown group. Since the distance between the mobile object 101 and the mobile object 102 belonging to the direct communication group of the mobile object 101 is shorter than the distance between the mobile object 102 and the mobile object 104, the ratio of a movement for maintaining direct communication is smaller than that of the mobile object 102, and an original purpose can be substantially implemented.

The basic movement vector groups and the actual movement vectors of the mobile objects 102 to 104, 106, and 107 are decided on similarly to the basic movement vector group and the actual movement vector of the mobile object 101.

Figure 56:
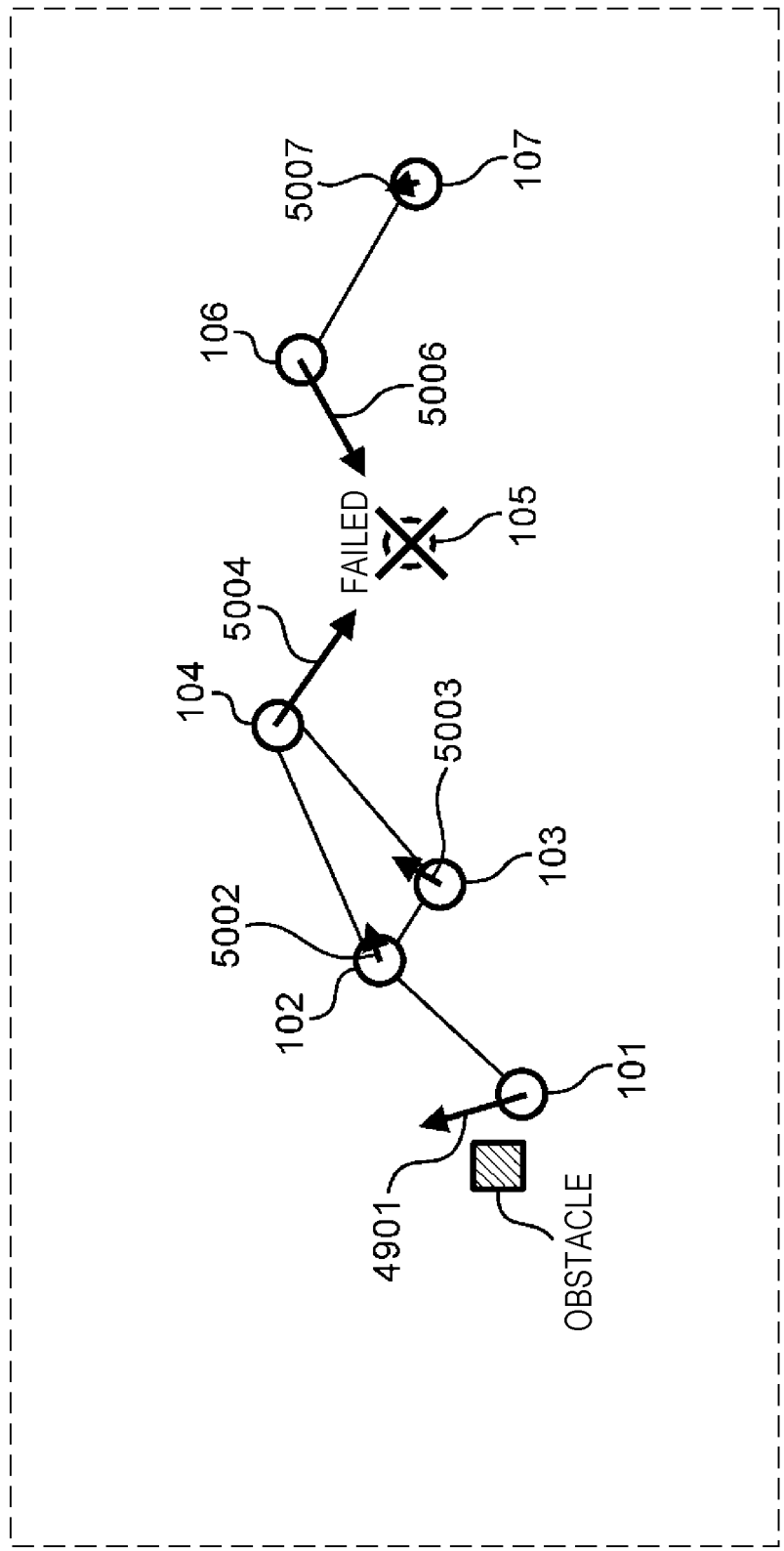
FIG. 56 is a conceptual diagram illustrating an example of actual movement vectors of mobile objects in a case where one mobile object fails in the third embodiment of the present disclosure.

FIG. 56 is a conceptual diagram illustrating an example of actual movement vectors of the mobile objects 101 to 104, 106, and 107 in a case where one mobile object (the mobile object 105) fails in the third embodiment of the present disclosure. In FIG. 56, the same elements as those in FIGS. 6 and 55 are denoted by the same reference numerals and the description thereof will not be given.

Here, among the movement vectors belonging to the second basic movement vector groups of the mobile objects 102 to 104, the value of the second main basic movement vector is (−10 m/s, 0 m/s, 0 m/s) and the value of the second obstacle avoidance basic movement vector is (0 m/s, 0 m/s, 0 m/s). Among the movement vectors belonging to the second basic movement vector groups of the mobile objects 106 and 107, the value of the second main basic movement vector is (10 m/s, 0 m/s, 0 m/s) and the value of the second obstacle avoidance basic movement vector is (0 m/s, 0 m/s, 0 m/s).

Here, the control unit 602 multiplies the second main basic movement vector belonging to the second basic movement vector group by 1 and multiplies the communication maintaining movement vector by 0.5, which is a value obtained by dividing 1 by the number of movement vectors belonging to the second basic movement vector group, and decides on the sum of the movement vectors obtained through the calculation as a main basic movement vector. Also, the control unit 602 multiplies the second obstacle avoidance basic movement vector by 1 and multiplies the communication maintaining movement vector by 0.5, which is a value obtained by dividing 1 by the number of movement vectors belonging to the second basic movement vector group, and decides on the sum of the movement vectors obtained through the calculation as an obstacle avoidance basic movement vector.

Here, if the magnitude of the communication restoration vector is 0, the control unit 602 decides on, as an actual movement vector, the sum of a movement vector obtained by multiplying the main basic movement vector by 0.5, a movement vector obtained by multiplying the obstacle avoidance basic movement vector by 1, and a movement vector obtained by multiplying the communication restoration vector by 1. If the magnitude of the communication restoration vector is not 0, the control unit 602 decides on, as an actual movement vector, the sum of a movement vector obtained by multiplying the main basic movement vector by 0.05, a movement vector obtained by multiplying the obstacle avoidance basic movement vector by 0.1, and a movement vector obtained by multiplying the communication restoration vector by 1.

The main basic movement vector of the mobile object 102 is the sum of a movement vector obtained by multiplying the second main basic movement vector (−10 m/s, 0 m/s, 0 m/s) by 1 and a movement vector obtained by multiplying the communication maintaining movement vector 4302 illustrated in FIG. 47 by 0.5. The obstacle avoidance basic movement vector of the mobile object 102 is the sum of a movement vector obtained by multiplying the second obstacle avoidance basic movement vector (0 m/s, 0 m/s, 0 m/s) by 1 and a movement vector obtained by multiplying the communication maintaining movement vector 4302 illustrated in FIG. 47 by 0.5. Since the magnitude of the communication restoration vector 4002 is 0, an actual movement vector 5002 of the mobile object 102 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1, as illustrated in FIG. 56.

If the mobile object 105 fails, the magnitude of the communication restoration vector 4002 is 0. Thus, even if the mobile object 105 fails and even if a mobile object belonging to an unknown group emerges, the mobile object 102 moves substantially east-northeastward in accordance with the actual movement vector 5002 as illustrated in FIG. 56, as in the case where the mobile object 105 does not fail and there is no mobile object belonging to an unknown group. Since the distance between the mobile object 102 and the mobile object 104 belonging to the direct communication group of the mobile object 102 is shorter than the distance between the mobile object 101 and the mobile object 102, the ratio of a movement for maintaining direct communication is larger in the mobile object 104 than in the mobile object 101, and the ratio of a movement for maintaining direct communication is larger than that for implementing an original purpose.

The main basic movement vector of the mobile object 103 is the sum of a movement vector obtained by multiplying the second main basic movement vector (−10 m/s, 0 m/s, 0 m/s) by 1 and a movement vector obtained by multiplying the communication maintaining movement vector 4403 illustrated in FIG. 48 by 0.5. The obstacle avoidance basic movement vector of the mobile object 103 is the sum of a movement vector obtained by multiplying the second obstacle avoidance basic movement vector (0 m/s, 0 m/s, 0 m/s) by 1 and a movement vector obtained by multiplying the communication maintaining movement vector 4403 illustrated in FIG. 48 by 0.5. Since the magnitude of the communication restoration vector 4003 is 0, an actual movement vector 5003 of the mobile object 103 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1, as illustrated in FIG. 56.

If the mobile object 105 fails, the magnitude of the communication restoration vector 4003 is 0. Thus, even if the mobile object 105 fails and even if a mobile object belonging to an unknown group emerges, the mobile object 103 moves substantially northeastward in accordance with the actual movement vector 5003 as illustrated in FIG. 56, as in the case where the mobile object 105 does not fail and there is no mobile object belonging to an unknown group. Since the distance between the mobile object 103 and the mobile object 104 belonging to the direct communication group of the mobile object 103 is shorter than the distance between the mobile object 101 and the mobile object 102, the ratio of a movement for maintaining direct communication is larger in the mobile object 104 than in the mobile object 101, and the ratio of a movement for maintaining direct communication is larger than that for implementing an original purpose.

The main basic movement vector of the mobile object 104 is the sum of a movement vector obtained by multiplying the second main basic movement vector (−10 m/s, 0 m/s, 0 m/s) by 1 and a movement vector obtained by multiplying the communication maintaining movement vector 4504 illustrated in FIG. 49 by 0.5. The obstacle avoidance basic movement vector of the mobile object 104 is the sum of a movement vector obtained by multiplying the second obstacle avoidance basic movement vector (0 m/s, 0 m/s, 0 m/s) by 1 and a movement vector obtained by multiplying the communication maintaining movement vector 4504 illustrated in FIG. 49 by 0.5.

If the mobile object 105 does not fail and if there is no mobile object belonging to an unknown group, the magnitude of the communication restoration vector is 0. Thus, an actual movement vector 5004 of the mobile object 104 is the sum of a movement vector obtained by multiplying the main basic movement vector by 0.5 and a movement vector obtained by multiplying the obstacle avoidance basic movement vector by 1, and the mobile object 104 moves substantially southwestward. However, if the mobile object 105 fails and if a mobile object belonging to an unknown group emerges, the actual movement vector 5004 of the mobile object 104 is the sum of a movement vector obtained by multiplying the main basic movement vector by 0.05, a movement vector obtained by multiplying the obstacle avoidance basic movement vector by 0.1, and a movement vector obtained by multiplying the communication restoration vector 4004 (5 m/s, −4 m/s, 0 m/s) by 1, and the mobile object 104 moves substantially southeastward and mainly performs a communication restoration operation, as illustrated in FIG. 56.

The main basic movement vector of the mobile object 106 is the sum of a movement vector obtained by multiplying the second main basic movement vector (10 m/s, 0 m/s, 0 m/s) by 1 and a movement vector obtained by multiplying the communication maintaining movement vector 4606 illustrated in FIG. 50 by 0.5. The obstacle avoidance basic movement vector of the mobile object 106 is the sum of a movement vector obtained by multiplying the second obstacle avoidance basic movement vector (0 m/s, 0 m/s, 0 m/s) by 1 and a movement vector obtained by multiplying the communication maintaining movement vector 4606 illustrated in FIG. 50 by 0.5.

If the mobile object 105 does not fail and if there is no mobile object belonging to an unknown group, the magnitude of the communication restoration vector is 0. Thus, an actual movement vector 5006 of the mobile object 106 is the sum of a movement vector obtained by multiplying the main basic movement vector by 0.5 and a movement vector obtained by multiplying the obstacle avoidance basic movement vector by 1, and the mobile object 106 moves substantially east-southeastward. However, if the mobile object 105 fails and if a mobile object belonging to an unknown group emerges, the actual movement vector 5006 of the mobile object 106 is the sum of a movement vector obtained by multiplying the main basic movement vector by 0.05, a movement vector obtained by multiplying the obstacle avoidance basic movement vector by 0.1, and a movement vector obtained by multiplying the communication restoration vector 4106 (5 m/s, −4 m/s, 0 m/s) by 1, and the mobile object 106 moves substantially southwestward and mainly performs a communication restoration operation, as illustrated in FIG. 56.

The main basic movement vector of the mobile object 107 is the sum of a movement vector obtained by multiplying the second main basic movement vector (10 m/s, 0 m/s, 0 m/s) by 1 and a movement vector obtained by multiplying the communication maintaining movement vector 4707 illustrated in FIG. 51 by 0.5. The obstacle avoidance basic movement vector of the mobile object 107 is the sum of a movement vector obtained by multiplying the second obstacle avoidance basic movement vector (0 m/s, 0 m/s, 0 m/s) by 1 and a movement vector obtained by multiplying the communication maintaining movement vector 4707 illustrated in FIG. 51 by 0.5. Since the magnitude of a communication restoration vector 4007 is 0, an actual movement vector 5007 of the mobile object 107 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1, as illustrated in FIG. 56.

If the mobile object 105 fails, the magnitude of the communication restoration vector 4007 is 0. Thus, even if the mobile object 105 fails and even if a mobile object belonging to an unknown group emerges, the mobile object 107 moves substantially north-northwestward in accordance with the actual movement vector 5007 as illustrated in FIG. 56, as in the case where the mobile object 105 does not fail and there is no mobile object belonging to an unknown group. Since the distance between the mobile object 107 and the mobile object 106 belonging to the direct communication group of the mobile object 107 is shorter than the distance between the mobile object 101 and the mobile object 102, the ratio of a movement for maintaining direct communication is larger in the mobile object 106 than in the mobile object 101, and the ratio of a movement for maintaining direct communication is larger than that for implementing an original purpose.

As a result, the mobile objects 102 to 107 move to get together, and thus an attempt to restore communication can be made. Furthermore, the mobile object 101 is capable of substantially implementing an original purpose and is also capable of maintaining the direct communication with the mobile object 102. In this way, the mobile objects 102 to 107 mainly perform a communication restoration operation whereas the mobile object 101 substantially implements an original purpose. Accordingly, both restoration of communication and an original purpose can be achieved by the entire component group.

Subsequently, the control unit 602 of the mobile object 101 obtains the actual movement vector information from the own-mobile-object information 5801 and actually causes the mobile object 101 to move in accordance with an actual movement vector 5701 that has been obtained (step S6116).

Hereinafter, a description will be given of, by using specific examples, the issues that are not overcome by the techniques disclosed in PTL 1 and that are overcome by the third embodiment of the present disclosure.

As described above, the first technique disclosed in PTL 1 is not applicable as is if there are two or more mobile objects disconnected from the ad hoc network when viewed from any mobile object, as in the example illustrated in FIG. 2.

In contrast, in the third embodiment of the present disclosure, an attempt can be made to restore communication even if there are two or more mobile objects disconnected from the ad hoc network when viewed from any mobile object, as in the example illustrated in FIG. 56. In this case, that is, in the case where there are two or more mobile objects belonging to an unknown group when viewed from any mobile object, some or all of the mobile objects belonging to the component group move to get together and thus an attempt to restore communication can be made. In the example illustrated in FIG. 56, the mobile objects 102 to 104, 106, and 107 move to get together and accordingly an attempt to restore communication can be made.

The second technique disclosed in PTL 1 has an issue that all mobile objects are incapable of moving for an original purpose until communication is restored. In contrast, in the third embodiment of the present disclosure, the mobile object 101 is capable of moving mainly for an original purpose in the example illustrated in FIG. 56, for example, and the foregoing issue can be overcome.

The third technique disclosed in PTL 1 has an issue that a region over which a mobile object group is deployed gradually becomes smaller and all mobile objects are incapable of moving for an original purpose until communication is restored. Furthermore, after the communication is restored, the mobile objects need to move again for the original purpose from the positions at the point of time when the communication is restored. In contrast, in the third embodiment of the present disclosure, the mobile object 101 is capable of moving mainly for an original purpose in the example illustrated in FIG. 56, for example, and the foregoing issue can be overcome.

The fourth technique disclosed in PTL 1 has an issue that, if a selected mobile object moves toward a cutoff position, the communication between the selected mobile object and a mobile object other than a mobile object disconnected from the ad hoc network is cut off, and accordingly the ad hoc network may be secondarily fractured. In contrast, in the third embodiment of the present disclosure, the mobile objects 102 to 104, 106, and 107 move to get together to attempt to restore communication, and all of the mobile objects 101 to 104, 106, and 107 are capable of maintaining the direct communication between the mobile objects due to an effect of communication maintaining movement vectors in the example illustrated in FIG. 56, for example. Accordingly, the foregoing issue can be overcome.

As described above, in the first technique disclosed in PTL 1, if some or all of the mobile objects move to get away from each other as in the example illustrated in FIG. 3, communication can be restored only partially at best. In the example illustrated in FIG. 3, if the group of the mobile objects 201 to 204 and the group of the mobile objects 206 and 207 continue to move to get away from each other, the direct communication with a mobile object belonging to one of the group of the mobile objects 201 to 204 and the group of the mobile objects 206 and 207 is restored at best, and it is impossible to restore the direct communication with a mobile object belonging to the other group.

In contrast, in the third embodiment of the present disclosure, an attempt to restore communication can be made even if some mobile objects move to get away from each other as in the example illustrated in FIG. 3. This will be described below.

Here, each of the mobile objects 201 to 207 decides on, as a target position, the position nearest to the own mobile object among the positions of all the mobile objects belonging to the unknown group, and also decides on a communication restoration vector having a direction toward the target position and having a magnitude of 6.4 m/s if the own mobile object is the nearest to the target position among the mobile objects belonging to the known group. Each of the mobile objects 201 to 207 decides on a communication restoration vector having a magnitude of 0 if the own mobile object is not the nearest to the target position among the positions of all the mobile objects belonging to the unknown group.

Here, the control unit 602 of each of the mobile objects 201 to 207 decides on, for each mobile object belonging to the direct communication group, a movement vector as a repulsion vector having a predetermined magnitude and having a direction opposite to the direction toward the mobile object, regardless of the distance from the position of the mobile object to the own mobile object. It is assumed that the magnitude of the repulsion vector is 2.8 m/s.

Here, the control unit 602 of each of the mobile objects 201 to 207 decides on, for each mobile object belonging to the direct communication group, a movement vector as an approach vector having a magnitude proportional to the square of the distance from the position of the mobile object to the position of the own mobile object and having a direction toward the mobile object. That is, the magnitude of the approach vector decided on by the control unit 602 increases as the distance between mobile objects increases.

Here, the control unit 602 of each of the mobile objects 201 to 207 multiplies the individual repulsion vectors and the individual approach vectors by 1 and then calculates the sum of the movement vectors, thereby deciding on a movement vector obtained through the calculation as a communication maintaining movement vector.

Here, the control unit 602 of each of the mobile objects 201 to 207 multiplies the second main basic movement vector belonging to the second basic movement vector group by 1, multiplies the communication maintaining movement vector by 0.5, which is a value obtained by dividing 1 by the number of movement vectors belonging to the second basic movement vector group, calculates the sum of the movement vectors as calculation results, and decides on the sum as a main basic movement vector. Also, the control unit 602 of each of the mobile objects 201 to 207 multiplies the second obstacle avoidance basic movement vector by 1, multiplies the communication maintaining movement vector by 0.5, which is a value obtained by dividing 1 by the number of movement vectors belonging to the second basic movement vector group, calculates the sum of the movement vectors as calculation results, and decides on the sum as an obstacle avoidance basic movement vector.

To increase the ratio of a movement for avoiding an obstacle, the control unit 602 of each of the mobile objects 201 to 207 multiplies the main basic movement vector belonging to the basic movement vector group by 0.5, multiplies the obstacle avoidance basic movement vector belonging to the basic movement vector group by 1, and multiplies the communication restoration vector by 1, and then calculates the sum of the movement vectors as calculation results.

Here, among the movement vectors belonging to the second basic movement vector groups of the mobile objects 201 to 204, the value of the second main basic movement vector is (−10 m/s, 0 m/s, 0 m/s) and the value of the second obstacle avoidance basic movement vector is (0 m/s, 0 m/s, 0 m/s). Among the movement vectors belonging to the second basic movement vector group of the mobile object 205, the value of the second main basic movement vector is (0 m/s, 0 m/s, 0 m/s) and the value of the second obstacle avoidance basic movement vector is (0 m/s, 0 m/s, 0 m/s). Among the movement vectors belonging to the second basic movement vector groups of the mobile objects 206 and 207, the value of the second main basic movement vector is (10 m/s, 0 m/s, 0 m/s) and the value of the second obstacle avoidance basic movement vector is (0 m/s, 0 m/s, 0 m/s).

Here, if the magnitude of the communication restoration vector is 0, the control unit 602 of each of the mobile objects 201 to 207 decides on, as an actual movement vector, the sum of a movement vector obtained by multiplying the main basic movement vector by 0.5, a movement vector obtained by multiplying the obstacle avoidance basic movement vector by 1, and a movement vector obtained by multiplying the communication restoration vector by 1. If the magnitude of the communication restoration vector is not 0, the control unit 602 of each of the mobile objects 201 to 207 decides on, as an actual movement vector, the sum of a movement vector obtained by multiplying the main basic movement vector by 0.05, a movement vector obtained by multiplying the obstacle avoidance basic movement vector by 0.1, and a movement vector obtained by multiplying the communication restoration vector by 1.

Figure 57:
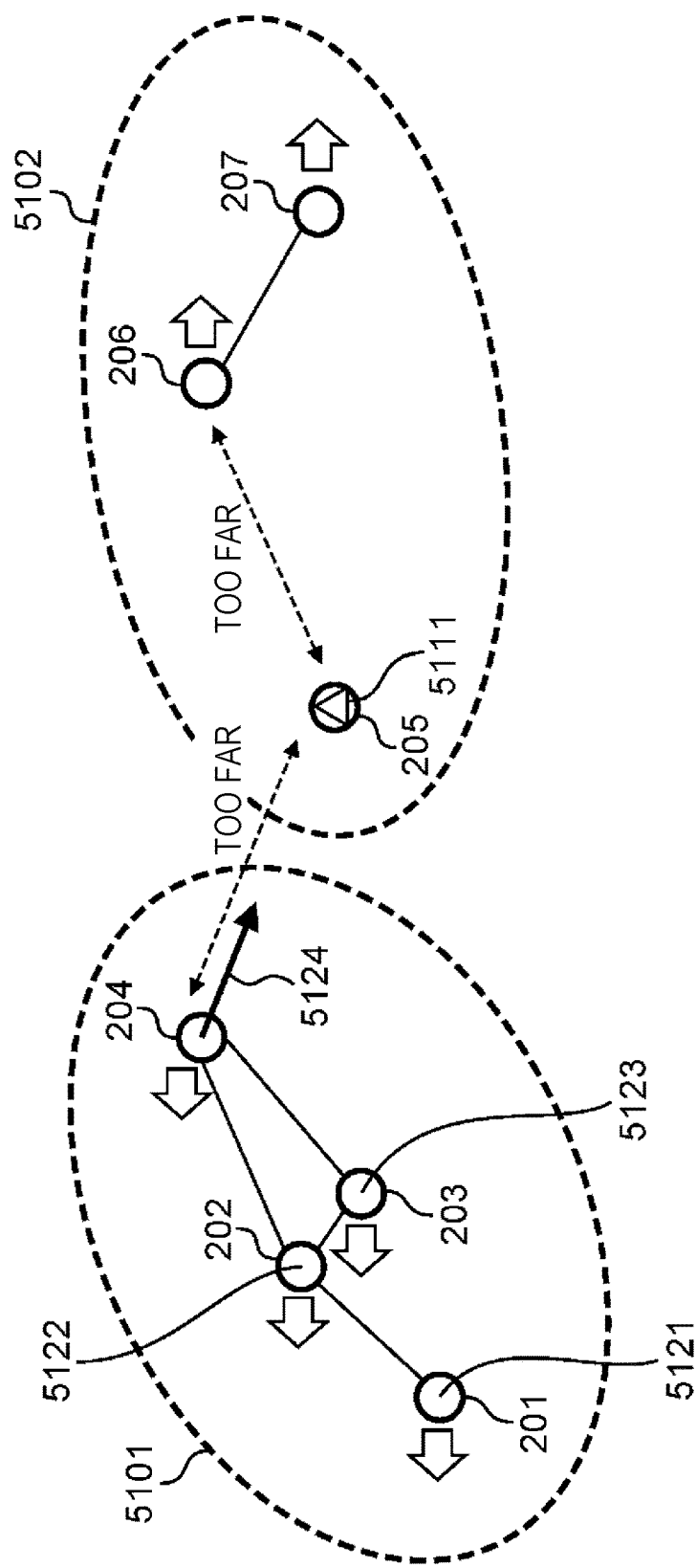
FIG. 57 is a conceptual diagram illustrating an example of communication restoration vectors of mobile objects in the situation illustrated in FIG. 3 in the third embodiment of the present disclosure.

FIG. 57 is a conceptual diagram illustrating an example of communication restoration vectors of the mobile objects 201 to 204 in the situation illustrated in FIG. 3 in the third embodiment of the present disclosure. In FIG. 57, the same elements as those in FIG. 1 are denoted by the same reference numerals and the description thereof will not be given.

As illustrated in FIG. 57, for each of the mobile objects 201 to 204, the mobile objects belonging to a known group 5101 are the mobile objects 201 to 204, and the mobile objects belonging to an unknown group 5102 are the mobile objects 205 to 207.

The control unit 602 of each of the mobile objects 201 to 204 decides on, as a target position 5111, the position of the mobile object 205, which is the nearest to the own mobile object among the positions of all the mobile objects belonging to the unknown group 5102.

The control unit 602 of the mobile object 204, which is the nearest to the target position 5111, decides on a communication restoration vector 5124 having a direction toward the target position and having a magnitude of 6.4 m/s. The control units 602 of the mobile objects 201 to 203 decide on communication restoration vectors 5121 to 5123 having a magnitude of 0, respectively.

Figure 58:
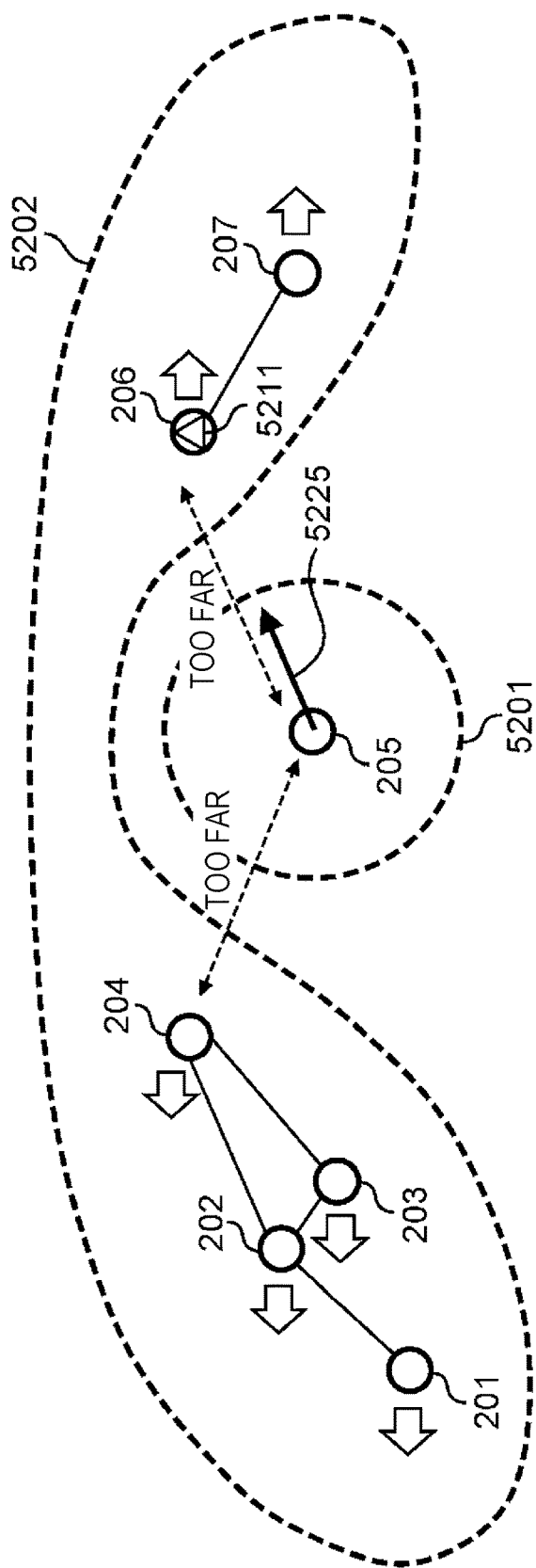
FIG. 58 is a conceptual diagram illustrating an example of a communication restoration vector of a mobile object in the situation illustrated in FIG. 3 in the third embodiment of the present disclosure.

FIG. 58 is a conceptual diagram illustrating an example of a communication restoration vector of the mobile object 205 in the situation illustrated in FIG. 3 in the third embodiment of the present disclosure. In FIG. 58, the same elements as those in FIG. 1 are denoted by the same reference numerals and the description thereof will not be given.

As illustrated in FIG. 58, for the mobile object 205, the mobile object belonging to a known group 5201 is the mobile object 205, and the mobile objects belonging to an unknown group 5202 are the mobile objects 201 to 204, 206, and 207.

The control unit 602 of the mobile object 205 decides on, as a target position 5211, the position of the mobile object 206, which is the nearest to the own mobile object among the positions of all the mobile objects belonging to the unknown group 5202.

The mobile object 205 is the nearest to the target position 5211, and thus the control unit 602 of the mobile object 205 decides on a communication restoration vector 5225 having a direction toward the target position and having a magnitude of 6.4 m/s.

Figure 59:
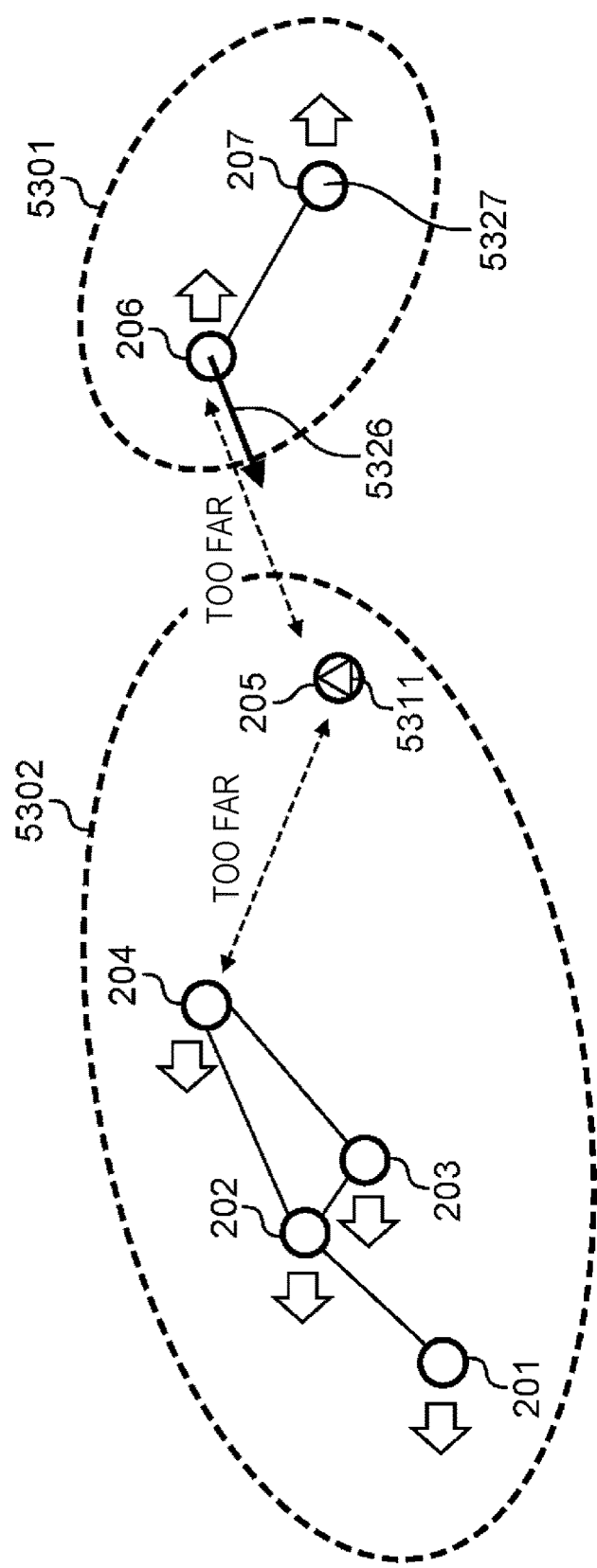
FIG. 59 is a conceptual diagram illustrating an example of communication restoration vectors of mobile objects in the situation illustrated in FIG. 3 in the third embodiment of the present disclosure.

FIG. 59 is a conceptual diagram illustrating an example of communication restoration vectors of the mobile objects 206 and 207 in the situation illustrated in FIG. 3 in the third embodiment of the present disclosure. In FIG. 59, the same elements as those in FIG. 1 are denoted by the same reference numerals and the description thereof will not be given.

As illustrated in FIG. 59, for each of the mobile objects 206 and 207, the mobile objects belonging to a known group 5301 are the mobile objects 206 and 207, and the mobile objects belonging to an unknown group 5302 are the mobile objects 201 to 205.

The control unit 602 of each of the mobile objects 206 and 207 decides on, as a target position 5311, the position of the mobile object 205, which is the nearest to the own mobile object among the positions of all the mobile objects belonging to the unknown group 5302.

The control unit 602 of the mobile object 206, which is the nearest to the target position 5311, decides on a communication restoration vector 5326 having a direction toward the target position and having a magnitude of 6.4 m/s. The control unit 602 of the mobile object 207 decides on a communication restoration vector 5327 having a magnitude of 0.

Figure 60:
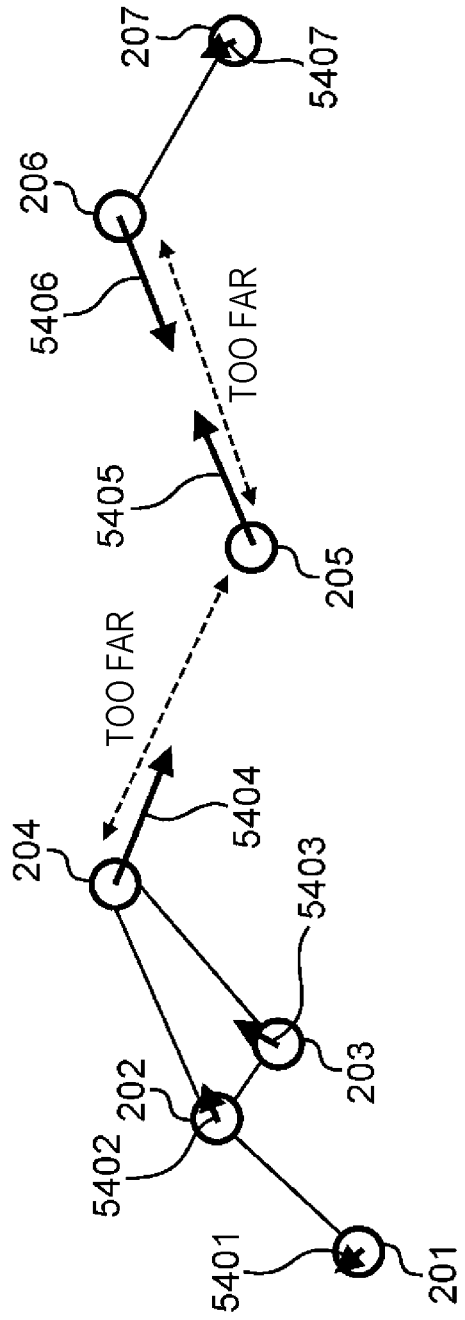
FIG. 60 is a conceptual diagram illustrating an example of actual movement vectors of mobile objects in the situation illustrated in FIG. 3 in the third embodiment of the present disclosure.

FIG. 60 is a conceptual diagram illustrating an example of actual movement vectors of the mobile objects 201 to 207 in the situation illustrated in FIG. 3 in the third embodiment of the present disclosure. In FIG. 60, the same elements as those in FIG. 1 are denoted by the same reference numerals and the description thereof will not be given.

Only the mobile object 202 belongs to the direct communication group of the mobile object 201. Thus, the control unit 602 of the mobile object 201 decides on, as a repulsion vector for the mobile object 202, a movement vector having a magnitude of 2.8 m/s and having a direction opposite to the direction toward the mobile object 202. Also, the control unit 602 of the mobile object 201 decides on, as an approach vector for the mobile object 202, a movement vector having a magnitude of 4.2 m/s that is proportional to the square of the distance 19.9 m from the position of the mobile object 202 to the position of the own mobile object and having a direction toward the mobile object 202. Also, the control unit 602 of the mobile object 201 decides on, as a communication maintaining movement vector, the sum of a movement vector obtained by multiplying the repulsion vector for the mobile object 202 by 1 and a movement vector obtained by multiplying the approach vector for the mobile object 202 by 1.

Subsequently, the control unit 602 of the mobile object 201 calculates the sum of a movement vector obtained by multiplying the second main basic movement vector (−10 m/s, 0 m/s, 0 m/s) by 1 and a movement vector obtained by multiplying the communication maintaining movement vector by 0.5, and decides on the sum as a main basic movement vector. Also, the control unit 602 of the mobile object 201 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

Since the magnitude of the communication restoration vector 5121 is 0, an actual movement vector 5401 of the mobile object 201 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1.

If the mobile object 205 fails, the magnitude of the communication restoration vector 5121 is 0. Thus, even if the mobile object 205 fails and even if a mobile object belonging to an unknown group emerges, the mobile object 201 moves substantially northwestward in accordance with the actual movement vector 5401 as illustrated in FIG. 60, as in the case where the mobile object 205 does not fail and there is no mobile object belonging to an unknown group. Since the distance between the mobile object 201 and the mobile object 202 belonging to the direct communication group of the mobile object 201 is shorter than the distance between the mobile object 202 and the mobile object 204, the ratio of a movement for maintaining direct communication is smaller in the mobile object 201 than in the mobile object 202, and an original purpose can be substantially implemented.

The mobile objects 201, 203, and 204 belong to the direct communication group of the mobile object 202. Thus, the control unit 602 of the mobile object 202 decides on, as a repulsion vector for the mobile object 201, a movement vector having a magnitude of 2.8 m/s and having a direction opposite to the direction toward the mobile object 201. The control unit 602 of the mobile object 202 decides on, as an approach vector for the mobile object 201, a movement vector having a magnitude proportional to the square of the distance from the position of the mobile object 201 to the position of the own mobile object and having a direction toward the mobile object 201. The control unit 602 of the mobile object 202 decides on, as a repulsion vector for the mobile object 203, a movement vector having a magnitude of 2.8 m/s and having a direction opposite to the direction toward the mobile object 203. The control unit 602 of the mobile object 202 decides on, as an approach vector for the mobile object 203, a movement vector having a magnitude proportional to the square of the distance from the position of the mobile object 203 to the position of the own mobile object and having a direction toward the mobile object 203.

The control unit 602 of the mobile object 202 decides on, as a repulsion vector for the mobile object 204, a movement vector having a magnitude of 2.8 m/s and having a direction opposite to the direction toward the mobile object 204. The control unit 602 of the mobile object 202 decides on, as an approach vector for the mobile object 204, a movement vector having a magnitude proportional to the square of the distance from the position of the mobile object 204 to the position of the own mobile object and having a direction toward the mobile object 204.

Subsequently, the control unit 602 of the mobile object 202 decides on, as a communication maintaining movement vector, the sum of a movement vector obtained by multiplying the repulsion vector for the mobile object 201 by 1, a movement vector obtained by multiplying the repulsion vector for the mobile object 203 by 1, a movement vector obtained by multiplying the repulsion vector for the mobile object 204 by 1, a movement vector obtained by multiplying the approach vector for the mobile object 201 by 1, a movement vector obtained by multiplying the approach vector for the mobile object 203 by 1, and a movement vector obtained by multiplying the approach vector for the mobile object 204 by 1.

Subsequently, the control unit 602 of the mobile object 202 calculates the sum of a movement vector obtained by multiplying the second main basic movement vector (−10 m/s, 0 m/s, 0 m/s) by 1 and a movement vector obtained by multiplying the communication maintaining movement vector by 0.5, and decides on the sum as a main basic movement vector. Also, the control unit 602 of the mobile object 202 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

Since the magnitude of the communication restoration vector 5122 is 0, an actual movement vector 5402 of the mobile object 202 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1.

If the mobile object 205 fails, the magnitude of the communication restoration vector 5122 is 0. Thus, even if the mobile object 205 fails and even if a mobile object belonging to an unknown group emerges, the mobile object 202 moves substantially east-northeastward in accordance with the actual movement vector 5402 as illustrated in FIG. 60, as in the case where the mobile object 205 does not fail and there is no mobile object belonging to an unknown group. Since the distance between the mobile object 202 and the mobile object 204 belonging to the direct communication group of the mobile object 202 is shorter than the distance between the mobile object 201 and the mobile object 202, the ratio of a movement for maintaining direct communication is larger in the mobile object 202 than in the mobile object 201, and the ratio of a movement for maintaining direct communication is larger than that for implementing an original purpose.

The mobile objects 202 and 204 belong to the direct communication group of the mobile object 203. Thus, the control unit 602 of the mobile object 203 decides on, as a repulsion vector for the mobile object 202, a movement vector having a magnitude of 2.8 m/s and having a direction opposite to the direction toward the mobile object 202. The control unit 602 of the mobile object 203 decides on, as an approach vector for the mobile object 202, a movement vector having a magnitude proportional to the square of the distance from the position of the mobile object 202 to the position of the own mobile object and having a direction toward the mobile object 202. The control unit 602 of the mobile object 203 decides on, as a repulsion vector for the mobile object 204, a movement vector having a magnitude of 2.8 m/s and having a direction opposite to the direction toward the mobile object 204. The control unit 602 of the mobile object 203 decides on, as an approach vector for the mobile object 204, a movement vector having a magnitude proportional to the square of the distance from the position of the mobile object 204 to the position of the own mobile object and having a direction toward the mobile object 204.

Subsequently, the control unit 602 of the mobile object 203 decides on, as a communication maintaining movement vector, the sum of a movement vector obtained by multiplying the repulsion vector for the mobile object 202 by 1, a movement vector obtained by multiplying the repulsion vector for the mobile object 204 by 1, a movement vector obtained by multiplying the approach vector for the mobile object 202 by 1, and a movement vector obtained by multiplying the approach vector for the mobile object 204 by 1.

Subsequently, the control unit 602 of the mobile object 203 calculates the sum of a movement vector obtained by multiplying the second main basic movement vector (−10 m/s, 0 m/s, 0 m/s) by 1 and a movement vector obtained by multiplying the communication maintaining movement vector by 0.5, and decides on the sum as a main basic movement vector. Also, the control unit 602 of the mobile object 203 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

Since the magnitude of the communication restoration vector 5123 is 0, an actual movement vector 5403 of the mobile object 203 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1.

If the mobile object 205 fails, the magnitude of the communication restoration vector 5123 is 0. Thus, even if the mobile object 205 fails and even if a mobile object belonging to an unknown group emerges, the mobile object 203 moves substantially northeastward in accordance with the actual movement vector 5403 as illustrated in FIG. 60, as in the case where the mobile object 205 does not fail and there is no mobile object belonging to an unknown group. Since the distance between the mobile object 203 and the mobile object 204 belonging to the direct communication group of the mobile object 203 is shorter than the distance between the mobile object 201 and the mobile object 202, the ratio of a movement for maintaining direct communication is larger in the mobile object 203 than in the mobile object 201, and the ratio of a movement for maintaining direct communication is larger than that for implementing an original purpose.

The mobile objects 202 and 203 belong to the direct communication group of the mobile object 204. Thus, the control unit 602 of the mobile object 204 decides on, as a repulsion vector for the mobile object 202, a movement vector having a magnitude of 2.8 m/s and having a direction opposite to the direction toward the mobile object 202. The control unit 602 of the mobile object 204 decides on, as an approach vector for the mobile object 202, a movement vector having a magnitude proportional to the square of the distance from the position of the mobile object 202 to the position of the own mobile object and having a direction toward the mobile object 202. The control unit 602 of the mobile object 204 decides on, as a repulsion vector for the mobile object 203, a movement vector having a magnitude of 2.8 m/s and having a direction opposite to the direction toward the mobile object 203. The control unit 602 of the mobile object 204 decides on, as an approach vector for the mobile object 203, a movement vector having a magnitude proportional to the square of the distance from the position of the mobile object 203 to the position of the own mobile object and having a direction toward the mobile object 203.

Subsequently, the control unit 602 of the mobile object 204 decides on, as a communication maintaining movement vector, the sum of a movement vector obtained by multiplying the repulsion vector for the mobile object 202 by 1, a movement vector obtained by multiplying the repulsion vector for the mobile object 203 by 1, a movement vector obtained by multiplying the approach vector for the mobile object 202 by 1, and a movement vector obtained by multiplying the approach vector for the mobile object 203 by 1.

Subsequently, the control unit 602 of the mobile object 204 calculates the sum of a movement vector obtained by multiplying the second main basic movement vector (−10 m/s, 0 m/s, 0 m/s) by 1 and a movement vector obtained by multiplying the communication maintaining movement vector by 0.5, and decides on the sum as a main basic movement vector. Also, the control unit 602 of the mobile object 204 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

If the mobile object 205 does not fail and if there is no mobile object belonging to an unknown group, the magnitude of the communication restoration vector is 0. Thus, an actual movement vector of the mobile object 204 is the sum of a movement vector obtained by multiplying the main basic movement vector by 0.5 and a movement vector obtained by multiplying the obstacle avoidance basic movement vector by 1, and the mobile object 204 moves substantially southwestward. However, if the mobile object 205 fails and if a mobile object belonging to an unknown group emerges, an actual movement vector 5404 of the mobile object 204 is the sum of a movement vector obtained by multiplying the main basic movement vector by 0.05, a movement vector obtained by multiplying the obstacle avoidance basic movement vector by 0.1, and a movement vector obtained by multiplying the communication restoration vector 5124 by 1, and the mobile object 204 moves substantially east-southeastward and mainly performs a communication restoration operation, as illustrated in FIG. 60.

There is no mobile object belonging to the direct communication group of the mobile object 205. Thus, the control unit 602 of the mobile object 205 decides on a repulsion vector having a magnitude of 0 and an approach vector having a magnitude of 0. The control unit 602 of the mobile object 205 calculates the sum of a movement vector obtained by multiplying the repulsion vector having a magnitude of 0 by 1 and a movement vector obtained by multiplying the approach vector having a magnitude of 0 by 1, and decides on a communication maintaining movement vector having a magnitude of 0.

Subsequently, the control unit 602 of the mobile object 205 calculates the sum of a movement vector obtained by multiplying the second main basic movement vector (0 m/s, 0 m/s, 0 m/s) by 1 and a movement vector obtained by multiplying the communication maintaining movement vector by 0.5, and decides on the sum as a main basic movement vector. Also, the control unit 602 of the mobile object 205 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

If the mobile object 205 does not fail and if there is no mobile object belonging to an unknown group, the magnitude of the communication restoration vector is 0. Thus, an actual movement vector of the mobile object 205 is the sum of a movement vector obtained by multiplying the main basic movement vector by 0.5 and a movement vector obtained by multiplying the obstacle avoidance basic movement vector by 1, and the mobile object 205 stops at the position. However, if the mobile object 205 fails and if a mobile object belonging to an unknown group emerges, an actual movement vector 5405 of the mobile object 205 is the sum of a movement vector obtained by multiplying the main basic movement vector by 0.05, a movement vector obtained by multiplying the obstacle avoidance basic movement vector by 0.1, and a movement vector obtained by multiplying the communication restoration vector 5225 by 1, and the mobile object 205 moves substantially east-northeastward and mainly performs a communication restoration operation, as illustrated in FIG. 60.

Only the mobile object 207 belongs to the direct communication group of the mobile object 206. Thus, the control unit 602 of the mobile object 206 decides on, as a repulsion vector for the mobile object 207, a movement vector having a magnitude of 2.8 m/s and having a direction opposite to the direction toward the mobile object 207. Also, the control unit 602 of the mobile object 206 decides on, as an approach vector for the mobile object 207, a movement vector having a magnitude proportional to the square of the distance from the position of the mobile object 207 to the position of the own mobile object and having a direction toward the mobile object 207. Also, the control unit 602 of the mobile object 206 decides on, as a communication maintaining movement vector, the sum of a movement vector obtained by multiplying the repulsion vector for the mobile object 207 by 1 and a movement vector obtained by multiplying the approach vector for the mobile object 207 by 1.

Subsequently, the control unit 602 of the mobile object 206 calculates the sum of a movement vector obtained by multiplying the second main basic movement vector (10 m/s, 0 m/s, 0 m/s) by 1 and a movement vector obtained by multiplying the communication maintaining movement vector by 0.5, and decides on the sum as a main basic movement vector. Also, the control unit 602 of the mobile object 206 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

If the mobile object 205 does not fail and if there is no mobile object belonging to an unknown group, the magnitude of the communication restoration vector is 0. Thus, an actual movement vector of the mobile object 206 is the sum of a movement vector obtained by multiplying the main basic movement vector by 0.5 and a movement vector obtained by multiplying the obstacle avoidance basic movement vector by 1, and the mobile object 206 moves substantially southeastward. However, if the mobile object 205 fails and if a mobile object belonging to an unknown group emerges, an actual movement vector 5406 of the mobile object 206 is the sum of a movement vector obtained by multiplying the main basic movement vector by 0.05, a movement vector obtained by multiplying the obstacle avoidance basic movement vector by 0.1, and a movement vector obtained by multiplying the communication restoration vector 5326 by 1, and the mobile object 206 moves substantially west-southwestward and mainly performs a communication restoration operation, as illustrated in FIG. 60.

Only the mobile object 206 belongs to the direct communication group of the mobile object 207. Thus, the control unit 602 of the mobile object 207 decides on, as a repulsion vector for the mobile object 206, a movement vector having a magnitude of 2.8 m/s and having a direction opposite to the direction toward the mobile object 206. Also, the control unit 602 of the mobile object 207 decides on, as an approach vector for the mobile object 206, a movement vector having a magnitude proportional to the square of the distance from the position of the mobile object 206 to the position of the own mobile object and having a direction toward the mobile object 206. Also, the control unit 602 of the mobile object 207 decides on, as a communication maintaining movement vector, the sum of a movement vector obtained by multiplying the repulsion vector for the mobile object 206 by 1 and a movement vector obtained by multiplying the approach vector for the mobile object 206 by 1.

Subsequently, the control unit 602 of the mobile object 207 calculates the sum of a movement vector obtained by multiplying the second main basic movement vector (10 m/s, 0 m/s, 0 m/s) by 1 and a movement vector obtained by multiplying the communication maintaining movement vector by 0.5, and decides on the sum as a main basic movement vector. Also, the control unit 602 of the mobile object 207 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

Since the magnitude of a communication restoration vector 5127 is 0, an actual movement vector 5407 of the mobile object 207 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1.

If the mobile object 205 fails, the magnitude of the communication restoration vector 5127 is 0. Thus, even if the mobile object 205 fails and even if a mobile object belonging to an unknown group emerges, the mobile object 207 moves substantially north-northwestward in accordance with the actual movement vector 5407 as illustrated in FIG. 60, as in the case where the mobile object 205 does not fail and there is no mobile object belonging to an unknown group. Since the distance between the mobile object 207 and the mobile object 206 belonging to the direct communication group of the mobile object 207 is shorter than the distance between the mobile object 201 and the mobile object 202, the ratio of a movement for maintaining direct communication is larger in the mobile object 207 than in the mobile object 201, and the ratio of a movement for maintaining direct communication is larger than that for implementing an original purpose.

In this way, the mobile objects 202 to 207 move to get together, and thus an attempt to restore communication can be made. Furthermore, all of the mobile objects 201 to 207 are capable of maintaining the direct communication between the mobile objects due to an effect of communication maintaining movement vectors. Even if some mobile objects move to get away from each other as in the example illustrated in FIG. 3, an attempt to restore communication can be made.

The second technique disclosed in PTL 1 has an issue that all mobile objects are incapable of moving for an original purpose until communication is restored. In contrast, in the third embodiment of the present disclosure, the mobile object 201 is capable of moving mainly for an original purpose in the example illustrated in FIG. 60, for example, and the foregoing issue can be overcome.

The third technique disclosed in PTL 1 has an issue that a region over which a mobile object group is deployed gradually becomes smaller and all mobile objects are incapable of moving for an original purpose until communication is restored. Furthermore, after the communication is restored, the mobile objects need to move again for the original purpose from the positions at the point of time when the communication is restored. In contrast, in the third embodiment of the present disclosure, the mobile object 201 is capable of moving mainly for an original purpose in the example illustrated in FIG. 60, for example, and the foregoing issue can be overcome.

The fourth technique disclosed in PTL 1 has an issue that, if a selected mobile object moves toward a cutoff position, the communication between the selected mobile object and a mobile object other than a mobile object disconnected from the ad hoc network is cut off, and accordingly the ad hoc network may be secondarily fractured. In contrast, in the third embodiment of the present disclosure, the mobile objects 202 to 207 move to get together to attempt to restore communication, and all of the mobile objects 201 to 207 are capable of maintaining the direct communication between the mobile objects due to an effect of communication maintaining movement vectors in the example illustrated in FIG. 60, for example. Accordingly, the foregoing issue can be overcome.

As described above, in the first technique disclosed in PTL 1, if a mobile object disconnected from the ad hoc network moves to restore communication with the ad hoc network but there is no mobile object in the movement direction or if a mobile object moves in a direction of getting away from the mobile object disconnected from the ad hoc network, it is impossible to restore communication, as in the example illustrated in FIG. 4. In the example illustrated in FIG. 4, the mobile objects 201 to 206 do not exist in the direction in which the mobile object 207, which has been disconnected from the ad hoc network, moves to restore communication, and the mobile objects 201 to 206 continue to move in a lower-left direction in FIG. 4. Thus, the mobile object 207 is incapable of approaching the mobile objects 201 to 206 and restoring the direct communication therewith even if the first technique disclosed in PTL 1 is used. Furthermore, even if the mobile objects 201 to 206 exist in the direction in which the mobile object 207 moves, the mobile object 207 is incapable of catching up with the mobile objects 201 to 206 and restoring the direct communication with the mobile objects 201 to 206 because the mobile objects 201 to 206 continue to move in a direction of getting away from the mobile object 207.

In contrast, in the third embodiment of the present disclosure, even if a mobile object disconnected from the ad hoc network moves to restore communication with the ad hoc network but there is no mobile object in the movement direction or even if a mobile object moves in a direction of getting away from the mobile object disconnected from the ad hoc network, as in the example illustrated in FIG. 4, an attempt to restore communication can be made. This will be described below.

Here, the control unit 602 of each of the mobile objects 201 to 207 decides on, as a target position, the position nearest to the own mobile object among the positions of all the mobile objects belonging to the unknown group. Also, the control unit 602 of each of the mobile objects 201 to 207 decides on a communication restoration vector having a direction toward the target position and having a magnitude of 6.4 m/s if the own mobile object is the nearest to the target position among the mobile objects belonging to the known group, and decides on a communication restoration vector having a magnitude of 0 if the own mobile object is not the nearest to the target position.

Here, the control unit 602 of each of the mobile objects 201 to 207 decides on, for each mobile object belonging to the direct communication group, a movement vector as a repulsion vector having a predetermined magnitude and having a direction opposite to the direction toward the mobile object, regardless of the distance from the position of the mobile object to the own mobile object. It is assumed that the magnitude of the repulsion vector is 2.8 m/s.

Here, the control unit 602 of each of the mobile objects 201 to 207 decides on, for each mobile object belonging to the direct communication group, a movement vector as an approach vector having a magnitude proportional to the square of the distance from the position of the mobile object to the position of the own mobile object and having a direction toward the mobile object. That is, the magnitude of the approach vector decided on by the control unit 602 of each of the mobile objects 201 to 207 increases as the distance between mobile objects increases.

Here, the control unit 602 of each of the mobile objects 201 to 207 calculates the sum of movement vectors obtained by multiplying the individual repulsion vectors by 1 and multiplying the individual approach vectors by 1, and decides on a movement vector obtained through the calculation as a communication maintaining movement vector.

Here, the control unit 602 of each of the mobile objects 201 to 207 multiplies the second main basic movement vector belonging to the second basic movement vector group by 1, multiplies the communication maintaining movement vector by 0.5, which is a value obtained by dividing 1 by the number of movement vectors belonging to the second basic movement vector group, calculates the sum of the movement vectors as calculation results, and decides on the sum as a main basic movement vector. Also, the control unit 602 of each of the mobile objects 201 to 207 multiplies the second obstacle avoidance basic movement vector belonging to the second basic movement vector group by 1, multiplies the communication maintaining movement vector by 0.5, which is a value obtained by dividing 1 by the number of movement vectors belonging to the second basic movement vector group, calculates the sum of the movement vectors as calculation results, and decides on the sum as an obstacle avoidance basic movement vector.

To increase the ratio of a movement for avoiding an obstacle, the control unit 602 of each of the mobile objects 201 to 207 multiplies the main basic movement vector belonging to the basic movement vector group by 0.5, multiplies the obstacle avoidance basic movement vector belonging to the basic movement vector group by 1, and multiplies the communication restoration vector by 1, and then calculates the sum of the movement vectors as calculation results.

Here, among the movement vectors belonging to the second basic movement vector groups of the mobile objects 201 to 206, the value of the second main basic movement vector is (−6 m/s, −8 m/s, 0 m/s) and the value of the second obstacle avoidance basic movement vector is (0 m/s, 0 m/s, 0 m/s). Among the movement vectors belonging to the second basic movement vector group of the mobile object 205, the value of the second main basic movement vector is (0 m/s, 0 m/s, 0 m/s) and the value of the second obstacle avoidance basic movement vector is (0 m/s, 0 m/s, 0 m/s). Among the movement vectors belonging to the second basic movement vector group of the mobile object 207, the value of the second main basic movement vector is (10 m/s, 0 m/s, 0 m/s) and the value of the second obstacle avoidance basic movement vector is (0 m/s, 0 m/s, 0 m/s).

Here, if the magnitude of the communication restoration vector is 0, the control unit 602 of each of the mobile objects 201 to 207 decides on, as an actual movement vector, the sum of a movement vector obtained by multiplying the main basic movement vector by 0.5, a movement vector obtained by multiplying the obstacle avoidance basic movement vector by 1, and a movement vector obtained by multiplying the communication restoration vector by 1. If the magnitude of the communication restoration vector is not 0, the control unit 602 of each of the mobile objects 201 to 207 decides on, as an actual movement vector, the sum of a movement vector obtained by multiplying the main basic movement vector by 0.05, a movement vector obtained by multiplying the obstacle avoidance basic movement vector by 0.1, and a movement vector obtained by multiplying the communication restoration vector by 1.

Figure 61:
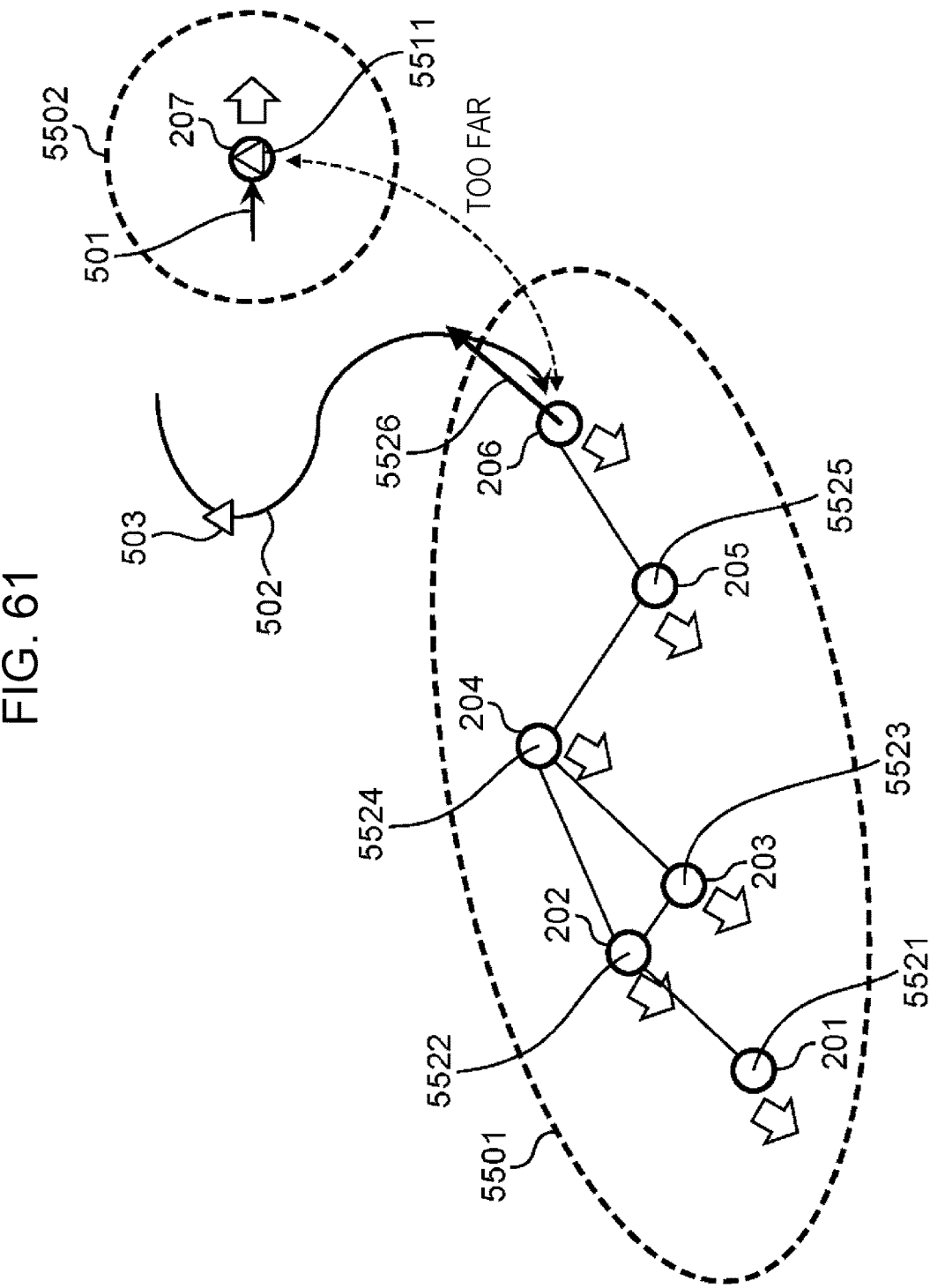
FIG. 61 is a conceptual diagram illustrating an example of communication restoration vectors that are decided on by mobile objects in the situation illustrated in FIG. 4 in the third embodiment of the present disclosure.

FIG. 61 is a conceptual diagram illustrating an example of communication restoration vectors that are decided on by the mobile objects 201 to 206 in the situation illustrated in FIG. 4 in the third embodiment of the present disclosure. In FIG. 61, the same elements as those in FIGS. 1 and 4 are denoted by the same reference numerals and the description thereof will not be given.

As illustrated in FIG. 61, for each of the mobile objects 201 to 206, the mobile objects belonging to a known group 5501 are the mobile objects 201 to 206, and the mobile object belonging to an unknown group 5502 is the mobile object 207.

The control unit 602 of each of the mobile objects 201 to 206 decides on, as a target position 5511, the position of the mobile object 207, which is the nearest to the own mobile object among the positions of all the mobile objects belonging to the unknown group 5502.

The control unit 602 of the mobile object 206, which is the nearest to the target position 5511, decides on a communication restoration vector 5526 having a direction toward the target position and having a magnitude of 6.4 m/s. The control units 602 of the mobile objects 201 to 205 decide on communication restoration vectors 5521 to 5525 having a magnitude of 0, respectively.

Figure 62:
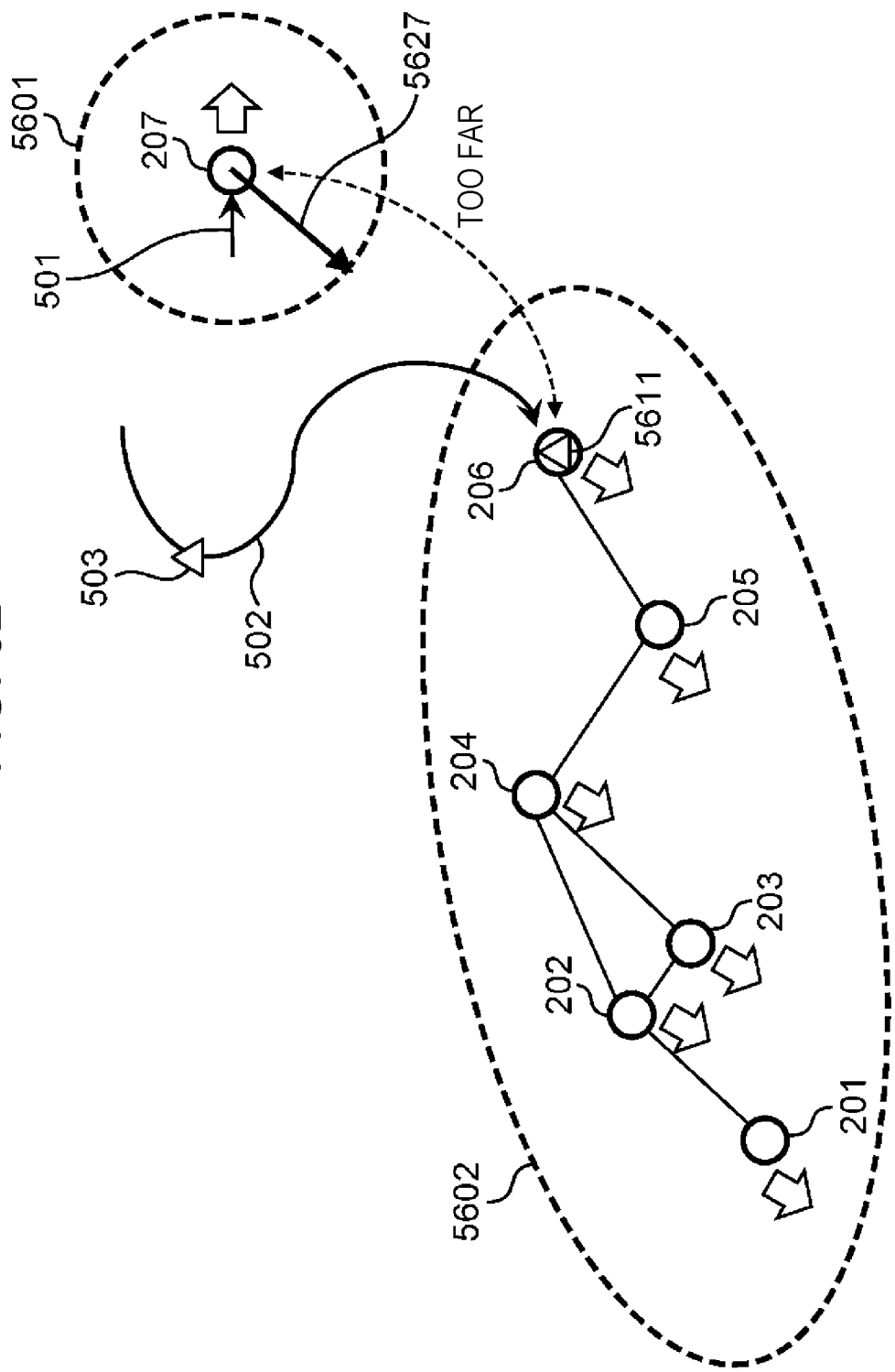
FIG. 62 is a conceptual diagram illustrating an example of a communication restoration vector of a mobile object in the situation illustrated in FIG. 4 in the third embodiment of the present disclosure.

FIG. 62 is a conceptual diagram illustrating an example of a communication restoration vector of the mobile object 207 in the situation illustrated in FIG. 4 in the third embodiment of the present disclosure. In FIG. 62, the same elements as those in FIGS. 1 and 4 are denoted by the same reference numerals and the description thereof will not be given.

As illustrated in FIG. 62, for the mobile object 207, the mobile object belonging to a known group 5601 is the mobile object 207, and the mobile objects belonging to an unknown group 5602 are the mobile objects 201 to 206.

The control unit 602 of the mobile object 207 decides on, as a target position 5611, the position 503 immediately before the communication cutoff of the mobile object 206, which is the nearest to the own mobile object among the positions of all the mobile objects belonging to the unknown group 5602.

The mobile object 207 is the nearest to the target position 5611, and thus the control unit 602 of the mobile object 207 decides on a communication restoration vector 5627 having a direction toward the target position and having a magnitude of 6.4 m/s.

Figure 63:
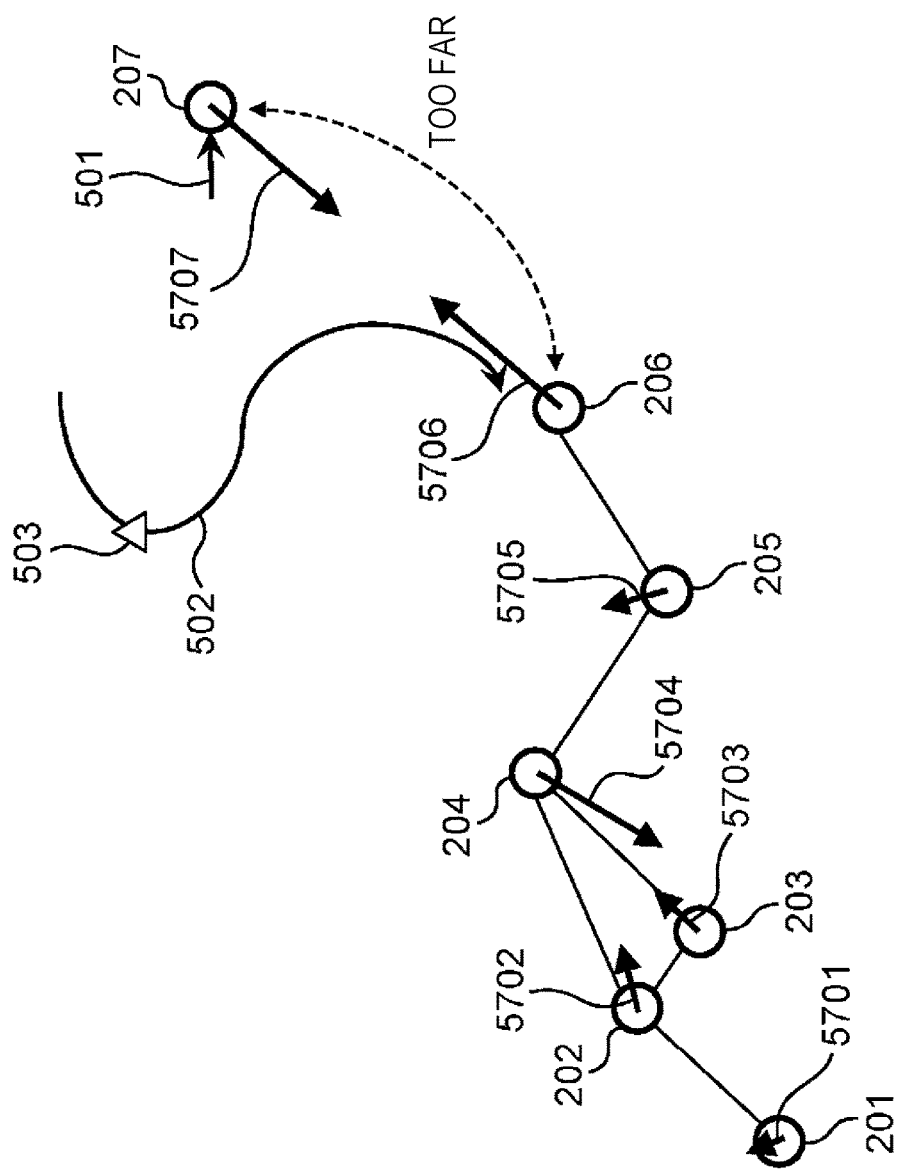
FIG. 63 is a conceptual diagram illustrating an example of actual movement vectors of mobile objects in the situation illustrated in FIG. 4 in the third embodiment of the present disclosure.

FIG. 63 is a conceptual diagram illustrating an example of actual movement vectors of the mobile objects 201 to 207 in the situation illustrated in FIG. 4 in the third embodiment of the present disclosure. In FIG. 63, the same elements as those in FIGS. 1 and 4 are denoted by the same reference numerals and the description thereof will not be given.

Only the mobile object 202 belongs to the direct communication group of the mobile object 201. Thus, the control unit 602 of the mobile object 201 decides on, as a repulsion vector for the mobile object 202, a movement vector having a magnitude of 2.8 m/s and having a direction opposite to the direction toward the mobile object 202. Also, the control unit 602 of the mobile object 201 decides on, as an approach vector for the mobile object 202, a movement vector having a magnitude of 4.2 m/s that is proportional to the square of the distance 19.9 m from the position of the mobile object 202 to the position of the own mobile object and having a direction toward the mobile object 202. Also, the control unit 602 of the mobile object 201 decides on, as a communication maintaining movement vector, the sum of a movement vector obtained by multiplying the repulsion vector for the mobile object 202 by 1 and a movement vector obtained by multiplying the approach vector for the mobile object 202 by 1.

Subsequently, the control unit 602 of the mobile object 201 calculates the sum of a movement vector obtained by multiplying the second main basic movement vector (−6 m/s, −8 m/s, 0 m/s) by 1 and a movement vector obtained by multiplying the communication maintaining movement vector by 0.5, and decides on the sum as a main basic movement vector. Also, the control unit 602 of the mobile object 201 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

Since the magnitude of the communication restoration vector 5521 is 0, the actual movement vector 5701 of the mobile object 201 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1.

If the mobile object 205 fails, the magnitude of the communication restoration vector 5521 is 0. Thus, even if the mobile object 205 fails and even if a mobile object belonging to an unknown group emerges, the mobile object 201 slowly moves substantially north-northwestward in accordance with the actual movement vector 5701 as illustrated in FIG. 63, as in the case where the mobile object 205 does not fail and there is no mobile object belonging to an unknown group. Since the distance between the mobile object 201 and the mobile object 202 belonging to the direct communication group of the mobile object 201 is shorter than the distance between the mobile object 202 and the mobile object 204, the ratio of a movement for maintaining direct communication is smaller in the mobile object 201 than in the mobile object 202, and an original purpose can be implemented although the ratio thereof is small.

The mobile objects 201, 203, and 204 belong to the direct communication group of the mobile object 202. Thus, the control unit 602 of the mobile object 202 decides on, as a repulsion vector for the mobile object 201, a movement vector having a magnitude of 2.8 m/s and having a direction opposite to the direction toward the mobile object 201. The control unit 602 of the mobile object 202 decides on, as an approach vector for the mobile object 201, a movement vector having a magnitude proportional to the square of the distance from the position of the mobile object 201 to the position of the own mobile object and having a direction toward the mobile object 201. The control unit 602 of the mobile object 202 decides on, as a repulsion vector for the mobile object 203, a movement vector having a magnitude of 2.8 m/s and having a direction opposite to the direction toward the mobile object 203. The control unit 602 of the mobile object 202 decides on, as an approach vector for the mobile object 203, a movement vector having a magnitude proportional to the square of the distance from the position of the mobile object 203 to the position of the own mobile object and having a direction toward the mobile object 203. The control unit 602 of the mobile object 202 decides on, as a repulsion vector for the mobile object 204, a movement vector having a magnitude of 2.8 m/s and having a direction opposite to the direction toward the mobile object 204. The control unit 602 of the mobile object 202 decides on, as an approach vector for the mobile object 204, a movement vector having a magnitude proportional to the square of the distance from the position of the mobile object 204 to the position of the own mobile object and having a direction toward the mobile object 204.

Subsequently, the control unit 602 of the mobile object 202 decides on, as a communication maintaining movement vector, the sum of a movement vector obtained by multiplying the repulsion vector for the mobile object 201 by 1, a movement vector obtained by multiplying the repulsion vector for the mobile object 203 by 1, a movement vector obtained by multiplying the repulsion vector for the mobile object 204 by 1, a movement vector obtained by multiplying the approach vector for the mobile object 201 by 1, a movement vector obtained by multiplying the approach vector for the mobile object 203 by 1, and a movement vector obtained by multiplying the approach vector for the mobile object 204 by 1.

Subsequently, the control unit 602 of the mobile object 202 calculates the sum of a movement vector obtained by multiplying the second main basic movement vector (−6 m/s, −8 m/s, 0 m/s) by 1 and a movement vector obtained by multiplying the communication maintaining movement vector by 0.5, and decides on the sum as a main basic movement vector. Also, the control unit 602 of the mobile object 202 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

Since the magnitude of the communication restoration vector 5522 is 0, an actual movement vector 5702 of the mobile object 202 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1.

If the mobile object 205 fails, the magnitude of the communication restoration vector 5522 is 0. Thus, even if the mobile object 205 fails and even if a mobile object belonging to an unknown group emerges, the mobile object 202 moves substantially east-northeastward in accordance with the actual movement vector 5702 as illustrated in FIG. 63, as in the case where the mobile object 205 does not fail and there is no mobile object belonging to an unknown group. Since the distance between the mobile object 202 and the mobile object 204 belonging to the direct communication group of the mobile object 202 is shorter than the distance between the mobile object 201 and the mobile object 202, the ratio of a movement for maintaining direct communication is larger in the mobile object 202 than in the mobile object 201, and the ratio of a movement for maintaining direct communication is larger than that for implementing an original purpose.

The mobile objects 202 and 204 belong to the direct communication group of the mobile object 203. Thus, the control unit 602 of the mobile object 203 decides on, as a repulsion vector for the mobile object 202, a movement vector having a magnitude of 2.8 m/s and having a direction opposite to the direction toward the mobile object 202. The control unit 602 of the mobile object 203 decides on, as an approach vector for the mobile object 202, a movement vector having a magnitude proportional to the square of the distance from the position of the mobile object 202 to the position of the own mobile object and having a direction toward the mobile object 202. The control unit 602 of the mobile object 203 decides on, as a repulsion vector for the mobile object 204, a movement vector having a magnitude of 2.8 m/s and having a direction opposite to the direction toward the mobile object 204. The control unit 602 of the mobile object 203 decides on, as an approach vector for the mobile object 204, a movement vector having a magnitude proportional to the square of the distance from the position of the mobile object 204 to the position of the own mobile object and having a direction toward the mobile object 204.

Subsequently, the control unit 602 of the mobile object 203 decides on, as a communication maintaining movement vector, the sum of a movement vector obtained by multiplying the repulsion vector for the mobile object 202 by 1, a movement vector obtained by multiplying the repulsion vector for the mobile object 204 by 1, a movement vector obtained by multiplying the approach vector for the mobile object 202 by 1, and a movement vector obtained by multiplying the approach vector for the mobile object 204 by 1.

Subsequently, the control unit 602 of the mobile object 203 calculates the sum of a movement vector obtained by multiplying the second main basic movement vector (−6 m/s, −8 m/s, 0 m/s) by 1 and a movement vector obtained by multiplying the communication maintaining movement vector by 0.5, and decides on the sum as a main basic movement vector. Also, the control unit 602 of the mobile object 203 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

Since the magnitude of the communication restoration vector 5523 is 0, an actual movement vector 5703 of the mobile object 203 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1.

If the mobile object 205 fails, the magnitude of the communication restoration vector 5523 is 0. Thus, even if the mobile object 205 fails and even if a mobile object belonging to an unknown group emerges, the mobile object 203 moves substantially northeastward in accordance with the actual movement vector 5703 as illustrated in FIG. 63, as in the case where the mobile object 205 does not fail and there is no mobile object belonging to an unknown group. Since the distance between the mobile object 203 and the mobile object 204 belonging to the direct communication group of the mobile object 203 is shorter than the distance between the mobile object 201 and the mobile object 202, the ratio of a movement for maintaining direct communication is larger in the mobile object 203 than in the mobile object 201, and the ratio of a movement for maintaining direct communication is larger than that for implementing an original purpose.

The mobile objects 202 and 203 belong to the direct communication group of the mobile object 204. Thus, the control unit 602 of the mobile object 204 decides on, as a repulsion vector for the mobile object 202, a movement vector having a magnitude of 2.8 m/s and having a direction opposite to the direction toward the mobile object 202. The control unit 602 of the mobile object 204 decides on, as an approach vector for the mobile object 202, a movement vector having a magnitude proportional to the square of the distance from the position of the mobile object 202 to the position of the own mobile object and having a direction toward the mobile object 202. The control unit 602 of the mobile object 204 decides on, as a repulsion vector for the mobile object 203, a movement vector having a magnitude of 2.8 m/s and having a direction opposite to the direction toward the mobile object 203. The control unit 602 of the mobile object 204 decides on, as an approach vector for the mobile object 203, a movement vector having a magnitude proportional to the square of the distance from the position of the mobile object 203 to the position of the own mobile object and having a direction toward the mobile object 203.

Subsequently, the control unit 602 of the mobile object 204 decides on, as a communication maintaining movement vector, the sum of a movement vector obtained by multiplying the repulsion vector for the mobile object 202 by 1, a movement vector obtained by multiplying the repulsion vector for the mobile object 203 by 1, a movement vector obtained by multiplying the approach vector for the mobile object 202 by 1, and a movement vector obtained by multiplying the approach vector for the mobile object 203 by 1.

Subsequently, the control unit 602 of the mobile object 204 calculates the sum of a movement vector obtained by multiplying the second main basic movement vector (−6 m/s, −8 m/s, 0 m/s) by 1 and a movement vector obtained by multiplying the communication maintaining movement vector by 0.5, and decides on the sum as a main basic movement vector. Also, the control unit 602 of the mobile object 204 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

Since the magnitude of the communication restoration vector 5524 is 0, an actual movement vector 5704 of the mobile object 204 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1.

If the mobile object 205 fails, the magnitude of the communication restoration vector 5524 is 0. Thus, even if the mobile object 205 fails and even if a mobile object belonging to an unknown group emerges, the mobile object 204 moves substantially south-southwestward in accordance with the actual movement vector 5704 as illustrated in FIG. 63, as in the case where the mobile object 205 does not fail and there is no mobile object belonging to an unknown group. Since the actual movement vector 5704 is directed south-southwestward due to an effect of the approach vectors for the mobile objects 202 and 203 belonging to the direct communication group and this direction substantially matches the direction of the second main basic movement vector, the mobile object 204 is capable of substantially implementing an original purpose.

Only the mobile object 204 belongs to the direct communication group of the mobile object 205. Thus, the control unit 602 of the mobile object 205 decides on, as a repulsion vector for the mobile object 204, a movement vector having a magnitude of 2.8 m/s and having a direction opposite to the direction toward the mobile object 204. Also, the control unit 602 of the mobile object 205 decides on, as an approach vector for the mobile object 204, a movement vector having a magnitude proportional to the square of the distance from the position of the mobile object 204 to the position of the own mobile object and having a direction toward the mobile object 204. Also, the control unit 602 of the mobile object 205 decides on, as a communication maintaining movement vector, the sum of a movement vector obtained by multiplying the repulsion vector for the mobile object 204 by 1 and a movement vector obtained by multiplying the approach vector for the mobile object 204 by 1.

Subsequently, the control unit 602 of the mobile object 205 calculates the sum of a movement vector obtained by multiplying the second main basic movement vector (−6 m/s, −8 m/s, 0 m/s) by 1 and a movement vector obtained by multiplying the communication maintaining movement vector by 0.5, and decides on the sum as a main basic movement vector. Also, the control unit 602 of the mobile object 205 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

If the mobile object 205 fails, the magnitude of the communication restoration vector 5525 is 0. Thus, even if the mobile object 205 fails and even if a mobile object belonging to an unknown group emerges, the mobile object 205 moves substantially north-northwestward in accordance with an actual movement vector 5705 as illustrated in FIG. 63, as in the case where the mobile object 205 does not fail and there is no mobile object belonging to an unknown group. Since the distance between the mobile object 205 and the mobile object 204 belonging to the direct communication group of the mobile object 205 is shorter than the distance between the mobile object 201 and the mobile object 202, the ratio of a movement for maintaining direct communication is larger in the mobile object 205 than in the mobile object 201, and the ratio of a movement for maintaining direct communication is larger than that for implementing an original purpose.

Only the mobile object 205 belongs to the direct communication group of the mobile object 206. Thus, the control unit 602 of the mobile object 206 decides on, as a repulsion vector for the mobile object 205, a movement vector having a magnitude of 2.8 m/s and having a direction opposite to the direction toward the mobile object 205. Also, the control unit 602 of the mobile object 206 decides on, as an approach vector for the mobile object 205, a movement vector having a magnitude proportional to the square of the distance from the position of the mobile object 205 to the position of the own mobile object and having a direction toward the mobile object 205. Also, the control unit 602 of the mobile object 206 decides on, as a communication maintaining movement vector, the sum of a movement vector obtained by multiplying the repulsion vector for the mobile object 205 by 1 and a movement vector obtained by multiplying the approach vector for the mobile object 205 by 1.

Subsequently, the control unit 602 of the mobile object 206 calculates the sum of a movement vector obtained by multiplying the second main basic movement vector (−6 m/s, −8 m/s, 0 m/s) by 1 and a movement vector obtained by multiplying the communication maintaining movement vector by 0.5, and decides on the sum as a main basic movement vector. Also, the control unit 602 of the mobile object 206 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

If the mobile object 205 does not fail and if there is no mobile object belonging to an unknown group, the magnitude of the communication restoration vector is 0. Thus, an actual movement vector of the mobile object 206 is the sum of a movement vector obtained by multiplying the main basic movement vector by 0.5 and a movement vector obtained by multiplying the obstacle avoidance basic movement vector by 1, and the mobile object 206 moves substantially southwestward. However, if the mobile object 205 fails and if a mobile object belonging to an unknown group emerges, an actual movement vector 5706 of the mobile object 206 is the sum of a movement vector obtained by multiplying the main basic movement vector by 0.05, a movement vector obtained by multiplying the obstacle avoidance basic movement vector by 0.1, and a movement vector obtained by multiplying the communication restoration vector 5526 by 1, and the mobile object 206 moves substantially northeastward and mainly performs a communication restoration operation, as illustrated in FIG. 63.

There is no mobile object belonging to the direct communication group of the mobile object 207. Thus, the control unit 602 of the mobile object 207 decides on a repulsion vector having a magnitude of 0 and an approach vector having a magnitude of 0. The control unit 602 of the mobile object 207 calculates the sum of a movement vector obtained by multiplying the repulsion vector having a magnitude of 0 by 1 and a movement vector obtained by multiplying the approach vector having a magnitude of 0 by 1, and decides on a communication maintaining movement vector having a magnitude of 0.

Subsequently, the control unit 602 of the mobile object 207 calculates the sum of a movement vector obtained by multiplying the second main basic movement vector (10 m/s, 0 m/s, 0 m/s) by 1 and a movement vector obtained by multiplying the communication maintaining movement vector by 0.5, and decides on the sum as a main basic movement vector. Also, the control unit 602 of the mobile object 207 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

If the mobile object 205 does not fail and if there is no mobile object belonging to an unknown group, the magnitude of the communication restoration vector is 0. Thus, an actual movement vector of the mobile object 207 is the sum of a movement vector obtained by multiplying the main basic movement vector by 0.5 and a movement vector obtained by multiplying the obstacle avoidance basic movement vector by 1, and the mobile object 207 moves substantially eastward. However, if the mobile object 205 fails and if a mobile object belonging to an unknown group emerges, an actual movement vector 5707 of the mobile object 207 is the sum of a movement vector obtained by multiplying the main basic movement vector by 0.05, a movement vector obtained by multiplying the obstacle avoidance basic movement vector by 0.1, and a movement vector obtained by multiplying the communication restoration vector 5627 by 1, and the mobile object 207 moves substantially west-northwestward and mainly performs a communication restoration operation, as illustrated in FIG. 63.

In this way, the mobile objects 202, 203, and 205 to 207 move to get together, and thus an attempt to restore communication can be made. Furthermore, all the mobile objects 201 to 207 are capable of maintaining direct communication with one another due to an effect of communication maintaining movement vectors. Even if a mobile object disconnected from the ad hoc network moves to restore communication with the ad hoc network but there is no mobile object in the movement direction or even if a mobile object moves in a direction of getting away from the mobile object disconnected from the ad hoc network, as in the example illustrated in FIG. 4, an attempt to restore communication can be made.

The second technique disclosed in PTL 1 has an issue that all mobile objects are incapable of moving for an original purpose until communication is restored. In contrast, in the third embodiment of the present disclosure, the mobile objects 201 and 204 are capable of moving for an original purpose in the example illustrated in FIG. 63, for example, and the foregoing issue can be overcome.

The third technique disclosed in PTL 1 has an issue that a region over which a mobile object group is deployed gradually becomes smaller and all mobile objects are incapable of moving for an original purpose until communication is restored. Furthermore, after the communication is restored, the mobile objects need to move again for the original purpose from the positions at the point of time when the communication is restored. In contrast, in the third embodiment of the present disclosure, the mobile objects 201 and 204 are capable of moving mainly for an original purpose in the example illustrated in FIG. 63, for example, and the foregoing issue can be overcome.

The fourth technique disclosed in PTL 1 has an issue that, if a selected mobile object moves toward a cutoff position, the communication between the selected mobile object and a mobile object other than a mobile object disconnected from the ad hoc network is cut off, and accordingly the ad hoc network may be secondarily fractured. In contrast, in the third embodiment of the present disclosure, the mobile objects 202, 203, and 205 to 207 move to get together to attempt to restore communication, and all of the mobile objects 201 to 207 are capable of maintaining the direct communication between the mobile objects due to an effect of communication maintaining movement vectors in the example illustrated in FIG. 63, for example. Accordingly, the foregoing issue can be overcome.

The storage unit 603 of the mobile object 101 may store the movement path 502 of the mobile object 101. The control unit 602 may decide on the first control amount (basic movement vector group information) on the basis of the fourth control amount (communication maintaining movement vector information) corresponding to any one of a set of a fourth movement distance and a fourth movement direction, a set of a fourth velocity absolute value and a fourth velocity direction, and a set of a fourth acceleration absolute value and a fourth acceleration direction. The fourth movement distance, the fourth velocity absolute value, or the fourth acceleration absolute value may be a predetermined value. The fourth movement direction, the fourth velocity direction, or the fourth acceleration direction may be a direction opposite to the movement direction specified by the movement path 502.

In the third embodiment of the present disclosure, a target position is decided on in step S6112 every time before a communication restoration vector is decided on in step S6114, as long as there is a mobile object belonging to an unknown group. Alternatively, in a second configuration of the third embodiment, a target position may be decided on only if a mobile object belonging to the unknown group is changed.

In the second configuration of the third embodiment, a target position is decided on only if a mobile object belonging to the unknown group is changed, and thus the processing efficiency can be enhanced.

In the third embodiment of the present disclosure, it is determined in step S6110 whether or not there is a mobile object belonging to an unknown group, and if there is a mobile object belonging to an unknown group, steps S6111 to S6114 are performed to decide on a communication restoration vector having a magnitude that is not 0. Alternatively, in a third configuration of the third embodiment, the time when step S6111 is performed for the first time may be stored, and if a restoration period longer than 0 elapses from the time, the magnitude of the communication restoration vector may be set to 0 (step S6117) and the process may proceed to step S6115 without performing steps S6111 to S6114 even if there is a mobile object belonging to the unknown group. The value of the restoration period may be a constant or may be a value that is dynamically decided on when an actual process is performed.

In the third configuration of the third embodiment, if restoration of communication is not completed within the restoration period, the operation for restoration is stopped. Thus, a situation can be prevented from occurring where a communication restoration operation is endlessly performed.

In the third configuration of the third embodiment, the time when step S6111 is performed for the first time may be reset at an appropriate timing after the restoration period elapses, so that the process in steps S6111 to S6114 can be performed again. The appropriate timing may be, for example, when a mobile object belonging to the unknown group is changed or when a predetermined period further elapses (a fourth configuration of the third embodiment).

In the fourth configuration of the third embodiment, if a predetermined condition is satisfied after the restoration period elapses, the communication restoration operation can be retried.

In the third embodiment of the present disclosure, it is determined in step S6110 whether or not there is a mobile object belonging to an unknown group, and if there is a mobile object belonging to an unknown group, steps S6111 to S6114 are performed to decide on a communication restoration vector having a magnitude that is not 0. In a fifth configuration of the third embodiment, if a mobile object reaches a position where the distance to a target position is equal to or less than a movement stop determination distance, the magnitude of the communication restoration vector may be set to 0 (step S6117) and the process may proceed to step S6115 without performing steps S6111 to S6114, even if there is a mobile object belonging to an unknown group. The value of the movement stop determination distance may be a constant or may be a value that is dynamically decided on when an actual process is performed.

In the fifth configuration of the third embodiment, if restoration of communication is not completed even if the mobile object reaches the position where the distance to the target position is equal to or less than the movement stop determination distance, the operation for restoration is stopped. Thus, a situation can be prevented from occurring where a communication restoration operation is endlessly performed.

In the fifth configuration of the third embodiment, after the mobile object reaches the position where the distance to the target position is equal to or less than the movement stop determination distance, the magnitude of the communication restoration vector may be set to 0 (step S6117) and the process may proceed to step S6115 without performing steps S6111 to S6114, until a mobile object belonging to the unknown group is changed (a sixth configuration of the third embodiment).

In the sixth configuration of the third embodiment, if the mobile object reaches the position where the distance to the target position is equal to or less than the movement stop determination distance and then moves away to a position where the distance to the target position exceeds the movement stop determination distance, a communication restoration operation may be started again, so that a situation can be prevented from occurring where a communication restoration operation and a movement for an original purpose are alternately repeated.

In the third embodiment of the present disclosure, it is determined in step S6110 whether or not there is a mobile object belonging to an unknown group, and if there is a mobile object belonging to an unknown group, steps S6111 to S6114 are performed to decide on a communication restoration vector having a magnitude that is not 0. In a seventh configuration of the third embodiment, a second movement stop determination distance is calculated by multiplying the distance from a specific position to a target position by a movement stop determination coefficient. If the mobile object reaches a position where the distance to the target position is equal to or less than the second movement stop determination distance, the magnitude of the communication restoration vector may be set to 0 (step S6117) and the process may proceed to step S6115 without performing steps S6111 to S6114, even if there is a mobile object belonging to the unknown group. The value of the second movement stop determination coefficient may be a constant or may be a value that is dynamically decided on when an actual process is performed.

In the seventh configuration of the third embodiment, if restoration of communication is not completed even if the mobile object reaches the position where the distance to the target position is equal to or less than the second movement stop determination distance, the operation for restoration is stopped. Thus, a situation can be prevented from occurring where a communication restoration operation is endlessly performed.

In the seventh configuration of the third embodiment, after the mobile object reaches the position where the distance to the target position is equal to or less than the second movement stop determination distance, the magnitude of the communication restoration vector may be set to 0 (step S6117) and the process may proceed to step S6115 without performing steps S6111 to S6114, until a mobile object belonging to the unknown group is changed (an eighth configuration of the third embodiment).

In the eighth configuration of the third embodiment, if the mobile object reaches the position where the distance to the target position is equal to or less than the second movement stop determination distance and then moves away to a position where the distance to the target position exceeds the second movement stop determination distance, a communication restoration operation may be started again, so that a situation can be prevented from occurring where a communication restoration operation and a movement for an original purpose are alternately repeated.

In the third embodiment of the present disclosure, it is determined in step S6110 whether or not there is a mobile object belonging to an unknown group, and if there is a mobile object belonging to an unknown group, steps S6111 to S6114 are performed to decide on a communication restoration vector having a magnitude that is not 0. In a ninth configuration of the third embodiment, when the mobile object reaches the target position, the magnitude of the communication restoration vector may be set to 0 (step S6117) and the process may proceed to step S6115 without performing steps S6111 to S6114, even if there is a mobile object belonging to the unknown group.

In the ninth configuration of the third embodiment, if restoration of communication is not completed even if the mobile object reaches the target position, the operation for restoration is stopped. Thus, a situation can be prevented from occurring where a communication restoration operation is endlessly performed.

In the ninth configuration of the third embodiment, after the mobile object reaches the target position, the magnitude of the communication restoration vector may be set to 0 (step S6117) and the process may proceed to step S6115 without performing steps S6111 to S6114, until a mobile object belonging to the unknown group is changed (a tenth configuration of the third embodiment).

In the tenth configuration of the third embodiment, if the mobile object reaches the target position and then moves away from the target position, a communication restoration operation may be started again, so that a situation can be prevented from occurring where a communication restoration operation and a movement for an original purpose are alternately repeated.

In the third to tenth configurations of the third embodiment of the present disclosure, at the time of performing step S6110, in order to stop a communication restoration operation when the conditions described above regarding the individual configurations are satisfied, the magnitude of the communication restoration vector may be set to 0 (step S6117), and when the process proceeds to step S6115 without performing steps S6111 to S6114, the mobile objects belonging to the known group may be specified again as a component group, thereby dividing the ad hoc network (an eleventh configuration of the third embodiment).

In the eleventh configuration of the third embodiment, each mobile object belonging to the known group is capable of avoiding endless repetition of stop and restart of a communication restoration operation by restarting the communication restoration operation for the unknown group for which restoration of communication has failed.

In the third to tenth configurations of the third embodiment of the present disclosure, at the time of performing step S6110, in order to stop a communication restoration operation when the conditions described above regarding the individual configurations are satisfied, the magnitude of the communication restoration vector may be set to 0 (step S6117), and when the process proceeds to step S6115 without performing steps S6111 to S6114, a division notification indicating that the ad hoc network is to be divided may be transmitted to all the mobile objects belonging to the known group other than the own mobile object (a twelfth configuration of the third embodiment). When a division notification is received from another mobile object, the magnitude of the communication restoration vector may be set to 0 (step S6117), and the process may proceed to step S6115 without performing steps S6111 to S6114 even if there is a mobile object belonging to the unknown group in step S6110. Accordingly, the communication restoration operation is stopped and the mobile objects belonging to the known group at the time are specified again as a component group, thereby dividing the ad hoc network.

In the twelfth configuration of the third embodiment, each mobile object belonging to the known group is capable of specifying the same component group and is also capable of avoiding endless repetition of stop and restart of a communication restoration operation by restarting the communication restoration operation for the unknown group for which restoration of communication has failed.

In the third to tenth configurations of the third embodiment of the present disclosure, at the time of performing step S6110, in order to stop a communication restoration operation when the conditions described above regarding the individual configurations are satisfied, the magnitude of the communication restoration vector may be set to 0 (step S6117), and when the process proceeds to step S6115 without performing steps S6111 to S6114, known group information specifying the mobile objects belonging to the known group may be transmitted to all the mobile objects belonging to the known group other than the own mobile object (a thirteenth configuration of the third embodiment). When known group information is received from another mobile object, the magnitude of the communication restoration vector may be set to 0 (step S6117), and the process may proceed to step S6115 without performing steps S6111 to S6114 even if there is a mobile object belonging to the unknown group in step S6110. Accordingly, the communication restoration operation is stopped and the mobile objects specified by the known group information are specified again as a component group, thereby dividing the ad hoc network.

In the thirteenth configuration of the third embodiment, each mobile object belonging to the known group is capable of reliably specifying the same component group without being affected by a time lag in communication and is also capable of avoiding endless repetition of stop and restart of a communication restoration operation by restarting the communication restoration operation for the unknown group for which restoration of communication has failed.

Fourth Embodiment

The conceptual diagram illustrating an overall ad hoc network formed of a plurality of mobile objects according to a fourth embodiment of the present disclosure is the same as FIG. 6, and thus the description thereof will not be given.

The block diagram illustrating the functional configuration of the mobile object 101 according to the fourth embodiment of the present disclosure is the same as FIG. 8, and thus the description thereof will not be given. However, the own-mobile-object information stored in the storage unit 603 of the mobile object 101 is different from that in FIGS. 9 and 10, and thus will be described with reference to FIGS. 64 and 65. The other-mobile-object information 702 stored in the storage unit 603 of the mobile object 101 is the same as that in FIG. 11 and thus the description thereof will not be given.

Figure 64:
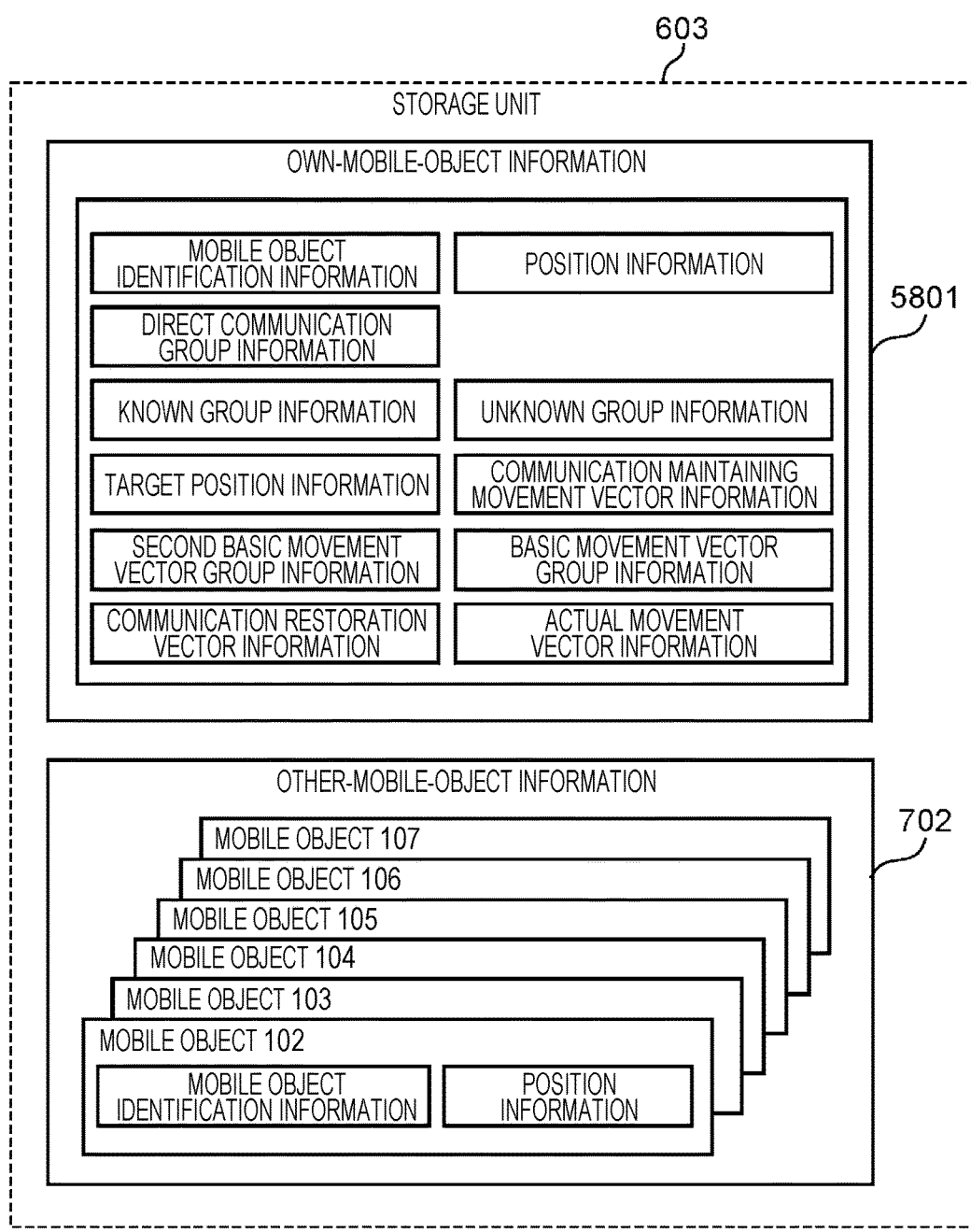
FIG. 64 is a diagram illustrating an example of information stored in the storage unit of the mobile object according to a fourth embodiment of the present disclosure.

FIG. 64 is a diagram illustrating an example of the information stored in the storage unit 603 of the mobile object 101 according to the fourth embodiment of the present disclosure. In FIG. 64, the same elements as those in FIGS. 6, 8, and 9 are denoted by the same reference numerals and the description thereof will not be given.

The storage unit 603 stores the own-mobile-object information 5801, which is information about the mobile object 101, and the other-mobile-object information 702, which is information about one or more other mobile objects.

The own-mobile-object information 5801 includes mobile object identification information for uniquely identifying the own mobile object; position information indicating the position of the own mobile object, which is detected by the position detection unit 604; direct communication group information including mobile object identification information of one or more other mobile objects belonging to a direct communication group that the own mobile object is capable of directly communicating with; known group information including mobile object identification information of the own mobile object and one or more other mobile objects that the own mobile object is capable of communicating with through an ad hoc network; unknown group information including mobile object identification information of one or more other mobile objects that the own mobile object is incapable of communicating with through the ad hoc network; target position information, which is position information indicating a target position to which the own mobile object moves to restore communication if there is an unknown group; communication maintaining movement vector information, which is information about a communication maintaining movement vector indicating a movement vector for maintaining direct communication with some or all of mobile objects included in a direct communication group; second basic movement vector group information, which is information about a second basic movement vector group including one or more movement vectors for controlling a movement if direct communication is not maintained; basic movement vector group information, which is information about a basic movement vector group including one or more movement vectors for controlling a movement if there is no unknown group; communication restoration vector information, which is information about a communication restoration vector indicating a movement vector for moving toward a target position; and actual movement vector information, which is information about an actual movement vector defining an actual movement.

FIG. 65 is a diagram illustrating an example of the own-mobile-object information 5801 stored in the storage unit 603 of the mobile object 101 according to the fourth embodiment of the present disclosure. In FIG. 65, the same elements as those in FIGS. 6 and 64 are denoted by the same reference numerals and the description thereof will not be given. In FIG. 65, the description will not be given of the same information as that included in the own-mobile-object information 701 illustrated in FIG. 10.

In the mobile object 101, the storage unit 603 stores the own-mobile-object information 5801 in the form illustrated in FIG. 65, for example. The own-mobile-object information 5801 includes mobile object identification information for uniquely identifying the own mobile object; position information indicating the position of the own mobile object, which is detected by the position detection unit 604; direct communication group information including mobile object identification information of one or more other mobile objects belonging to a direct communication group that the own mobile object is capable of directly communicating with; known group information including mobile object identification information of the own mobile object and one or more other mobile objects that the own mobile object is capable of communicating with through an ad hoc network; unknown group information including mobile object identification information of one or more other mobile objects that the own mobile object is incapable of communicating with through the ad hoc network; target position information, which is position information indicating a target position to which the own mobile object moves to restore communication if there is an unknown group; communication maintaining movement vector information, which is information about a communication maintaining movement vector indicating a movement vector for maintaining direct communication with some or all of mobile objects included in a direct communication group; second basic movement vector group information, which is information about a second basic movement vector group including one or more movement vectors for controlling a movement if direct communication is not maintained; basic movement vector group information, which is information about a basic movement vector group including one or more movement vectors for controlling a movement if there is no unknown group; communication restoration vector information, which is information about a communication restoration vector indicating a movement vector for moving toward a target position; and actual movement vector information, which is information about an actual movement vector defining an actual movement.

The own-mobile-object information 5801 illustrated in FIG. 65 indicates that the value of the own mobile object identification information is "mobile object 101", the value of the own position information is "34° 41'37.0" north latitude, 135° 30'7.1" east longitude, 2 m above sea level", the value of the known group information is "mobile object 101, mobile object 102, mobile object 103, and mobile object 104", the value of the unknown group information is "mobile object 105, mobile object 106, and mobile object 107", the value of the target position information is "34° 41'37.6" north latitude, 135° 30'9.1" east longitude, 2 m above sea level", the value of the communication maintaining movement vector information is "(1 m/s, 1 m/s, 0 m/s)", the value of the second main basic movement vector information in the second basic movement vector group information is "(−5 m/s, −2 m/s, 0 m/s)", the value of the second obstacle avoidance basic movement vector information in the second basic movement vector group information is "(0 m/s, 5 m/s, 0 m/s)", the value of the main basic movement vector information in the basic movement vector group information is "(−4.5 m/s, −1.5 m/s, 0 m/s)", the value of the obstacle avoidance basic movement vector information in the basic movement vector group information is "(0.5 m/s, 5.5 m/s, 0 m/s)", the value of the communication restoration vector information is "(0 m/s, 0 m/s, 0 m/s)", and the value of the actual movement vector information is "(−1.75 m/s, 4.75 m/s, 0 m/s)".

In FIG. 65, the second basic movement vector group information is represented by a set of second main basic movement vector information and second obstacle avoidance basic movement vector information. That is, a second basic movement vector group is a set of a second main basic movement vector and a second obstacle avoidance basic movement vector. Here, the second main basic movement vector is a movement vector representing a movement of a mobile object for achieving an original purpose in the case of not making an attempt to maintain direct communication. The second obstacle avoidance basic movement vector is a movement vector representing a movement of a mobile object for avoiding an obstacle near the mobile object in the case of not making an attempt to maintain direct communication. The number of movement vectors included in the second basic movement vector group and the movements represented by the movement vectors have variations, which is not related to the gist of the present disclosure. In this specification, unless otherwise noted, a second basic movement vector group is a set of a second main basic movement vector and a second obstacle avoidance basic movement vector described herein.

Figure 66:
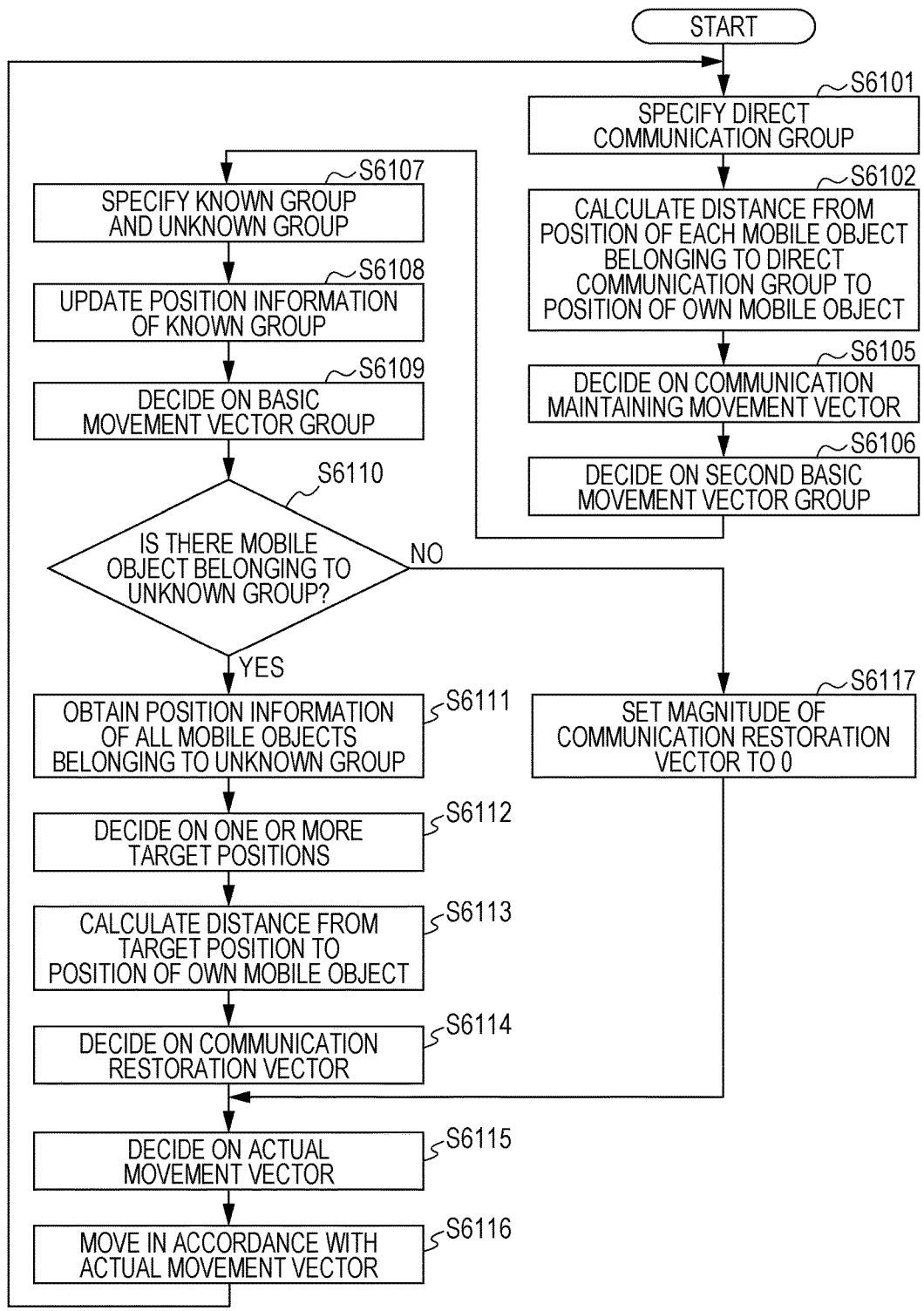
FIG. 66 is a flowchart illustrating an overall operation of movement control of the mobile object according to the fourth embodiment of the present disclosure.

FIG. 66 is a flowchart illustrating an overall operation of movement control of the mobile object 101 according to the fourth embodiment of the present disclosure.

The operations performed in steps S6101 to S6109 are the same regardless of whether there is a mobile object belonging to an unknown group. Thus, a description will be given below under the assumption that the mobile object 105 fails, unless otherwise noted.

The conceptual diagram of an example of a basic movement vector group is the same as FIG. 13, and thus the description thereof will not be given.

The conceptual diagram illustrating a known group and an unknown group in each of the mobile objects 101 to 104 in a case where the mobile object 105 fails is the same as FIG. 14, and thus the description thereof will not be given.

The conceptual diagram illustrating a known group and an unknown group in each of the mobile objects 106 and 107 in a case where the mobile object 105 fails is the same as FIG. 15, and thus the description thereof will not be given.

First, the control unit 602 of the mobile object 101 attempts to communicate with the mobile objects 102 to 107 and specifies, as a direct communication group, one or more of the mobile objects 102 to 107 with which direct communication has succeeded (step S6101). Subsequently, the control unit 602 updates the direct communication group information including the mobile object identification information of all the mobile objects belonging to the direct communication group in the own-mobile-object information 5801.

As illustrated in FIGS. 6, 13, 14, and 15, the mobile object 101 is capable of directly communicating with only the mobile object 102 in both cases where the mobile object 105 fails and where the mobile object 105 does not fail. Thus, the control unit 602 specifies only the mobile object 102 as a direct communication group and updates the direct communication group information in the own-mobile-object information 5801.

Subsequently, the control unit 602 of the mobile object 101 calculates the distance from the position of each mobile object belonging to the direct communication group to the position of the own mobile object (step S6102).

It is assumed that the mobile objects 105 to 107 are at the positions described in the other-mobile-object information 702 illustrated in FIG. 11 at the point of time when the mobile object 105 fails.

Since only the mobile object 102 belongs to the direct communication group of the mobile object 101, the control unit 602 of the mobile object 101 calculates the distance from the position of the mobile object 102 to the position of the own mobile object. The distance between the mobile objects 101 and 102 is 19.9 m.

Subsequently, the control unit 602 of the mobile object 101 decides on a communication maintaining movement vector for each mobile object belonging to the direct communication group (step S6105).

Here, the control unit 602 decides on, as a communication maintaining movement vector, a movement vector having a predetermined magnitude and having a direction toward the center position of all the mobile objects belonging to the direct communication group. It is assumed that the magnitude of the communication maintaining movement vector is 2.8 m/s.

Figure 67:
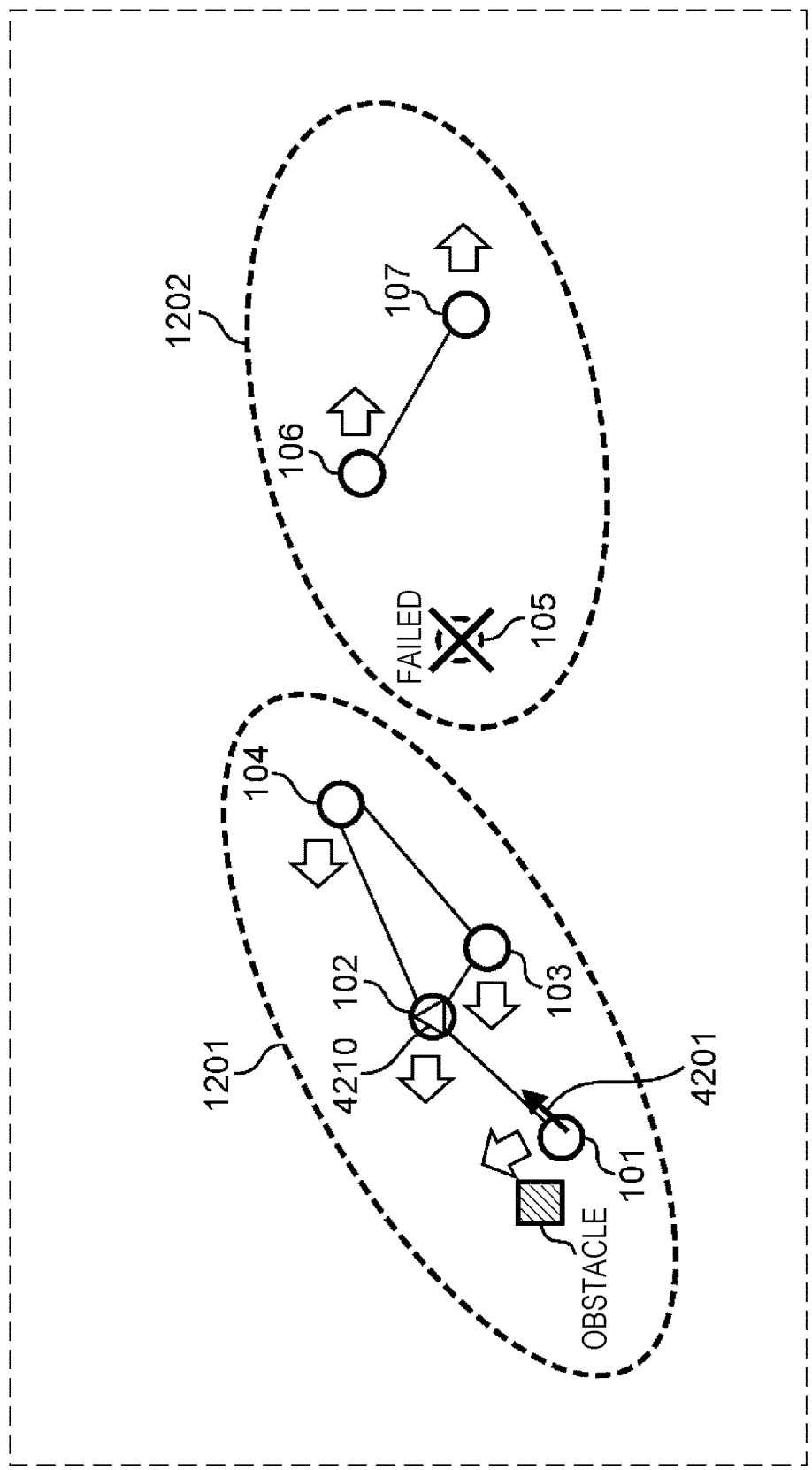
FIG. 67 is a conceptual diagram for describing a method for deciding on a communication maintaining movement vector in a mobile object in a case where one mobile object fails in the fourth embodiment of the present disclosure.

FIG. 67 is a conceptual diagram for describing a method for deciding on a communication maintaining movement vector in the mobile object 101 in a case where one mobile object (the mobile object 105) fails in the fourth embodiment of the present disclosure. In FIG. 67, the same elements as those in FIGS. 6 and 14 are denoted by the same reference numerals and the description thereof will not be given.

As illustrated in FIG. 67, only the mobile object 102 belongs to the direct communication group of the mobile object 101. Thus, the control unit 602 of the mobile object 101 decides on, as the communication maintaining movement vector 4201, a movement vector having a magnitude of 2.8 m/s and having a direction toward a center position 4210 of all the mobile objects belonging to the direct communication group. Since only the mobile object 102 belongs to the direct communication group, the center position 4210 of all the mobile objects belonging to the direct communication group is the position of the mobile object 102. In this case, the communication maintaining movement vector 4201 is (2 m/s, 2 m/s, 0 m/s).

The communication maintaining movement vectors of the mobile objects 102 to 104, 106, and 107 are decided on similarly to the communication maintaining movement vector of the mobile object 101.

Figure 68:
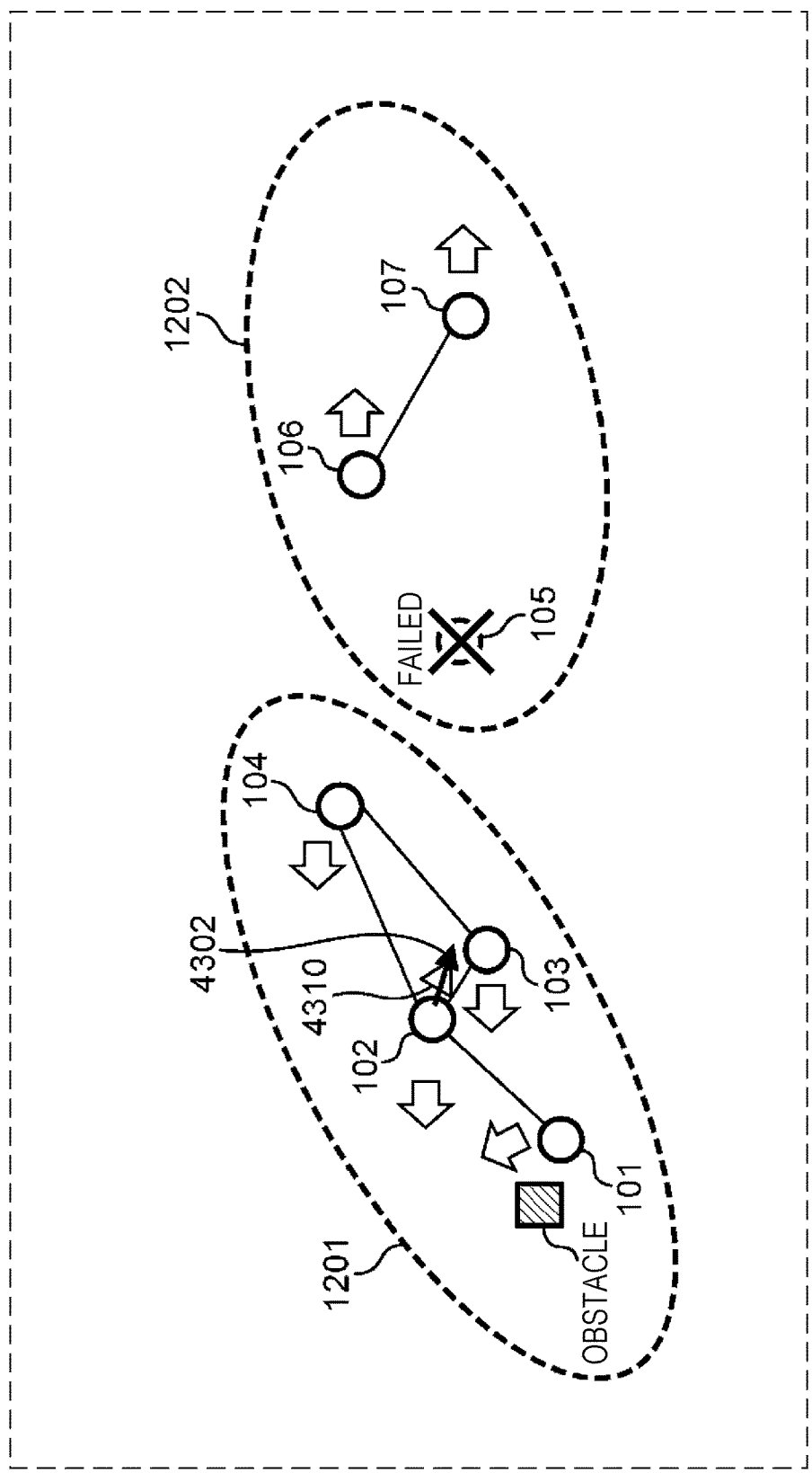
FIG. 68 is a conceptual diagram for describing a method for deciding on a communication maintaining movement vector in a mobile object in a case where one mobile object fails in the fourth embodiment of the present disclosure.

FIG. 68 is a conceptual diagram for describing a method for deciding on a communication maintaining movement vector in the mobile object 102 in a case where one mobile object (the mobile object 105) fails in the fourth embodiment of the present disclosure. In FIG. 68, the same elements as those in FIGS. 6 and 14 are denoted by the same reference numerals and the description thereof will not be given.

As illustrated in FIG. 68, the mobile objects 101, 103, and 104 belong to the direct communication group of the mobile object 102. Thus, the control unit 602 of the mobile object 102 decides on, as the communication maintaining movement vector 4302, a movement vector having a magnitude of 2.8 m/s and having a direction toward a center position 4310 of the mobile objects 101, 103, and 104.

Figure 69:
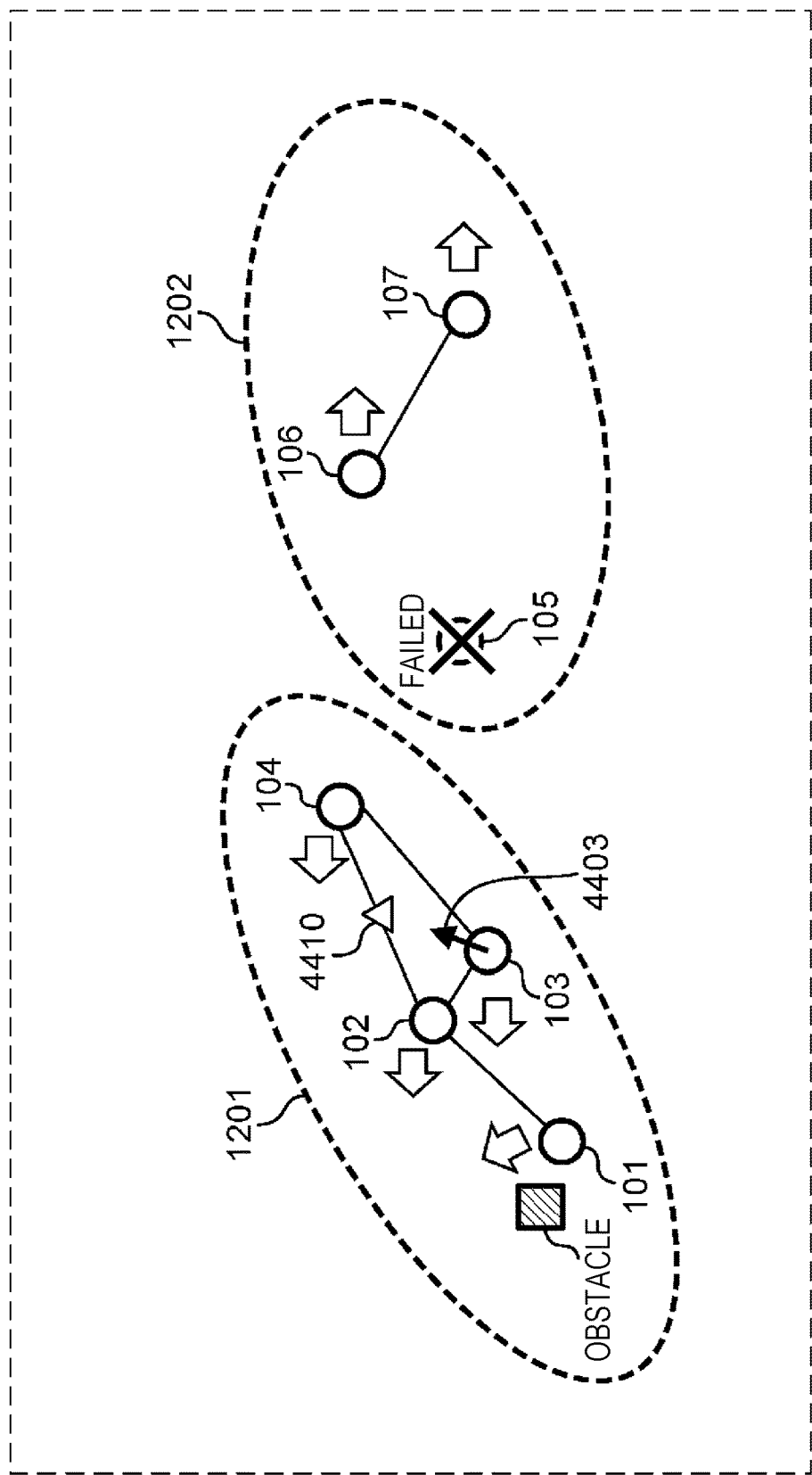
FIG. 69 is a conceptual diagram for describing a method for deciding on a communication maintaining movement vector in a mobile object in a case where one mobile object fails in the fourth embodiment of the present disclosure.

FIG. 69 is a conceptual diagram for describing a method for deciding on a communication maintaining movement vector in the mobile object 103 in a case where one mobile object (the mobile object 105) fails in the fourth embodiment of the present disclosure. In FIG. 69, the same elements as those in FIGS. 6 and 14 are denoted by the same reference numerals and the description thereof will not be given.

As illustrated in FIG. 69, the mobile objects 102 and 104 belong to the direct communication group of the mobile object 103. Thus, the control unit 602 of the mobile object 103 decides on, as the communication maintaining movement vector 4403, a movement vector having a magnitude of 2.8 m/s and having a direction toward a center position 4410 of the mobile objects 102 and 104.

Figure 70:
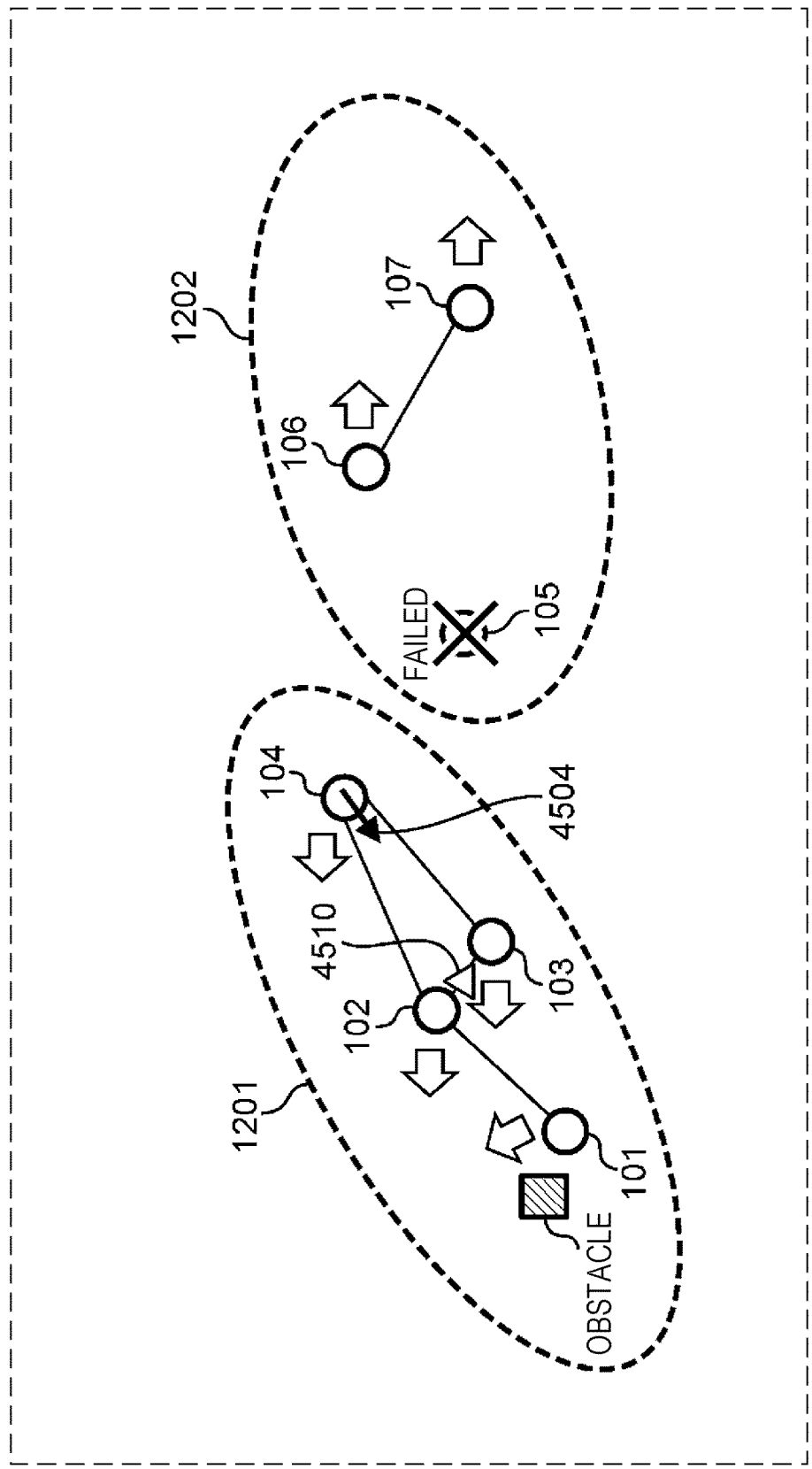
FIG. 70 is a conceptual diagram for describing a method for deciding on a communication maintaining movement vector in a mobile object in a case where one mobile object fails in the fourth embodiment of the present disclosure.

FIG. 70 is a conceptual diagram for describing a method for deciding on a communication maintaining movement vector in the mobile object 104 in a case where one mobile object (the mobile object 105) fails in the fourth embodiment of the present disclosure. In FIG. 70, the same elements as those in FIGS. 6 and 14 are denoted by the same reference numerals and the description thereof will not be given.

As illustrated in FIG. 70, the mobile objects 102 and 103 belong to the direct communication group of the mobile object 104. Thus, the control unit 602 of the mobile object 104 decides on, as the communication maintaining movement vector 4504, a movement vector having a magnitude of 2.8 m/s and having a direction toward a center position 4510 of the mobile objects 102 and 103.

Figure 71:
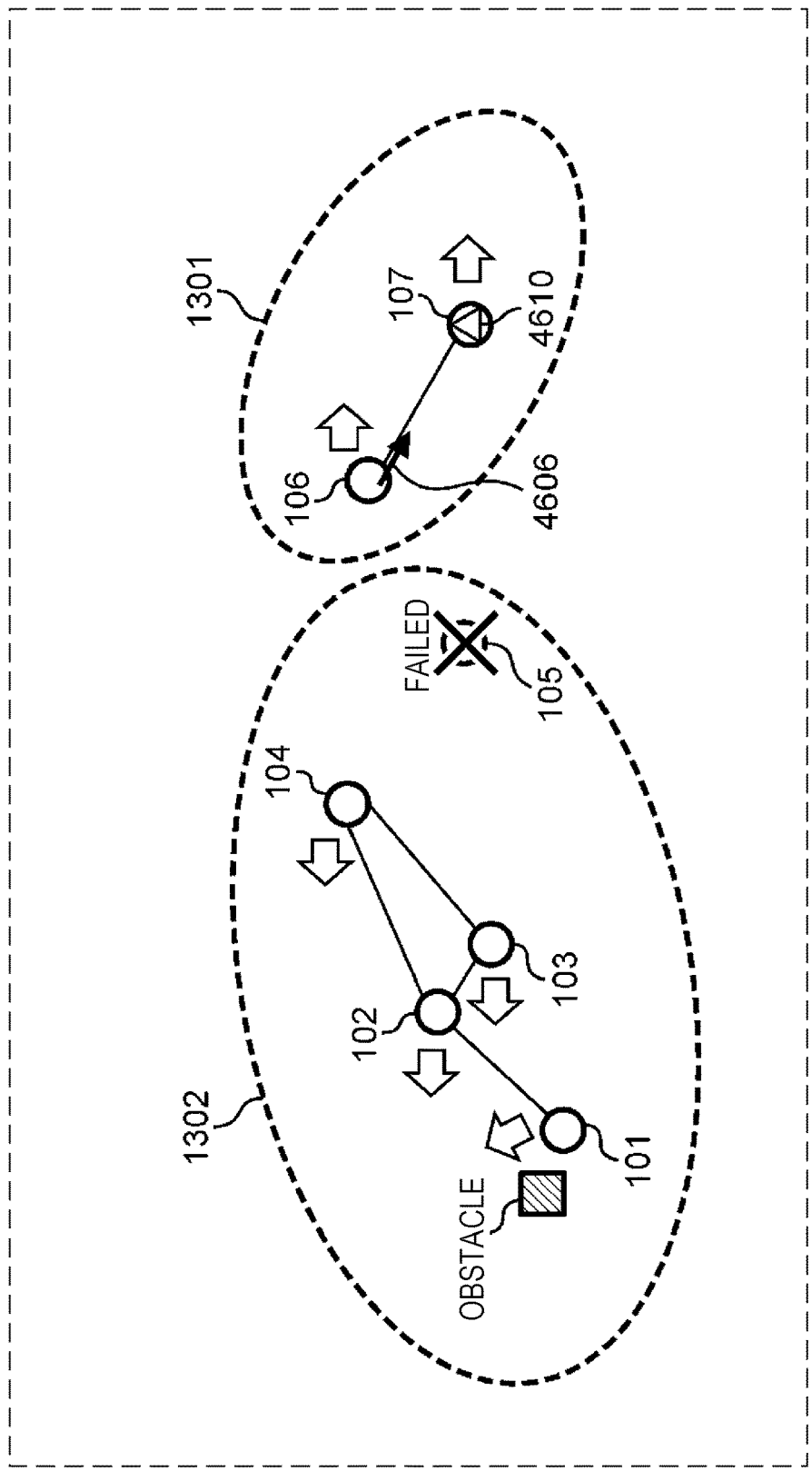
FIG. 71 is a conceptual diagram for describing a method for deciding on a communication maintaining movement vector in a mobile object in a case where one mobile object fails in the fourth embodiment of the present disclosure.

FIG. 71 is a conceptual diagram for describing a method for deciding on a communication maintaining movement vector in the mobile object 106 in a case where one mobile object (the mobile object 105) fails in the fourth embodiment of the present disclosure. In FIG. 71, the same elements as those in FIGS. 6 and 14 are denoted by the same reference numerals and the description thereof will not be given.

As illustrated in FIG. 71, only the mobile object 107 belongs to the direct communication group of the mobile object 106. Thus, the control unit 602 of the mobile object 106 decides on, as the communication maintaining movement vector 4606, a movement vector having a magnitude of 2.8 m/s and having a direction toward a center position 4610 of all the mobile objects belonging to the direct communication group. Since only the mobile object 107 belongs to the direct communication group, the center position 4610 of all the mobile objects belonging to the direct communication group is the position of the mobile object 107.

Figure 72:
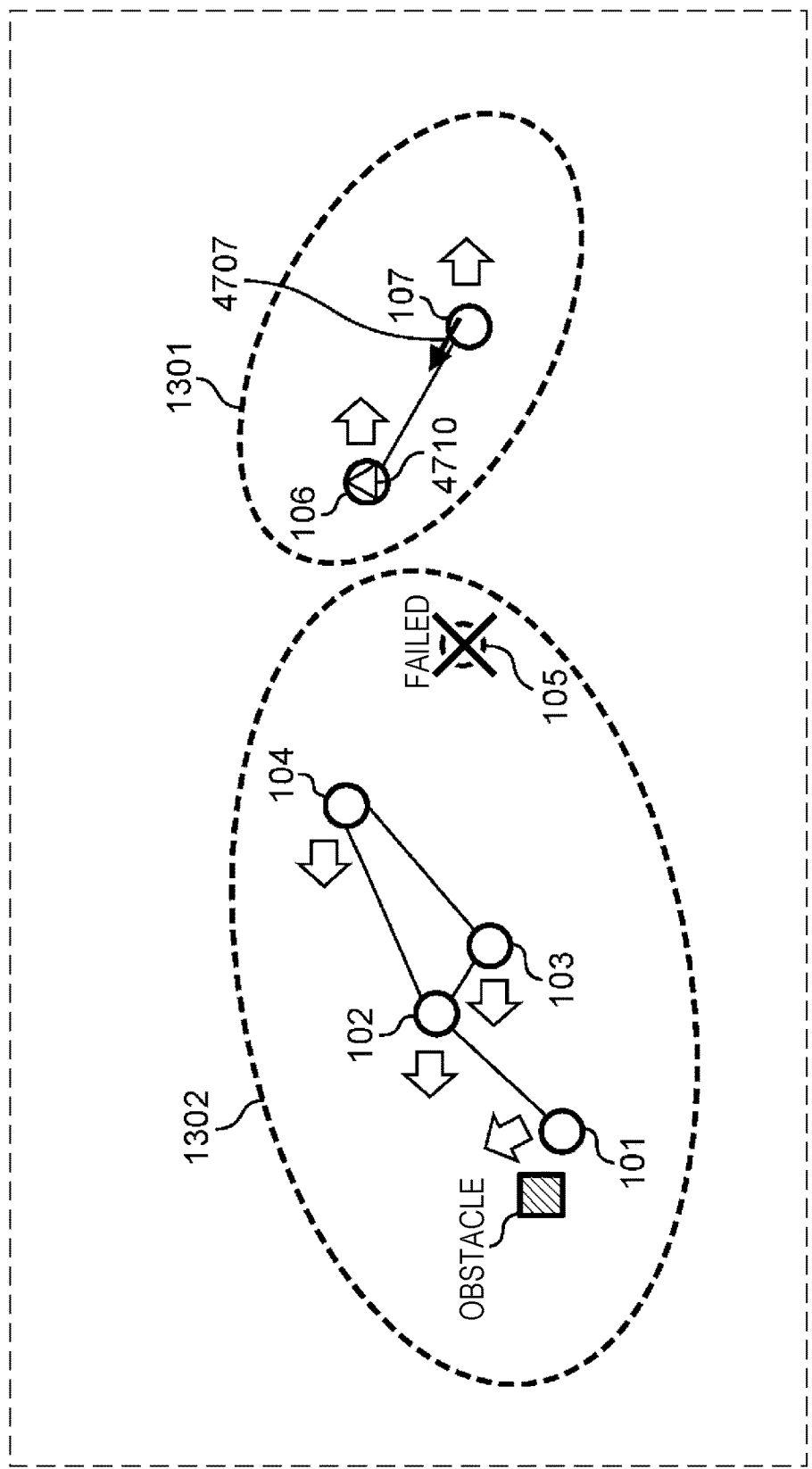
FIG. 72 is a conceptual diagram for describing a method for deciding on a communication maintaining movement vector in a mobile object in a case where one mobile object fails in the fourth embodiment of the present disclosure.

FIG. 72 is a conceptual diagram for describing a method for deciding on a communication maintaining movement vector in the mobile object 107 in a case where one mobile object (the mobile object 105) fails in the fourth embodiment of the present disclosure. In FIG. 72, the same elements as those in FIGS. 6 and 14 are denoted by the same reference numerals and the description thereof will not be given.

As illustrated in FIG. 72, only the mobile object 106 belongs to the direct communication group of the mobile object 107. Thus, the control unit 602 of the mobile object 107 decides on, as the communication maintaining movement vector 4707, a movement vector having a magnitude of 2.8 m/s and having a direction toward a center position 4710 of all the mobile objects belonging to the direct communication group. Since only the mobile object 106 belongs to the direct communication group, the center position 4710 of all the mobile objects belonging to the direct communication group is the position of the mobile object 106.

Subsequently, the control unit 602 of the mobile object 101 decides on a second basic movement vector group including one or more movement vectors for controlling a movement in the case of not attempting to maintain direct communication (step S6106). Subsequently, the control unit 602 creates second basic movement vector group information, which is information about the second basic movement vector group, and updates the second basic movement vector group information in the own-mobile-object information 5801.

Figure 73:
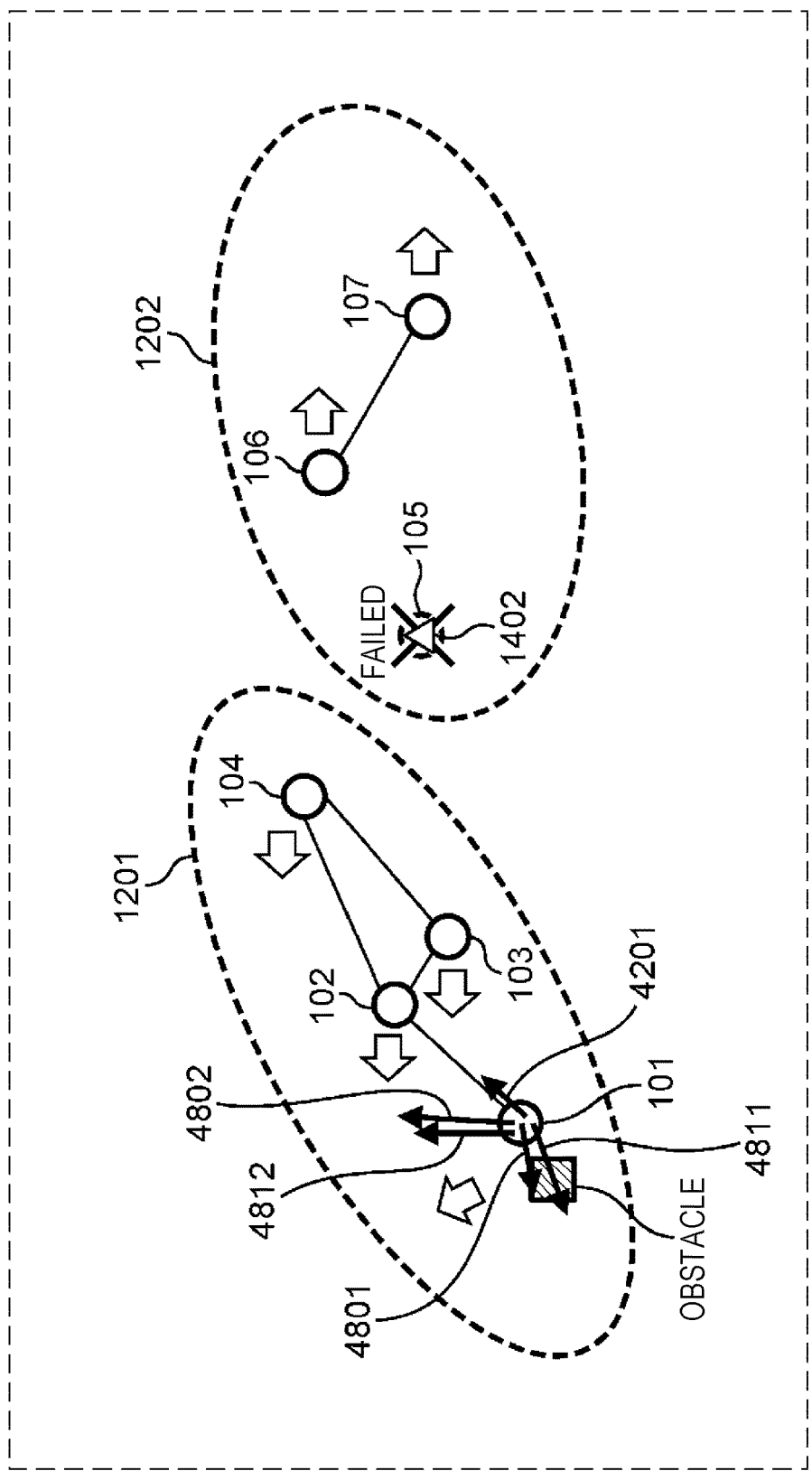
FIG. 73 is a conceptual diagram illustrating an example of a second basic movement vector group in the fourth embodiment of the present disclosure.

FIG. 73 is a conceptual diagram illustrating an example of a second basic movement vector group in the fourth embodiment of the present disclosure. In FIG. 73, the same elements as those in FIGS. 6, 14, 16, and 67 are denoted by the same reference numerals and the description thereof will not be given.

In the situation illustrated in FIG. 73, it is the best for the mobile object 101 to move in accordance with a movement vector including a movement component of 5 m/s in the direction of west and a movement component of 2 m/s in the direction of south to achieve an original purpose if no attempt is made to maintain direct communication and if there is no restriction. In this case, the second main basic movement vector 4811 is (−5 m/s, −2 m/s, 0 m/s).

However, there is an obstacle to the west of the mobile object 101. Thus, the mobile object 101 needs to move while avoiding the obstacle. Thus, if no attempt is made to maintain direct communication, the mobile object 101 needs to move in accordance with a movement vector including a movement component of 5 m/s in the direction of north to avoid the obstacle. In this case, the second obstacle avoidance basic movement vector 4812 is (0 m/s, 5 m/s, 0 m/s).

Subsequently, the control unit 602 of the mobile object 101 attempts to communicate with the mobile objects 102 to 107 through the ad hoc network. In accordance with whether or not the communication therewith can be performed, the control unit 602 specifies a known group, which is a group of mobile objects that the mobile object 101 is capable of communicating with through the ad hoc network, and an unknown group, which is a group of mobile objects that the mobile object 101 is incapable of communicating with through the ad hoc network (step S6107). Subsequently, the control unit 602 updates the known group information, which includes mobile object identification information of all the mobile objects belonging to the known group, and the unknown group information, which includes mobile object identification information of all the mobile objects belonging to the unknown group, in the own-mobile-object information 5801.

Subsequently, the control unit 602 of the mobile object 101 updates the position information of the known group (step S6108). At this time, the position detection unit 604 detects the position of the own mobile object and updates the position information in the own-mobile-object information 5801. Furthermore, the communication unit 601 requests, through the ad hoc network, all the mobile objects belonging to the known group to transmit mobile object identification information and position information and receives the mobile object identification information and the position information from the mobile objects belonging to the known group. Subsequently, the control unit 602 updates the position information in the other-mobile-object information 702.

Subsequently, the control unit 602 of the mobile object 101 calculates the sum of movement vectors that are obtained by multiplying individual movement vectors belonging to the second basic movement vector group and the communication maintaining movement vector by a value other than 0, and decides on a movement vector group obtained through the calculation as a basic movement vector group (step S6109). Subsequently, the control unit 602 creates basic movement vector group information, which is information about the basic movement vector group, and updates the basic movement vector information in the own-mobile-object information 5801.

Here, the control unit 602 multiplies the second main basic movement vector belonging to the second basic movement vector group by 1 and multiplies the communication maintaining movement vector by 0.5, which is a value obtained by dividing 1 by the number of movement vectors belonging to the second basic movement vector group, and decides on the sum of the two movement vectors obtained through the calculation as a main basic movement vector. Also, the control unit 602 multiplies the second obstacle avoidance basic movement vector by 1 and multiplies the communication maintaining movement vector by 0.5, which is a value obtained by dividing 1 by the number of movement vectors belonging to the second basic movement vector group, and decides on the sum of the two movement vectors obtained through the calculation as an obstacle avoidance basic movement vector. The value by which each movement vector belonging to the second basic movement vector group is multiplied may be a constant or may be a value that is dynamically decided on when an actual process is performed.

As illustrated in FIG. 73 and as described above, in this example, the second main basic movement vector 4811 of the mobile object 101 is (−5 m/s, −2 m/s, 0 m/s) and the communication maintaining movement vector 4201 is (2 m/s, 2 m/s, 0 m/s), and thus the movement vector as a calculation result is (−4 m/s, −1 m/s, 0 m/s). Thus, the control unit 602 of the mobile object 101 decides on the movement vector as a calculation result (−4 m/s, −1 m/s, 0 m/s) as the main basic movement vector 4801 in the basic movement vector group. Also, in this example, the second obstacle avoidance basic movement vector 4812 of the mobile object 101 is (0 m/s, 5 m/s, 0 m/s) and the communication maintaining movement vector 4201 is (2 m/s, 2 m/s, 0 m/s), and thus the movement vector as a calculation result is (1 m/s, 6 m/s, 0 m/s). Thus, the control unit 602 of the mobile object 101 decides on the movement vector as a calculation result (1 m/s, 6 m/s, 0 m/s) as the obstacle avoidance basic movement vector 4802 in the basic movement vector group.

Subsequently, the control unit 602 of the mobile object 101 determines whether or not there is a mobile object belonging to an unknown group (step S6110).

If it is determined in step S6110 that there is no mobile object belonging to an unknown group (NO in step S6110), the control unit 602 of the mobile object 101 sets the magnitude of the communication restoration vector to 0 (step S6117) and the process proceeds to step S6115, which will be described below.

For example, in the situation illustrated in FIG. 13, there is no unknown group and all the mobile objects 101 to 107 belong to the known group. Thus, the control unit 602 of the mobile object 101 sets the magnitude of the communication restoration vector to 0, and then the process proceeds to step S6115, which will be described below.

On the other hand, if it is determined in step S6110 that there is a mobile object belonging to an unknown group (YES in step S6110), the control unit 602 performs the process in steps S6111 to S6114.

If it is determined in step S6110 that there is a mobile object belonging to an unknown group, the control unit 602 of the mobile object 101 obtains, from the other-mobile-object information 702, the position information of all the mobile objects belonging to the unknown group (step S6111).

The conceptual diagram illustrating the mobile objects 101 to 104 belonging to the known group and the mobile objects 105 to 107 belonging to the unknown group in a case where one mobile object (the mobile object 105) fails in the fourth embodiment of the present disclosure is the same as FIG. 14, and thus the description thereof will not be given.

The conceptual diagram illustrating the mobile objects 106 and 107 belonging to the known group and the mobile objects 101 to 104 belonging to the unknown group in a case where one mobile object (the mobile object 105) fails in the fourth embodiment of the present disclosure is the same as FIG. 15, and thus the description thereof will not be given.

Subsequently, the control unit 602 of the mobile object 101 decides on one or more target positions on the basis of the position information of the mobile objects belonging to the unknown group obtained in step S6111 (step S6112).

The target position is, for example, a center position of all the mobile objects belonging to the unknown group or a position nearest to the own mobile object among the positions of all the mobile objects belonging to the unknown group.

Subsequently, the control unit 602 of the mobile object 101 calculates the distance from the target position to the position of the own mobile object (step S6113).

The diagram illustrating an example of a method for deciding on a target position and the target position decided on by using the method in each of the mobile objects 101 to 104 in a case where one mobile object (the mobile object 105) fails in the fourth embodiment of the present disclosure is the same as FIG. 16. It is assumed that the mobile objects 105 to 107 are at the positions described in the other-mobile-object information 702 illustrated in FIG. 11.

For example, in the case of deciding on the center position of all the mobile objects belonging to the unknown group as a target position, the target position of each of the mobile objects 101 to 104 is the target position 1401 illustrated in FIG. 16. The value of the target position 1401 is "34° 41'37.6" north latitude, 135° 30'9.1" east longitude, 2 m above sea level". In this case, the distances from the target position 1401 to the mobile objects 101 to 104 are 53.3 m, 37.6 m, 35.5 m, and 27.9 m, respectively.

In the case of deciding on the position nearest to the own mobile object among the positions of all the mobile objects belonging to the unknown group as a target position, the target position of each of the mobile objects 101 to 104 is the target position 1402 illustrated in FIG. 16, that is, the position of the mobile object 105. The value of the target position 1402 is "34° 41'37.5" north latitude, 135° 30'8.6" east longitude, 2 m above sea level". In this case, the distances from the target position 1402 to the mobile objects 101 to 104 are 40.6 m, 25.0 m, 22.7 m, and 19.9 m, respectively. Here, approximate values are calculated in an abbreviated manner under the assumption that the distance corresponding to one second in latitude is 31 m and the distance corresponding to one second in longitude is 25 m. However, the method for calculating a distance on the basis of a difference in latitude and longitude is not related to the gist of the present disclosure. In this specification, unless otherwise noted, a distance is calculated on the basis of a difference in latitude and longitude by using the simple method described herein.

The diagram illustrating an example of a method for deciding on a target position and the target position decided on by using the method in each of the mobile objects 106 and 107 in a case where one mobile object (the mobile object 105) fails in the fourth embodiment of the present disclosure is the same as FIG. 17. It is assumed that the mobile objects 101 to 105 are at the positions described in the other-mobile-object information 702 illustrated in FIG. 11.

For example, in the case of deciding on the center position of all the mobile objects belonging to the unknown group as a target position, the target position of each of the mobile objects 106 and 107 is the target position 1501 illustrated in FIG. 17. The value of the target position 1501 is "34° 41'37.48" north latitude, 135° 30'7.82" east longitude, 2 m above sea level". In this case, the distances from the target position 1501 to the mobile objects 106 and 107 are 33.5 m and 44.5 m, respectively. In the case of deciding on the position nearest to the own mobile object among the positions of all the mobile objects belonging to the unknown group as a target position, the target position of each of the mobile objects 106 and 107 is the target position 1502 illustrated in FIG. 17, that is, the position of the mobile object 105. The value of the target position 1502 is "34° 41'37.5" north latitude, 135° 30'8.6" east longitude, 2 m above sea level". In this case, the distances from the target position 1502 to the mobile objects 106 and 107 are 15.6 m and 25.0 m, respectively.

Subsequently, the control unit 602 of the mobile object 101 decides on a communication restoration vector, which is a movement vector for moving toward the target position, in accordance with the distance from the target position to the position of the own mobile object (step S6114). Subsequently, the control unit 602 creates communication restoration vector information, which is information about the communication restoration vector, and updates the communication restoration vector information in the own-mobile-object information 5801.

Now, an example of a communication restoration vector will be described. The control unit 602 of each of the mobile objects 101 to 107 decides on, as a target position, the position nearest to the own mobile object among the positions of all the mobile objects belonging to the unknown group. If the own mobile object is the nearest to the target position among the mobile objects belonging to the known group, the control unit 602 decides on a communication restoration vector having a direction toward the target position and having a magnitude of 6.4 m/s. If the own mobile object is not the nearest to the target position, the control unit 602 decides on a communication restoration vector having a magnitude of 0.

Figure 74:
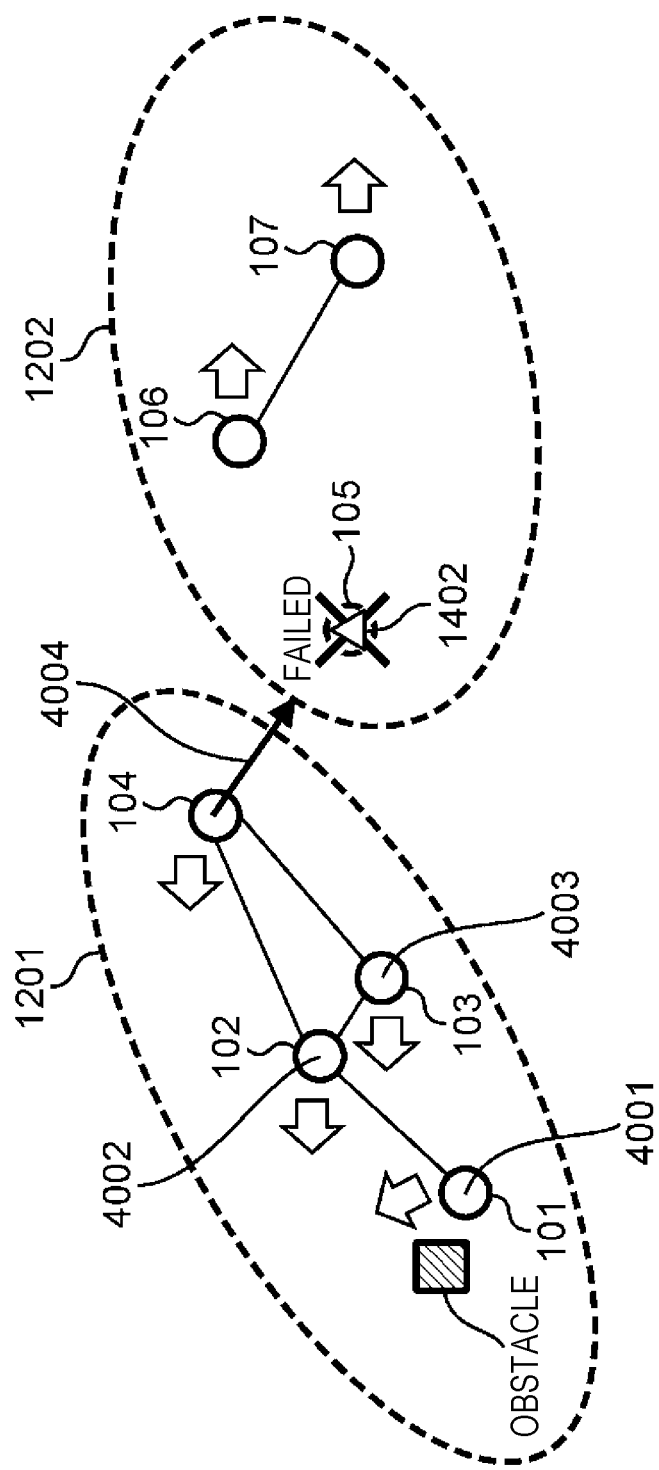
FIG. 74 is a conceptual diagram illustrating an example of communication restoration vectors of mobile objects in a case where one mobile object fails in the fourth embodiment of the present disclosure.

FIG. 74 is a conceptual diagram illustrating an example of communication restoration vectors of the mobile objects 101 to 104 in a case where one mobile object (the mobile object 105) fails in the fourth embodiment of the present disclosure. In FIG. 74, the same elements as those in FIGS. 6, 14, and 16 are denoted by the same reference numerals and the description thereof will not be given.

As described above, the distances from the target position 1402 to the mobile objects 101 to 104 are 40.6 m, 25.0 m, 22.7 m, and 19.9 m, respectively. Thus, the control unit 602 of the mobile object 104 that is the nearest to the target position 1402 decides on, as the communication restoration vector 4004, a communication restoration vector (5 m/s, −4 m/s, 0 m/s) having a direction toward the target position and having a magnitude of 6.4 m/s. Also, the control units 602 of the mobile objects 101 to 103 decide on the communication restoration vectors 4001 to 4003 having a magnitude of 0, respectively.

Figure 75:
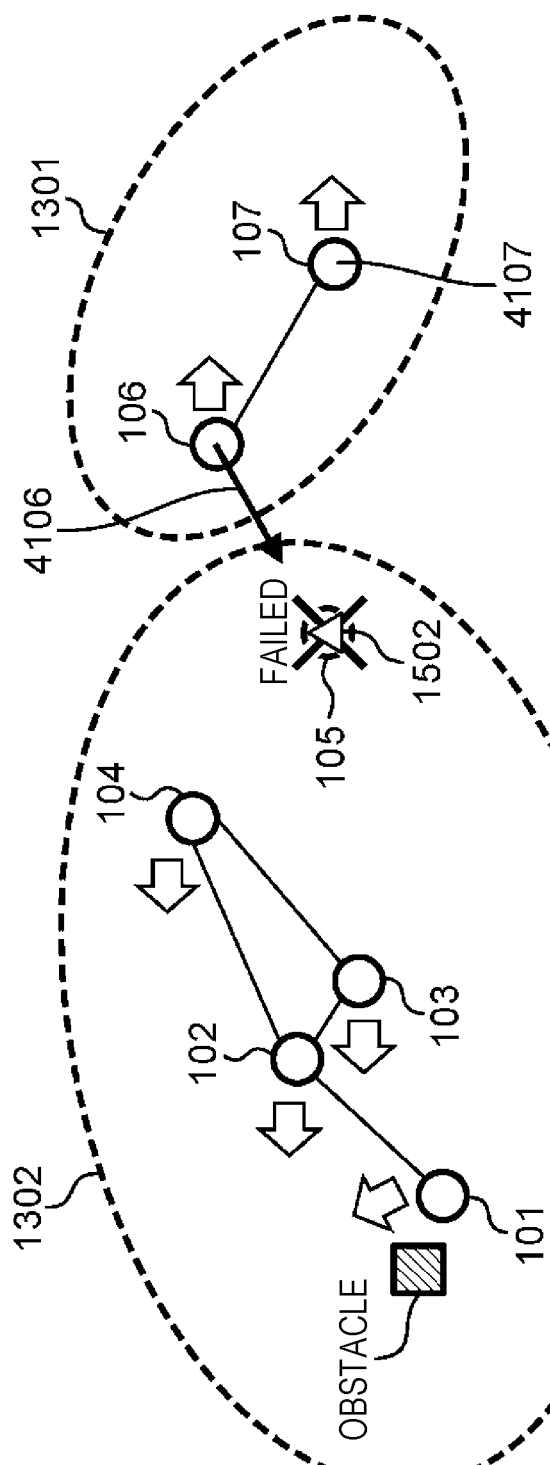
FIG. 75 is a conceptual diagram illustrating an example of communication restoration vectors of mobile objects in a case where one mobile object fails in the fourth embodiment of the present disclosure.

FIG. 75 is a conceptual diagram illustrating an example of communication restoration vectors of the mobile objects 106 and 107 in a case where one mobile object (the mobile object 105) fails in the fourth embodiment of the present disclosure. In FIG. 75, the same elements as those in FIGS. 6, 15, and 17 are denoted by the same reference numerals and the description thereof will not be given.

As described above, the distances from the target position 1502 to the mobile objects 106 and 107 are 15.6 m and 25.0 m, respectively. Thus, the control unit 602 of the mobile object 106 that is the nearest to the target position 1502 decides on, as the communication restoration vector 4106, a communication restoration vector (−5 m/s, −4 m/s, 0 m/s) having a direction toward the target position and having a magnitude of 6.4 m/s. Also, the control unit 602 of the mobile object 107 decides on the communication restoration vector 4107 having a magnitude of 0.

Subsequently, the control unit 602 of the mobile object 101 calculates the sum of movement vectors obtained by multiplying all the movement vectors belonging to the basic movement vector group and the communication restoration vector by a value other than 0, and decides on a movement vector obtained through the calculation as an actual movement vector (step S6115). Subsequently, the control unit 602 creates actual movement vector information, which is information about the actual movement vector, and updates the actual movement vector information in the own-mobile-object information 5801.

Figure 76:
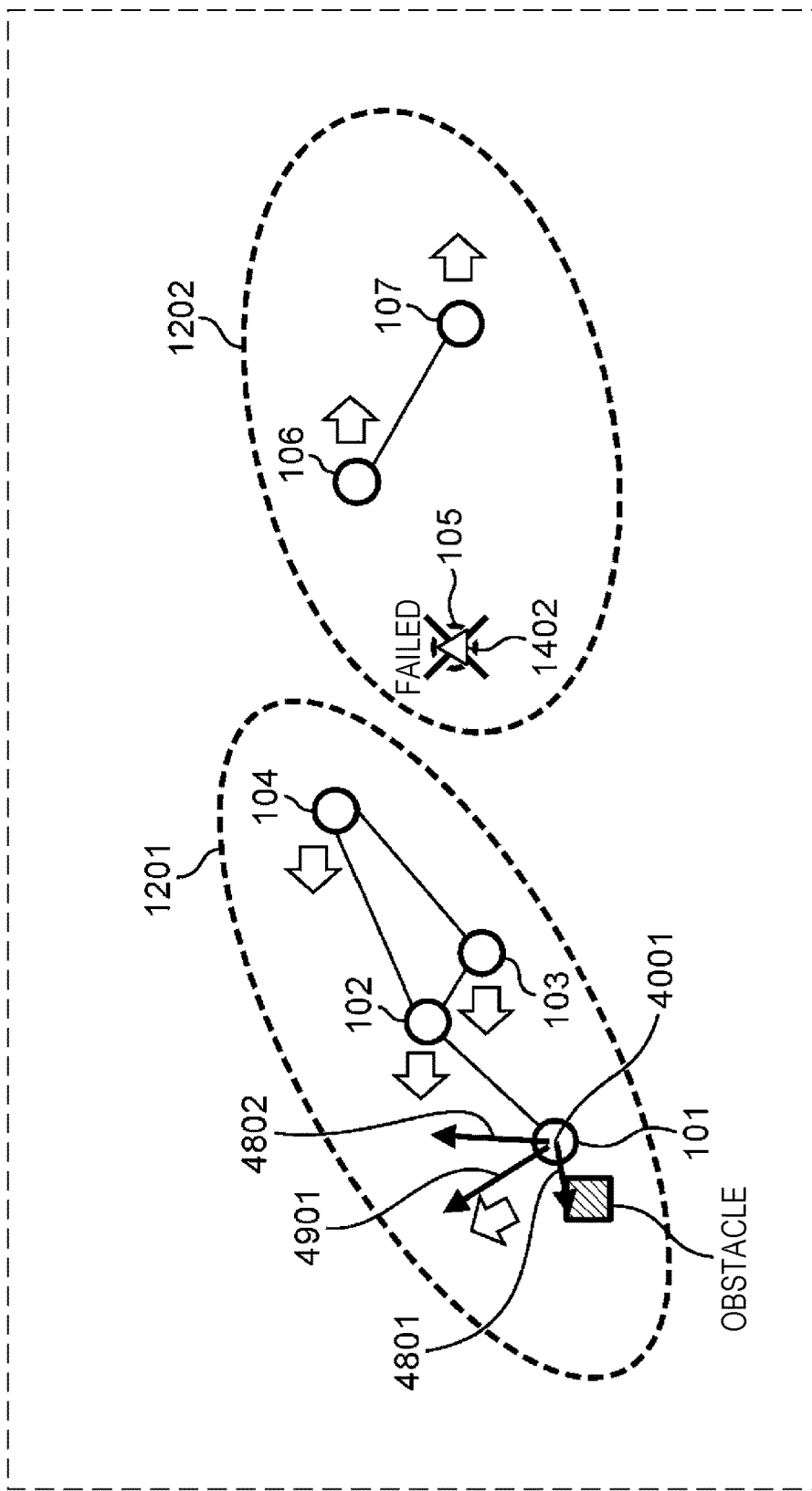
FIG. 76 is a conceptual diagram for describing a method for deciding on an actual movement vector in a mobile object in a case where one mobile object fails in the fourth embodiment of the present disclosure.

FIG. 76 is a conceptual diagram for describing a method for deciding on an actual movement vector in the mobile object 101 in a case where one mobile object (the mobile object 105) fails in the fourth embodiment of the present disclosure. In FIG. 76, the same elements as those in FIGS. 6, 14, 16, 73, and 74 are denoted by the same reference numerals and the description thereof will not be given.

To increase the ratio of a movement for avoiding an obstacle, the control unit 602 multiplies the main basic movement vector belonging to the basic movement vector group by 0.5, multiplies the obstacle avoidance basic movement vector belonging to the basic movement vector group by 1, and multiplies the communication restoration vector by 1, and then calculates the sum of the movement vectors as calculation results. The value by which each movement vector belonging to the basic movement vector group is multiplied may be a constant or may be a value that is dynamically decided on at the time of performing an actual process.

In the example illustrated in FIG. 76, the main basic movement vector 4801 of the mobile object 101 is (−4 m/s, −1 m/s, 0 m/s), the obstacle avoidance basic movement vector 4802 is (1 m/s, 6 m/s, 0 m/s), and the communication restoration vector 4001 is (0 m/s, 0 m/s, 0 m/s). Thus, the movement vector as a calculation result is (−3 m/s, 5 m/s, 0 m/s). The control unit 602 of the mobile object 101 decides on the movement vector (−3 m/s, 5 m/s, 0 m/s) obtained through the calculation as the actual movement vector 4901.

If the mobile object 105 fails, the magnitude of the communication restoration vector 4001 is 0. Thus, even if the mobile object 105 fails and even if a mobile object belonging to an unknown group emerges, the mobile object 101 moves substantially north-northwestward in accordance with the actual movement vector 4901 (−3 m/s, 5 m/s, 0 m/s) as illustrated in FIG. 76, as in the case where the mobile object 105 does not fail and there is no mobile object belonging to an unknown group. Thus, an obstacle can be appropriately avoided. In addition, direct communication can be maintained and an original purpose can be implemented in a balanced manner.

The basic movement vector groups and the actual movement vectors of the mobile objects 102 to 104, 106, and 107 are decided on similarly to the basic movement vector group and the actual movement vector of the mobile object 101.

Figure 77:
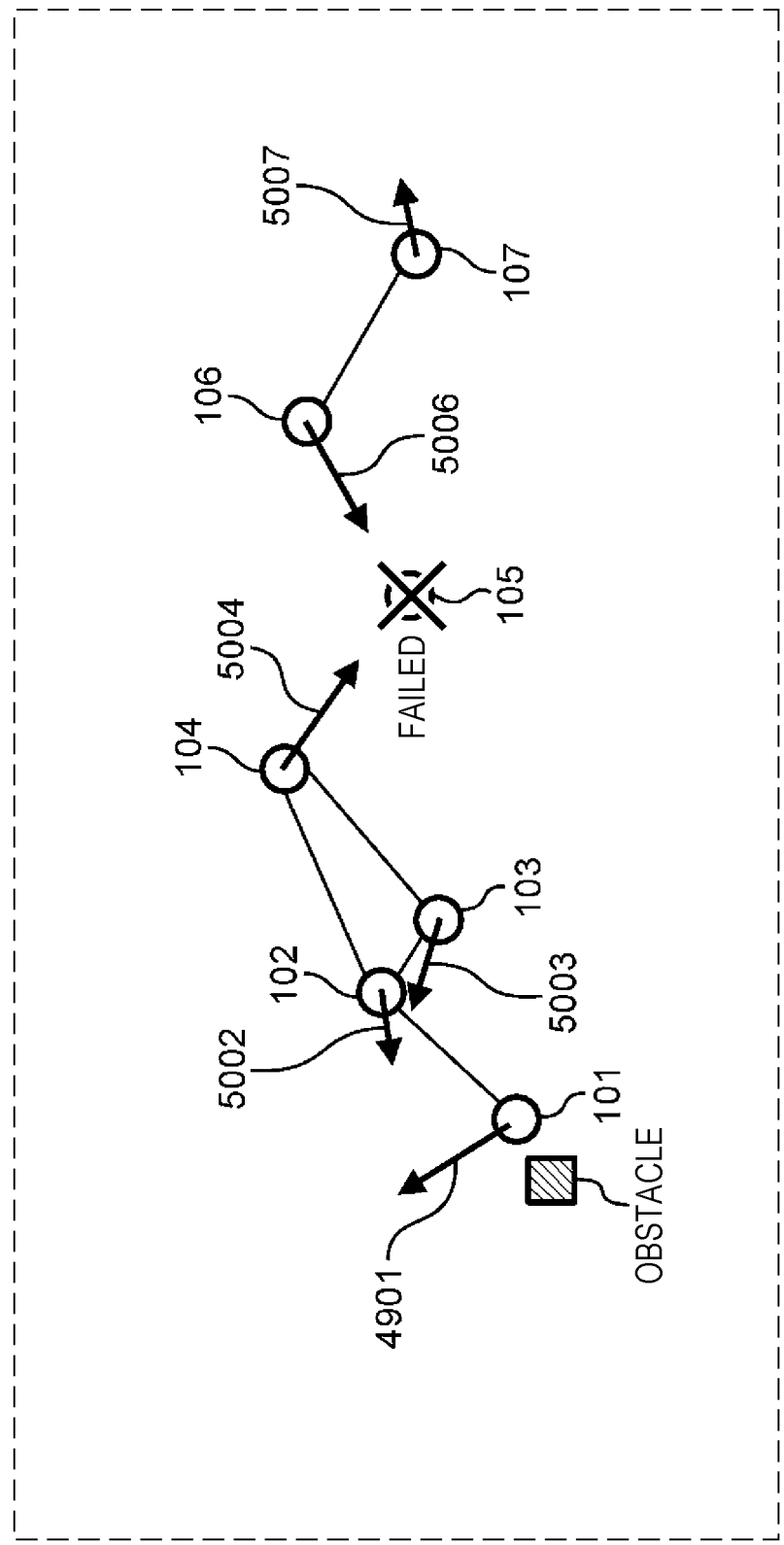
FIG. 77 is a conceptual diagram illustrating an example of actual movement vectors of mobile objects in a case where one mobile object fails in the fourth embodiment of the present disclosure.

FIG. 77 is a conceptual diagram illustrating an example of actual movement vectors of the mobile objects 101 to 104, 106, and 107 in a case where one mobile object (the mobile object 105) fails in the fourth embodiment of the present disclosure. In FIG. 77, the same elements as those in FIGS. 6 and 76 are denoted by the same reference numerals and the description thereof will not be given.

Here, among the movement vectors belonging to the second basic movement vector groups of the mobile objects 102 to 104, the value of the second main basic movement vector is (−10 m/s, 0 m/s, 0 m/s) and the value of the second obstacle avoidance basic movement vector is (0 m/s, 0 m/s, 0 m/s). Among the movement vectors belonging to the second basic movement vector groups of the mobile objects 106 and 107, the value of the second main basic movement vector is (10 m/s, 0 m/s, 0 m/s) and the value of the second obstacle avoidance basic movement vector is (0 m/s, 0 m/s, 0 m/s).

Here, the control unit 602 multiplies the second main basic movement vector belonging to the second basic movement vector group by 1 and multiplies the communication maintaining movement vector by 0.5, which is a value obtained by dividing 1 by the number of movement vectors belonging to the second basic movement vector group, and decides on the sum of the movement vectors obtained through the calculation as a main basic movement vector. Also, the control unit 602 multiplies the second obstacle avoidance basic movement vector by 1 and multiplies the communication maintaining movement vector by 0.5, which is a value obtained by dividing 1 by the number of movement vectors belonging to the second basic movement vector group, and decides on the sum of the movement vectors obtained through the calculation as an obstacle avoidance basic movement vector.

Here, if the magnitude of the communication restoration vector is 0, the control unit 602 decides on, as an actual movement vector, the sum of a movement vector obtained by multiplying the main basic movement vector by 0.5, a movement vector obtained by multiplying the obstacle avoidance basic movement vector by 1, and a movement vector obtained by multiplying the communication restoration vector by 1. If the magnitude of the communication restoration vector is not 0, the control unit 602 decides on, as an actual movement vector, the sum of a movement vector obtained by multiplying the main basic movement vector by 0.05, a movement vector obtained by multiplying the obstacle avoidance basic movement vector by 0.1, and a movement vector obtained by multiplying the communication restoration vector by 1.

The main basic movement vector of the mobile object 102 is the sum of a movement vector obtained by multiplying the second main basic movement vector (−10 m/s, 0 m/s, 0 m/s) by 1 and a movement vector obtained by multiplying the communication maintaining movement vector 4302 illustrated in FIG. 68 by 0.5. The obstacle avoidance basic movement vector of the mobile object 102 is the sum of a movement vector obtained by multiplying the second obstacle avoidance basic movement vector (0 m/s, 0 m/s, 0 m/s) by 1 and a movement vector obtained by multiplying the communication maintaining movement vector 4302 illustrated in FIG. 68 by 0.5. Since the magnitude of the communication restoration vector 4002 is 0, the actual movement vector 5002 of the mobile object 102 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1, as illustrated in FIG. 77.

If the mobile object 105 fails, the magnitude of the communication restoration vector 4002 is 0. Thus, even if the mobile object 105 fails and even if a mobile object belonging to an unknown group emerges, the mobile object 102 moves substantially west-southwestward in accordance with the actual movement vector 5002 as illustrated in FIG. 77, as in the case where the mobile object 105 does not fail and there is no mobile object belonging to an unknown group. Thus, direct communication can be maintained and an original purpose can be implemented in a balanced manner.

The main basic movement vector of the mobile object 103 is the sum of a movement vector obtained by multiplying the second main basic movement vector (−10 m/s, 0 m/s, 0 m/s) by 1 and a movement vector obtained by multiplying the communication maintaining movement vector 4403 illustrated in FIG. 69 by 0.5. The obstacle avoidance basic movement vector of the mobile object 103 is the sum of a movement vector obtained by multiplying the second obstacle avoidance basic movement vector (0 m/s, 0 m/s, 0 m/s) by 1 and a movement vector obtained by multiplying the communication maintaining movement vector 4403 illustrated in FIG. 69 by 0.5. Since the magnitude of the communication restoration vector 4003 is 0, the actual movement vector 5003 of the mobile object 103 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1, as illustrated in FIG. 77.

If the mobile object 105 fails, the magnitude of the communication restoration vector 4003 is 0. Thus, even if the mobile object 105 fails and even if a mobile object belonging to an unknown group emerges, the mobile object 103 moves substantially west-northwestward in accordance with the actual movement vector 5003 as illustrated in FIG. 77, as in the case where the mobile object 105 does not fail and there is no mobile object belonging to an unknown group. Thus, direct communication can be maintained and an original purpose can be implemented in a balanced manner.

The main basic movement vector of the mobile object 104 is the sum of a movement vector obtained by multiplying the second main basic movement vector (−10 m/s, 0 m/s, 0 m/s) by 1 and a movement vector obtained by multiplying the communication maintaining movement vector 4504 illustrated in FIG. 70 by 0.5. The obstacle avoidance basic movement vector of the mobile object 104 is the sum of a movement vector obtained by multiplying the second obstacle avoidance basic movement vector (0 m/s, 0 m/s, 0 m/s) by 1 and a movement vector obtained by multiplying the communication maintaining movement vector 4504 illustrated in FIG. 70 by 0.5.

If the mobile object 105 does not fail and if there is no mobile object belonging to an unknown group, the magnitude of the communication restoration vector is 0. Thus, the actual movement vector 5004 of the mobile object 104 is the sum of a movement vector obtained by multiplying the main basic movement vector by 0.5 and a movement vector obtained by multiplying the obstacle avoidance basic movement vector by 1, and the mobile object 104 moves substantially west-southwestward. However, if the mobile object 105 fails and if a mobile object belonging to an unknown group emerges, the actual movement vector 5004 of the mobile object 104 is the sum of a movement vector obtained by multiplying the main basic movement vector by 0.05, a movement vector obtained by multiplying the obstacle avoidance basic movement vector by 0.1, and a movement vector obtained by multiplying the communication restoration vector 4004 (5 m/s, −4 m/s, 0 m/s) by 1, and the mobile object 104 moves substantially east-southeastward and mainly performs a communication restoration operation, as illustrated in FIG. 77.

The main basic movement vector of the mobile object 106 is the sum of a movement vector obtained by multiplying the second main basic movement vector (10 m/s, 0 m/s, 0 m/s) by 1 and a movement vector obtained by multiplying the communication maintaining movement vector 4606 illustrated in FIG. 71 by 0.5. The obstacle avoidance basic movement vector of the mobile object 106 is the sum of a movement vector obtained by multiplying the second obstacle avoidance basic movement vector (0 m/s, 0 m/s, 0 m/s) by 1 and a movement vector obtained by multiplying the communication maintaining movement vector 4606 illustrated in FIG. 71 by 0.5.

If the mobile object 105 does not fail and if there is no mobile object belonging to an unknown group, the magnitude of the communication restoration vector is 0. Thus, the actual movement vector 5006 of the mobile object 106 is the sum of a movement vector obtained by multiplying the main basic movement vector by 0.5 and a movement vector obtained by multiplying the obstacle avoidance basic movement vector by 1, and the mobile object 106 moves substantially east-southeastward. However, if the mobile object 105 fails and if a mobile object belonging to an unknown group emerges, the actual movement vector 5006 of the mobile object 106 is the sum of a movement vector obtained by multiplying the main basic movement vector by 0.05, a movement vector obtained by multiplying the obstacle avoidance basic movement vector by 0.1, and a movement vector obtained by multiplying the communication restoration vector 4106 (5 m/s, −4 m/s, 0 m/s) by 1, and the mobile object 106 moves substantially west-southwestward and mainly performs a communication restoration operation, as illustrated in FIG. 77.

The main basic movement vector of the mobile object 107 is the sum of a movement vector obtained by multiplying the second main basic movement vector (10 m/s, 0 m/s, 0 m/s) by 1 and a movement vector obtained by multiplying the communication maintaining movement vector 4707 illustrated in FIG. 72 by 0.5. The obstacle avoidance basic movement vector of the mobile object 107 is the sum of a movement vector obtained by multiplying the second obstacle avoidance basic movement vector (0 m/s, 0 m/s, 0 m/s) by 1 and a movement vector obtained by multiplying the communication maintaining movement vector 4707 illustrated in FIG. 72 by 0.5. Since the magnitude of the communication restoration vector 4007 is 0, the actual movement vector 5007 of the mobile object 107 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1, as illustrated in FIG. 77.

If the mobile object 105 fails, the magnitude of the communication restoration vector 4007 is 0. Thus, even if the mobile object 105 fails and even if a mobile object belonging to an unknown group emerges, the mobile object 107 moves substantially east-northeastward in accordance with the actual movement vector 5007 as illustrated in FIG. 77, as in the case where the mobile object 105 does not fail and there is no mobile object belonging to an unknown group. Thus, direct communication can be maintained and an original purpose can be implemented in a balanced manner.

As a result, each of the mobile objects 101 to 104, 106, and 107 moves to maintain direct communication and the mobile objects 104 and 106 move to get together, and thus an attempt to restore communication can be made.

Furthermore, the mobile objects 101 to 103 and 107 maintain direct communication and implement an original purpose in a balanced manner, and the mobile objects 104 and 106 mainly perform a communication restoration operation. Accordingly, both restoration of communication and an original purpose can be achieved by the entire component group.

Subsequently, the control unit 602 of the mobile object 101 obtains the actual movement vector information from the own-mobile-object information 5801 and actually causes the mobile object 101 to move in accordance with the actual movement vector 5701 that has been obtained (step S6116).

Hereinafter, a description will be given of, by using specific examples, the issues that are not overcome by the techniques disclosed in PTL 1 and that are overcome by the fourth embodiment of the present disclosure.

As described above, the first technique disclosed in PTL 1 is not applicable as is if there are two or more mobile objects disconnected from the ad hoc network when viewed from any mobile object, as in the example illustrated in FIG. 2.

In contrast, in the fourth embodiment of the present disclosure, an attempt can be made to restore communication even if there are two or more mobile objects disconnected from the ad hoc network when viewed from any mobile object, as in the example illustrated in FIG. 77. In this case, that is, in the case where there are two or more mobile objects belonging to an unknown group when viewed from any mobile object, all the mobile objects belonging to the component group move to maintain direct communication, and some or all of the mobile objects belonging to the component group move to get together. Thus, an attempt to restore communication can be made. In the example illustrated in FIG. 77, each of the mobile objects 101 to 104, 106, and 107 moves to maintain direct communication, and the mobile objects 104 and 106 move to get together. Accordingly, an attempt to restore communication can be made.

The second technique disclosed in PTL 1 has an issue that all mobile objects are incapable of moving for an original purpose until communication is restored. In contrast, in the fourth embodiment of the present disclosure, the mobile objects 101 to 103 and 107 are capable of maintaining direct communication and implementing an original purpose in a balanced manner in the example illustrated in FIG. 77, for example, and the foregoing issue can be overcome.

The third technique disclosed in PTL 1 has an issue that a region over which a mobile object group is deployed gradually becomes smaller and all mobile objects are incapable of moving for an original purpose until communication is restored. Furthermore, after the communication is restored, the mobile objects need to move again for the original purpose from the positions at the point of time when the communication is restored. In contrast, in the fourth embodiment of the present disclosure, the mobile objects 101 to 103 and 107 are capable of maintaining direct communication and implementing an original purpose in a balanced manner in the example illustrated in FIG. 77, for example, and the foregoing issue can be overcome.

The fourth technique disclosed in PTL 1 has an issue that, if a selected mobile object moves toward a cutoff position, the communication between the selected mobile object and a mobile object other than a mobile object disconnected from the ad hoc network is cut off, and accordingly the ad hoc network may be secondarily fractured. In contrast, in the fourth embodiment of the present disclosure, the mobile objects 104 and 106 move to get together to attempt to restore communication, and the mobile objects 101 to 104, 106, and 107 move to maintain direct communication in the example illustrated in FIG. 77, for example. Accordingly, direct communication between mobile objects can be maintained and the foregoing issue can be overcome.

As described above, in the first technique disclosed in PTL 1, if some or all of the mobile objects move to get away from each other as in the example illustrated in FIG. 3, communication can be restored only partially at best. In the example illustrated in FIG. 3, if the group of the mobile objects 201 to 204 and the group of the mobile objects 206 and 207 continue to move to get away from each other, the direct communication with a mobile object belonging to one of the group of the mobile objects 201 to 204 and the group of the mobile objects 206 and 207 is restored at best, and it is impossible to restore the direct communication with a mobile object belonging to the other group.

In contrast, in the fourth embodiment of the present disclosure, an attempt to restore communication can be made even if some mobile objects move to get away from each other as in the example illustrated in FIG. 3. This will be described below.

Here, each of the mobile objects 201 to 207 decides on, as a target position, the position nearest to the own mobile object among the positions of all the mobile objects belonging to the unknown group, and also decides on a communication restoration vector having a direction toward the target position and having a magnitude of 6.4 m/s if the own mobile object is the nearest to the target position among the mobile objects belonging to the known group. Each of the mobile objects 201 to 207 decides on a communication restoration vector having a magnitude of 0 if the own mobile object is not the nearest to the target position among the positions of all the mobile objects belonging to the unknown group.

Here, the control unit 602 of each of the mobile objects 201 to 207 decides on, as a communication maintaining movement vector, a movement vector having a predetermined magnitude and having a direction toward the center position of all the mobile objects belonging to the direct communication group. It is assumed that the magnitude of the communication maintaining movement vector is 2.8 m/s.

Here, the control unit 602 of each of the mobile objects 201 to 207 multiplies the second main basic movement vector belonging to the second basic movement vector group by 1, multiplies the communication maintaining movement vector by 0.5, which is a value obtained by dividing 1 by the number of movement vectors belonging to the second basic movement vector group, calculates the sum of the movement vectors as calculation results, and decides on the sum as a main basic movement vector. Also, the control unit 602 of each of the mobile objects 201 to 207 multiplies the second obstacle avoidance basic movement vector by 1, multiplies the communication maintaining movement vector by 0.5, which is a value obtained by dividing 1 by the number of movement vectors belonging to the second basic movement vector group, calculates the sum of the movement vectors as calculation results, and decides on the sum as an obstacle avoidance basic movement vector.

To increase the ratio of a movement for avoiding an obstacle, the control unit 602 of each of the mobile objects 201 to 207 multiplies the main basic movement vector belonging to the basic movement vector group by 0.5, multiplies the obstacle avoidance basic movement vector belonging to the basic movement vector group by 1, and multiplies the communication restoration vector by 1, and then calculates the sum of the movement vectors as calculation results.

Here, among the movement vectors belonging to the second basic movement vector groups of the mobile objects 201 to 204, the value of the second main basic movement vector is (−10 m/s, 0 m/s, 0 m/s) and the value of the second obstacle avoidance basic movement vector is (0 m/s, 0 m/s, 0 m/s). Among the movement vectors belonging to the second basic movement vector group of the mobile object 205, the value of the second main basic movement vector is (0 m/s, 0 m/s, 0 m/s) and the value of the second obstacle avoidance basic movement vector is (0 m/s, 0 m/s, 0 m/s). Among the movement vectors belonging to the second basic movement vector groups of the mobile objects 206 and 207, the value of the second main basic movement vector is (10 m/s, 0 m/s, 0 m/s) and the value of the second obstacle avoidance basic movement vector is (0 m/s, 0 m/s, 0 m/s).

Here, if the magnitude of the communication restoration vector is 0, the control unit 602 of each of the mobile objects 201 to 207 decides on, as an actual movement vector, the sum of a movement vector obtained by multiplying the main basic movement vector by 0.5, a movement vector obtained by multiplying the obstacle avoidance basic movement vector by 1, and a movement vector obtained by multiplying the communication restoration vector by 1. If the magnitude of the communication restoration vector is not 0, the control unit 602 of each of the mobile objects 201 to 207 decides on, as an actual movement vector, the sum of a movement vector obtained by multiplying the main basic movement vector by 0.05, a movement vector obtained by multiplying the obstacle avoidance basic movement vector by 0.1, and a movement vector obtained by multiplying the communication restoration vector by 1.

Figure 78:
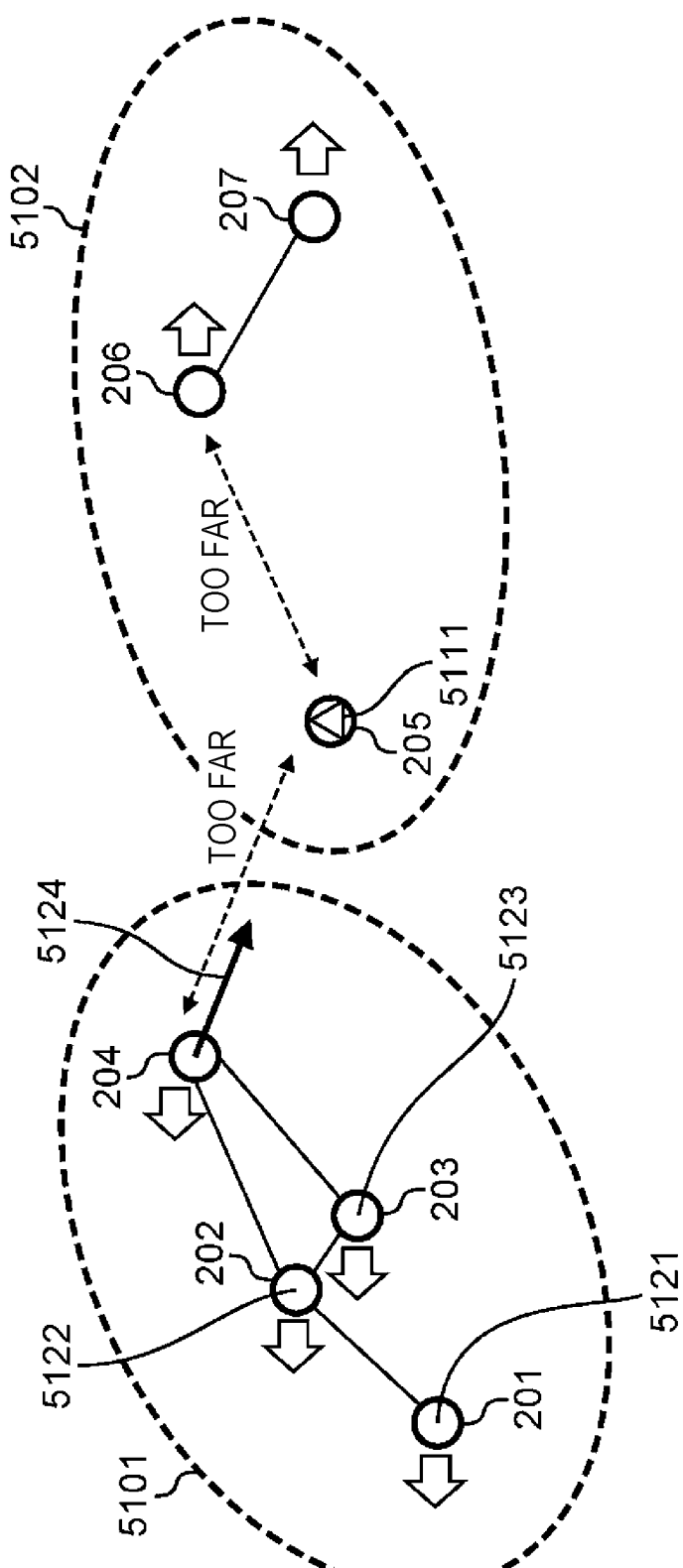
FIG. 78 is a conceptual diagram illustrating an example of communication restoration vectors of mobile objects in the situation illustrated in FIG. 3 in the fourth embodiment of the present disclosure.

FIG. 78 is a conceptual diagram illustrating an example of communication restoration vectors of the mobile objects 201 to 204 in the situation illustrated in FIG. 3 in the fourth embodiment of the present disclosure. In FIG. 78, the same elements as those in FIG. 1 are denoted by the same reference numerals and the description thereof will not be given.

As illustrated in FIG. 78, for each of the mobile objects 201 to 204, the mobile objects belonging to the known group

5101 are the mobile objects 201 to 204, and the mobile objects belonging to the unknown group 5102 are the mobile objects 205 to 207.

The control unit 602 of each of the mobile objects 201 to 204 decides on, as the target position 5111, the position of the mobile object 205, which is the nearest to the own mobile object among the positions of all the mobile objects belonging to the unknown group 5102.

The control unit 602 of the mobile object 204, which is the nearest to the target position 5111, decides on the communication restoration vector 5124 having a direction toward the target position and having a magnitude of 6.4 m/s. The control units 602 of the mobile objects 201 to 203 decide on the communication restoration vectors 5121 to 5123 having a magnitude of 0, respectively.

Figure 79:
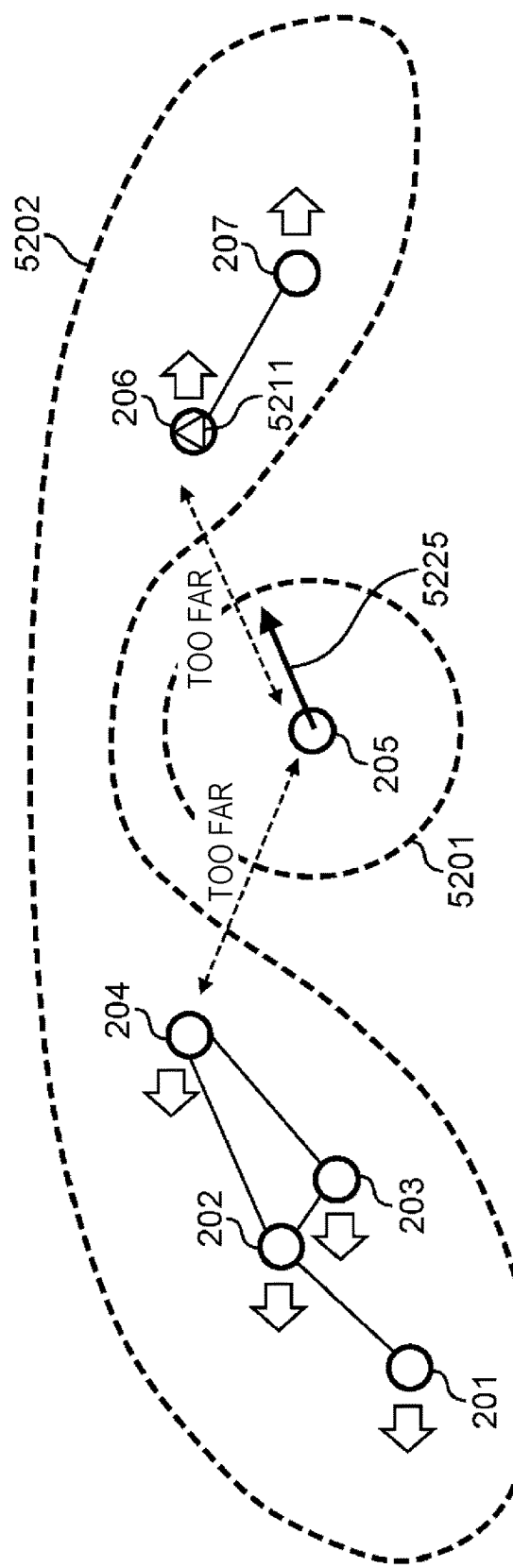
FIG. 79 is a conceptual diagram illustrating an example of a communication restoration vector of a mobile object in the situation illustrated in FIG. 3 in the fourth embodiment of the present disclosure.

FIG. 79 is a conceptual diagram illustrating an example of a communication restoration vector of the mobile object 205 in the situation illustrated in FIG. 3 in the fourth embodiment of the present disclosure. In FIG. 79, the same elements as those in FIG. 1 are denoted by the same reference numerals and the description thereof will not be given.

As illustrated in FIG. 79, for the mobile object 205, the mobile object belonging to the known group 5201 is the mobile object 205, and the mobile objects belonging to the unknown group 5202 are the mobile objects 201 to 204, 206, and 207.

The control unit 602 of the mobile object 205 decides on, as the target position 5211, the position of the mobile object 206, which is the nearest to the own mobile object among the positions of all the mobile objects belonging to the unknown group 5202.

The mobile object 205 is the nearest to the target position 5211, and thus the control unit 602 of the mobile object 205 decides on the communication restoration vector 5225 having a direction toward the target position 5211 and having a magnitude of 6.4 m/s.

Figure 80:
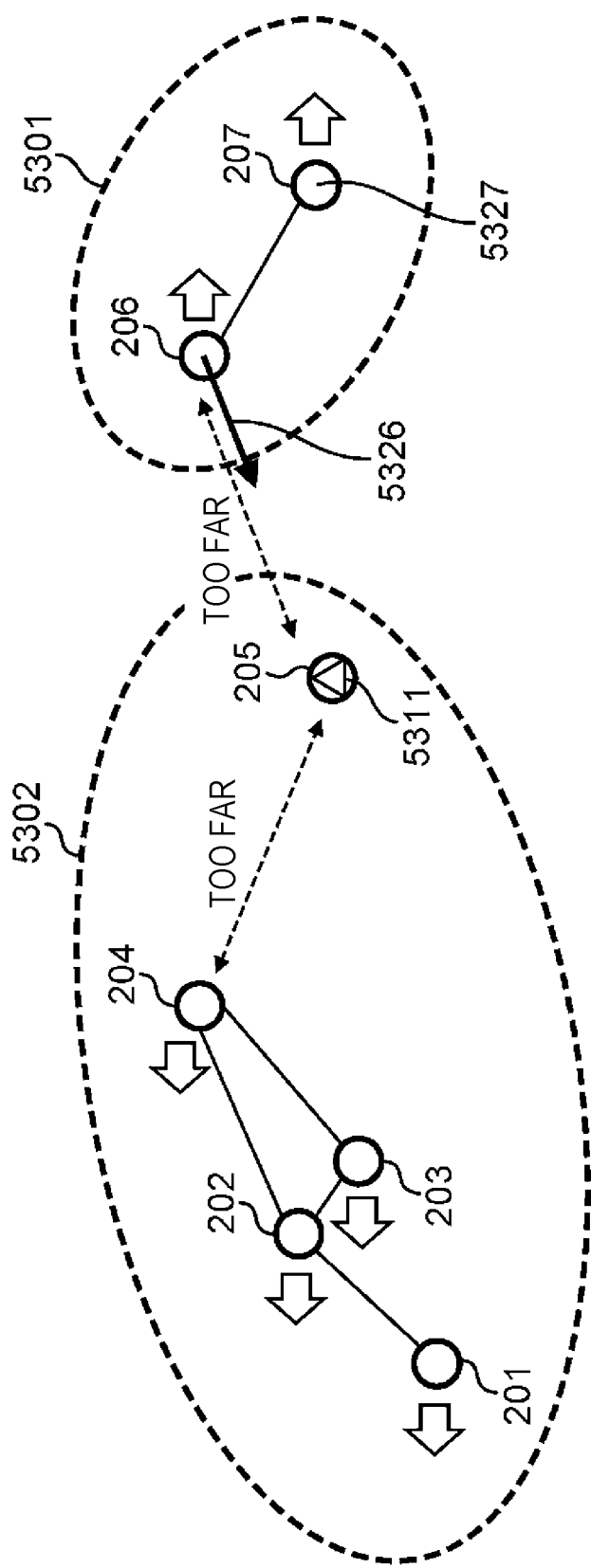
FIG. 80 is a conceptual diagram illustrating an example of communication restoration vectors of mobile objects in the situation illustrated in FIG. 3 in the fourth embodiment of the present disclosure.

FIG. 80 is a conceptual diagram illustrating an example of communication restoration vectors of the mobile objects 206 and 207 in the situation illustrated in FIG. 3 in the fourth embodiment of the present disclosure. In FIG. 80, the same elements as those in FIG. 1 are denoted by the same reference numerals and the description thereof will not be given.

As illustrated in FIG. 80, for each of the mobile objects 206 and 207, the mobile objects belonging to the known group 5301 are the mobile objects 206 and 207, and the mobile objects belonging to the unknown group 5302 are the mobile objects 201 to 205.

The control unit 602 of each of the mobile objects 206 and 207 decides on, as the target position 5311, the position of the mobile object 205, which is the nearest to the own mobile object among the positions of all the mobile objects belonging to the unknown group 5302.

The control unit 602 of the mobile object 206, which is the nearest to the target position 5311, decides on the communication restoration vector 5326 having a direction toward the target position and having a magnitude of 6.4 m/s. The control unit 602 of the mobile object 207 decides on the communication restoration vector 5327 having a magnitude of 0.

Figure 81:
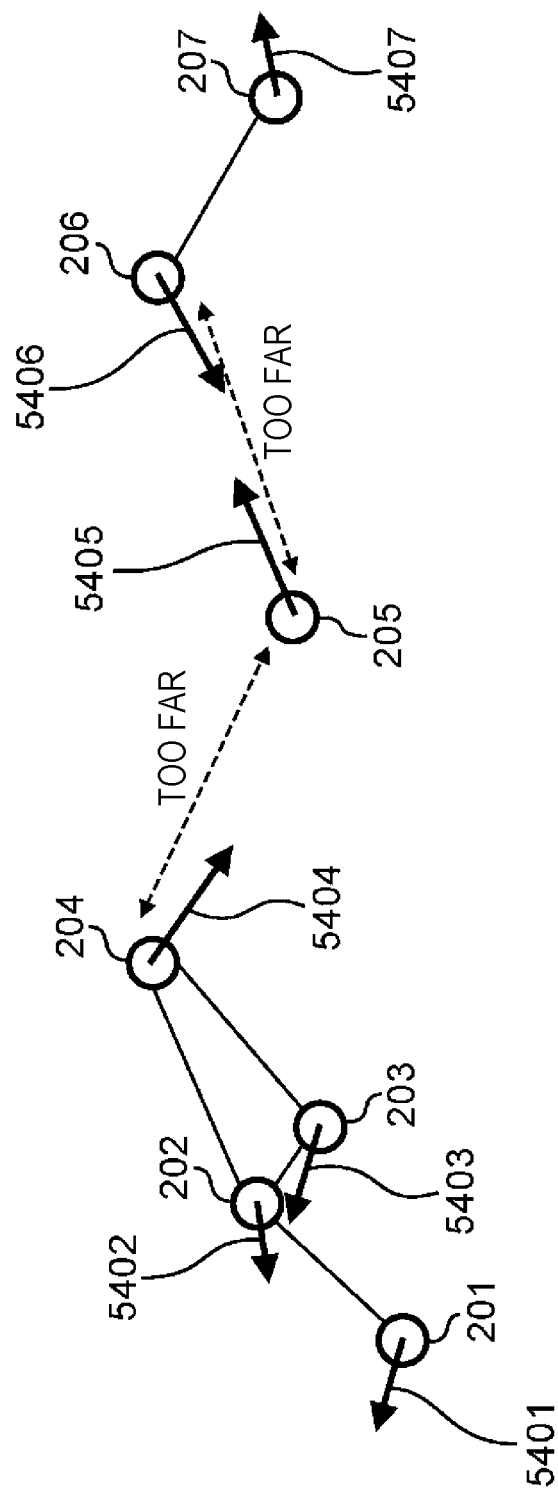
FIG. 81 is a conceptual diagram illustrating an example of actual movement vectors of mobile objects in the situation illustrated in FIG. 3 in the fourth embodiment of the present disclosure.

FIG. 81 is a conceptual diagram illustrating an example of actual movement vectors of the mobile objects 201 to 207 in the situation illustrated in FIG. 3 in the fourth embodiment of the present disclosure. In FIG. 81, the same elements as those in FIG. 1 are denoted by the same reference numerals and the description thereof will not be given.

Only the mobile object 202 belongs to the direct communication group of the mobile object 201. Thus, the control unit 602 of the mobile object 201 decides on, as a communication maintaining movement vector, a movement vector having a magnitude of 2.8 m/s and having a direction toward the center position of all the mobile objects belonging to the direct communication group (the position of the mobile object 202).

Subsequently, the control unit 602 of the mobile object 201 calculates the sum of a movement vector obtained by multiplying the second main basic movement vector (−10 m/s, 0 m/s, 0 m/s) by 1 and a movement vector obtained by multiplying the communication maintaining movement vector by 0.5, and decides on the sum as a main basic movement vector. Also, the control unit 602 of the mobile object 201 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

Since the magnitude of the communication restoration vector 5121 is 0, the actual movement vector 5401 of the mobile object 201 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1.

If the mobile object 205 fails, the magnitude of the communication restoration vector 5121 is 0. Thus, even if the mobile object 205 fails and even if a mobile object belonging to an unknown group emerges, the mobile object 201 moves substantially west-northwestward in accordance with the actual movement vector 5401 as illustrated in FIG. 81, as in the case where the mobile object 205 does not fail and there is no mobile object belonging to an unknown group. Thus, direct communication can be maintained and an original purpose can be implemented in a balanced manner.

The mobile objects 201, 203, and 204 belong to the direct communication group of the mobile object 202. Thus, the control unit 602 of the mobile object 202 decides on, as a communication maintaining movement vector, a movement vector having a magnitude of 2.8 m/s and having a direction toward the center position of the mobile objects 201, 203, and 204.

Subsequently, the control unit 602 of the mobile object 202 calculates the sum of a movement vector obtained by multiplying the second main basic movement vector (−10 m/s, 0 m/s, 0 m/s) by 1 and a movement vector obtained by multiplying the communication maintaining movement vector by 0.5, and decides on the sum as a main basic movement vector. Also, the control unit 602 of the mobile object 202 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

Since the magnitude of the communication restoration vector 5122 is 0, the actual movement vector 5402 of the mobile object 202 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1.

If the mobile object 205 fails, the magnitude of the communication restoration vector 5122 is 0. Thus, even if the mobile object 205 fails and even if a mobile object belonging to an unknown group emerges, the mobile object 202 moves substantially west-southwestward in accordance with the actual movement vector 5402 as illustrated in FIG. 81, as in the case where the mobile object 205 does not fail and there is no mobile object belonging to an unknown group. Thus, direct communication can be maintained and an original purpose can be implemented in a balanced manner.

The mobile objects 202 and 204 belong to the direct communication group of the mobile object 203. Thus, the control unit 602 of the mobile object 203 decides on, as a communication maintaining movement vector, a movement vector having a magnitude of 2.8 m/s and having a direction toward the center position of the mobile objects 202 and 204.

Subsequently, the control unit 602 of the mobile object 203 calculates the sum of a movement vector obtained by multiplying the second main basic movement vector (−10 m/s, 0 m/s, 0 m/s) by 1 and a movement vector obtained by multiplying the communication maintaining movement vector by 0.5, and decides on the sum as a main basic movement vector. Also, the control unit 602 of the mobile object 203 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

Since the magnitude of the communication restoration vector 5123 is 0, the actual movement vector 5403 of the mobile object 203 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1.

If the mobile object 205 fails, the magnitude of the communication restoration vector 5123 is 0. Thus, even if the mobile object 205 fails and even if a mobile object belonging to an unknown group emerges, the mobile object 203 moves substantially west-northwestward in accordance with the actual movement vector 5403 as illustrated in FIG. 81, as in the case where the mobile object 205 does not fail and there is no mobile object belonging to an unknown group. Thus, direct communication can be maintained and an original purpose can be implemented in a balanced manner.

The mobile objects 202 and 203 belong to the direct communication group of the mobile object 204. Thus, the control unit 602 of the mobile object 204 decides on, as a communication maintaining movement vector, a movement vector having a magnitude of 2.8 m/s and having a direction toward the center position of the mobile objects 202 and 203.

Subsequently, the control unit 602 of the mobile object 204 calculates the sum of a movement vector obtained by multiplying the second main basic movement vector (−10 m/s, 0 m/s, 0 m/s) by 1 and a movement vector obtained by multiplying the communication maintaining movement vector by 0.5, and decides on the sum as a main basic movement vector. Also, the control unit 602 of the mobile object 204 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

If the mobile object 205 does not fail and if there is no mobile object belonging to an unknown group, the magnitude of the communication restoration vector is 0. Thus, an actual movement vector of the mobile object 204 is the sum of a movement vector obtained by multiplying the main basic movement vector by 0.5 and a movement vector obtained by multiplying the obstacle avoidance basic movement vector by 1, and the mobile object 204 moves substantially west-southwestward. However, if the mobile object 205 fails and if a mobile object belonging to an unknown group emerges, the actual movement vector 5404 of the mobile object 204 is the sum of a movement vector obtained by multiplying the main basic movement vector by 0.05, a movement vector obtained by multiplying the obstacle avoidance basic movement vector by 0.1, and a movement vector obtained by multiplying the communication restoration vector 5124 by 1, and the mobile object 204 moves substantially east-southeastward and mainly performs a communication restoration operation, as illustrated in FIG. 81.

There is no mobile object belonging to the direct communication group of the mobile object 205. Thus, the control unit 602 of the mobile object 205 decides on a communication maintaining movement vector having a magnitude of 0.

Subsequently, the control unit 602 of the mobile object 205 calculates the sum of a movement vector obtained by multiplying the second main basic movement vector (0 m/s, 0 m/s, 0 m/s) by 1 and a movement vector obtained by multiplying the communication maintaining movement vector by 0.5, and decides on the sum as a main basic movement vector. Also, the control unit 602 of the mobile object 205 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

If the mobile object 205 does not fail and if there is no mobile object belonging to an unknown group, the magnitude of the communication restoration vector is 0. Thus, an actual movement vector of the mobile object 205 is the sum of a movement vector obtained by multiplying the main basic movement vector by 0.5 and a movement vector obtained by multiplying the obstacle avoidance basic movement vector by 1, and the mobile object 205 stops at the position. However, if the mobile object 205 fails and if a mobile object belonging to an unknown group emerges, the actual movement vector 5405 of the mobile object 205 is the sum of a movement vector obtained by multiplying the main basic movement vector by 0.05, a movement vector obtained by multiplying the obstacle avoidance basic movement vector by 0.1, and a movement vector obtained by multiplying the communication restoration vector 5225 by 1, and the mobile object 205 moves substantially east-northeastward and mainly performs a communication restoration operation, as illustrated in FIG. 81.

Only the mobile object 207 belongs to the direct communication group of the mobile object 206. Thus, the control unit 602 of the mobile object 206 decides on, as a communication maintaining movement vector, a movement vector having a magnitude of 2.8 m/s and having a direction toward the center position of all the mobile objects belonging to the direct communication group (the position of the mobile object 207).

Subsequently, the control unit 602 of the mobile object 206 calculates the sum of a movement vector obtained by multiplying the second main basic movement vector (10 m/s, 0 m/s, 0 m/s) by 1 and a movement vector obtained by multiplying the communication maintaining movement vector by 0.5, and decides on the sum as a main basic movement vector. Also, the control unit 602 of the mobile object 206 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

If the mobile object 205 does not fail and if there is no mobile object belonging to an unknown group, the magnitude of the communication restoration vector is 0. Thus, an actual movement vector of the mobile object 206 is the sum of a movement vector obtained by multiplying the main basic movement vector by 0.5 and a movement vector obtained by multiplying the obstacle avoidance basic movement vector by 1, and the mobile object 206 moves substantially east-southeastward. However, if the mobile object 205 fails and if a mobile object belonging to an unknown group emerges, the actual movement vector 5406 of the mobile object 206 is the sum of a movement vector obtained by multiplying the main basic movement vector by 0.05, a movement vector obtained by multiplying the obstacle avoidance basic movement vector by 0.1, and a movement vector obtained by multiplying the communication restoration vector 5326 by 1, and the mobile object 206 moves substantially west-southwestward and mainly performs a communication restoration operation, as illustrated in FIG. 81.

Only the mobile object 206 belongs to the direct communication group of the mobile object 207. Thus, the control unit 602 of the mobile object 207 decides on, as a communication maintaining movement vector, a movement vector having a magnitude of 2.8 m/s and having a direction toward the center position of all the mobile objects belonging to the direct communication group (the position of the mobile object 206).

Subsequently, the control unit 602 of the mobile object 207 calculates the sum of a movement vector obtained by multiplying the second main basic movement vector (10 m/s, 0 m/s, 0 m/s) by 1 and a movement vector obtained by multiplying the communication maintaining movement vector by 0.5, and decides on the sum as a main basic movement vector. Also, the control unit 602 of the mobile object 207 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

Since the magnitude of the communication restoration vector 5127 is 0, the actual movement vector 5407 of the mobile object 207 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1.

If the mobile object 205 fails, the magnitude of the communication restoration vector 5127 is 0. Thus, even if the mobile object 205 fails and even if a mobile object belonging to an unknown group emerges, the mobile object 207 moves substantially east-northeastward in accordance with the actual movement vector 5407 as illustrated in FIG. 81, as in the case where the mobile object 205 does not fail and there is no mobile object belonging to an unknown group. Thus, direct communication can be maintained and an original purpose can be implemented in a balanced manner.

In this way, each of the mobile objects 201 to 204, 206, and 207 moves to maintain direct communication, and the mobile objects 204 to 206 move to get together, and thus an attempt to restore communication can be made even if some mobile objects move to get away from each other as in the example illustrated in FIG. 3.

The second technique disclosed in PTL 1 has an issue that all mobile objects are incapable of moving for an original purpose until communication is restored. In contrast, in the fourth embodiment of the present disclosure, the mobile objects 201 to 203 and 207 are capable of maintaining direct communication and implementing an original purpose in a balanced manner in the example illustrated in FIG. 81, for example, and the foregoing issue can be overcome.

The third technique disclosed in PTL 1 has an issue that a region over which a mobile object group is deployed gradually becomes smaller and all mobile objects are incapable of moving for an original purpose until communication is restored. Furthermore, after the communication is restored, the mobile objects need to move again for the original purpose from the positions at the point of time when the communication is restored. In contrast, in the fourth embodiment of the present disclosure, the mobile objects 201 to 203 and 207 are capable of maintaining direct communication and implementing an original purpose in a balanced manner in the example illustrated in FIG. 81, for example, and the foregoing issue can be overcome.

The fourth technique disclosed in PTL 1 has an issue that, if a selected mobile object moves toward a cutoff position, the communication between the selected mobile object and a mobile object other than a mobile object disconnected from the ad hoc network is cut off, and accordingly the ad hoc network may be secondarily fractured. In contrast, in the fourth embodiment of the present disclosure, the mobile objects 204 to 206 move to get together to attempt to restore communication and each of the mobile objects 201 to 204, 206, and 207 moves to maintain direct communication in the example illustrated in FIG. 81, for example. Accordingly, the foregoing issue can be overcome.

As described above, in the first technique disclosed in PTL 1, if a mobile object disconnected from the ad hoc network moves to restore communication with the ad hoc network but there is no mobile object in the movement direction or if a mobile object moves in a direction of getting away from the mobile object disconnected from the ad hoc network, it is impossible to restore communication, as in the example illustrated in FIG. 4. In the example illustrated in FIG. 4, the mobile objects 201 to 206 do not exist in the direction in which the mobile object 207, which has been disconnected from the ad hoc network, moves to restore communication, and the mobile objects 201 to 206 continue to move in a lower-left direction in FIG. 4. Thus, the mobile object 207 is incapable of approaching the mobile objects 201 to 206 and restoring the direct communication therewith even if the first technique disclosed in PTL 1 is used. Furthermore, even if the mobile objects 201 to 206 exist in the direction in which the mobile object 207 moves, the mobile object 207 is incapable of catching up with the mobile objects 201 to 206 and restoring the direct communication with the mobile objects 201 to 206 because the mobile objects 201 to 206 continue to move in a direction of getting away from the mobile object 207.

In contrast, in the fourth embodiment of the present disclosure, even if a mobile object disconnected from the ad hoc network moves to restore communication with the ad hoc network but there is no mobile object in the movement direction or even if a mobile object moves in a direction of getting away from the mobile object disconnected from the ad hoc network, as in the example illustrated in FIG. 4, an attempt to restore communication can be made. This will be described below.

Here, the control unit 602 of each of the mobile objects 201 to 207 decides on, as a target position, the position nearest to the own mobile object among the positions of all the mobile objects belonging to the unknown group. Also, the control unit 602 of each of the mobile objects 201 to 207 decides on a communication restoration vector having a direction toward the target position and having a magnitude of 6.4 m/s if the own mobile object is the nearest to the target position among the mobile objects belonging to the known group, and decides on a communication restoration vector having a magnitude of 0 if the own mobile object is not the nearest to the target position.

Here, the control unit 602 of each of the mobile objects 201 to 207 decides on, as a communication maintaining movement vector, a movement vector having a predetermined magnitude and having a direction toward the center position of all the mobile objects belonging to the direct communication group. It is assumed that the magnitude of the communication maintaining movement vector is 2.8 m/s.

Here, the control unit 602 of each of the mobile objects 201 to 207 multiplies the second main basic movement vector belonging to the second basic movement vector group by 1, multiplies the communication maintaining movement vector by 0.5, which is a value obtained by dividing 1 by the number of movement vectors belonging to the second basic movement vector group, calculates the sum of the movement vectors as calculation results, and decides on the sum as a main basic movement vector. Also, the control unit 602 of each of the mobile objects 201 to 207 multiplies the second obstacle avoidance basic movement vector belonging to the second basic movement vector group by 1, multiplies the communication maintaining movement vector by 0.5, which is a value obtained by dividing 1 by the number of movement vectors belonging to the second basic movement vector group, calculates the sum of the movement vectors as calculation results, and decides on the sum as an obstacle avoidance basic movement vector.

To increase the ratio of a movement for avoiding an obstacle, the control unit 602 of each of the mobile objects 201 to 207 multiplies the main basic movement vector belonging to the basic movement vector group by 0.5, multiplies the obstacle avoidance basic movement vector belonging to the basic movement vector group by 1, and multiplies the communication restoration vector by 1, and then calculates the sum of the movement vectors as calculation results.

Here, among the movement vectors belonging to the second basic movement vector groups of the mobile objects 201 to 206, the value of the second main basic movement vector is (−6 m/s, −8 m/s, 0 m/s) and the value of the second obstacle avoidance basic movement vector is (0 m/s, 0 m/s, 0 m/s). Among the movement vectors belonging to the second basic movement vector group of the mobile object 205, the value of the second main basic movement vector is (0 m/s, 0 m/s, 0 m/s) and the value of the second obstacle avoidance basic movement vector is (0 m/s, 0 m/s, 0 m/s). Among the movement vectors belonging to the second basic movement vector group of the mobile object 207, the value of the second main basic movement vector is (10 m/s, 0 m/s, 0 m/s) and the value of the second obstacle avoidance basic movement vector is (0 m/s, 0 m/s, 0 m/s).

Here, if the magnitude of the communication restoration vector is 0, the control unit 602 of each of the mobile objects 201 to 207 decides on, as an actual movement vector, the sum of a movement vector obtained by multiplying the main basic movement vector by 0.5, a movement vector obtained by multiplying the obstacle avoidance basic movement vector by 1, and a movement vector obtained by multiplying the communication restoration vector by 1. If the magnitude of the communication restoration vector is not 0, the control unit 602 of each of the mobile objects 201 to 207 decides on, as an actual movement vector, the sum of a movement vector obtained by multiplying the main basic movement vector by 0.05, a movement vector obtained by multiplying the obstacle avoidance basic movement vector by 0.1, and a movement vector obtained by multiplying the communication restoration vector by 1.

Figure 82:
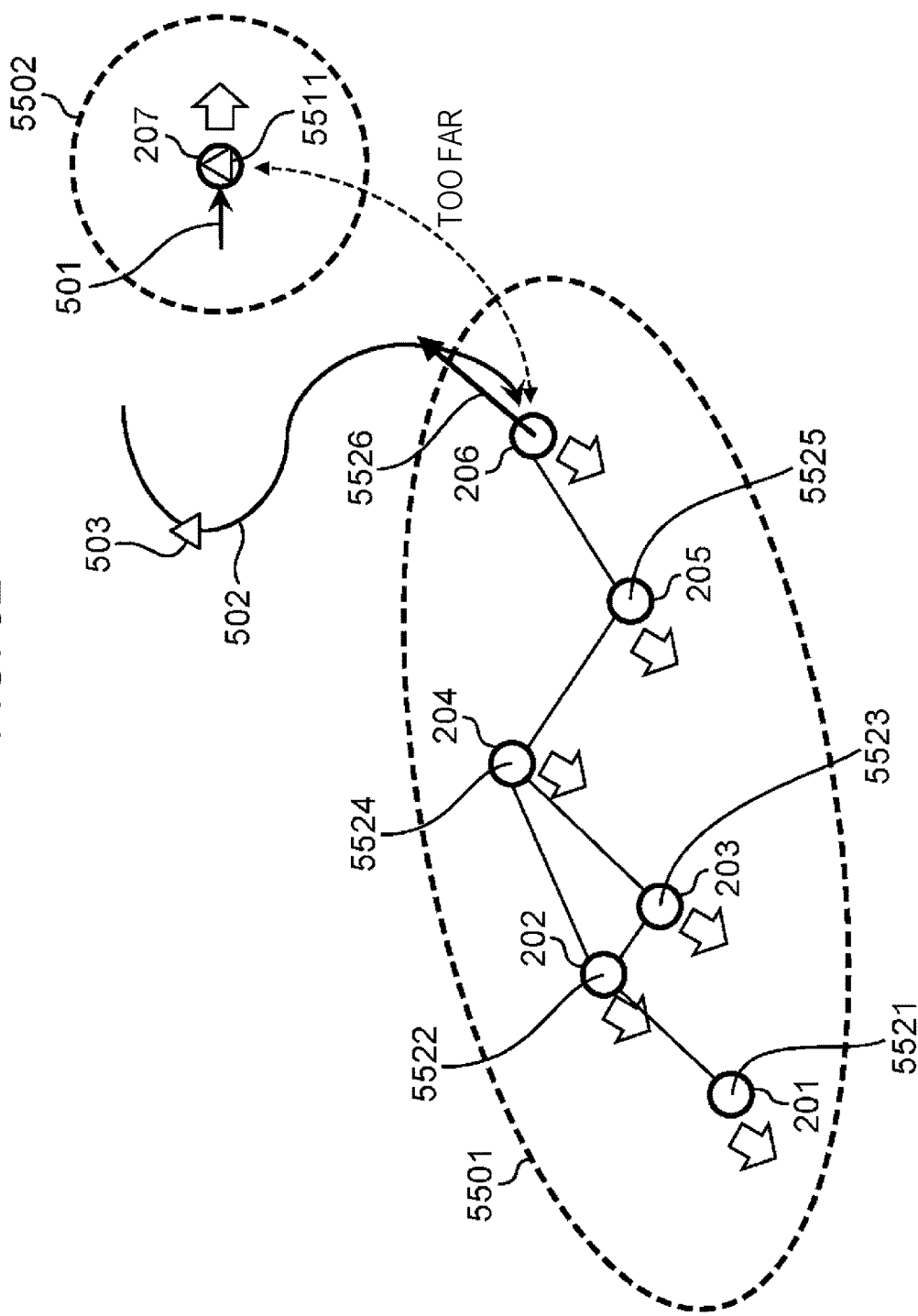
FIG. 82 is a conceptual diagram illustrating an example of communication restoration vectors that are decided on by mobile objects in the situation illustrated in FIG. 4 in the fourth embodiment of the present disclosure.

FIG. 82 is a conceptual diagram illustrating an example of communication restoration vectors that are decided on by the mobile objects 201 to 206 in the situation illustrated in FIG. 4 in the fourth embodiment of the present disclosure. In FIG. 82, the same elements as those in FIGS. 1 and 4 are denoted by the same reference numerals and the description thereof will not be given.

As illustrated in FIG. 82, for each of the mobile objects 201 to 206, the mobile objects belonging to the known group 5501 are the mobile objects 201 to 206, and the mobile object belonging to the unknown group 5502 is the mobile object 207.

The control unit 602 of each of the mobile objects 201 to 206 decides on, as the target position 5511, the position of the mobile object 207, which is the nearest to the own mobile object among the positions of all the mobile objects belonging to the unknown group 5502.

The control unit 602 of the mobile object 206, which is the nearest to the target position 5511, decides on the communication restoration vector 5526 having a direction toward the target position and having a magnitude of 6.4 m/s. The control units 602 of the mobile objects 201 to 205 decide on the communication restoration vectors 5521 to 5525 having a magnitude of 0, respectively.

Figure 83:
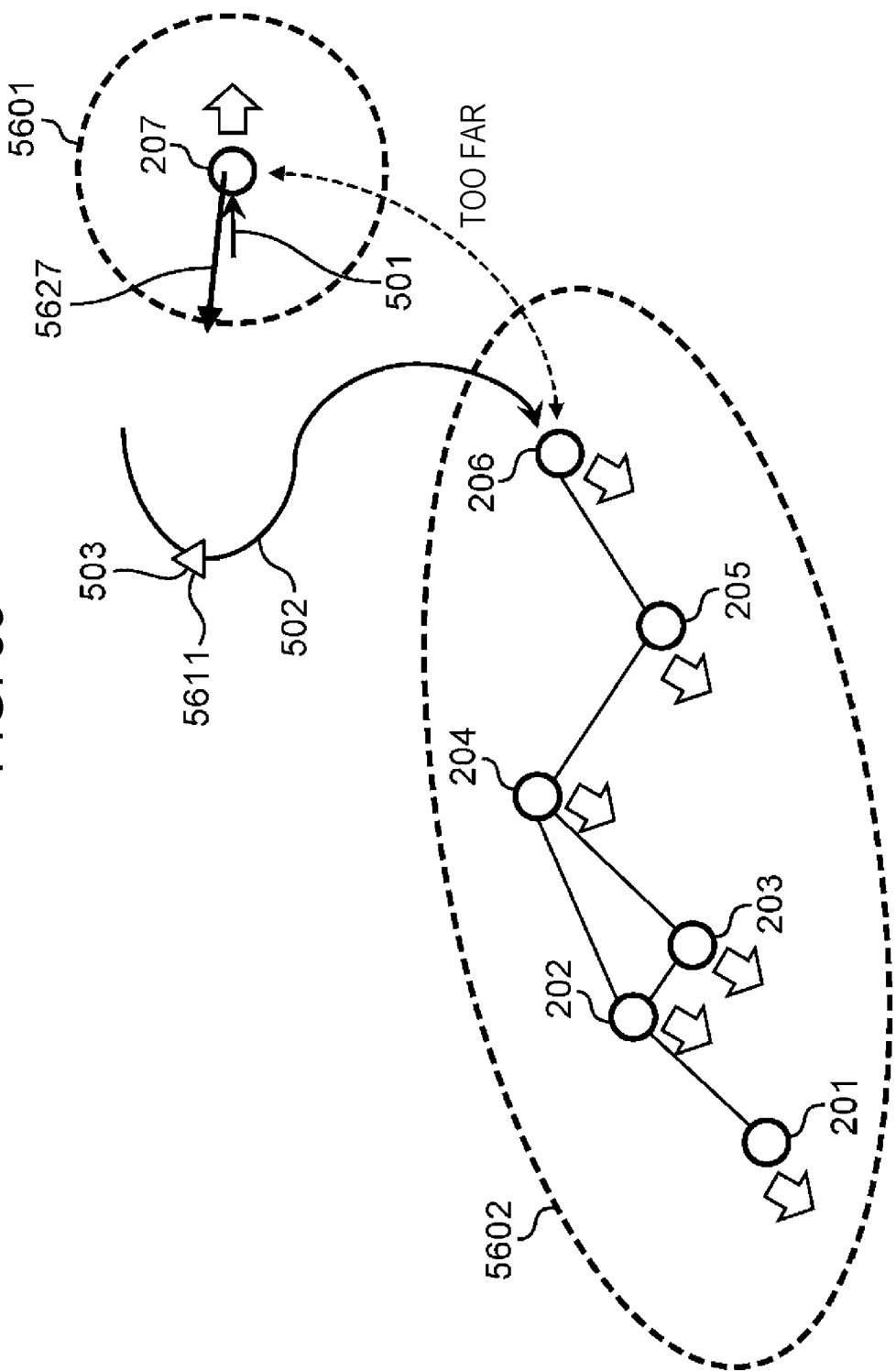
FIG. 83 is a conceptual diagram illustrating an example of a communication restoration vector of a mobile object in the situation illustrated in FIG. 4 in the fourth embodiment of the present disclosure.

FIG. 83 is a conceptual diagram illustrating an example of a communication restoration vector of the mobile object 207 in the situation illustrated in FIG. 4 in the fourth embodiment of the present disclosure. In FIG. 83, the same elements as those in FIGS. 1 and 4 are denoted by the same reference numerals and the description thereof will not be given.

As illustrated in FIG. 83, for the mobile object 207, the mobile object belonging to the known group 5601 is the mobile object 207, and the mobile objects belonging to the unknown group 5602 are the mobile objects 201 to 206.

The control unit 602 of the mobile object 207 decides on, as the target position 5611, the position 503 immediately before the communication cutoff of the mobile object 206, which is the nearest to the own mobile object among the positions of all the mobile objects belonging to the unknown group 5602.

The mobile object 207 is the nearest to the target position 5611, and thus the control unit 602 of the mobile object 207 decides on the communication restoration vector 5627 having a direction toward the target position and having a magnitude of 6.4 m/s.

FIG. 84 is a conceptual diagram illustrating an example of actual movement vectors of the mobile objects 201 to 207 in the situation illustrated in FIG. 4 in the fourth embodiment of the present disclosure. In FIG. 84, the same elements as those in FIGS. 1 and 4 are denoted by the same reference numerals and the description thereof will not be given.

Only the mobile object 202 belongs to the direct communication group of the mobile object 201. Thus, the control unit 602 of the mobile object 201 decides on, as a communication maintaining movement vector, a movement vector having a magnitude of 2.8 m/s and having a direction toward the center position of all the mobile objects belonging to the direct communication group (the position of the mobile object 202).

Subsequently, the control unit 602 of the mobile object 201 calculates the sum of a movement vector obtained by multiplying the second main basic movement vector (−6 m/s, −8 m/s, 0 m/s) by 1 and a movement vector obtained by multiplying the communication maintaining movement vector by 0.5, and decides on the sum as a main basic movement vector. Also, the control unit 602 of the mobile object 201 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

Since the magnitude of the communication restoration vector 5521 is 0, the actual movement vector 5701 of the mobile object 201 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1.

If the mobile object 205 fails, the magnitude of the communication restoration vector 5521 is 0. Thus, even if the mobile object 205 fails and even if a mobile object belonging to an unknown group emerges, the mobile object 201 moves substantially southwestward in accordance with the actual movement vector 5701 as illustrated in FIG. 84, as in the case where the mobile object 205 does not fail and there is no mobile object belonging to an unknown group. Thus, direct communication can be maintained and an original purpose can be implemented in a balanced manner.

The mobile objects 201, 203, and 204 belong to the direct communication group of the mobile object 202. Thus, the control unit 602 of the mobile object 202 decides on, as a communication maintaining movement vector, a movement vector having a magnitude of 2.8 m/s and having a direction toward the center position of the mobile objects 201, 203, and 204.

Subsequently, the control unit 602 of the mobile object 202 calculates the sum of a movement vector obtained by multiplying the second main basic movement vector (−6 m/s, −8 m/s, 0 m/s) by 1 and a movement vector obtained by multiplying the communication maintaining movement vector by 0.5, and decides on the sum as a main basic movement vector. Also, the control unit 602 of the mobile object 202 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

Since the magnitude of the communication restoration vector 5522 is 0, the actual movement vector 5702 of the mobile object 202 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1.

If the mobile object 205 fails, the magnitude of the communication restoration vector 5522 is 0. Thus, even if the mobile object 205 fails and even if a mobile object belonging to an unknown group emerges, the mobile object 202 moves substantially south-southwestward in accordance with the actual movement vector 5702 as illustrated in FIG. 84, as in the case where the mobile object 205 does not fail and there is no mobile object belonging to an unknown group. Thus, direct communication can be maintained and an original purpose can be implemented in a balanced manner.

The mobile objects 202 and 204 belong to the direct communication group of the mobile object 203. Thus, the control unit 602 of the mobile object 203 decides on, as a communication maintaining movement vector, a movement vector having a magnitude of 2.8 m/s and having a direction toward the center position of the mobile objects 202 and 204.

Subsequently, the control unit 602 of the mobile object 203 calculates the sum of a movement vector obtained by multiplying the second main basic movement vector (−6 m/s, −8 m/s, 0 m/s) by 1 and a movement vector obtained by multiplying the communication maintaining movement vector by 0.5, and decides on the sum as a main basic movement vector. Also, the control unit 602 of the mobile object 203 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

Since the magnitude of the communication restoration vector 5523 is 0, the actual movement vector 5703 of the mobile object 203 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1.

If the mobile object 205 fails, the magnitude of the communication restoration vector 5523 is 0. Thus, even if the mobile object 205 fails and even if a mobile object belonging to an unknown group emerges, the mobile object 203 moves substantially southwestward in accordance with the actual movement vector 5703 as illustrated in FIG. 84, as in the case where the mobile object 205 does not fail and there is no mobile object belonging to an unknown group. Thus, direct communication can be maintained and an original purpose can be implemented in a balanced manner.

The mobile objects 202 and 203 belong to the direct communication group of the mobile object 204. Thus, the control unit 602 of the mobile object 204 decides on, as a communication maintaining movement vector, a movement vector having a magnitude of 2.8 m/s and having a direction toward the center position of the mobile objects 202 and 203.

Subsequently, the control unit 602 of the mobile object 204 calculates the sum of a movement vector obtained by multiplying the second main basic movement vector (−6 m/s, −8 m/s, 0 m/s) by 1 and a movement vector obtained by multiplying the communication maintaining movement vector by 0.5, and decides on the sum as a main basic movement vector. Also, the control unit 602 of the mobile object 204 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

Since the magnitude of the communication restoration vector 5524 is 0, the actual movement vector 5704 of the mobile object 204 is the sum of a movement vector obtained by multiplying the main basic movement vector by 0.5, a movement vector obtained by multiplying the obstacle avoidance basic movement vector by 1, and a movement vector obtained by multiplying the communication restoration vector by 1.

If the mobile object 205 fails, the magnitude of the communication restoration vector 5524 is 0. Thus, even if the mobile object 205 fails and even if a mobile object belonging to an unknown group emerges, the mobile object 204 moves substantially southwestward in accordance with the actual movement vector 5704 as illustrated in FIG. 84, as in the case where the mobile object 205 does not fail and there is no mobile object belonging to an unknown group. Thus, direct communication can be maintained and an original purpose can be implemented in a balanced manner.

Only the mobile object 204 belongs to the direct communication group of the mobile object 205. Thus, the control unit 602 of the mobile object 205 decides on, as a communication maintaining movement vector, a movement vector having a magnitude of 2.8 m/s and having a direction toward the center position of all the mobile objects belonging to the direct communication group (the position of the mobile object 204).

Subsequently, the control unit 602 of the mobile object 205 calculates the sum of a movement vector obtained by multiplying the second main basic movement vector (−6 m/s, −8 m/s, 0 m/s) by 1 and a movement vector obtained by multiplying the communication maintaining movement vector by 0.5, and decides on the sum as a main basic movement vector. Also, the control unit 602 of the mobile object 205 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

If the mobile object 205 fails, the magnitude of the communication restoration vector 5525 is 0. Thus, even if the mobile object 205 fails and even if a mobile object belonging to an unknown group emerges, the mobile object 205 moves substantially west-southwestward in accordance with the actual movement vector 5705 as illustrated in FIG. 84, as in the case where the mobile object 205 does not fail and there is no mobile object belonging to an unknown group. Thus, direct communication can be maintained and an original purpose can be implemented in a balanced manner.

Only the mobile object 205 belongs to the direct communication group of the mobile object 206. Thus, the control unit 602 of the mobile object 206 decides on, as a communication maintaining movement vector, a movement vector having a magnitude of 2.8 m/s and having a direction toward the center position of all the mobile objects belonging to the direct communication group (the position of the mobile object 205).

Subsequently, the control unit 602 of the mobile object 206 calculates the sum of a movement vector obtained by multiplying the second main basic movement vector (−6 m/s, −8 m/s, 0 m/s) by 1 and a movement vector obtained by multiplying the communication maintaining movement vector by 0.5, and decides on the sum as a main basic movement vector. Also, the control unit 602 of the mobile object 206 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

If the mobile object 205 does not fail and if there is no mobile object belonging to an unknown group, the magnitude of the communication restoration vector is 0. Thus, an actual movement vector of the mobile object 206 is the sum of a movement vector obtained by multiplying the main basic movement vector by 0.5 and a movement vector obtained by multiplying the obstacle avoidance basic movement vector by 1, and the mobile object 206 moves substantially west-southwestward. However, if the mobile object 205 fails and if a mobile object belonging to an unknown group emerges, the actual movement vector 5706 of the mobile object 206 is the sum of a movement vector obtained by multiplying the main basic movement vector by 0.05, a movement vector obtained by multiplying the obstacle avoidance basic movement vector by 0.1, and a movement vector obtained by multiplying the communication restoration vector 5526 by 1, and the mobile object 206 moves substantially northeastward and mainly performs a communication restoration operation, as illustrated in FIG. 84.

There is no mobile object belonging to the direct communication group of the mobile object 207. Thus, the control unit 602 of the mobile object 207 decides on a communication maintaining movement vector having a magnitude of 0.

Subsequently, the control unit 602 of the mobile object 207 calculates the sum of a movement vector obtained by multiplying the second main basic movement vector (10 m/s, 0 m/s, 0 m/s) by 1 and a movement vector obtained by multiplying the communication maintaining movement vector by 0.5, and decides on the sum as a main basic movement vector. Also, the control unit 602 of the mobile object 207 calculates the sum of a movement vector obtained by multiplying the second obstacle avoidance basic movement vector (0 m/s, 0 m/s, 0 m/s) by 1 and a movement vector obtained by multiplying the communication maintaining movement vector by 0.5, and decides on the sum as an obstacle avoidance basic movement vector.

If the mobile object 205 does not fail and if there is no mobile object belonging to an unknown group, the magnitude of the communication restoration vector is 0. Thus, an actual movement vector of the mobile object 207 is the sum of a movement vector obtained by multiplying the main basic movement vector by 0.5 and a movement vector obtained by multiplying the obstacle avoidance basic movement vector by 1, and the mobile object 207 moves substantially eastward. However, if the mobile object 205 fails and if a mobile object belonging to an unknown group emerges, the actual movement vector 5707 of the mobile object 207 is the sum of a movement vector obtained by multiplying the main basic movement vector by 0.05, a movement vector obtained by multiplying the obstacle avoidance basic movement vector by 0.1, and a movement vector obtained by multiplying the communication restoration vector 5627 by 1, and the mobile object 207 moves substantially westward and mainly performs a communication restoration operation, as illustrated in FIG. 84.

In this way, the mobile objects 201 to 205 move to maintain direct communication and the mobile objects 206 and 207 move to get together. Thus, even if a mobile object disconnected from the ad hoc network moves to restore communication with the ad hoc network but there is no mobile object in the movement direction or even if a mobile object moves in a direction of getting away from the mobile object disconnected from the ad hoc network, as in the example illustrated in FIG. 4, an attempt to restore communication can be made.

The second technique disclosed in PTL 1 has an issue that all mobile objects are incapable of moving for an original purpose until communication is restored. In contrast, in the fourth embodiment of the present disclosure, the mobile objects 201 to 205 are capable of maintaining direct communication and implementing an original purpose in a balanced manner in the example illustrated in FIG. 84, for example, and the foregoing issue can be overcome.

The third technique disclosed in PTL 1 has an issue that a region over which a mobile object group is deployed gradually becomes smaller and all mobile objects are incapable of moving for an original purpose until communication is restored. Furthermore, after the communication is restored, the mobile objects need to move again for the original purpose from the positions at the point of time when the communication is restored. In contrast, in the fourth embodiment of the present disclosure, the mobile objects 201 to 205 are capable of maintaining direct communication and implementing an original purpose in a balanced manner in the example illustrated in FIG. 84, for example, and the foregoing issue can be overcome.

The fourth technique disclosed in PTL 1 has an issue that, if a selected mobile object moves toward a cutoff position, the communication between the selected mobile object and a mobile object other than a mobile object disconnected from the ad hoc network is cut off, and accordingly the ad hoc network may be secondarily fractured. In contrast, in the fourth embodiment of the present disclosure, the mobile objects 206 and 207 move to get together to attempt to restore communication, and the mobile objects 201 to 205 move to maintain direct communication in the example illustrated in FIG. 84, for example. Accordingly, the foregoing issue can be overcome.

In the fourth embodiment of the present disclosure, a target position is decided on in step S6112 every time before a communication restoration vector is decided on in step S6114, as long as there is a mobile object belonging to an unknown group. Alternatively, in a second configuration of the fourth embodiment, a target position may be decided on only if a mobile object belonging to the unknown group is changed.

In the second configuration of the fourth embodiment, a target position is decided on only if a mobile object belonging to the unknown group is changed, and thus the processing efficiency can be enhanced.

In the fourth embodiment of the present disclosure, it is determined in step S6110 whether or not there is a mobile object belonging to an unknown group, and if there is a mobile object belonging to an unknown group, steps S6111 to S6114 are performed to decide on a communication restoration vector having a magnitude that is not 0. Alternatively, in a third configuration of the fourth embodiment, the time when step S6111 is performed for the first time may be stored, and if a restoration period longer than 0 elapses from the time, the magnitude of the communication restoration vector may be set to 0 (step S6117) and the process may proceed to step S6115 without performing steps S6111 to S6114 even if there is a mobile object belonging to the unknown group. The value of the restoration period may be a constant or may be a value that is dynamically decided on when an actual process is performed.

In the third configuration of the fourth embodiment, if restoration of communication is not completed within the restoration period, the operation for restoration is stopped. Thus, a situation can be prevented from occurring where a communication restoration operation is endlessly performed.

In the third configuration of the fourth embodiment, the time when step S6111 is performed for the first time may be reset at an appropriate timing after the restoration period elapses, so that the process in steps S6111 to S6114 can be performed again. The appropriate timing may be, for example, when a mobile object belonging to the unknown group is changed or when a predetermined period further elapses (a fourth configuration of the fourth embodiment).

In the fourth configuration of the fourth embodiment, if a predetermined condition is satisfied after the restoration period elapses, the communication restoration operation can be retried.

In the fourth embodiment of the present disclosure, it is determined in step S6110 whether or not there is a mobile object belonging to an unknown group, and if there is a mobile object belonging to an unknown group, steps S6111 to S6114 are performed to decide on a communication restoration vector having a magnitude that is not 0. In a fifth configuration of the fourth embodiment, if a mobile object reaches a position where the distance to a target position is equal to or less than a movement stop determination distance, the magnitude of the communication restoration vector may be set to 0 (step S6117) and the process may proceed to step S6115 without performing steps S6111 to S6114, even if there is a mobile object belonging to an unknown group. The value of the movement stop determination distance may be a constant or may be a value that is dynamically decided on when an actual process is performed.

In the fifth configuration of the fourth embodiment, if restoration of communication is not completed even if the mobile object reaches the position where the distance to the target position is equal to or less than the movement stop determination distance, the operation for restoration is stopped. Thus, a situation can be prevented from occurring where a communication restoration operation is endlessly performed.

In the fifth configuration of the fourth embodiment, after the mobile object reaches the position where the distance to the target position is equal to or less than the movement stop determination distance, the magnitude of the communication restoration vector may be set to 0 (step S6117) and the process may proceed to step S6115 without performing steps S6111 to S6114, until a mobile object belonging to the unknown group is changed (a sixth configuration of the fourth embodiment).

In the sixth configuration of the fourth embodiment, if the mobile object reaches the position where the distance to the target position is equal to or less than the movement stop determination distance and then moves away to a position where the distance to the target position exceeds the movement stop determination distance, a communication restoration operation may be started again, so that a situation can be prevented from occurring where a communication restoration operation and a movement for an original purpose are alternately repeated.

In the fourth embodiment of the present disclosure, it is determined in step S6110 whether or not there is a mobile object belonging to an unknown group, and if there is a mobile object belonging to an unknown group, steps S6111 to S6114 are performed to decide on a communication restoration vector having a magnitude that is not 0. In a seventh configuration of the fourth embodiment, a second movement stop determination distance is calculated by multiplying the distance from a specific position to a target position by a movement stop determination coefficient. If the mobile object reaches a position where the distance to the target position is equal to or less than the second movement stop determination distance, the magnitude of the communication restoration vector may be set to 0 (step S6117) and the process may proceed to step S6115 without performing steps S6111 to S6114, even if there is a mobile object belonging to the unknown group. The value of the second movement stop determination coefficient may be a constant or may be a value that is dynamically decided on when an actual process is performed.

In the seventh configuration of the fourth embodiment, if restoration of communication is not completed even if the mobile object reaches the position where the distance to the target position is equal to or less than the second movement stop determination distance, the operation for restoration is stopped. Thus, a situation can be prevented from occurring where a communication restoration operation is endlessly performed.

In the seventh configuration of the fourth embodiment, after the mobile object reaches the position where the distance to the target position is equal to or less than the second movement stop determination distance, the magnitude of the communication restoration vector may be set to 0 (step S6117) and the process may proceed to step S6115 without performing steps S6111 to S6114, until a mobile object belonging to the unknown group is changed (an eighth configuration of the fourth embodiment).

In the eighth configuration of the fourth embodiment, if the mobile object reaches the position where the distance to the target position is equal to or less than the second movement stop determination distance and then moves away to a position where the distance to the target position exceeds the second movement stop determination distance, a communication restoration operation may be started again, so that a situation can be prevented from occurring where a communication restoration operation and a movement for an original purpose are alternately repeated.

In the fourth embodiment of the present disclosure, it is determined in step S6110 whether or not there is a mobile object belonging to an unknown group, and if there is a mobile object belonging to an unknown group, steps S6111 to S6114 are performed to decide on a communication restoration vector having a magnitude that is not 0. In a ninth configuration of the fourth embodiment, when the mobile object reaches the target position, the magnitude of the communication restoration vector may be set to 0 (step S6117) and the process may proceed to step S6115 without performing steps S6111 to S6114, even if there is a mobile object belonging to the unknown group.

In the ninth configuration of the fourth embodiment, if restoration of communication is not completed even if the mobile object reaches the target position, the operation for restoration is stopped. Thus, a situation can be prevented from occurring where a communication restoration operation is endlessly performed.

In the ninth configuration of the fourth embodiment, after the mobile object reaches the target position, the magnitude of the communication restoration vector may be set to 0 (step S6117) and the process may proceed to step S6115 without performing steps S6111 to S6114, until a mobile object belonging to the unknown group is changed (a tenth configuration of the fourth embodiment).

In the tenth configuration of the fourth embodiment, if the mobile object reaches the target position and then moves away from the target position, a communication restoration operation may be started again, so that a situation can be prevented from occurring where a communication restoration operation and a movement for an original purpose are alternately repeated.

In the third to tenth configurations of the fourth embodiment of the present disclosure, at the time of performing step S6110, in order to stop a communication restoration operation when the conditions described above regarding the individual configurations are satisfied, the magnitude of the communication restoration vector may be set to 0 (step S6117), and when the process proceeds to step S6115 without performing steps S6111 to S6114, the mobile objects belonging to the known group may be specified again as a component group, thereby dividing the ad hoc network (an eleventh configuration of the fourth embodiment).

In the eleventh configuration of the fourth embodiment, each mobile object belonging to the known group is capable of avoiding endless repetition of stop and restart of a communication restoration operation by restarting the communication restoration operation for the unknown group for which restoration of communication has failed.

In the third to tenth configurations of the fourth embodiment of the present disclosure, at the time of performing step S6110, in order to stop a communication restoration operation when the conditions described above regarding the individual configurations are satisfied, the magnitude of the communication restoration vector may be set to 0 (step S6117), and when the process proceeds to step S6115 without performing steps S6111 to S6114, a division notification indicating that the ad hoc network is to be divided may be transmitted to all the mobile objects belonging to the known group other than the own mobile object (a twelfth configuration of the fourth embodiment). When a division notification is received from another mobile object, the magnitude of the communication restoration vector may be set to 0 (step S6117), and the process may proceed to step S6115 without performing steps S6111 to S6114 even if there is a mobile object belonging to the unknown group in step S6110. Accordingly, the communication restoration operation is stopped and the mobile objects belonging to the known group at the time are specified again as a component group, thereby dividing the ad hoc network.

In the twelfth configuration of the fourth embodiment, each mobile object belonging to the known group is capable of specifying the same component group and is also capable of avoiding endless repetition of stop and restart of a communication restoration operation by restarting the communication restoration operation for the unknown group for which restoration of communication has failed.

In the third to tenth configurations of the fourth embodiment of the present disclosure, at the time of performing step S6110, in order to stop a communication restoration operation when the conditions described above regarding the individual configurations are satisfied, the magnitude of the communication restoration vector may be set to 0 (step S6117), and when the process proceeds to step S6115 without performing steps S6111 to S6114, known group information specifying the mobile objects belonging to the known group may be transmitted to all the mobile objects belonging to the known group other than the own mobile object (a thirteenth configuration of the fourth embodiment). When known group information is received from another mobile object, the magnitude of the communication restoration vector may be set to 0 (step S6117), and the process may proceed to step S6115 without performing steps S6111 to S6114 even if there is a mobile object belonging to the unknown group in step S6110. Accordingly, the communication restoration operation is stopped and the mobile objects specified by the known group information are specified again as a component group, thereby dividing the ad hoc network.

In the thirteenth configuration of the fourth embodiment, each mobile object belonging to the known group is capable of reliably specifying the same component group without being affected by a time lag in communication and is also capable of avoiding endless repetition of stop and restart of a communication restoration operation by restarting the communication restoration operation for the unknown group for which restoration of communication has failed.

In the present disclosure, all or some of the units, apparatuses, members, or portions, or all or some of functional blocks in the block diagrams in the drawings may be implemented by one or a plurality of electronic circuits including a semiconductor device, a semiconductor integrated circuit (IC), or a large scale integration (LSI). The LSI or IC may be integrated into a single chip or may be formed by combining a plurality of chips. For example, functional blocks other than a storage element may be integrated into a single chip. Although the LSI or IC is used here, an integrated circuit having another degree of integration may be used, for example, a system LSI, a very large scale integration (VLSI), or an ultra large scale integration (ULSI). A field programmable gate array (FPGA), which is programmed after manufacturing of the LSI, or a reconfigurable logic device, which is capable of reconfiguring the connection relationship in the LSI or setting up circuit sections in the LSI, can also be used for the same purpose.

Furthermore, the functions or operations of all or some of the units, apparatuses, members, or portions can be implemented by software processing. In this case, software is recorded on one or a plurality of non-transitory recording media, such as a ROM, an optical disc, or a hard disk drive. When the software is executed by a processor, a function specified by the software is executed by the processor and a peripheral device. A system or apparatus may include one or a plurality of non-transitory recording media including the software recorded thereon, a processor, and a necessary hardware device, for example, an interface.

An autonomous mobile robot and a movement control method according to an embodiment of the present disclosure are useful as an autonomous mobile robot and a movement control method for the autonomous mobile robot in which the autonomous mobile robot and a communication-partner autonomous mobile robot eventually move in cooperation with each other, both restoration of communication with the communication-partner autonomous mobile robot and a movement of the autonomous mobile robot for an original purpose can be achieved, and the autonomous mobile robot autonomously moves.

What is claimed is:

1. An autonomous mobile robot that autonomously moves while communicating with a communication-partner autonomous mobile robot, comprising:
   a driver that drives the autonomous mobile robot;
   a controller that outputs a first control command to the driver, the first control command causing the autonomous mobile robot to move by a first control amount corresponding to any one of a set of a first movement distance and a first movement direction, a set of a first velocity absolute value and a first velocity direction, and a set of a first acceleration absolute value and a first acceleration direction; and
   a communicator that receives, from a first communication-partner autonomous mobile robot that is different from the autonomous mobile robot and forms a network together with the autonomous mobile robot, first information indicating any one of a first position, a first velocity, and a first acceleration of the first communication-partner autonomous mobile robot, wherein
   if the controller detects that the first information is ceased to be received by the communicator, the controller decides on a second control amount by which the autonomous mobile robot is to be moved based on the first information that has already been received, the second control amount corresponding to any one of a set of a second movement distance and a second movement direction, a set of a second velocity absolute value and a second velocity direction, and a set of a second acceleration absolute value and a second acceleration direction,
   the controller decides on, based on the first control amount and the second control amount, a third control amount corresponding to any one of a set of a third movement distance and a third movement direction, a set of a third velocity absolute value and a third velocity direction, and a set of a third acceleration absolute value and a third acceleration direction, and
   the controller generates a second control command and outputs the second control command to the driver, the second control command causing the autonomous mobile robot to move by switching from the first control amount to the third control amount.

2. The autonomous mobile robot according to claim 1, wherein
   the first communication-partner autonomous mobile robot includes a plurality of first communication-partner autonomous mobile robots, and
   the communicator receives the first information from each of the plurality of first communication-partner autonomous mobile robots.

3. The autonomous mobile robot according to claim 1, wherein
   the communicator further receives, from a second communication-partner autonomous mobile robot that is different from the autonomous mobile robot and the first communication-partner autonomous mobile robot and forms the network together with the autonomous mobile robot, second information indicating any one of a second position, a second velocity, and a second acceleration of the second communication-partner autonomous mobile robot, and
   if the controller detects that the first information is ceased to be received by the communicator, the controller decides on, based on the second information, the second control amount.

4. The autonomous mobile robot according to claim 3, wherein
the second communication-partner autonomous mobile robot includes a plurality of second communication-partner autonomous mobile robots, and
the communicator receives the second information from each of the plurality of second communication-partner autonomous mobile robots.

5. The autonomous mobile robot according to claim 1, wherein
the controller obtains third information indicating a current position of the autonomous mobile robot,
the controller calculates, based on the first information and the third information, a distance between the autonomous mobile robot and the first communication-partner autonomous mobile robot, and
the controller decides on, based on the distance, the second control amount.

6. The autonomous mobile robot according to claim 5, wherein the controller decreases the second movement distance, the second velocity absolute value, or the second acceleration absolute value as the distance decreases.

7. The autonomous mobile robot according to claim 5, wherein the controller decreases the second movement distance, the second velocity absolute value, or the second acceleration absolute value as the distance increases.

8. The autonomous mobile robot according to claim 1, wherein if the controller detects that the first information is ceased to be received by the communicator, the controller outputs a third control command to the driver after a predetermined time period elapses from when the second control command is output to the driver, the third control command causing the autonomous mobile robot to move by switching from the third control amount to the first control amount.

9. The autonomous mobile robot according to claim 1, wherein
the first information includes the first position, and
if the controller detects that the first information is ceased to be received by the communicator, the controller determines whether or not a distance between the first position and a third position is equal to or less than a predetermined value, the third position being a position of the autonomous mobile robot after the second control command is output to the driver, and if the controller determines that the distance is equal to or less than the predetermined value, the controller outputs a third control command to the driver, the third control command causing the autonomous mobile robot to move by switching from the third control amount to the first control amount.

10. The autonomous mobile robot according to claim 9, further comprising:
a memory, wherein
the communicator further receives, from a second communication-partner autonomous mobile robot that is different from the autonomous mobile robot and the first communication-partner autonomous mobile robot and forms the network together with the autonomous mobile robot, second information indicating any one of a second position, a second velocity, and a second acceleration of the second communication-partner autonomous mobile robot,
the memory stores fourth information including the first information and the second information, and
the controller updates the fourth information stored in the memory by deleting the first information from the fourth information after outputting the third control command to the driver.

11. The autonomous mobile robot according to claim 10, wherein the controller causes the communicator to transmit the fourth information to the second communication-partner autonomous mobile robot after updating the fourth information.

12. The autonomous mobile robot according to claim 1, wherein if the controller detects that the first information is ceased to be received by the communicator and then detects that the first information is restarted to be received by the communicator, the controller outputs a third control command to the driver, the third control command causing the autonomous mobile robot to move by switching from the third control amount to the first control amount.

13. The autonomous mobile robot according to claim 12, wherein
the first communication-partner autonomous mobile robot includes a plurality of first communication-partner autonomous mobile robots, and
the communicator receives the first information again from each of the plurality of first communication-partner autonomous mobile robots.

14. The autonomous mobile robot according to claim 3, further comprising:
a memory that stores fourth information including the first information and the second information, wherein
after the second communication-partner autonomous mobile robot updates fifth information that includes information indicating the autonomous mobile robot and information indicating a third communication-partner autonomous mobile robot by deleting the information indicating the third communication-partner autonomous mobile robot from the fifth information, the second communication-partner autonomous mobile robot transmits the fifth information to the autonomous mobile robot,
the communicator receives the fifth information from the second communication-partner autonomous mobile robot, and
the controller updates the fourth information stored in the memory to the fifth information.

15. The autonomous mobile robot according to claim 14, wherein the third communication-partner autonomous mobile robot is the first communication-partner autonomous mobile robot.

16. The autonomous mobile robot according to claim 1, wherein
the communicator further receives, from a second communication-partner autonomous mobile robot that is different from the autonomous mobile robot and the first communication-partner autonomous mobile robot and forms the network together with the autonomous mobile robot, second information indicating any one of a second position, a second velocity, and a second acceleration of the second communication-partner autonomous mobile robot,
the controller decides on, based on the second information, a fourth control amount corresponding to any one of a set of a fourth movement distance and a fourth movement direction, a set of a fourth velocity absolute value and a fourth velocity direction, and a set of a fourth acceleration absolute value and a fourth acceleration direction, and the controller updates, based on the fourth control amount, the first control amount.

17. The autonomous mobile robot according to claim 16, wherein
the second information includes the second position, and
the controller decides on, based on a distance calculated from a current position of the autonomous mobile robot and the second position, the fourth control amount.

18. The autonomous mobile robot according to claim 17, wherein the controller decreases the fourth movement distance, the fourth velocity absolute value, or the fourth acceleration absolute value as the distance decreases.

19. The autonomous mobile robot according to claim 17, wherein the controller increases the fourth movement distance, the fourth velocity absolute value, or the fourth acceleration absolute value as the distance decreases.

20. The autonomous mobile robot according to claim 1, further comprising:
a memory that stores a movement path of the autonomous mobile robot, wherein
the controller decides on, based on a fourth control amount corresponding to any one of a set of a fourth movement distance and a fourth movement direction, a set of a fourth velocity absolute value and a fourth velocity direction, and a set of a fourth acceleration absolute value and a fourth acceleration direction, the first control amount,
the fourth movement distance, the fourth velocity absolute value, or the fourth acceleration absolute value is a predetermined value, and
the fourth movement direction, the fourth velocity direction, or the fourth acceleration direction is opposite to a movement direction specified by the movement path.

21. A movement control method for an autonomous mobile robot that autonomously moves while communicating with a communication-partner autonomous mobile robot, comprising:
outputting a first control command that causes the autonomous mobile robot to move by a first control amount corresponding to any one of a set of a first movement distance and a first movement direction, a set of a first velocity absolute value and a first velocity direction, and a set of a first acceleration absolute value and a first acceleration direction;
receiving, from a first communication-partner autonomous mobile robot that is different from the autonomous mobile robot and forms a network together with the autonomous mobile robot, first information indicating any one of a first position, a first velocity, and a first acceleration of the first communication-partner autonomous mobile robot;
if a detection is made that the first information is ceased to be received, deciding on a second control amount by which the autonomous mobile robot is to be moved based on the first information that has already been received, the second control amount corresponding to any one of a set of a second movement distance and a second movement direction, a set of a second velocity absolute value and a second velocity direction, and a set of a second acceleration absolute value and a second acceleration direction;
deciding on, based on the first control amount and the second control amount, a third control amount corresponding to any one of a set of a third movement distance and a third movement direction, a set of a third velocity absolute value and a third velocity direction, and a set of a third acceleration absolute value and a third acceleration direction; and
generating and outputting a second control command that causes the autonomous mobile robot to move by switching from the first control amount to the third control amount.

* * * * *